US011995874B2

(12) United States Patent
Sugio et al.

(10) Patent No.: US 11,995,874 B2
(45) Date of Patent: May 28, 2024

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Toshiyasu Sugio, Osaka (JP); Noritaka Iguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 337 days.

(21) Appl. No.: 17/557,829

(22) Filed: Dec. 21, 2021

(65) Prior Publication Data

US 2022/0114766 A1    Apr. 14, 2022

Related U.S. Application Data

(63) Continuation of application No. PCT/JP2020/026101, filed on Jul. 2, 2020.
(Continued)

(51) Int. Cl.
*G06T 9/40*    (2006.01)
(52) U.S. Cl.
CPC .................................... *G06T 9/40* (2013.01)
(58) Field of Classification Search
None
See application file for complete search history.

(56) References Cited

U.S. PATENT DOCUMENTS 8,233,742 B2 *  7/2012  Masuda ................... G06T 7/35
                                           382/280
11,694,368 B2 *  7/2023  Sugio ................. G06F 18/241
                                           382/232
(Continued)

FOREIGN PATENT DOCUMENTS

WO    2014/020663    2/2014
WO    2019/082837    5/2019

OTHER PUBLICATIONS

International Search Report (ISR) dated Sep. 24, 2020 in International (PCT) Application No. PCT/JP2020/026101.

*Primary Examiner* — Anand P Bhatnagar
(74) *Attorney, Agent, or Firm* — Wenderoth, Lind & Ponack, L.L.P.

(57) ABSTRACT

A three-dimensional data encoding method includes: assigning three-dimensional points to one of layers, based on items of geometry information of the three-dimensional points; searching three-dimensional points surrounding a current three-dimensional point to be encoded, to select, from the three-dimensional points, a three-dimensional point to be referred to when a predicted value of attribute information of the current three-dimensional point is calculated, the current three-dimensional point belonging to a first layer among the layers; and calculating the predicted value of the attribute information of the current three-dimensional point using the three-dimensional point selected. In the searching of the three-dimensional points, a search range for a same layer as the current three-dimensional point is different from a search range for a layer higher than the first layer.

6 Claims, 130 Drawing Sheets

Related U.S. Application Data

(60) Provisional application No. 62/869,786, filed on Jul. 2, 2019.

(56) References Cited

U.S. PATENT DOCUMENTS

| | | | |
|---|---|---|---|
| 11,726,184 B2* | 8/2023 | Ferreira | G01S 7/4815 |
| | | | 356/4.01 |
| 11,729,243 B2* | 8/2023 | Oyman | H04N 19/597 |
| | | | 709/219 |
| 2014/0375638 A1 | 12/2014 | Tomaru et al. | |
| 2020/0252659 A1 | 8/2020 | Lasang et al. | |
| 2020/0364904 A1* | 11/2020 | Najaf-Zadeh | H04N 19/597 |
| 2021/0006614 A1* | 1/2021 | Oyman | H04N 19/30 |
| 2021/0105451 A1* | 4/2021 | Oyman | H04N 19/597 |
| 2021/0312669 A1* | 10/2021 | Sugio | G06F 18/2431 |
| 2021/0375004 A1* | 12/2021 | Sugio | G06T 9/001 |
| 2021/0383577 A1* | 12/2021 | Sugio | G06F 18/241 |
| 2021/0409715 A1* | 12/2021 | Sugio | H04N 19/124 |
| 2023/0100085 A1* | 3/2023 | Sugio | G06T 9/001 |
| | | | 382/232 |

* cited by examiner

| | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 27

```
EXAMPLES OF SEMANTICS OF pcc_nal_unit_type
(1) if pcc_codec_type == Codec 1
      0:Codec1 Goemetry
      1:Codec1 AttributeX
      2:Codec1 AttributeY
      3:Codec1 Geom. PS
      4:Codec1 AttrX. PS
      5:Codec1 AttrX. PS
      6:Codec1 Geometry Sequence PS
      7:Codec1 AttributeX Sequence PS
      8:Codec1 AttributeY Sequence PS
      9:Codec1 AU Header
     10:Codec1 GOF Header
     11~:Codec1 reserved for future use (2) if pcc_codec_type == Codec 2
      0:Codec2 DataA
      1:Codec2 MetaDataA
      2:Codec2 MetaDataB
      3~:Codec2 reserved for future use
```

| a0 | a1 | a2 | LoD0 | Thres_LoD[0] = 10 | SPARSE |
| b0 | b1 | b2 | LoD1 | Thres_LoD[1] = 5 | ↕ |
| c0 | c1 | c2 | LoD2 | Thres_LoD[2] = 0 | DENSE |

FIG. 37

| VALUE | BIT |
|-------|-----|
| 0 | 1 |
| 1 | 010 |
| 2 | 011 |
| 3 | 00100 |
| 4 | 00101 |
| 5 | 00110 |
| 6 | 00111 |
| 7 | 0001000 |
| ... | ... |

FIG. 38

| VALUE | BIT |
|-------|-----|
| 3 | 00100 |
| 4 | 00101 |
| 5 | 00110 |
| 6 | 00111 |

PREFIX SUFFIX 00   1   00

↑

TERMINATE SYMBOL

FIG. 39

```
attribute_header{
...
NumLoD for (i=0; i<NumLoD; i++) {
 NumOfPoint[i]
}
...
for (i=0; i<NumLoD-1; i++) {
 Thres_LoD[i]
}
...
for (i=0; i<NumLoD; i++) {
 NumNeighborPoint[i]
}
...
for (i=0; i<NumLoD; i++) {
 THd[i]
}
...
for (i=0; i<NumLoD; i++) {
 QS[i]
}
...
for (i=0; i<NumLoD; i++) {
 R_TH[i]
}
...
}
```

FIG. 40

```
attribute_data{
...
for (i=0; i<NumLoD; i++) {
 for(j=0; j<NumOfPoint[i]; j++) {
  n-bit code
  if (n-bit code == R_TH[i])
   remaining code
 }
}
...
}
```

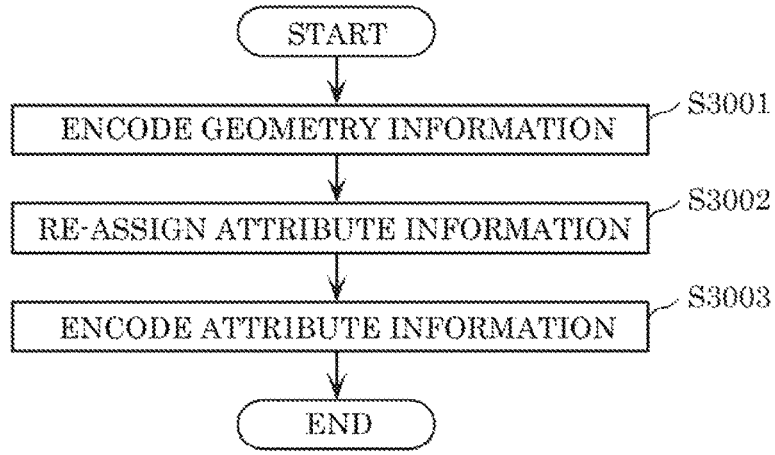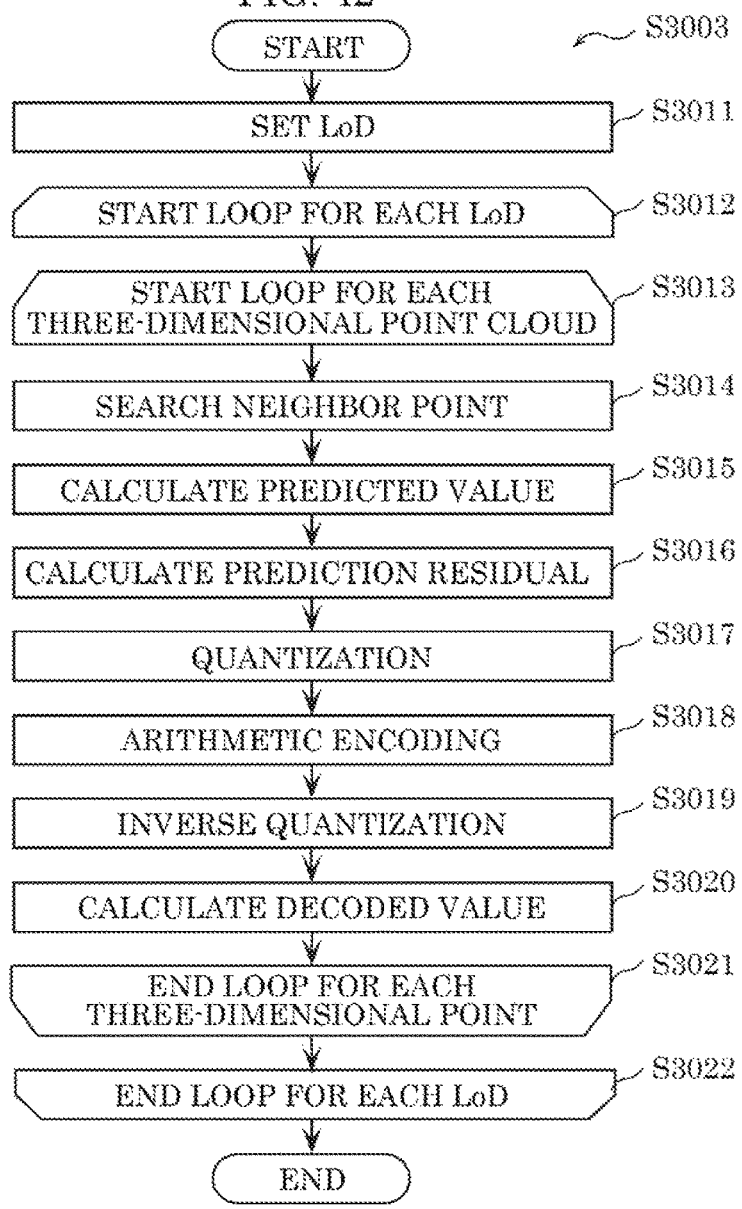

FIG. 43

| VALUE | BIT   |
|-------|-------|
| 3     | 00100 |
| 4     | 00101 |
| 5     | 00110 |
| 6     | 00111 |

PREFIX  SUFFIX 00  1  00

TERMINATE SYMBOL

FIG. 44

| VALUE | BIT     |
|-------|---------|
| 0     | 1       |
| 1     | 010     |
| 2     | 011     |
| 3     | 00100   |
| 4     | 00101   |
| 5     | 00110   |
| 6     | 00111   |
| 7     | 0001000 |
| ...   | ...     |

REVERSE LOOKUP

| PREDICTION MODE | PREDICTED VALUE |
|---|---|
| 0 | AVERAGE VALUE OF a0, a1, a2, b1 |
| 1 | b1 |
| 2 | a2 |
| 3 | a1 |
| 4 | a0 |

FIG. 51

| PREDICTION MODE | PREDICTED VALUE |
|---|---|
| 0 | AVERAGE VALUE OF a0, a1 |
| 1 | a1 |
| 2 | a0 |
| 3 | NOT AVAILABLE |
| 4 | NOT AVAILABLE |

FIG. 52

| PREDICTION MODE | PREDICTED VALUE |
|---|---|
| 0 | AVERAGE VALUE OF a0, a1, a2, b1 (Yave, Uave, Vave) |
| 1 | b1 = (Yb1, Ub1, Vb1) |
| 2 | a2 = (Ya2, Ua2, Va2) |
| 3 | a1 = (Ya1, Ua1, Va1) |
| 4 | a0 = (Ya0, Ua0, Va0) |

FIG. 53

| PREDICTION MODE | PREDICTED VALUE |
|---|---|
| 0 | AVERAGE VALUE OF a0, a1, a2, b1<br>Rave |
| 1 | b1 = Rb1 |
| 2 | a2 = Ra2 |
| 3 | a1 = Ra1 |
| 4 | a0 = Ra0 |

FIG. 54

| PREDICTION MODE Y | PREDICTED VALUE |
|---|---|
| 0 | AVERAGE VALUE OF a0, a1, a2, b1<br>Yave |
| 1 | b1 = Yb1 |
| 2 | a2 = Ya2 |
| 3 | a1 = Ya1 |
| 4 | a0 = Ya0 |

FIG. 55

| PREDICTION MODE U | PREDICTED VALUE |
|---|---|
| 0 | AVERAGE VALUE OF a0, a1, a2, b1 Uave |
| 1 | b1 = Ub1 |
| 2 | a2 = Ua2 |
| 3 | a1 = Ua1 |
| 4 | a0 = Ua0 |

FIG. 56

| PREDICTION MODE V | PREDICTED VALUE |
|---|---|
| 0 | AVERAGE VALUE OF a0, a1, a2, b1 Vave |
| 1 | b1 = Vb1 |
| 2 | a2 = Va2 |
| 3 | a1 = Va1 |
| 4 | a0 = Va0 |

FIG. 57

| PREDICTION MODE UV | PREDICTED VALUE |
|---|---|
| 0 | AVERAGE VALUE OF a0, a1, a2, b1 (Uave, Vave) |
| 1 | b1 = (Ub1, Vb1) |
| 2 | a2 = (Ua2, Va2) |
| 3 | a1 = (Ua1, Va1) |
| 4 | a0 = (Ua0, Va0) |

FIG. 58

| PREDICTION MODE | BINARY DATA |
|---|---|
| 0 | 0 |
| 1 | 10 |
| 2 | 110 |
| 3 | 1110 |
| 4 | 1111 |

FIG. 59

| PREDICTION MODE | BINARY DATA |
|---|---|
| 0 | 0 |
| 1 | 10 |
| 2 | 110 |
| 3 | 1110 |
| 4 | 11110 |

FIG. 60

| PREDICTION MODE | BINARY DATA |
|---|---|
| 0 | 000 |
| 1 | 001 |
| 2 | 010 |
| 3 | 011 |
| 4 | 100 |

| PREDICTION MODE | BINARY DATA |
|---|---|
| 0 | 0 |
| 1 | 10 |
| 2 | 110 |
| 3 | 1110 |
| 4 | 11110 |

ONE BIT  REMAINING BIT
1   110

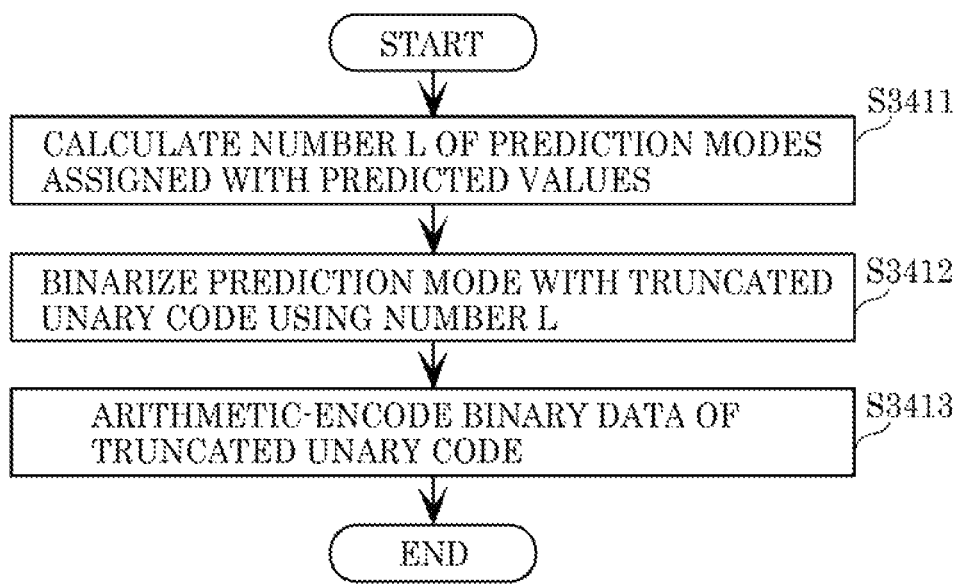

```
ATTRIBUTE VALUES OF N SURROUNDING
THREE-DIMENSIONAL POINTS: a[0]~a[N-1]
MAXIMUM ABSOLUTE DIFFERENTIAL VALUE: maxdiff
CALCULATED, FOR EXAMPLE, BY THE FOLLOWING:
maxdiff = -1
for (i=0; i<N; i++) {
 for (j=i+1; j<N; j++) {
   diff = abs(a[i] -a[j]);
   if (diff > maxdiff) {
    maxdiff= diff;
   }
  }
 }

※ATTRIBUTE VALUES OF N SURROUNDING
THREE-DIMENSIONAL POINTS ARE ENCODED
AND DECODED ATTRIBUTE VALUES
```

FIG. 71

```
attribute_header{
...
NumLoD
...
for (i=0; i<NumLoD; i++) {
 NumNeighborPoint[i]
}

...
for (i=0; i<NumLoD; i++) {
 NumPredMode[i]
}

...
for (i=0; i<NumLoD; i++) {
 Thfix[i]
}

...
for (i=0; i<NumLoD; i++) {
 NumOfPoint[i]
}

}...
```

```
attribute_data {
 ...
 for (i=0; i<NumLoD; i++) {
  for (j=0; j<NumOfPoint[i]; j++) {
   if (maxdiff>= Thfix[i] && NumPredMode[i] > 1)
    PredMode
   n-bit code
   if (n-bit code == R_TH[i])
    remaining code
  }
 }
 ...
}
```

FIG. 85

```
maxdiff = -1
for (i=0; i<N; i++) {
  for (j=i+1; j<N; j++) {
    diff = abs(a[i] ? a[j]);
    if (diff > maxdiff) {
      maxdiff = diff;
    }
  }
}
```

FIG. 87

```
attribute_data {
 ...
 for (i=0; i<NumLoD; i++) {
  for (j=0; j<NumOfPoint[i]; j++) {
    fixedPredMode
    if (!fixedPredMode && NumPredMode[i] > 1)
     PredMode
    n-bit code
    if (n-bit code== R_TH[i])
     remaining code
   }
  }
  ...
 }
```

FIG. 88

```
attribute_data {
...
for (i=0; i<NumLoD; i++) {
  fixedPredMode[i]
  for (j=0; j<NumOfPoint[i]; j++) {
  if (!fixedPredMode[i] && NumPredMode[i] > 1)
    PredMode
  n-bit code
  if (n-bit code == R_TH[i])
    remaining code
  }
 }
 ...
}
```

FIG. 102

```
attribute_data {
 ...
 for (i=0; i<NumloD; i++) {
  for (j=0; j<NumOfPoint[i]; j++) {
   if (NumPredMode[i] > 1)
    PredMode
    n-bit code
    if (n-bit code == R_TH[i])
     remaining code
  }
 }
 ...
}
```

FIG. 115

```
attribute_data {
  ...
  ZeroCnt
  for (i=0; i<NumOfPoint; i++) {
    if (ZeroCnt > 0 ) {
      for (j=0; j<attribute_dimension; j++)
        value[j][i] = 0
      --ZeroCnt
    }
    else {
      for (j=0; j<attribute_dimension; j++)
        value[j][i]
      for(d=1, j=1; j<attribute_dimension; j++)
        if (value[j][i] != value[j-1][i])
          d = 0
      for(j=0; j< attribute_dimension; j++ )
        value[j][i] += d
      ZeroCnt
    }
  }
  ...
};
```

FIG. 116

| FIRST DIMENSIONAL COMPONENT (R COMPONENT, v0): | 73 | 50 | 32 | 15 | 0 | 12 | 0 | 0 | 0 | ... | 0 |
| SECOND DIMENSIONAL COMPONENT (G COMPONENT, v1): | 60 | 20 | 0 | 0 | 0 | 10 | 0 | 0 | 0 | ... | 0 |
| THIRD DIMENSIONAL COMPONENT (B COMPONENT, v2): | 58 | 10 | 12 | 0 | 0 | 12 | 0 | 0 | 0 | ... | 0 |

| 0 | 73 | 60 | 58 | 0 | 50 | 20 | 10 | 0 | 32 | 0 | 12 | ... |
|   | v0 | v1 | v2 |   | v0 | v1 | v2 |   | v0 | v1 | v2 |     |

| ... | 0 | 15 | 0 | 0 | 1 | 12 | 10 | 12 | N |
|     | ZeroCnt | v0 | v1 | v2 | ZeroCnt | v0 | v1 | v2 | ZeroCnt |

```
attribute_data {
...
ZeroCnt
for (i=0; i<NumOfPoint; i++) {
  if (maxdiff >= Thfix && NumPredMode[i] > 1)
    PredMode
  if (ZeroCnt > 0 ) {
    for (j=0; j<attribute_dimension; j++)
      value[j][i] = 0
    --ZeroCnt
  }
  else {
    for (j=0; j<attribute_dimension; j++)
      value[j][i]
    for(d=1, j=1; j<attribute_dimension; j++)
      if (value[j][i] != value[j-1][i])
        d = 0
    for(j=0; j< attribute_dimension; j++ )
      value[j][i] += d
    ZeroCnt
  }
}
...
}
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2020/026101 filed on Jul. 2, 2020, claiming the benefit of priority of U.S. Provisional Patent Application No. 62/869,786 filed on Jul. 2, 2019, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (for example, see International Publication WO 2014/020663).

SUMMARY

There has been a demand for reducing the processing amount of three-dimensional data encoding processing and three-dimensional data decoding processing.

The present disclosure provides a three-dimensional data encoding method, a three-dimensional data decoding method, a three-dimensional data encoding device, or a three-dimensional data decoding device that is capable of reducing a processing amount.

A three-dimensional data encoding method according to one aspect of the present disclosure includes: assigning three-dimensional points to one of layers, based on items of geometry information of the three-dimensional points; searching three-dimensional points surrounding a current three-dimensional point to be encoded, to select, from the three-dimensional points, a three-dimensional point to be referred to when a predicted value of attribute information of the current three-dimensional point is calculated, the current three-dimensional point belonging to a first layer among the layers; and calculating the predicted value of the attribute information of the current three-dimensional point using the three-dimensional point selected. In the searching of the three-dimensional points, a search range for a same layer as the current three-dimensional point is different from a search range for a layer higher than the first layer.

A three-dimensional data decoding method according to one aspect of the present disclosure includes: assigning three-dimensional points to one of layers, based on items of geometry information of the three-dimensional points; searching three-dimensional points surrounding a current three-dimensional point to be decoded, to select, from the three-dimensional points, a three-dimensional point to be referred to when a predicted value of attribute information of the current three-dimensional point is calculated, the current three-dimensional point belonging to a first layer among the layers; and calculating the predicted value of the attribute information of the current three-dimensional point using the three-dimensional point selected. In the searching of the three-dimensional points, a search range for a same layer as the current three-dimensional point is different from a search range for a layer higher than the first layer.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 27 is a diagram illustrating a semantics example of pcc_nal_unit_type according to Embodiment 2;

FIG. 37 is a diagram illustrating examples of exponential-Golomb codes according to Embodiment 3;

FIG. 38 is a diagram indicating a process on exponential-Golomb codes according to Embodiment 3;

FIG. 39 is a diagram indicating an example of a syntax in attribute header according to Embodiment 3;

FIG. 40 is a diagram indicating an example of a syntax in attribute data according to Embodiment 3;

FIG. 41 is a flowchart of a three-dimensional data encoding process according to Embodiment 3;

FIG. 42 is a flowchart of an attribute information encoding process according to Embodiment 3;

FIG. 43 is a diagram indicating processing on exponential-Golomb codes according to Embodiment 3;

FIG. 44 is a diagram indicating an example of a reverse lookup table indicating relationships between remaining codes and the values thereof according to Embodiment 3;

FIG. 51 is a diagram showing a second example of a table representing predicted values calculated in the prediction modes according to Embodiment 4;

FIG. 52 is a diagram showing a third example of a table representing predicted values calculated in the prediction modes according to Embodiment 4;

FIG. 53 is a diagram showing a fourth example of a table representing predicted values calculated in the prediction modes according to Embodiment 4;

FIG. 54 is a diagram showing a fifth example of a table representing predicted values calculated in the prediction modes according to Embodiment 4;

FIG. 55 is a diagram showing a sixth example of a table representing predicted values calculated in the prediction modes according to Embodiment 4;

FIG. 56 is a diagram showing a seventh example of a table representing predicted values calculated in the prediction modes according to Embodiment 4;

FIG. 57 is a diagram showing an eighth example of a table representing predicted values calculated in the prediction modes according to Embodiment 4;

FIG. 58 is a diagram showing a first example of a binarization table in binarizing and encoding prediction mode values according to Embodiment 4;

FIG. 59 is a diagram showing a second example of a binarization table in binarizing and encoding the prediction mode values according to Embodiment 4;

FIG. 60 is a diagram showing a third example of a binarization table in binarizing and encoding the prediction mode values according to Embodiment 4;

FIG. 65 is a diagram for describing an example of encoding binary data in the binarization table in binarizing and encoding the prediction modes according to Embodiment 4;

FIG. 66 is flowchart of another example of encoding a prediction mode value according to Embodiment 4;

FIG. 71 is a diagram showing an example of a syntax according to Embodiment 4;

FIG. 85 is a diagram showing an example of a syntax of the prediction mode determination process performed by the three-dimensional data encoding device according to Embodiment 5;

FIG. 87 is a diagram showing an example of a syntax of attribute data when a prediction mode fixing flag is provided for each three-dimensional point according to Embodiment 5;

FIG. 88 is a diagram showing an example of a syntax of attribute data when a prediction mode fixing flag is provided for each LoD according to Embodiment 5;

FIG. 102 is a diagram showing another example of a syntax of attribute data according to Embodiment 5;

FIG. 115 is a diagram showing a syntax example of the attribute information according to Embodiment 6;

FIG. 116 is a diagram showing an example of the predicted residual and ZeroCnt according to Embodiment 6;

FIG. 119 is a flowchart of the attribute information encoding processing according to Embodiment 6;

FIG. 120 is a flowchart of the predicted residual encoding processing according to Embodiment 6;

FIG. 121 is a flowchart of the three-dimensional data decoding processing according to Embodiment 6;

FIG. 122 is a flowchart of the attribute information decoding processing according to Embodiment 6;

FIG. 123 is a flowchart of the predicted residual decoding processing according to Embodiment 6;

FIG. 124 is a block diagram of an attribute information encoder according to Embodiment 6;

FIG. 125 is a block diagram of an attribute information decoder according to Embodiment 6;

FIG. 126 is a diagram illustrating a first example of a LoD according to Embodiment 7;

FIG. 127 is a diagram illustrating a second example of the LoD according to Embodiment 7;

FIG. 128 is a diagram illustrating a third example of the LoD according to Embodiment 7;

FIG. 129 is a diagram showing an example of a processing of re-ordering three-dimensional points according to Embodiment 8;

FIG. 130 is a diagram showing an example of a layer assignment processing according to Embodiment 8;

Figure 131:
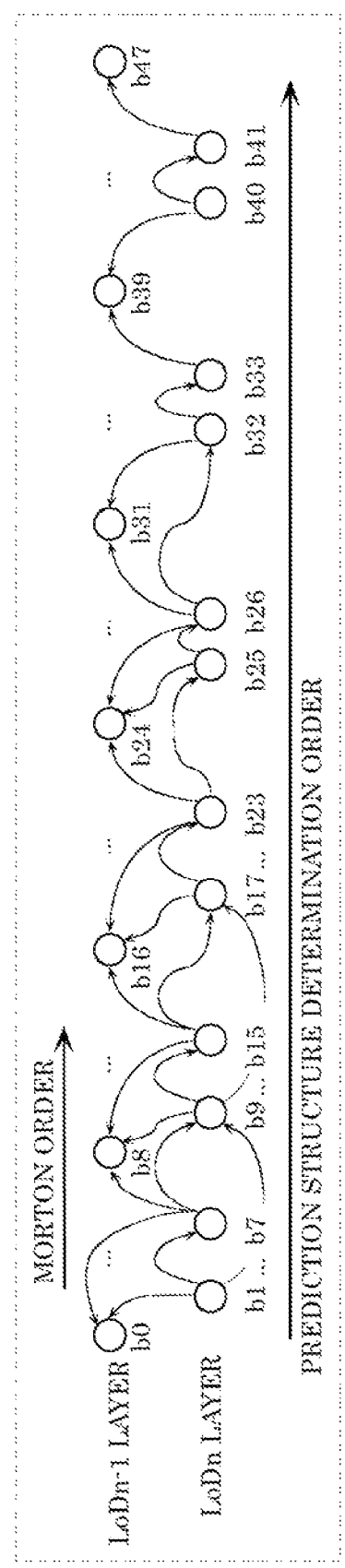
Figure 132:
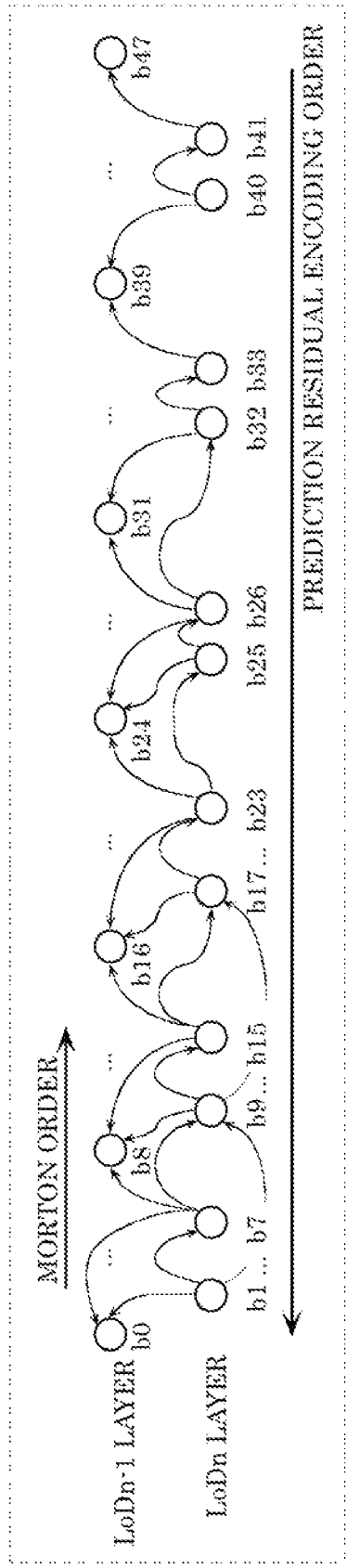
Figure 133:
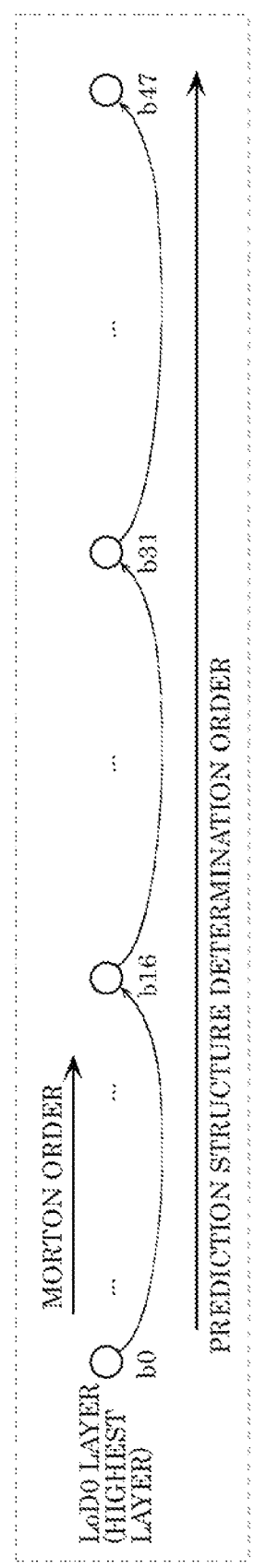
Figure 134:
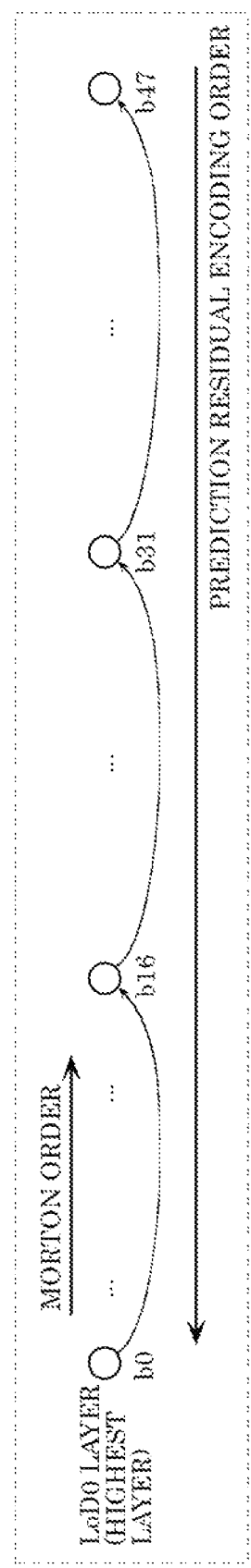
Figure 135:
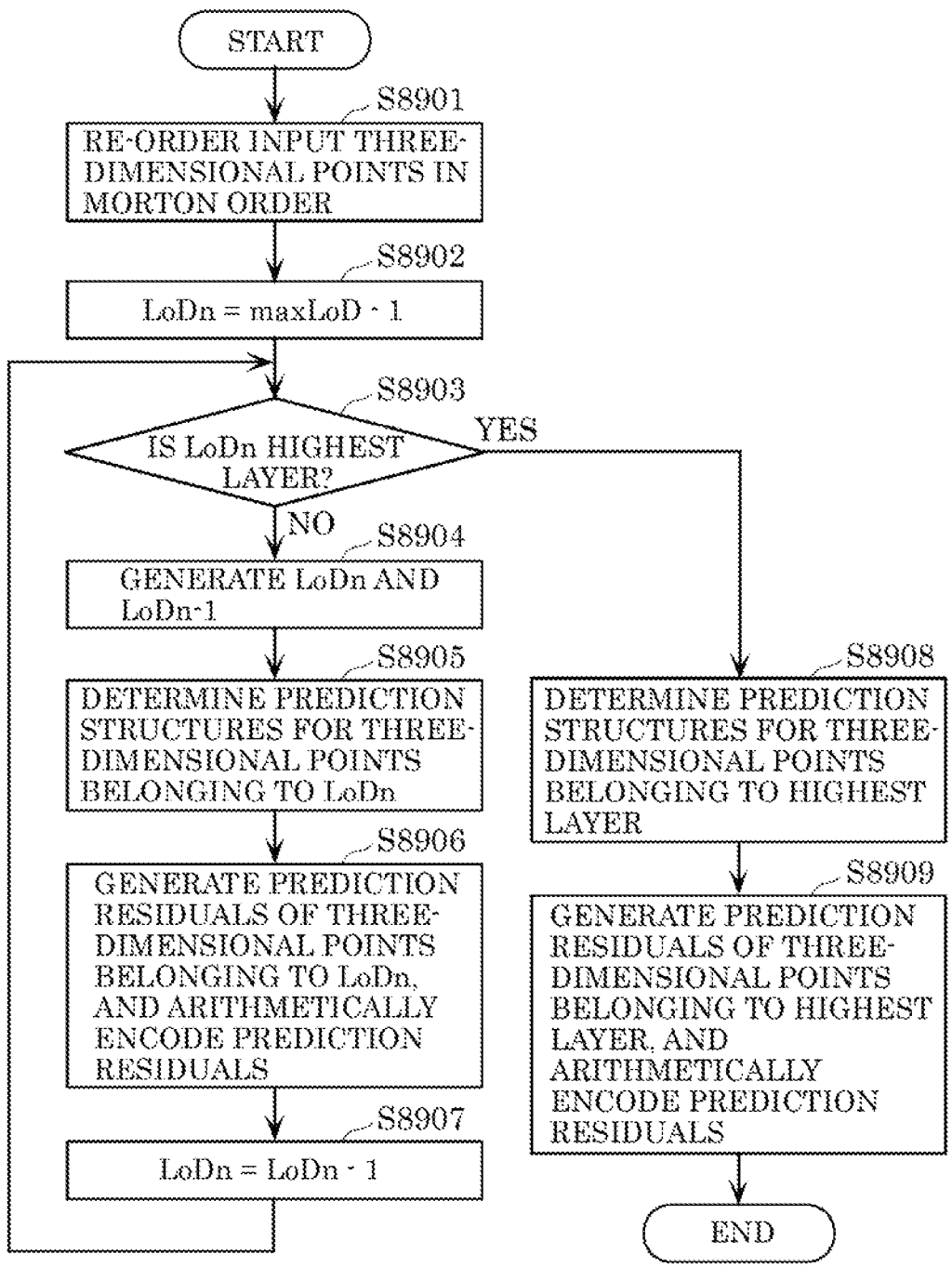
Figure 136:
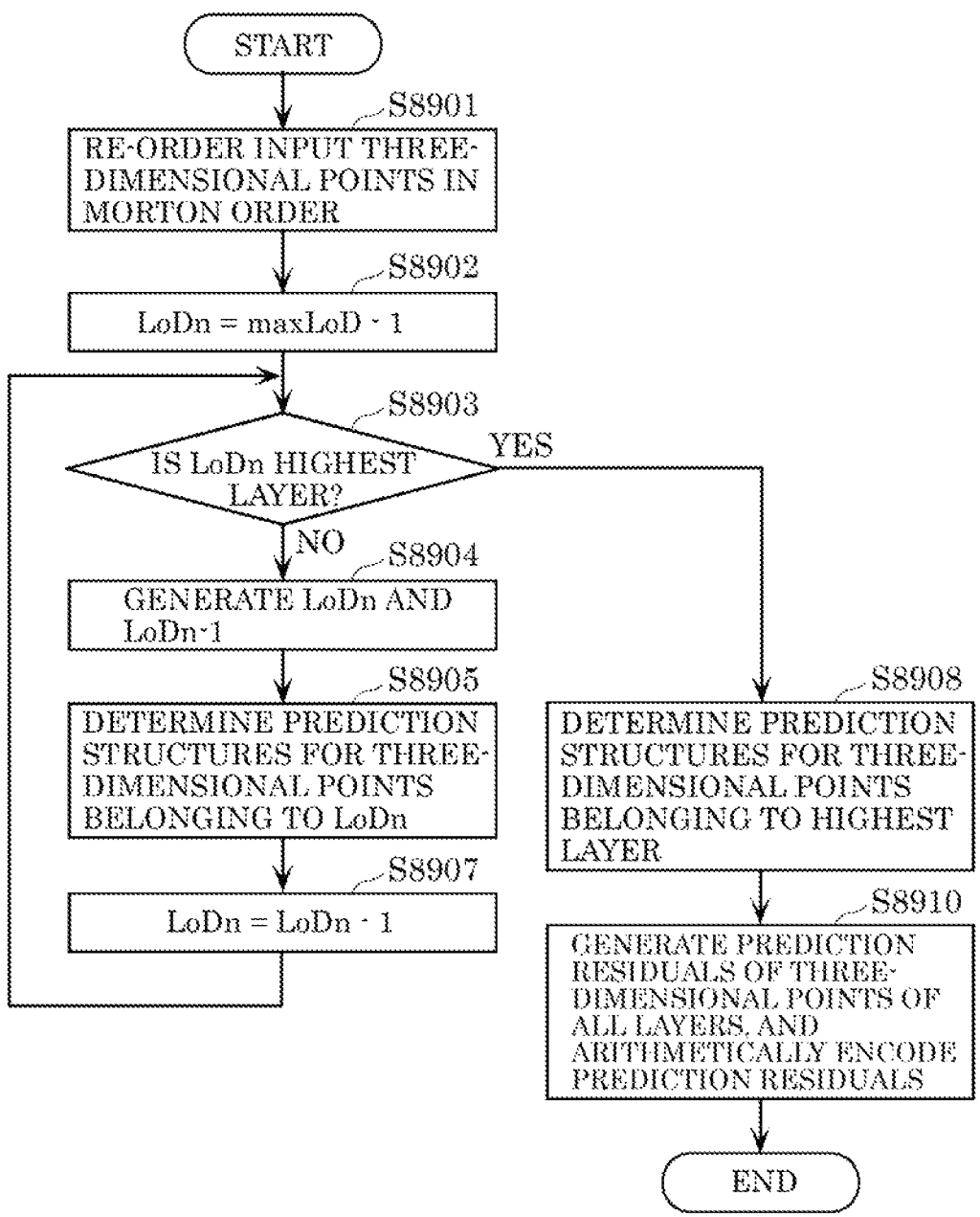
Figure 137:
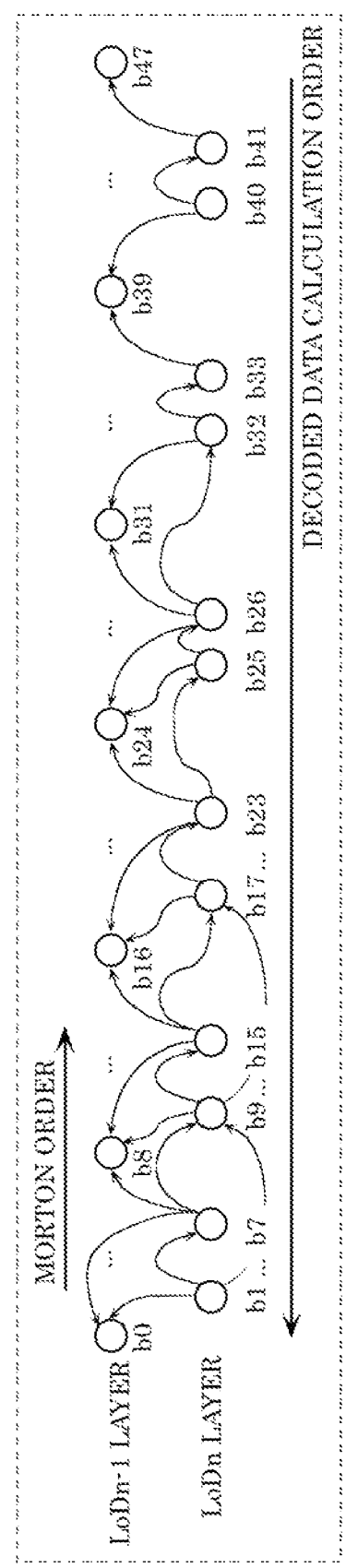
Figure 138:
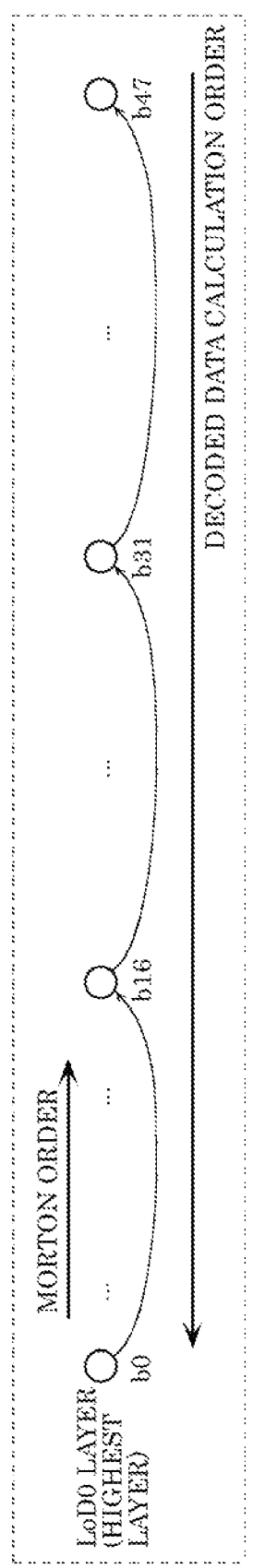
Figure 139:
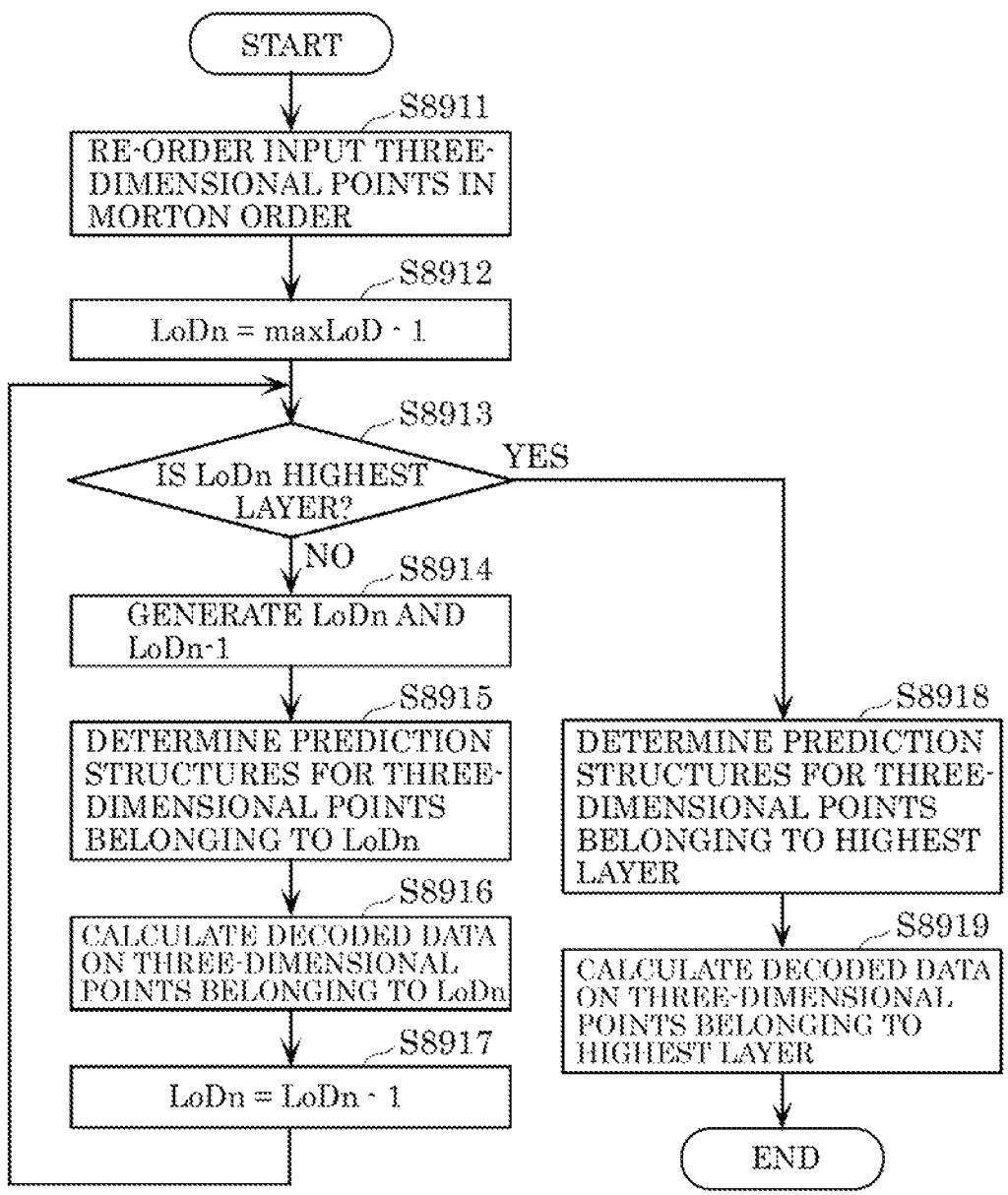
Figure 140:
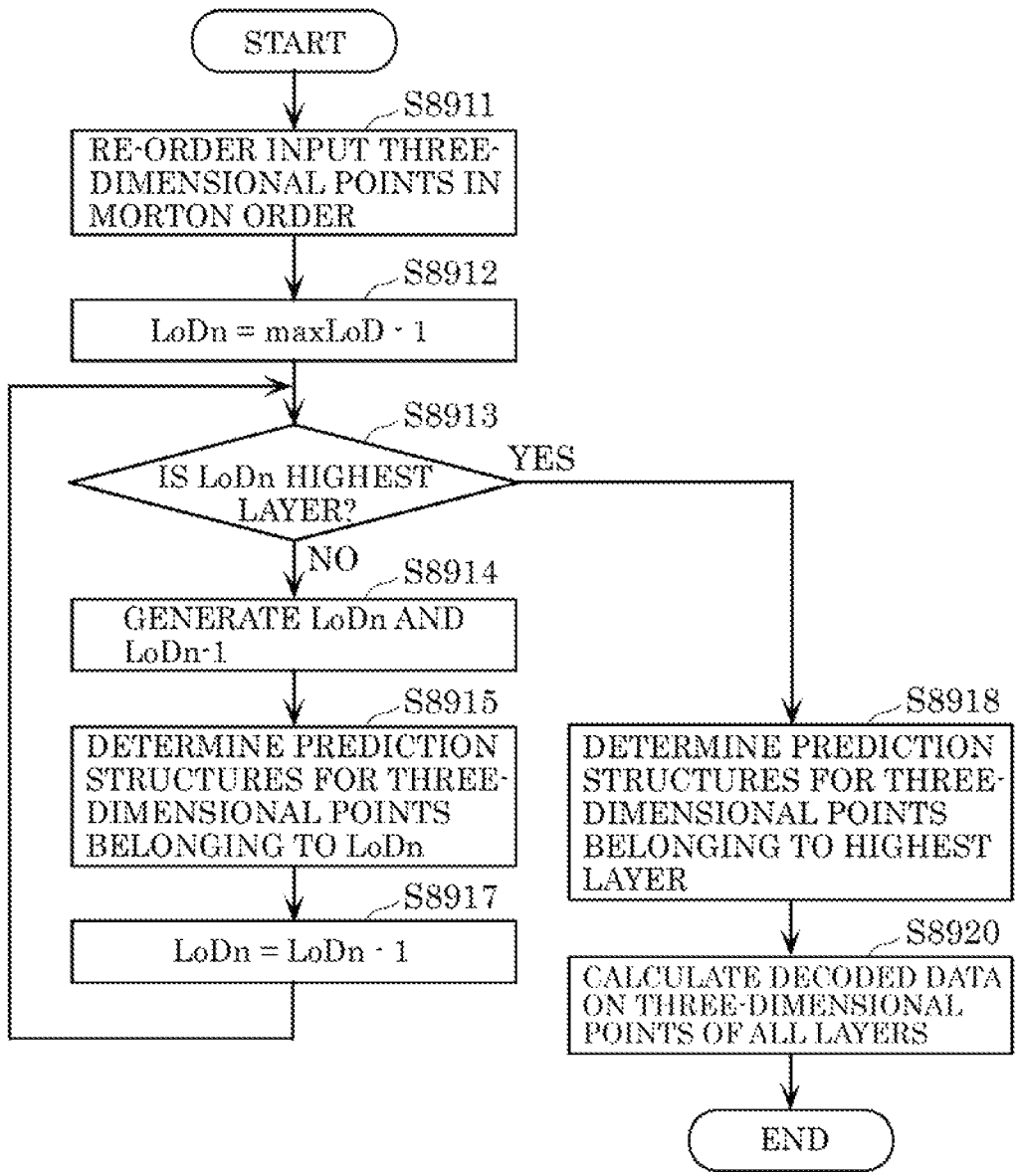
Figure 141:
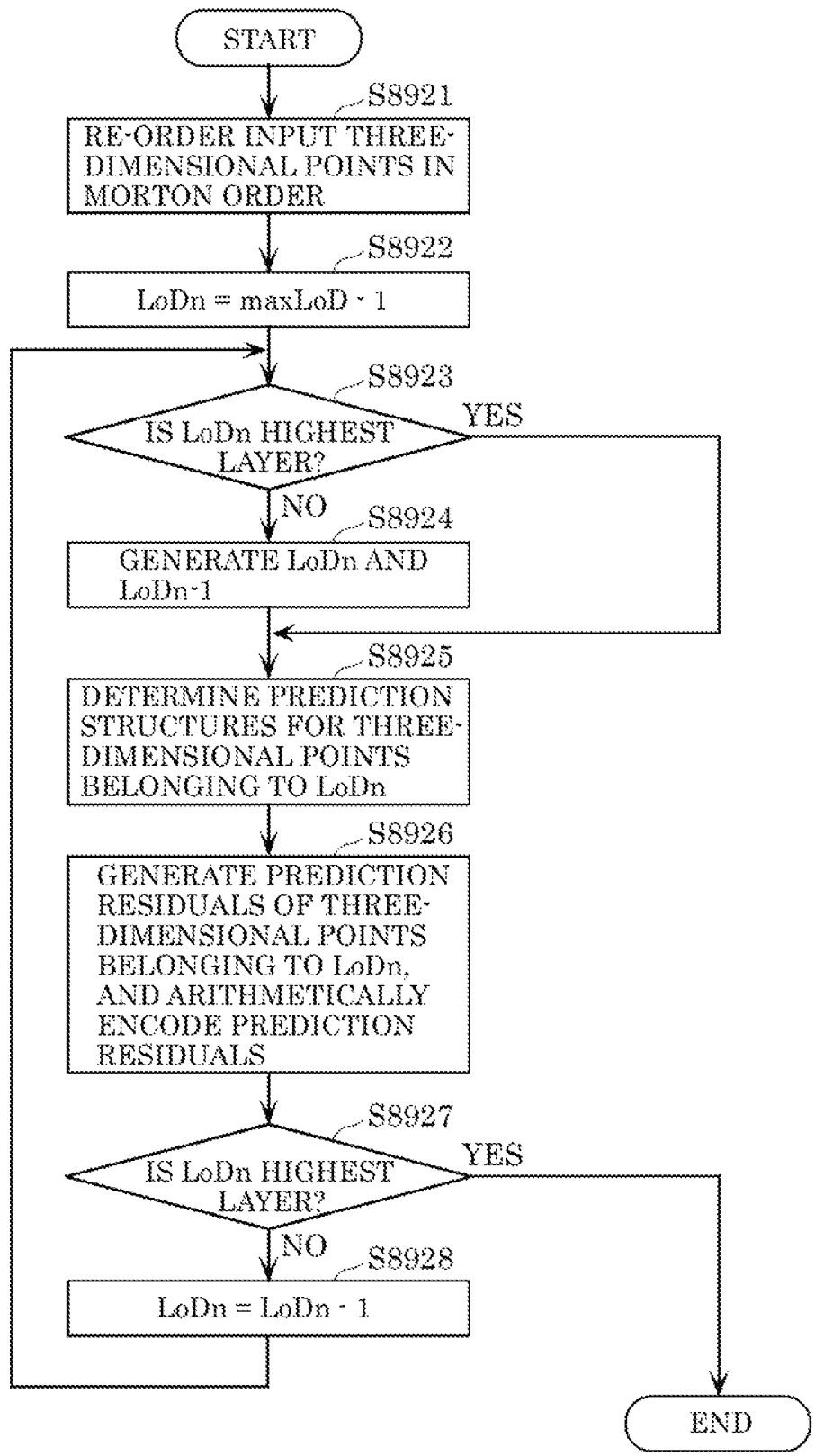
Figure 142:
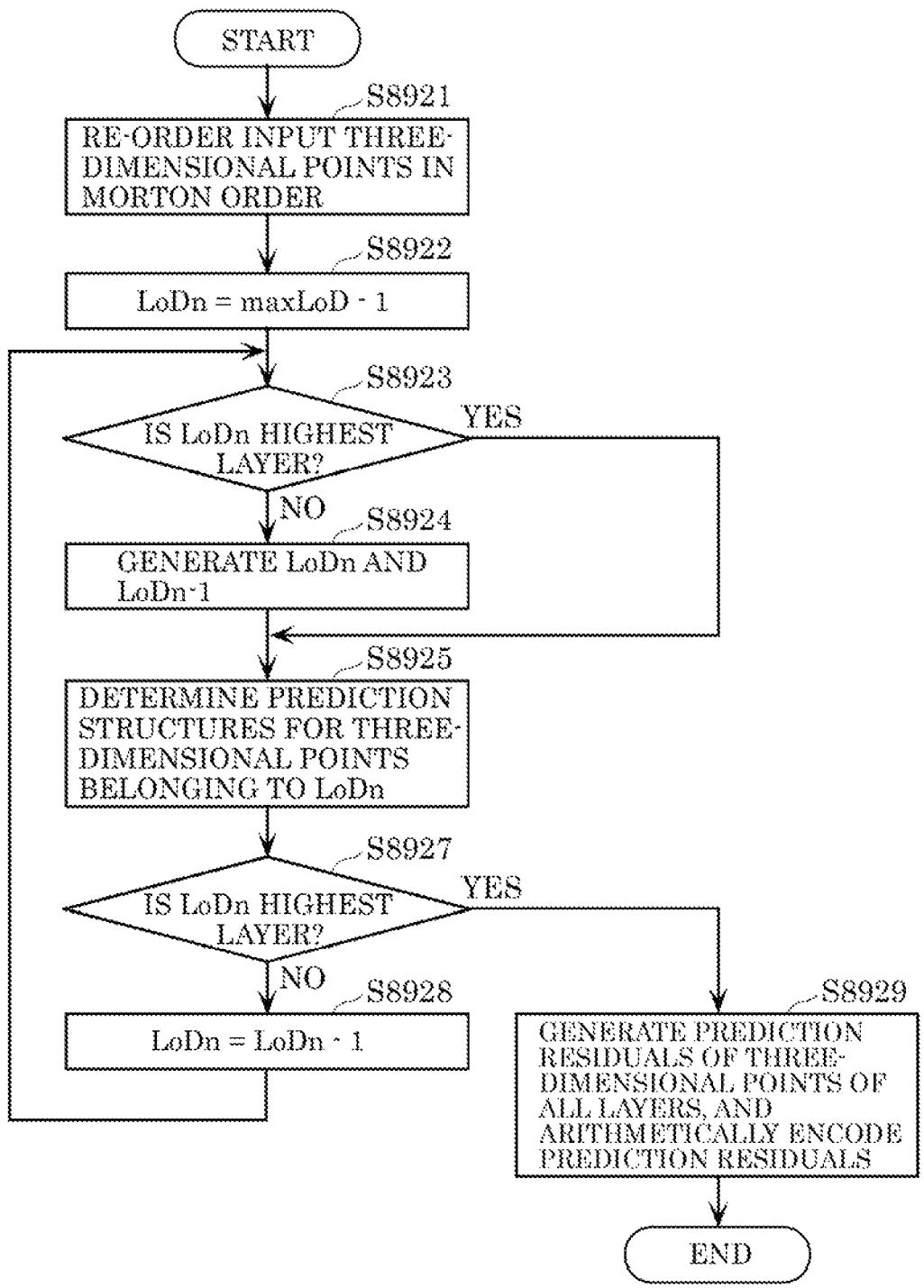
Figure 143:
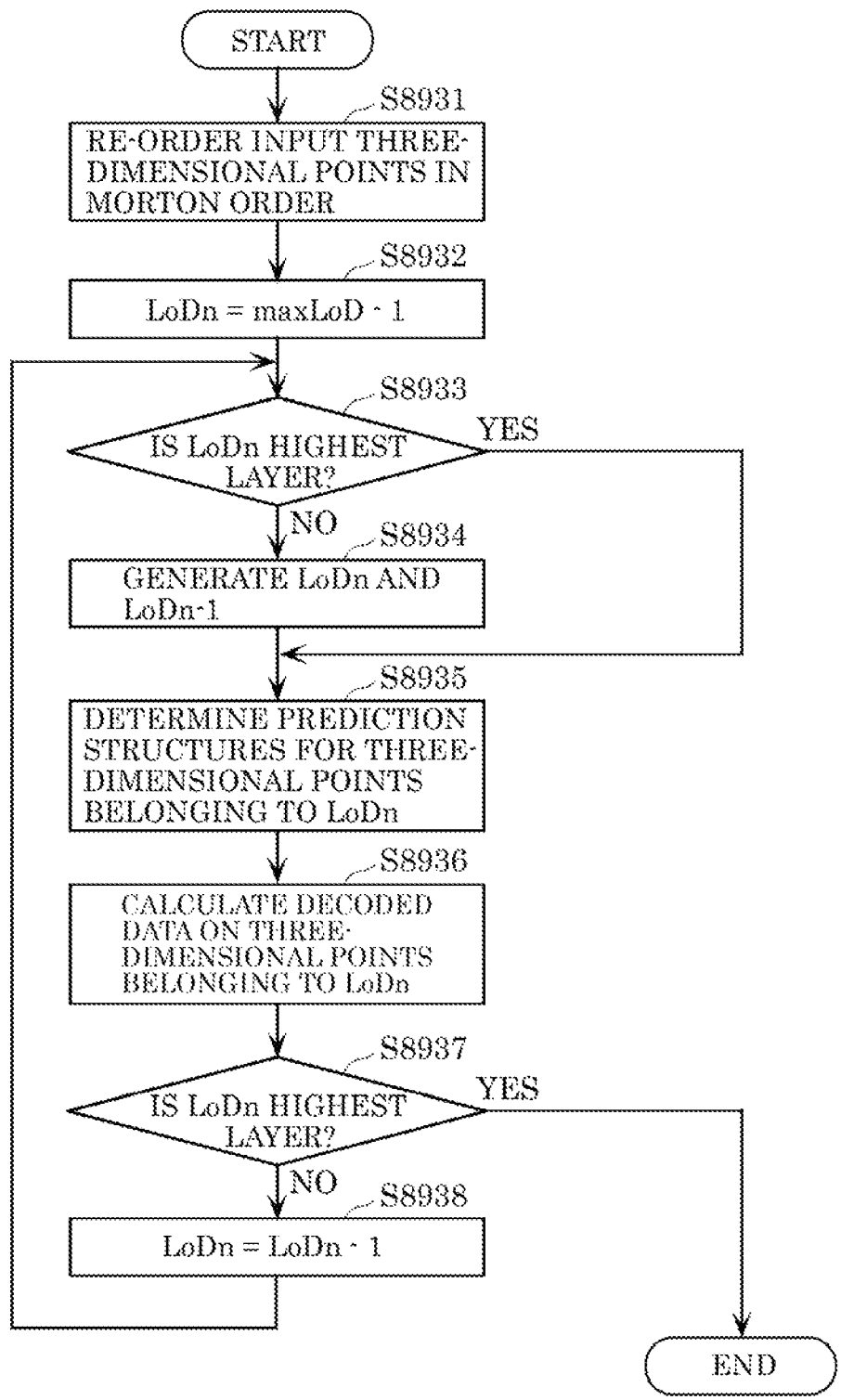
Figure 144:
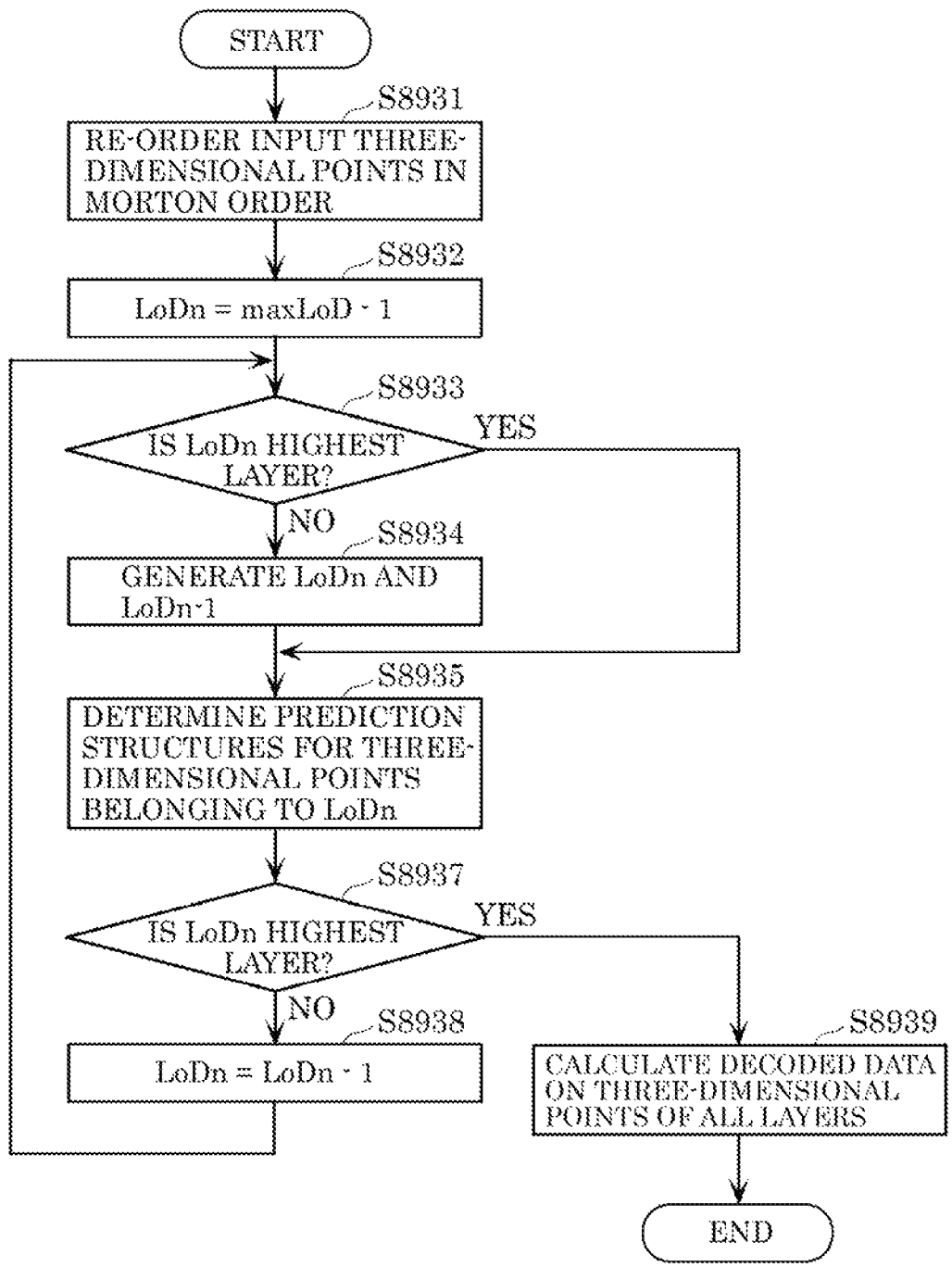
Figure 145:
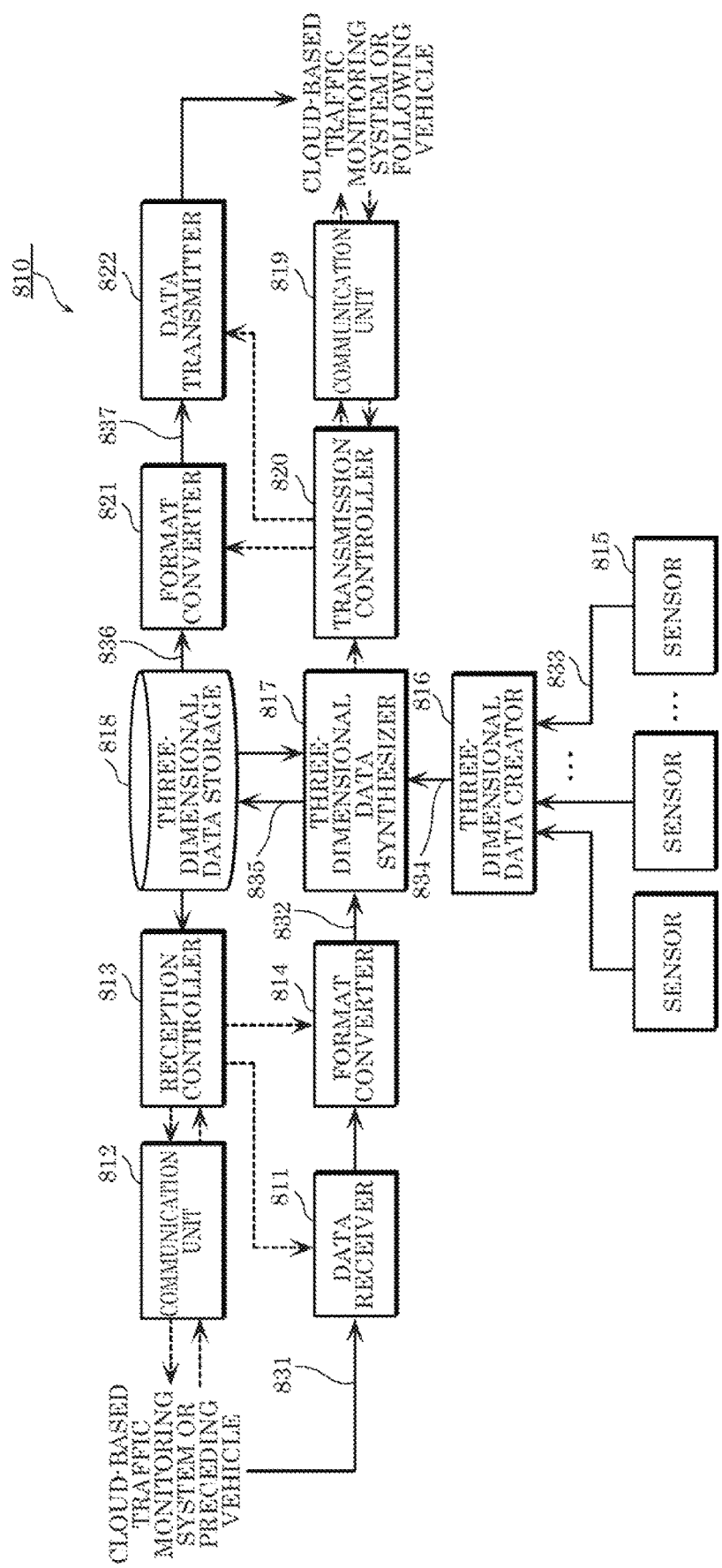
Figure 146:
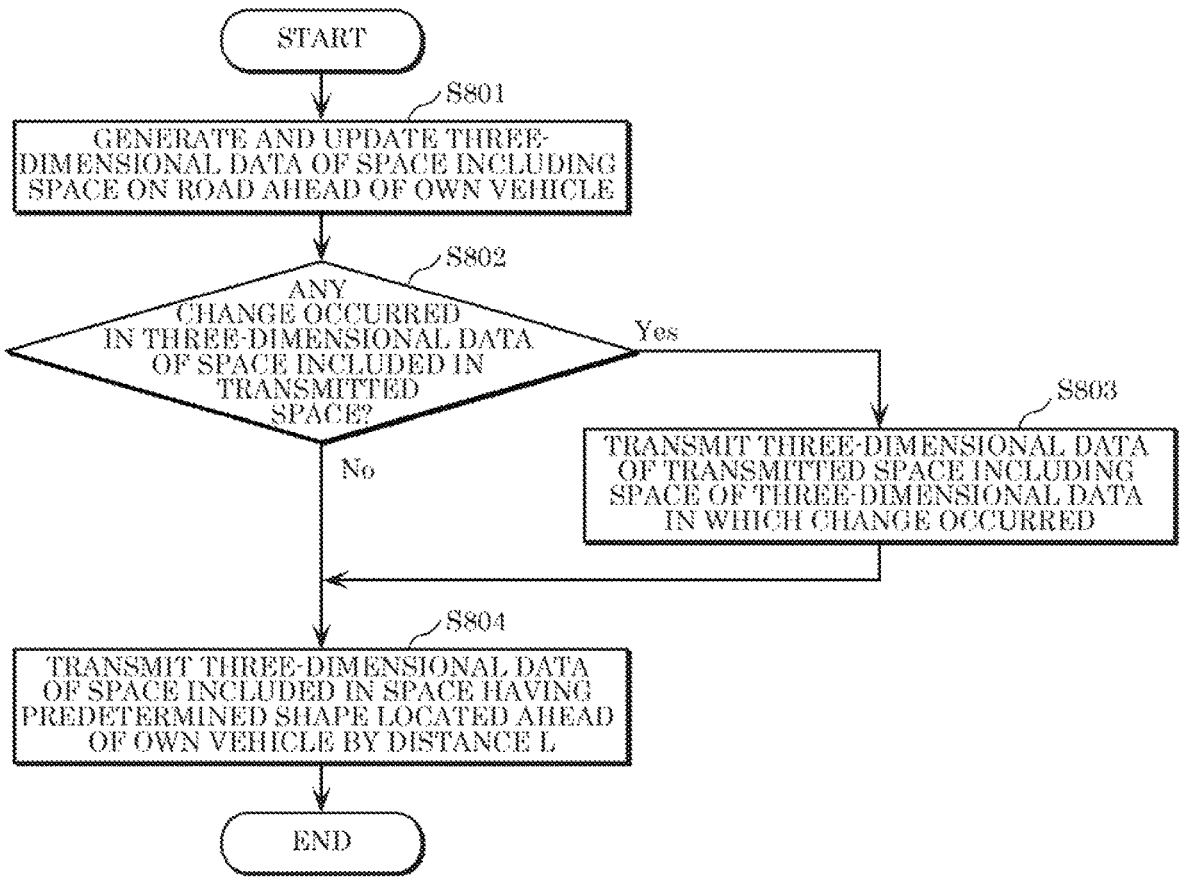
Figure 147:
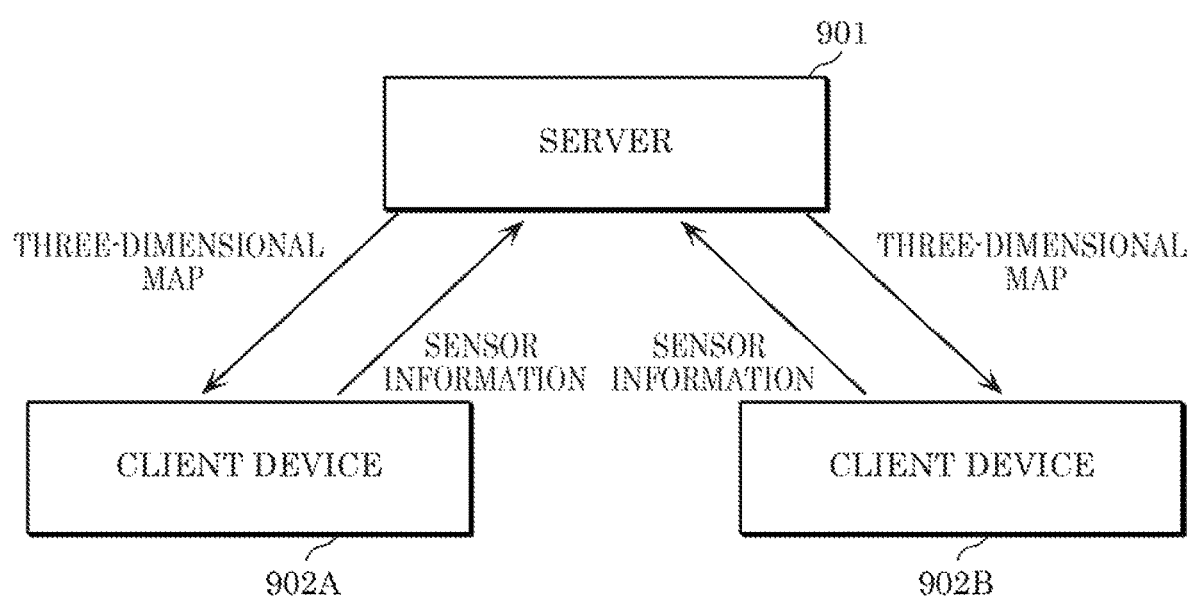
Figure 148:
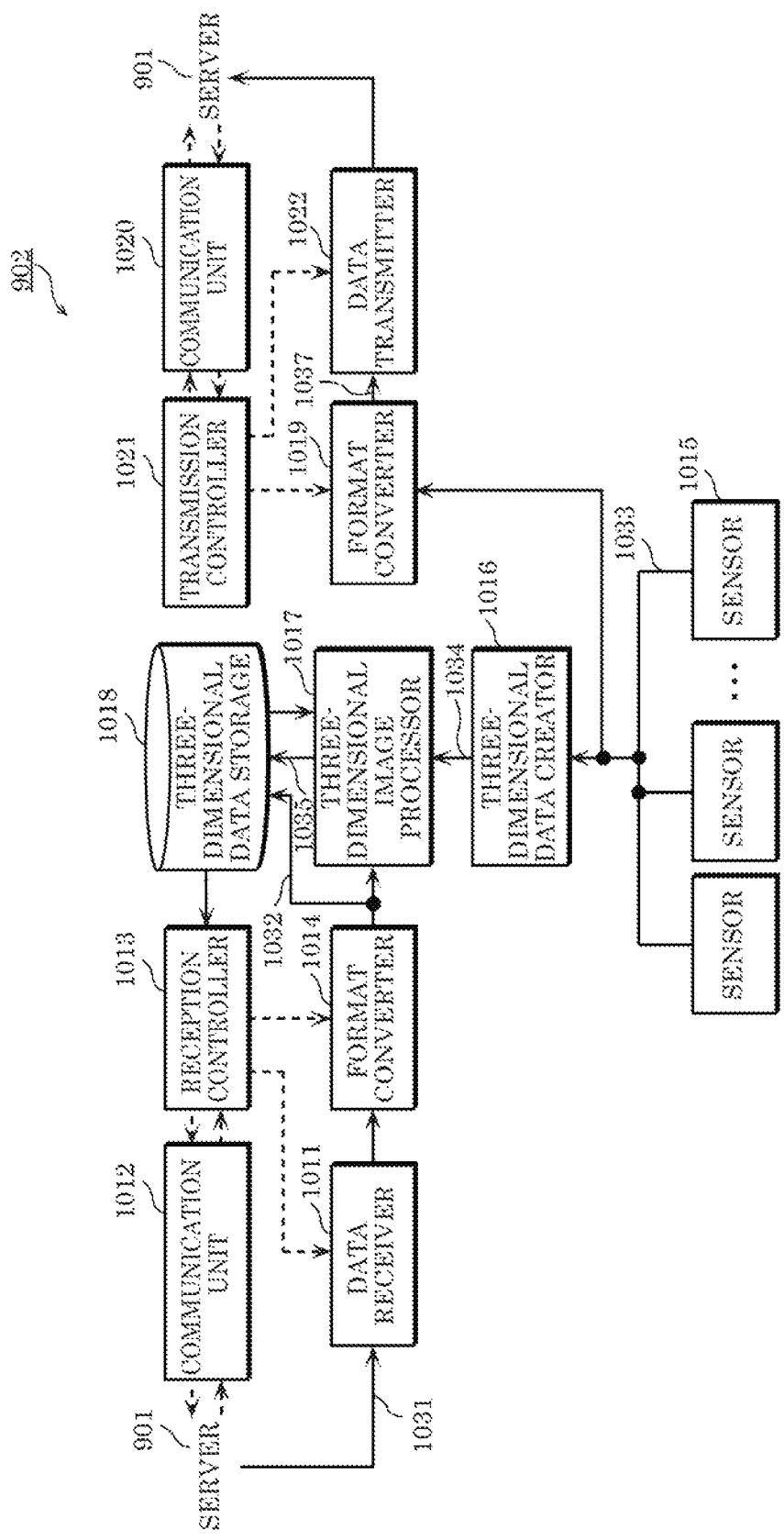
Figure 149:
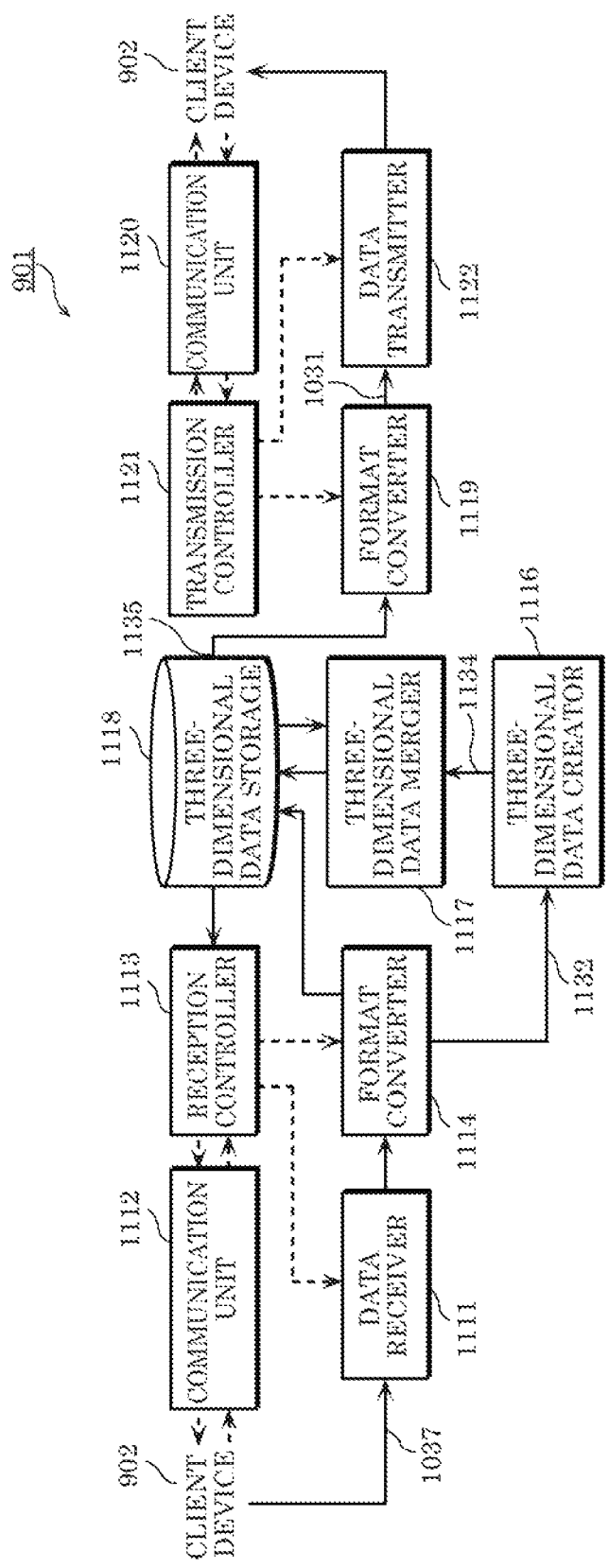
Figure 150:
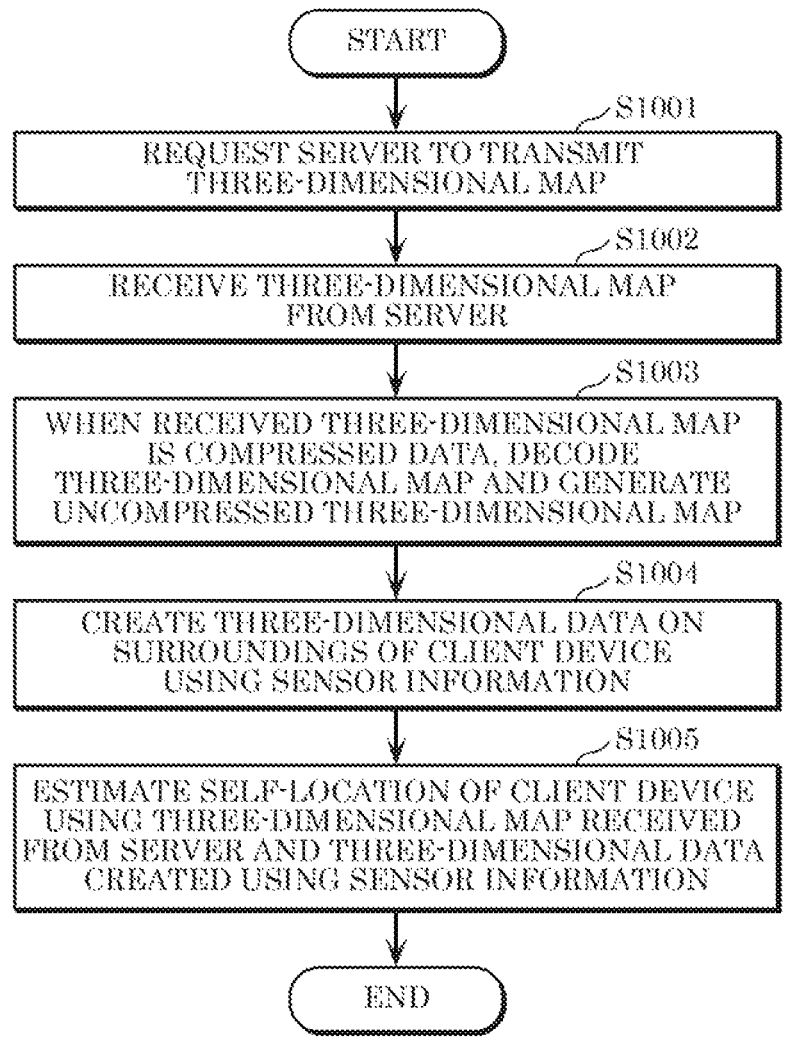
Figure 151:
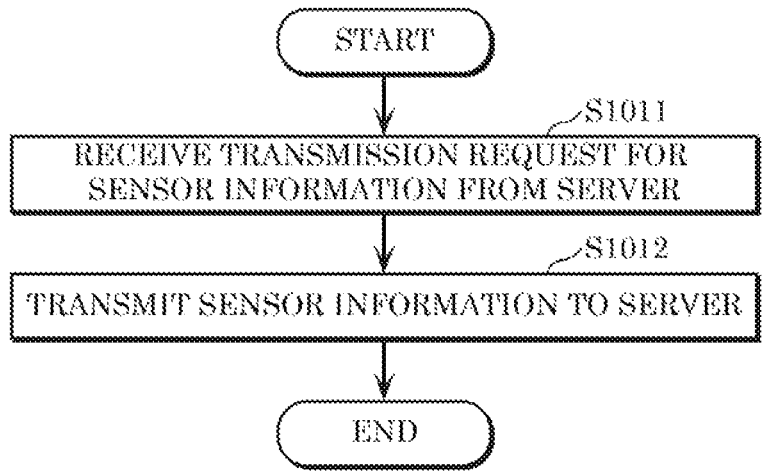
Figure 152:
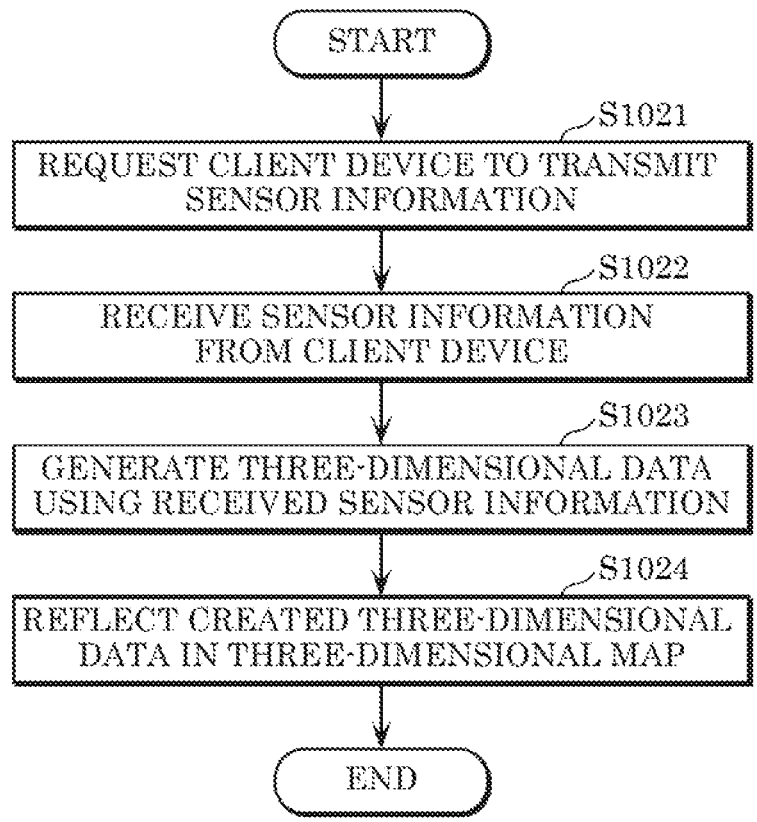
Figure 153:
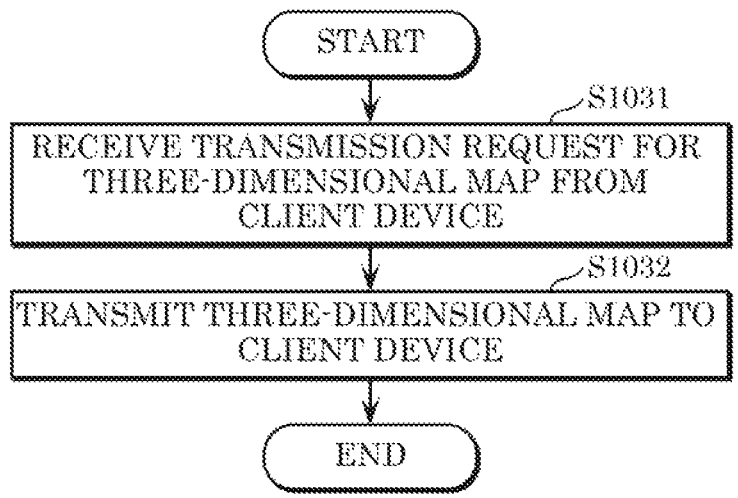
Figure 154:
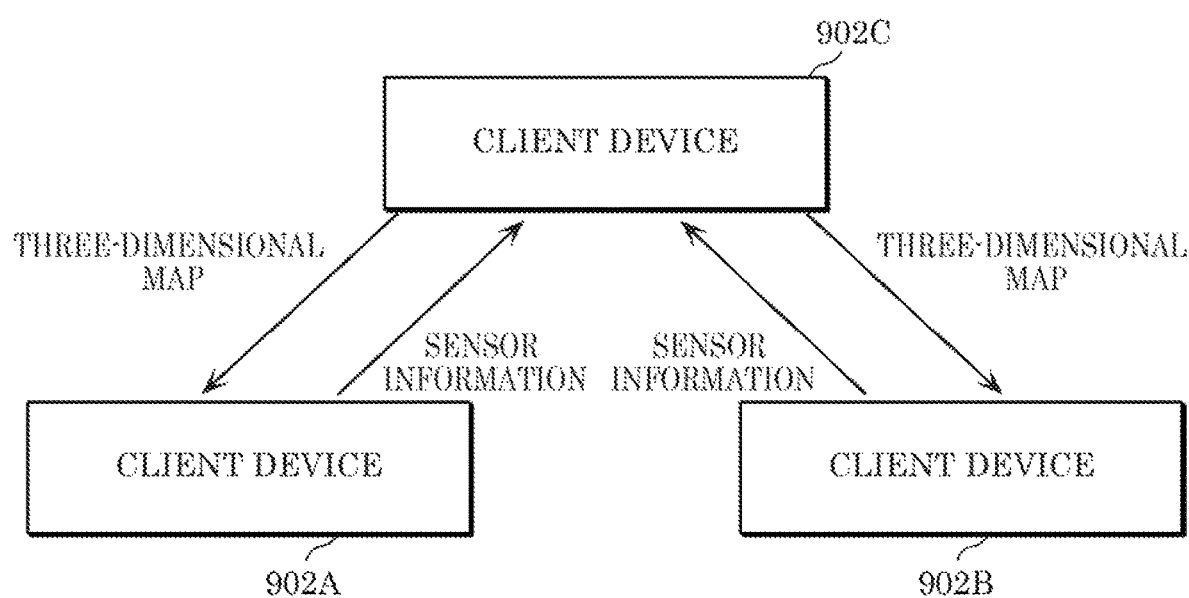
Figure 155:
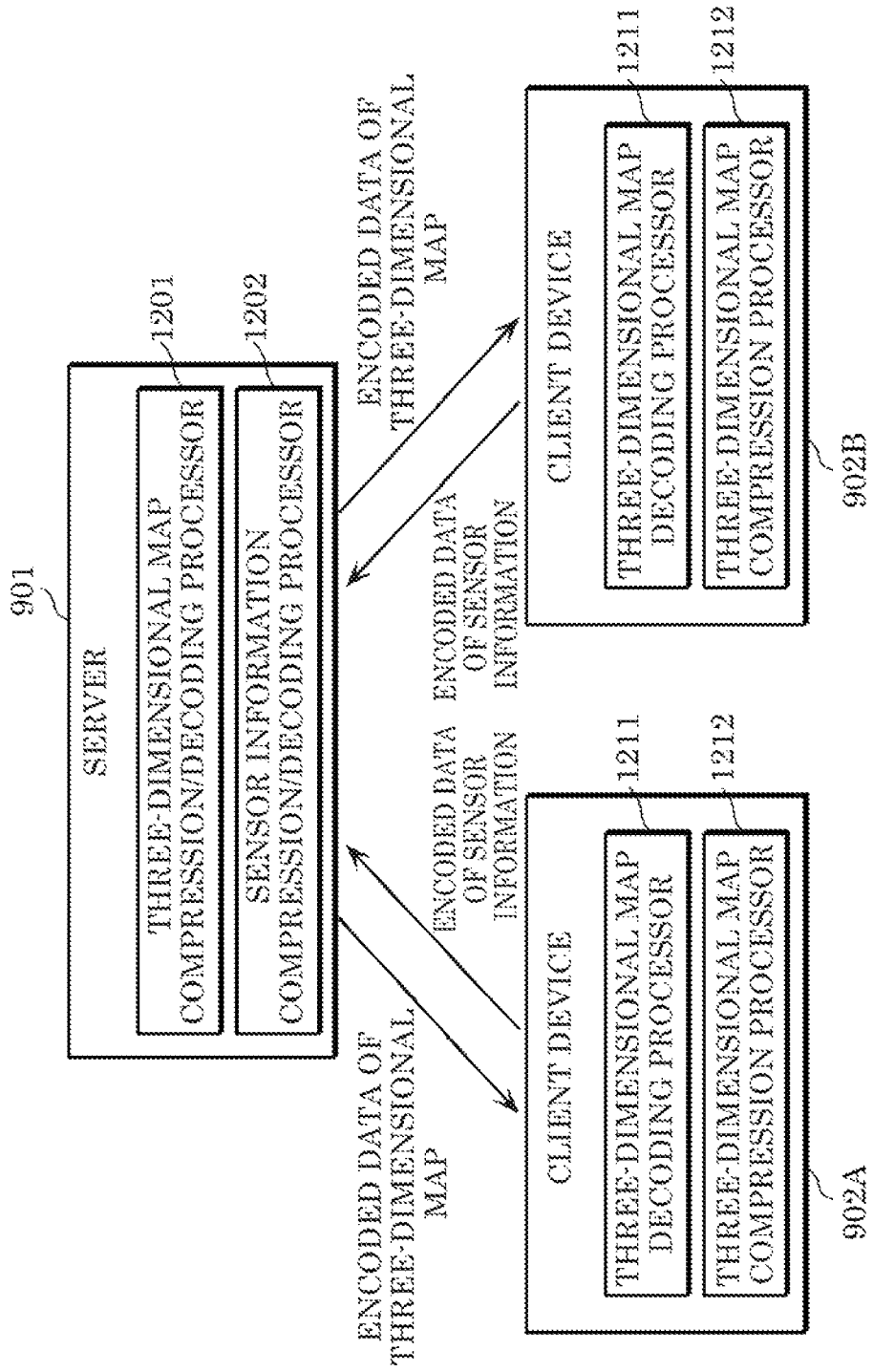
Figure 156:
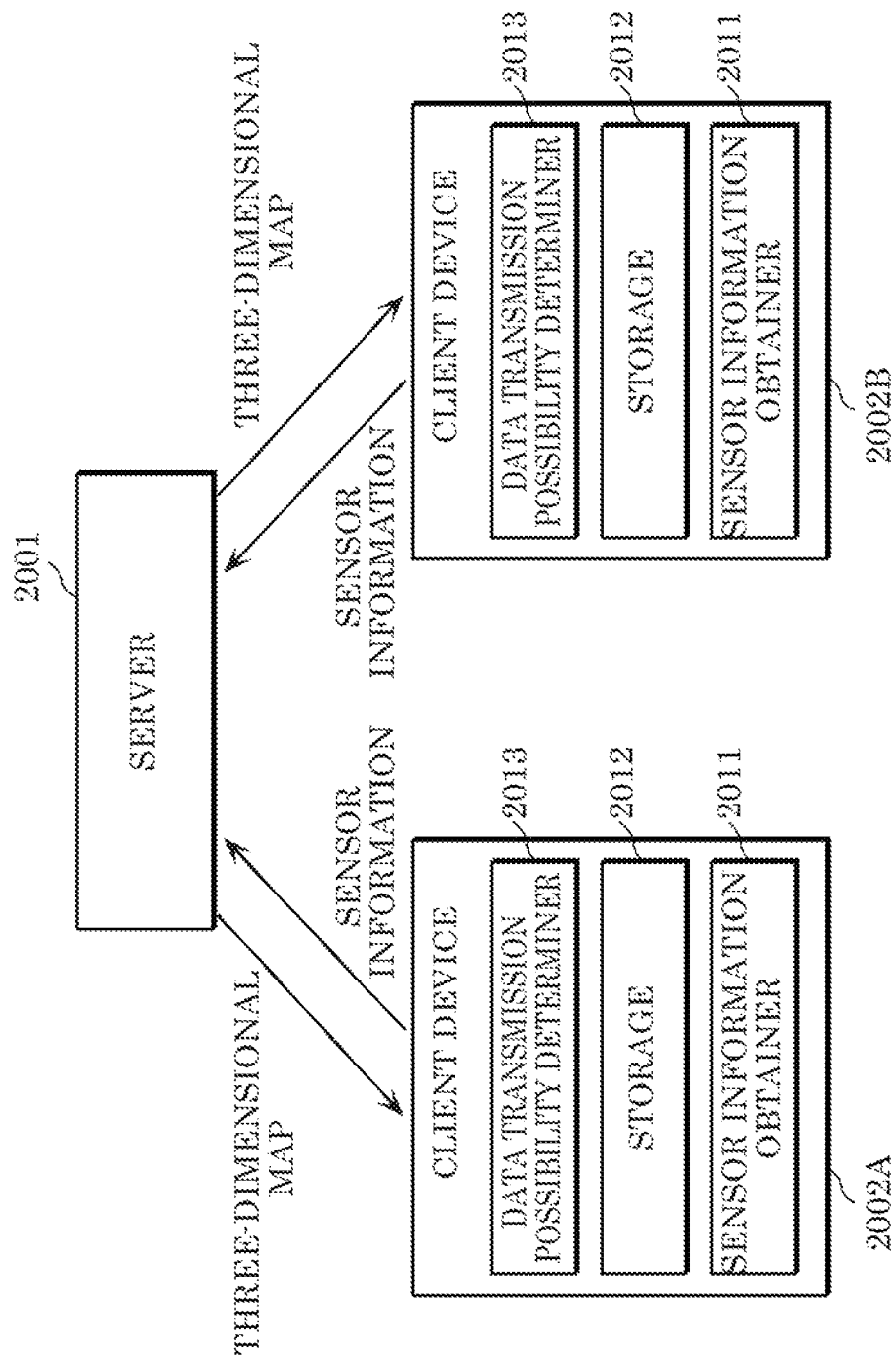
Figure 157:
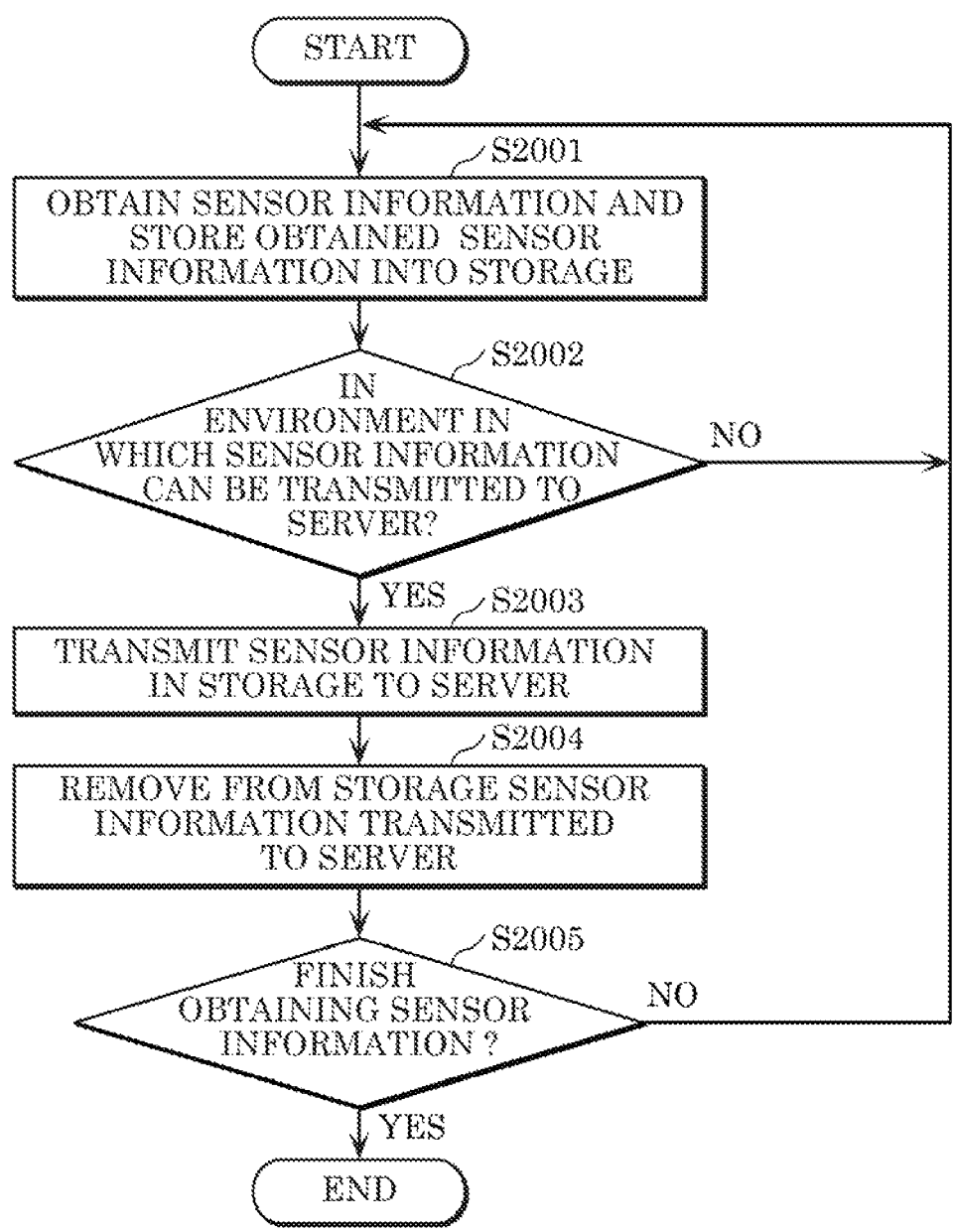
Figure 158:
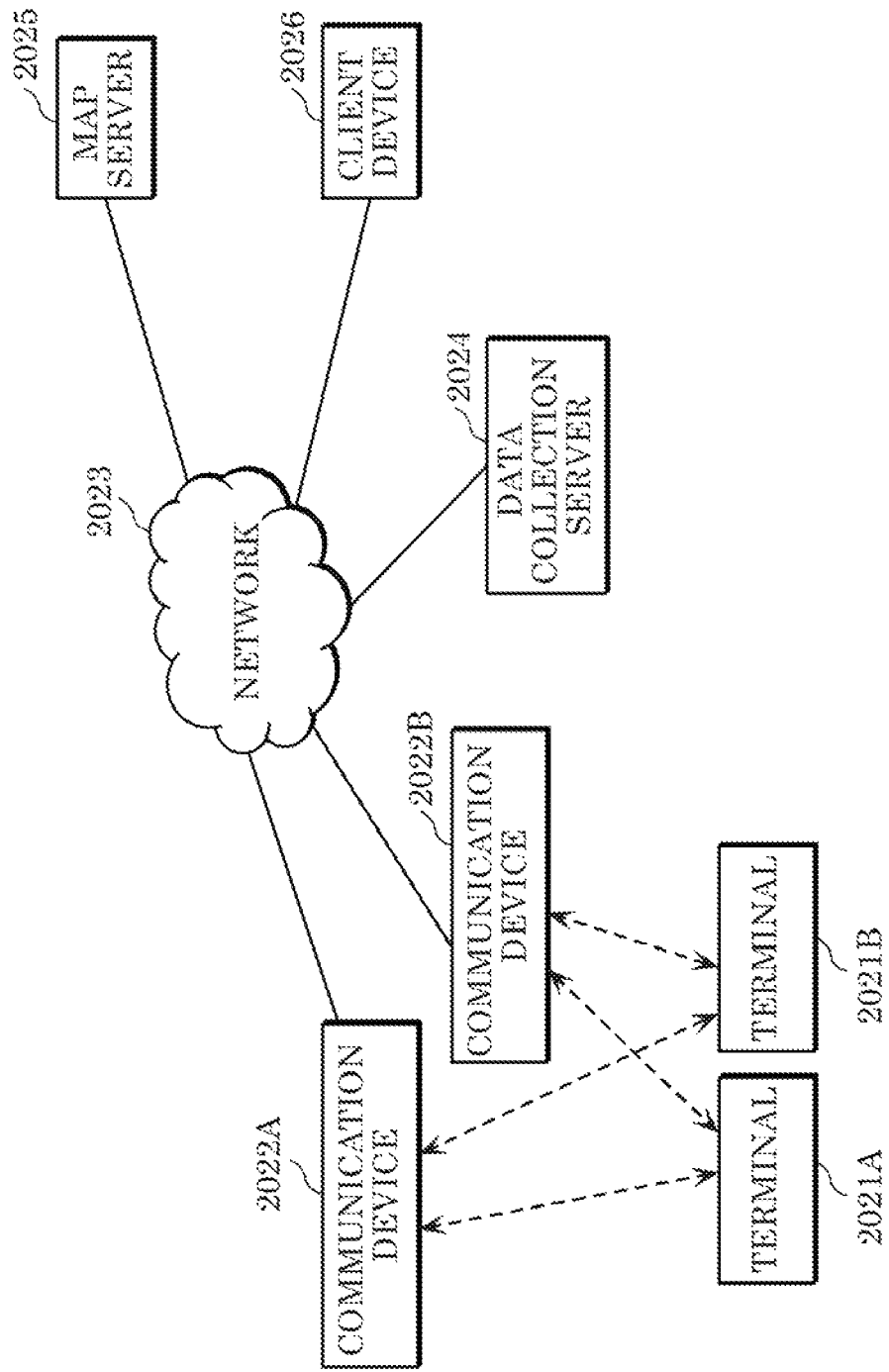
Figure 159:
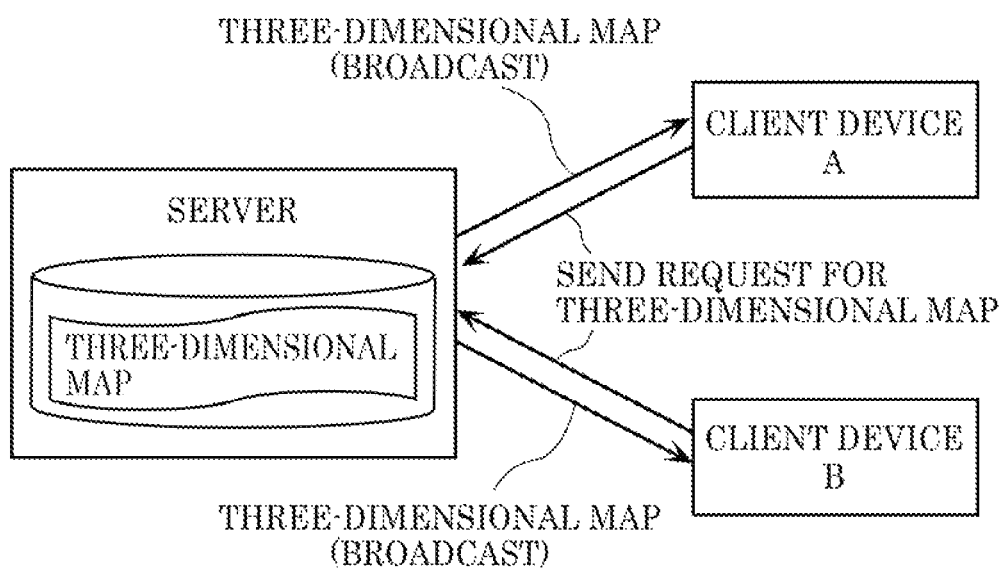
Figure 160:
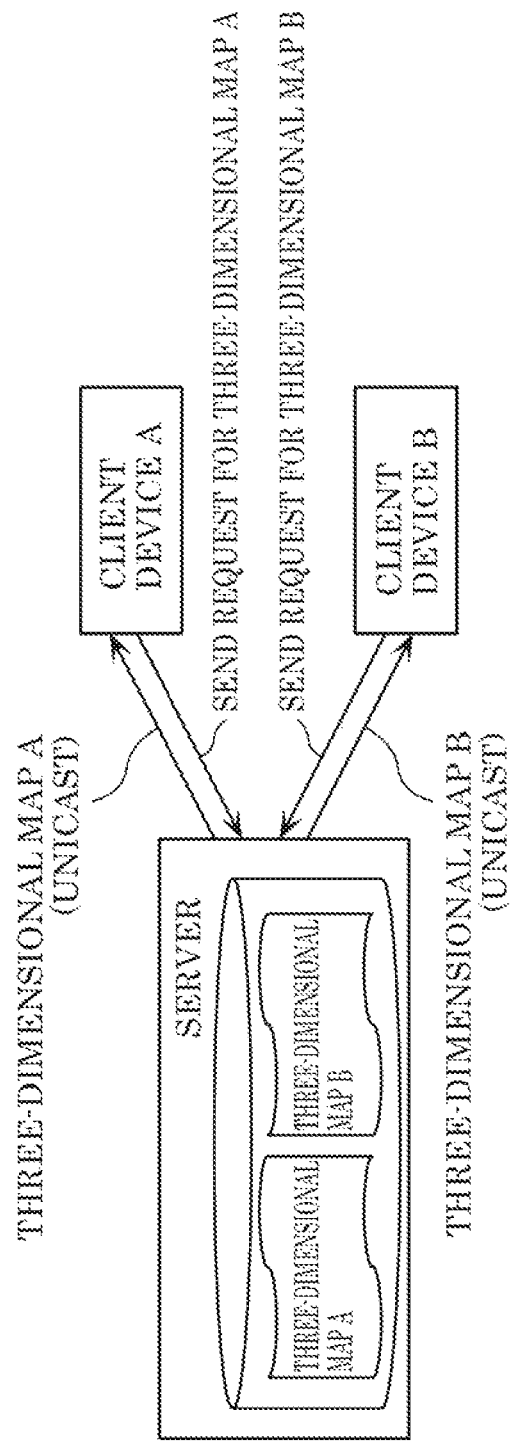
Figure 161:
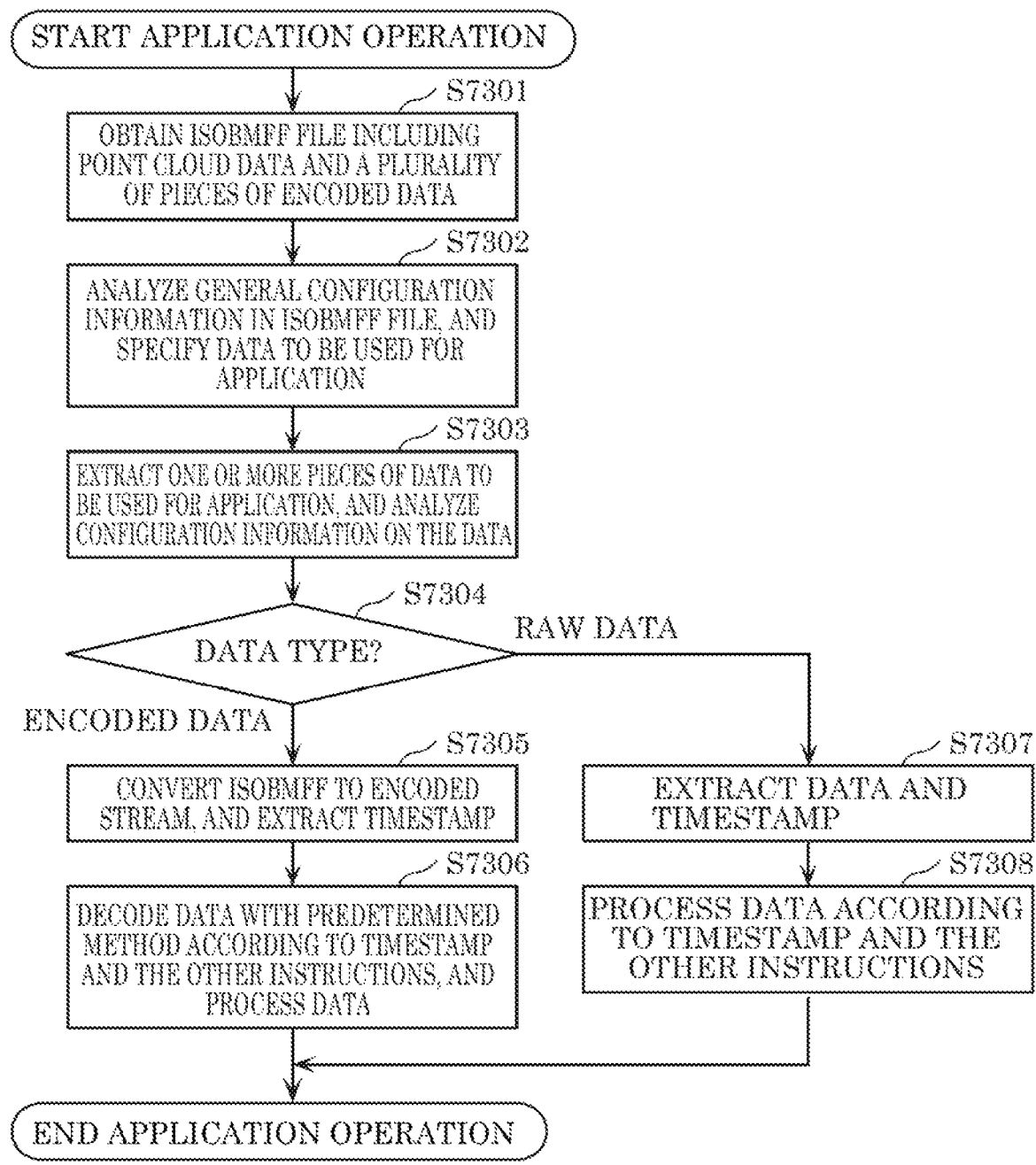
Figure 162:
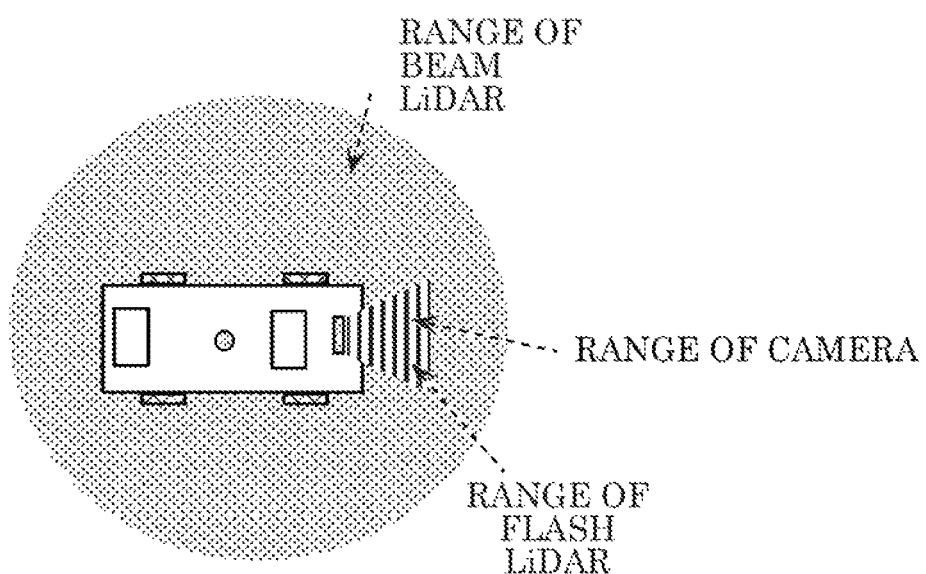
Figure 163:
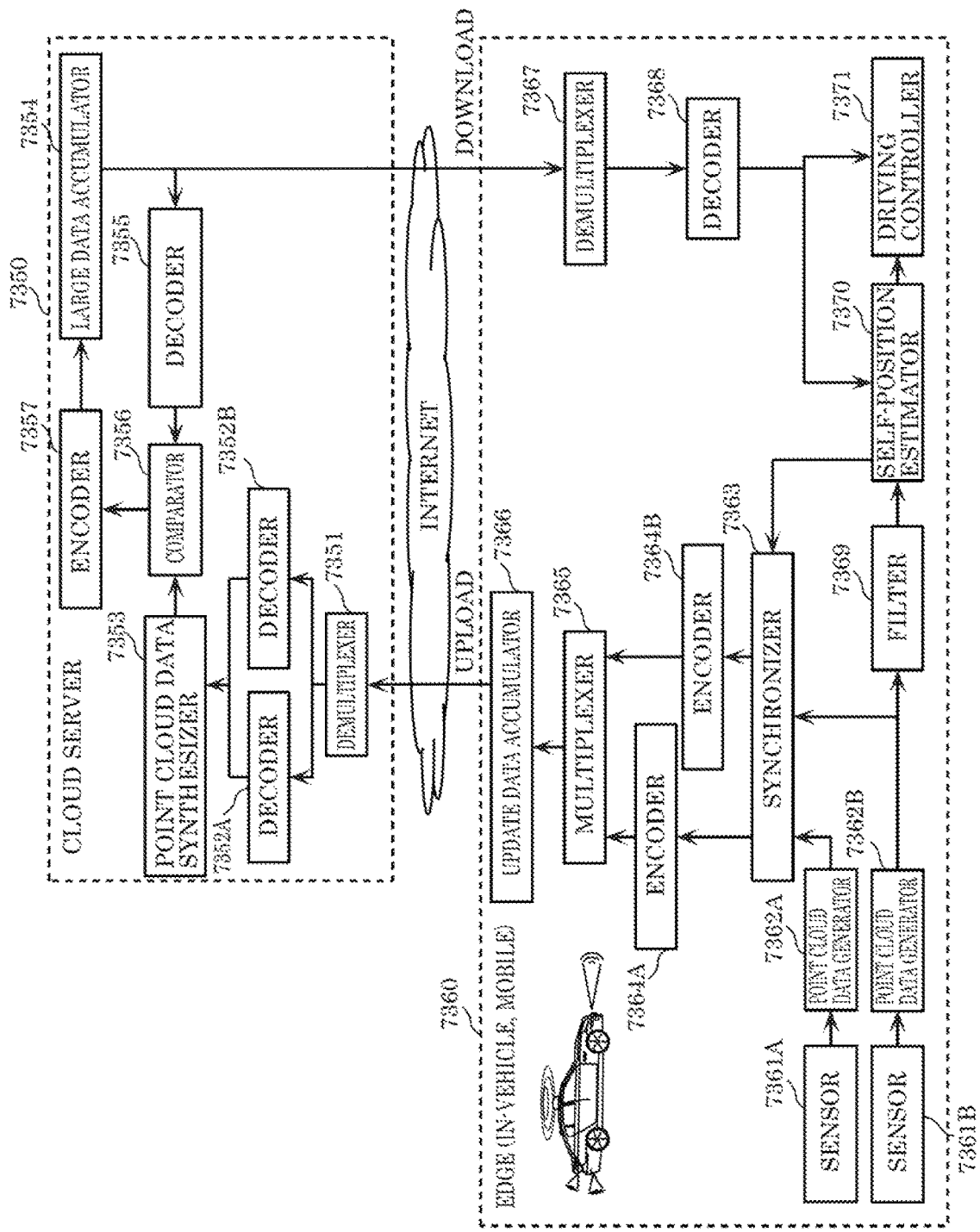
Figure 164:
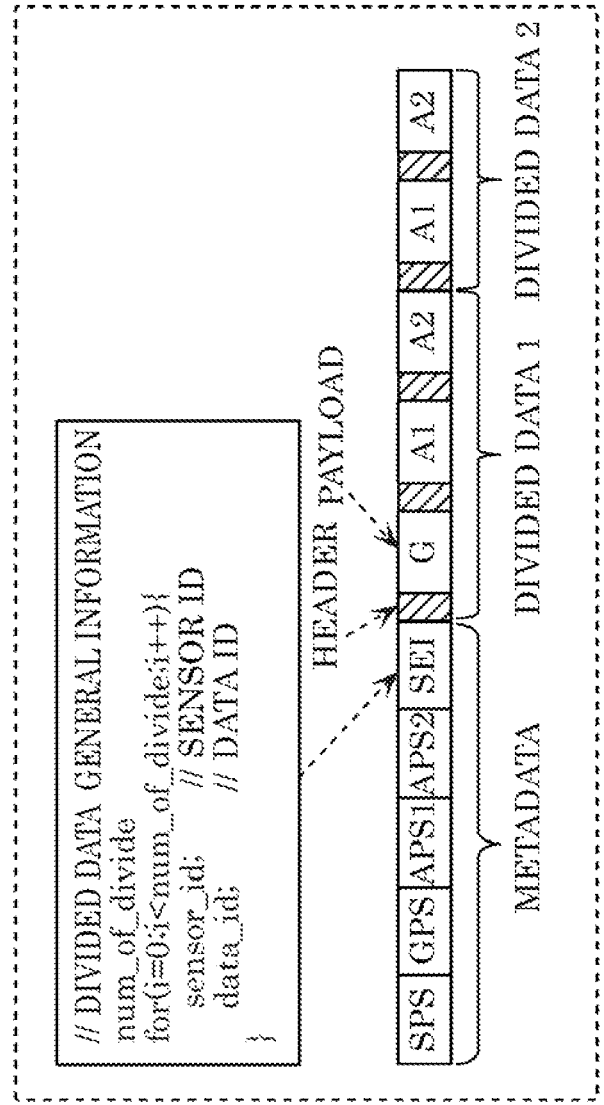
Figure 165:
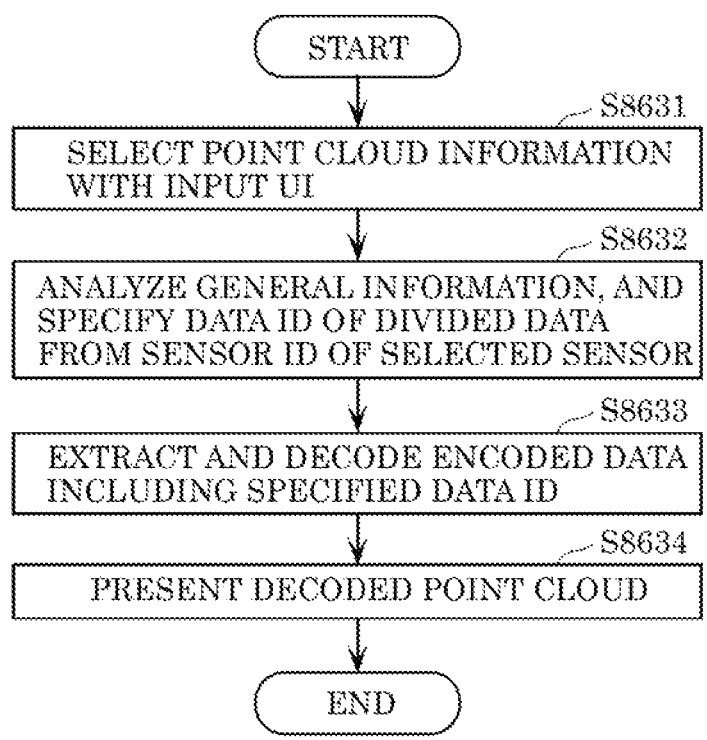
Figure 166:
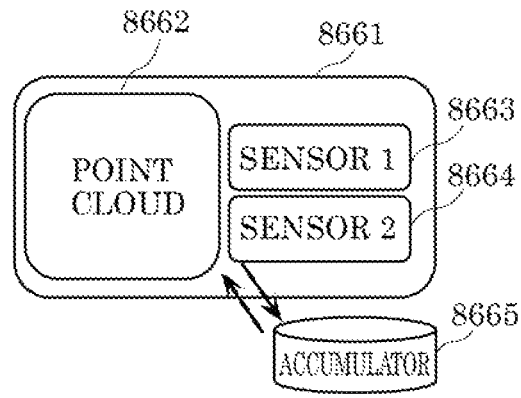
Figure 167:
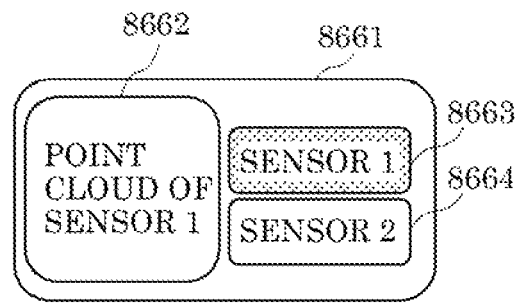
Figure 168:
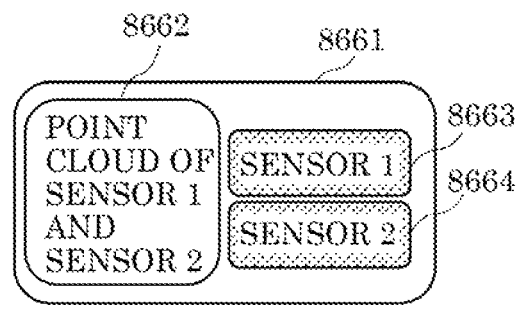

FIG. 131 is a diagram showing an example of a prediction structure determination processing according to Embodiment 8;

FIG. 132 is a diagram showing an example of a prediction processing according to Embodiment 8;

FIG. 133 is a diagram showing an example of the prediction structure determination processing for a highest layer according to Embodiment 8;

FIG. 134 is a diagram showing an example of the prediction processing for the highest layer according to Embodiment 8;

FIG. 135 is a flowchart of a three-dimensional data encoding process according to Embodiment 8;

FIG. 136 is a flowchart of a three-dimensional data encoding process according to Embodiment 8;

FIG. 137 is a diagram showing an example of a decoded data generation process according to Embodiment 8;

FIG. 138 is a diagram showing an example of the decoded data generation process for the highest layer according to Embodiment 8;

FIG. 139 is a flowchart of a three-dimensional data decoding process according to Embodiment 8;

FIG. 140 is a flowchart of a three-dimensional data decoding process according to Embodiment 8;

FIG. 141 is a flowchart of a three-dimensional data encoding process according to Embodiment 8;

FIG. 142 is a flowchart of a three-dimensional data encoding process according to Embodiment 8;

FIG. 143 is a flowchart of a three-dimensional data decoding process according to Embodiment 8;

FIG. 144 is a flowchart of a three-dimensional data decoding process according to Embodiment 8;

FIG. 145 is a block diagram of a three-dimensional data creation device according to Embodiment 9;

FIG. 146 is a flowchart of a three-dimensional data creation method according to Embodiment 9;

FIG. 147 is a diagram showing a structure of a system according to Embodiment 9;

FIG. 148 is a block diagram of a client device according to Embodiment 9;

FIG. 149 is a block diagram of a server according to Embodiment 9;

FIG. 150 is a flowchart of a three-dimensional data creation process performed by the client device according to Embodiment 9;

FIG. 151 is a flowchart of a sensor information transmission process performed by the client device according to Embodiment 9;

FIG. 152 is a flowchart of a three-dimensional data creation process performed by the server according to Embodiment 9;

FIG. 153 is a flowchart of a three-dimensional map transmission process performed by the server according to Embodiment 9;

FIG. 154 is a diagram showing a structure of a variation of the system according to Embodiment 9;

FIG. 155 is a diagram showing a structure of the server and client devices according to Embodiment 9;

FIG. 156 is a diagram illustrating a configuration of a server and a client device according to Embodiment 9;

FIG. 157 is a flowchart of a process performed by the client device according to Embodiment 9;

FIG. 158 is a diagram illustrating a configuration of a sensor information collection system according to Embodiment 9;

FIG. 159 is a diagram illustrating an example of a system according to Embodiment 9;

FIG. 160 is a diagram illustrating a variation of the system according to Embodiment 9;

FIG. 161 is a flowchart illustrating an example of an application process according to Embodiment 9;

FIG. 162 is a diagram illustrating the sensor range of various sensors according to Embodiment 9;

FIG. 163 is a diagram illustrating a configuration example of an automated driving system according to Embodiment 9;

FIG. 164 is a diagram illustrating a configuration example of a bitstream according to Embodiment 9;

FIG. 165 is a flowchart of a point cloud selection process according to Embodiment 9;

FIG. 166 is a diagram illustrating a screen example for point cloud selection process according to Embodiment 9;

FIG. 167 is a diagram illustrating a screen example of the point cloud selection process according to Embodiment 9; and FIG. 168 is a diagram illustrating a screen example of the point cloud selection process according to Embodiment 9.

DETAILED DESCRIPTION OF THE EMBODIMENTS

A three-dimensional data encoding method according to one aspect of the present disclosure is a three-dimensional data encoding method of (i) assigning items of attribute information of three-dimensional points included in point cloud data to one of layers, based on items of geometry information of the three-dimensional points, and (ii) encoding the items of attribute information, the three-dimensional data encoding method including: selecting each of the layers as a current layer in order from a lowest layer; when the current layer is not a highest layer among the layers, repeating, for each of the current layers, (i) assigning three-dimensional points included in the current layer to each of the current layer and a next layer higher by one layer than the current layer, to update three-dimensional points included in each of the current layer and the next layer, and (ii) determining a prediction structure indicating three-dimensional points referred to by the three-dimensional points updated included in the current layer; when the current layer is the highest layer in the repeating, determining a prediction structure of three-dimensional points included in the highest layer; and predictively encoding the items of attribute information of the three-dimensional points included in the layers, based on the prediction structure determined in the repeating, to generate prediction residuals.

According to this three-dimensional data encoding method, prediction structures can be determined while generating layers, so that the processing amount can be reduced. In this case, in addition, according to the three-dimensional data encoding method, an efficient process can be implemented, so that the processing amount can be reduced.

For example, in the determining, prediction structures of the three-dimensional points updated included in the current layer may be determined in sequence according to a first order, and in the predictively encoding, items of attribute information of three-dimensional points included in each of the layers may be predictively encoded in sequence according to a second order reverse to the first order.

For example, the first order may be a Morton order.

For example, when the current layer is not the highest layer, in the prediction structure, a three-dimensional point among the three-dimensional points included in the current layer may refer to another three-dimensional point among the three-dimensional points included in the current layer and a three-dimensional point among the three-dimensional points included in the next layer, and when the current layer is the highest layer, in the prediction structure, a three-dimensional point among the three-dimensional points included in the highest layer may refer to another three-dimensional point among the three-dimensional points included in the highest layer.

A three-dimensional data decoding method according to one aspect of the present disclosure is a three-dimensional data decoding method of decoding a bitstream generated by (i) assigning items of attribute information of three-dimensional points included in point cloud data to one of layers, based on items of geometry information of the three-dimensional points, and (ii) encoding the items of attribute information, the three-dimensional data decoding method including: selecting each of the layers as a current layer in order from a lowest layer; when the current layer is not a highest layer among the layers, repeating, for each of the current layers, (i) assigning three-dimensional points included in the current layer to each of the current layer and a next layer higher by one layer than the current layer, to update three-dimensional points included in each of the current layer and the next layer, and (ii) determining a prediction structure indicating three-dimensional points referred to by the three-dimensional points updated included in the current layer; when the current layer is the highest layer in the repeating, determining a prediction structure of three-dimensional points included in the highest layer; and predictively decoding prediction residuals included in the bitstream, based on the prediction structure determined in the repeating, to generate decoded data of the items of attribute information of the three-dimensional points included in the layers.

According to this three-dimensional data decoding method, prediction structures can be determined while generating layers, so that the processing amount can be reduced. In this case, in addition, according to the three-dimensional data decoding method, an efficient process can be implemented, so that the processing amount can be reduced.

For example, in the determining, prediction structures of the three-dimensional points included in the current layer may be determined in sequence according to a first order, and in the predictively decoding, decoded data of items of attribute information of three-dimensional points included in each of the layers may be generated in sequence according to a second order reverse to the first order.

For example, the first order may be a Morton order.

For example, when the current layer is not the highest layer, in the prediction structure, a three-dimensional point among the three-dimensional points included in the current layer may refer to another three-dimensional point among the three-dimensional points included in the current layer and a three-dimensional point among the three-dimensional points included in the next layer, and when the current layer is the highest layer, in the prediction structure, a three-dimensional point among the three-dimensional points included in the highest layer may refer to another three-dimensional point among the three-dimensional points included in the highest layer.

A three-dimensional data encoding device according to one aspect of the present disclosure is a three-dimensional data encoding device that (i) assigns items of attribute information of three-dimensional points included in point cloud data to one of layers, based on items of geometry information of the three-dimensional points, and (ii) encodes the items of attribute information, the three-dimensional data encoding device including a processor and memory. Using the memory, the processor: selects each of the layers as a current layer in order from a lowest layer; when the current layer is not a highest layer among the layers, repeats, for each of the current layers, (i) assigning three-dimensional points included in the current layer to each of the current layer and a next layer higher by one layer than the current layer, to update three-dimensional points included in each of the current layer and the next layer, and (ii) determining a prediction structure indicating three-dimensional points referred to by the three-dimensional points updated included in the current layer; when the current layer is the highest layer in the repeating, determines a prediction structure of three-dimensional points included in the highest layer; and predictively encodes the items of attribute information of the three-dimensional points included in the layers, based on the prediction structure determined in the repeating, to generate prediction residuals.

According to this three-dimensional data encoding device, prediction structures can be determined while generating layers, so that the processing amount can be reduced. In this case, in addition, according to the three-dimensional data encoding device, an efficient process can be implemented, so that the processing amount can be reduced.

A three-dimensional data decoding device according to one aspect of the present disclosure is a three-dimensional data decoding device that decodes a bitstream generated by (i) assigning items of attribute information of three-dimensional points included in point cloud data to one of layers, based on items of geometry information of the three-dimensional points, and (ii) encoding the items of attribute information, the three-dimensional data decoding device including a processor and memory. Using the memory, the processor: selects each of the layers as a current layer in order from a lowest layer; when the current layer is not a highest layer among the layers, repeats, for each of the current layers, (i) assigning three-dimensional points included in the current layer to each of the current layer and a next layer higher by one layer than the current layer, to update three-dimensional points included in each of the current layer and the next layer, and (ii) determining a prediction structure indicating three-dimensional points referred to by the three-dimensional points updated included in the current layer; when the current layer is the highest layer in the repeating, determines a prediction structure of three-dimensional points included in the highest layer; and predictively decodes prediction residuals included in the bitstream, based on the prediction structure determined in the repeating, to generate decoded data of the items of attribute information of the three-dimensional points included in the layers.

According to this three-dimensional data decoding device, prediction structures can be determined while generating layers, so that the processing amount can be reduced. In this case, in addition, according to the three-dimensional data decoding device, an efficient process can be implemented, so that the processing amount can be reduced.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

EMBODIMENT 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

Figure 1:
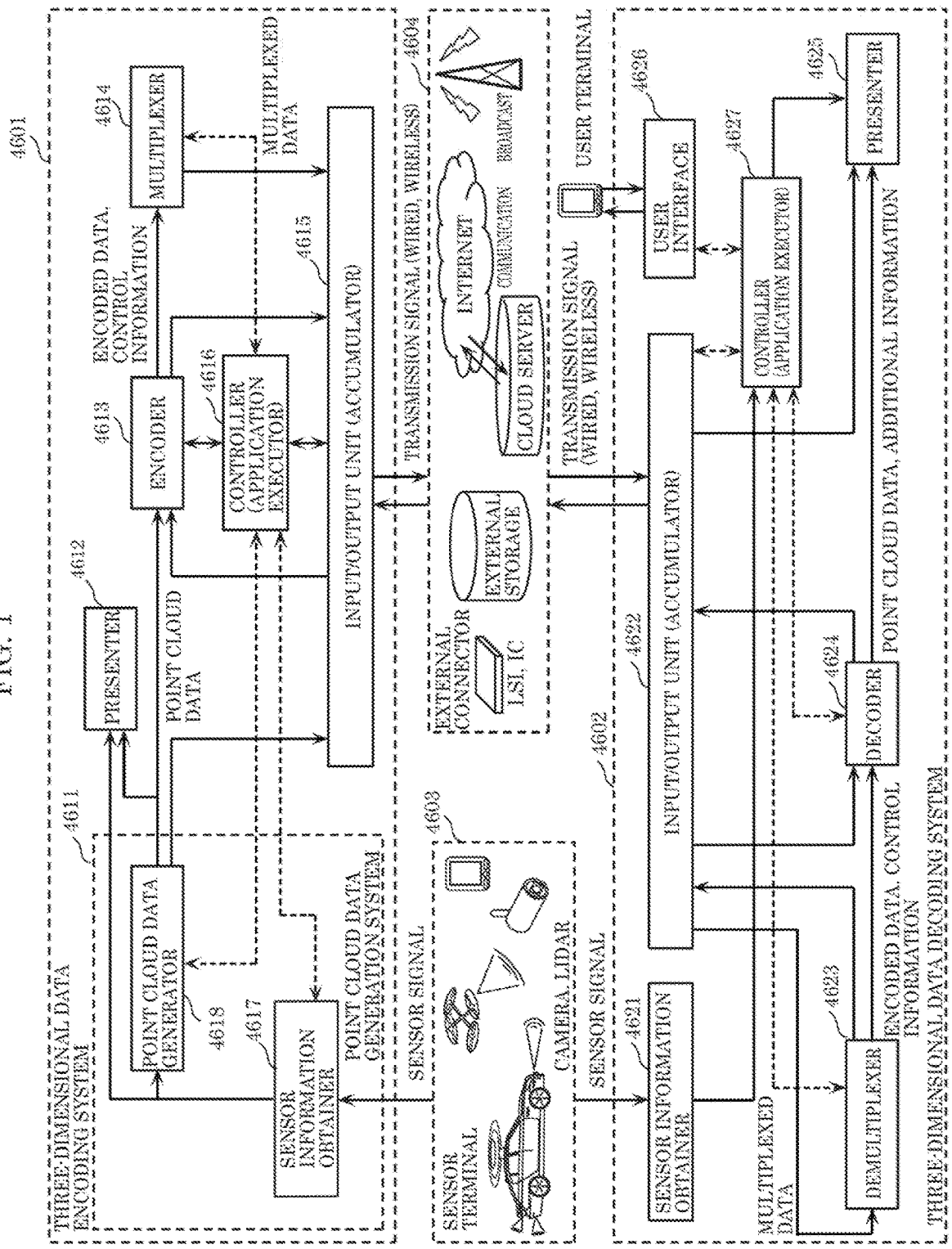
FIG. 1 is a diagram illustrating a configuration of a three-dimensional data encoding and decoding system according to Embodiment 1.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LiDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
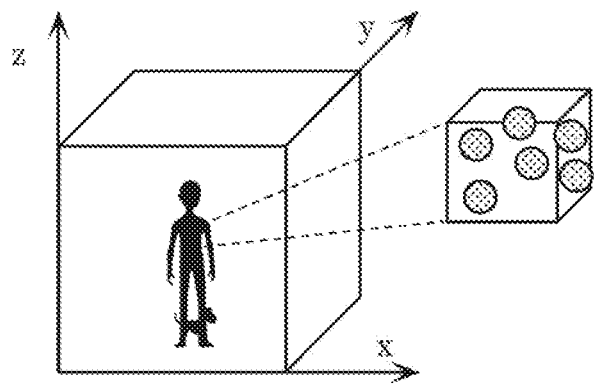
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One item of attribute information (in other words, a piece of attribute information or an attribute information item) may be associated with one item of geometry information (in other words, a piece of geometry information or a geometry information item), or attribute information on a plurality of different types of attributes may be associated with one item of geometry information. Alternatively, items of attribute information on the same type of attribute may be associated with one item of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
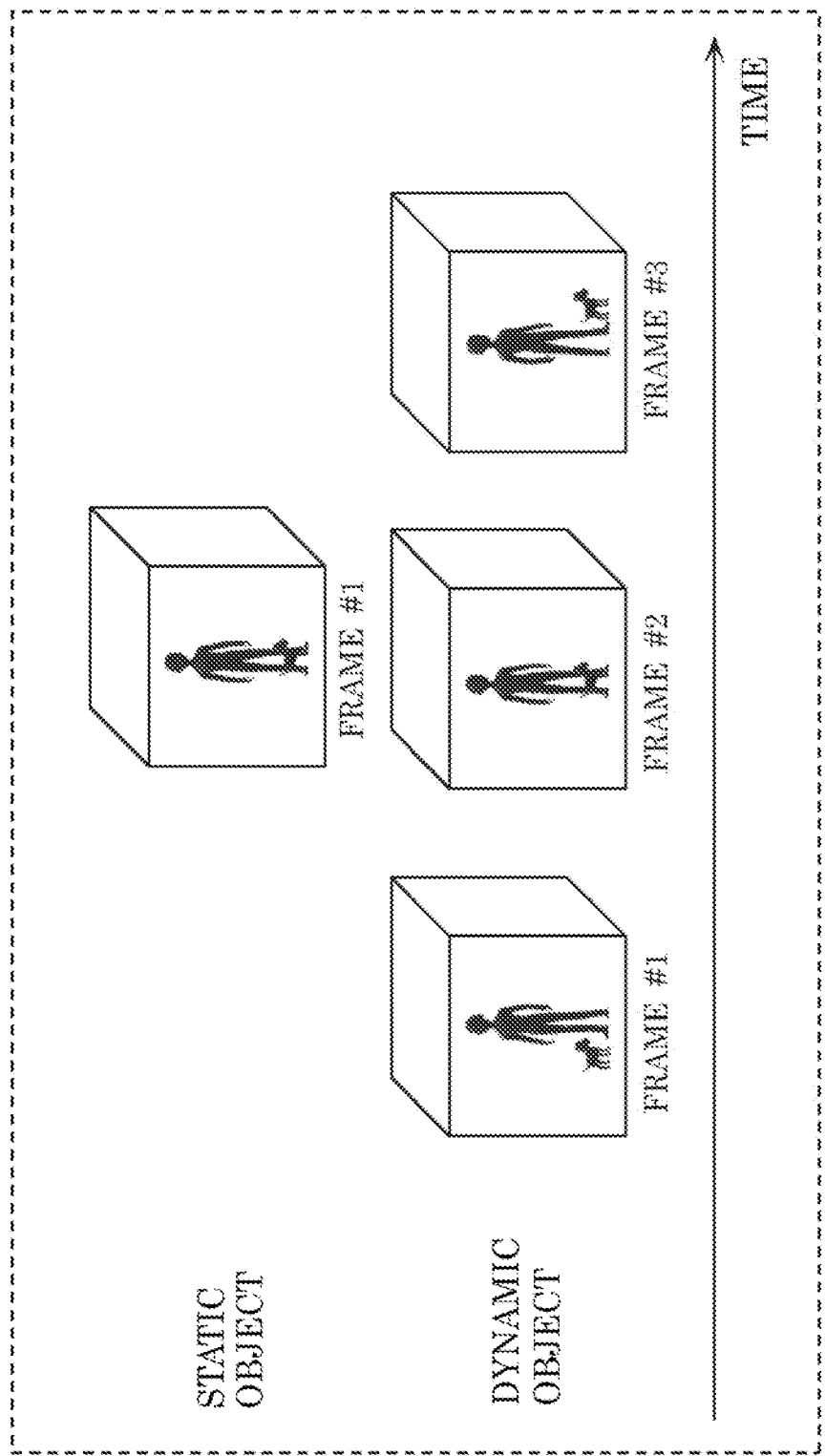
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LiDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
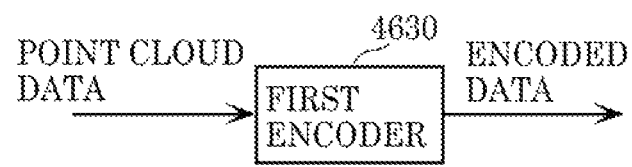
FIG. 5 is a diagram illustrating a structure of a first encoder according to Embodiment 1.
Figure 6:
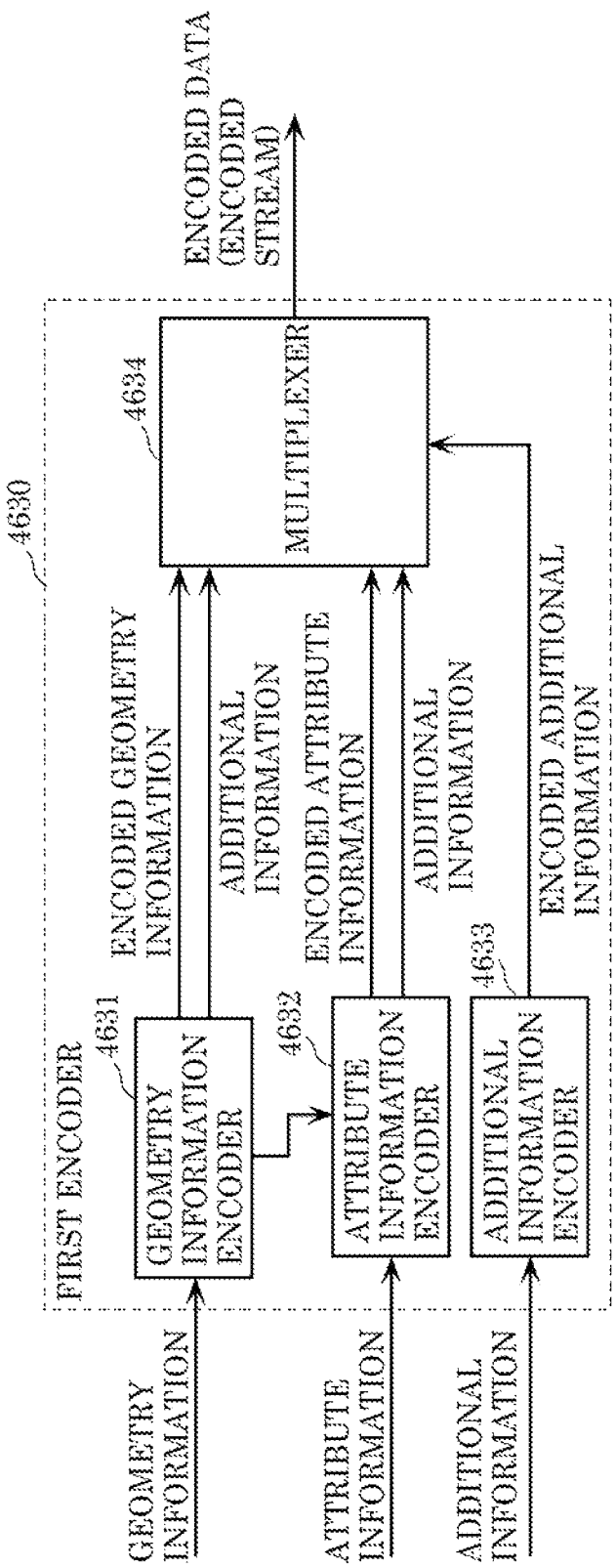
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space (target space) is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (in other words, a current node or a target node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
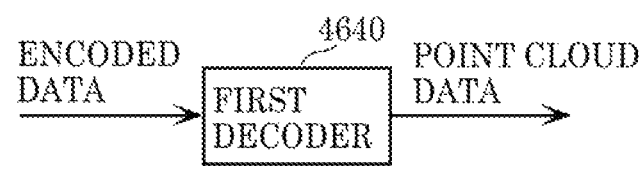
FIG. 7 is a diagram illustrating a structure of a first decoder according to Embodiment 1.
Figure 8:
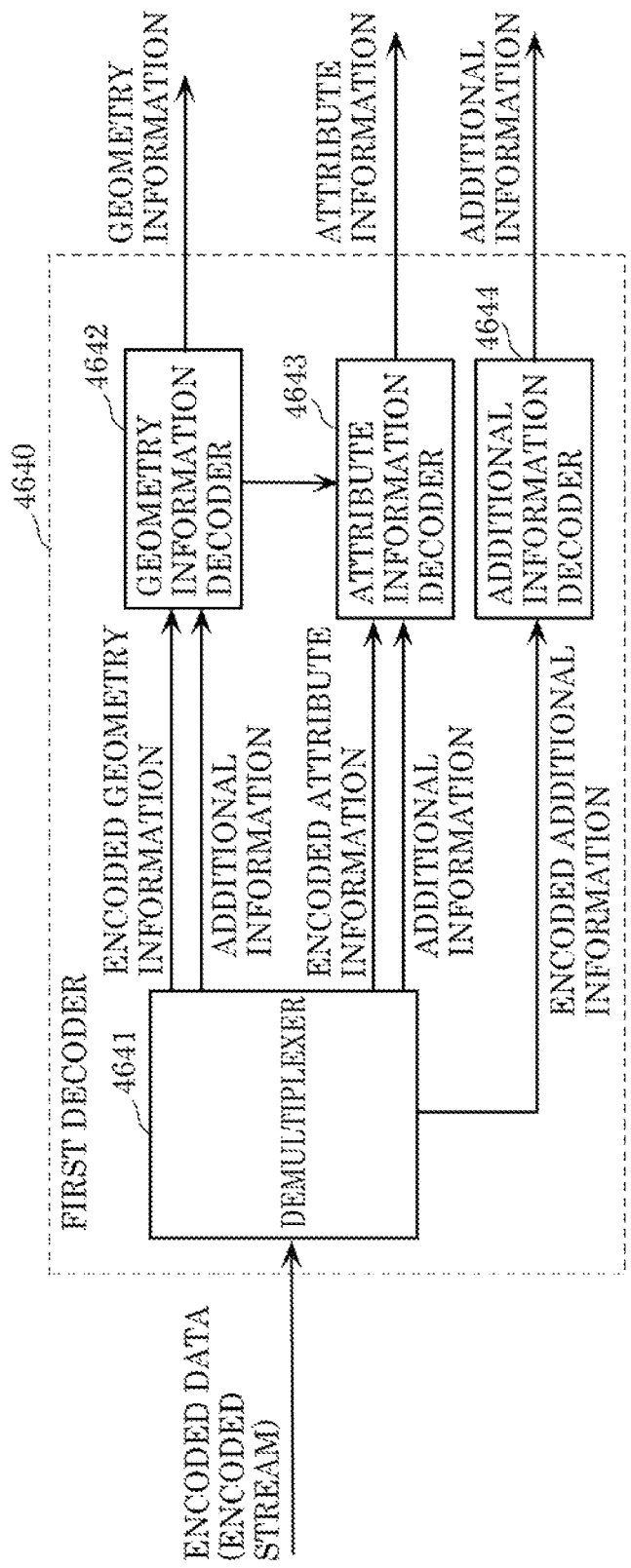
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
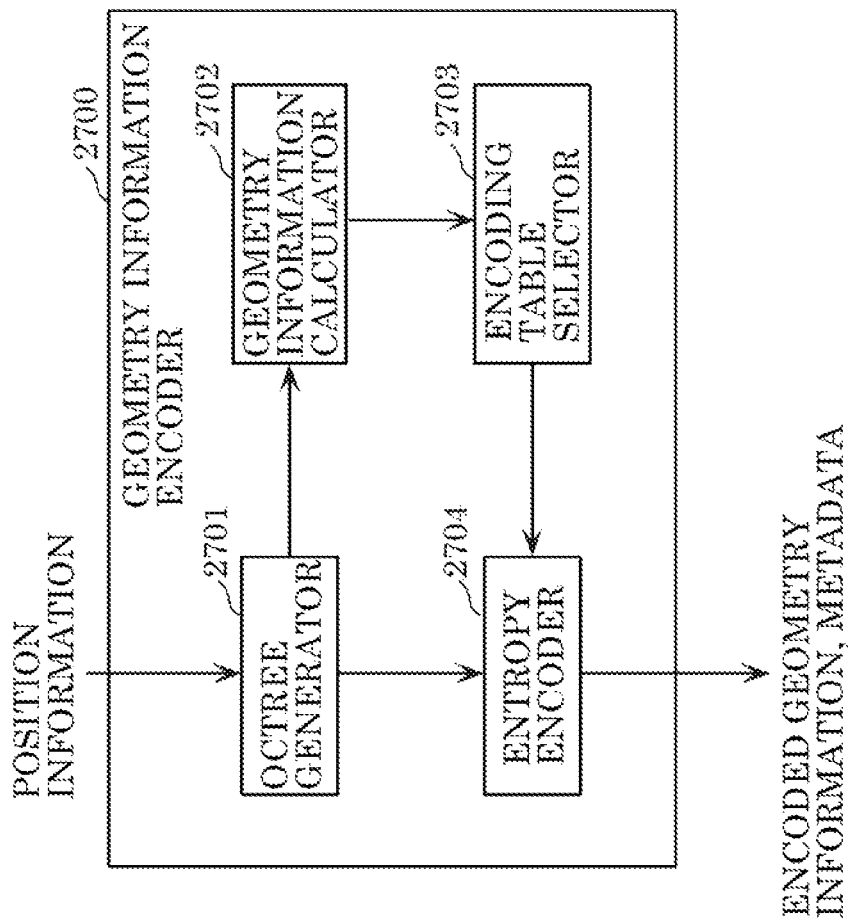
FIG. 9 is a block diagram of a three-dimensional data encoding device according to Embodiment 1.

Next, an example configuration of a geometry information encoder will be described. FIG. 9 is a block diagram of geometry information encoder 2700 according to this embodiment. Geometry information encoder 2700 includes octree generator 2701, geometry information calculator 2702, encoding table selector 2703, and entropy encoder 2704.

Octree generator 2701 generates an octree, for example, from input position information, and generates an occupancy code of each node of the octree. Geometry information calculator 2702 obtains information that indicates whether a neighboring node of a current node (target node) is an occupied node or not. For example, geometry information calculator 2702 calculates occupancy information on a neighboring node from an occupancy code of a parent node to which a current node belongs (information that indicates whether a neighboring node is an occupied node or not). Geometry information calculator 2702 may save an encoded node in a list and search the list for a neighboring node. Note that geometry information calculator 2702 may change neighboring nodes in accordance with the position of the current node in the parent node.

Encoding table selector 2703 selects an encoding table used for entropy encoding of the current node based on the occupancy information on the neighboring node calculated by geometry information calculator 2702. For example, encoding table selector 2703 may generate a bit sequence based on the occupancy information on the neighboring node and select an encoding table of an index number generated from the bit sequence.

Entropy encoder 2704 generates encoded geometry information and metadata by entropy-encoding the occupancy code of the current node using the encoding table of the selected index number. Entropy encoder may add, to the encoded geometry information, information that indicates the selected encoding table.

Figure 10:
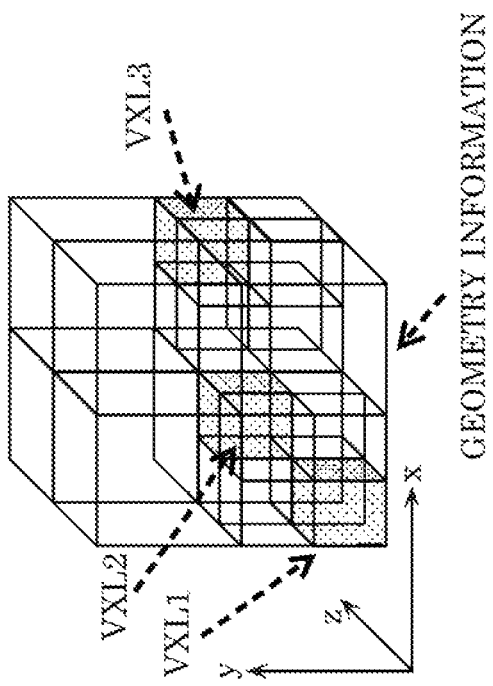
FIG. 10 is a diagram showing an example of geometry information according to Embodiment 1.
Figure 11:
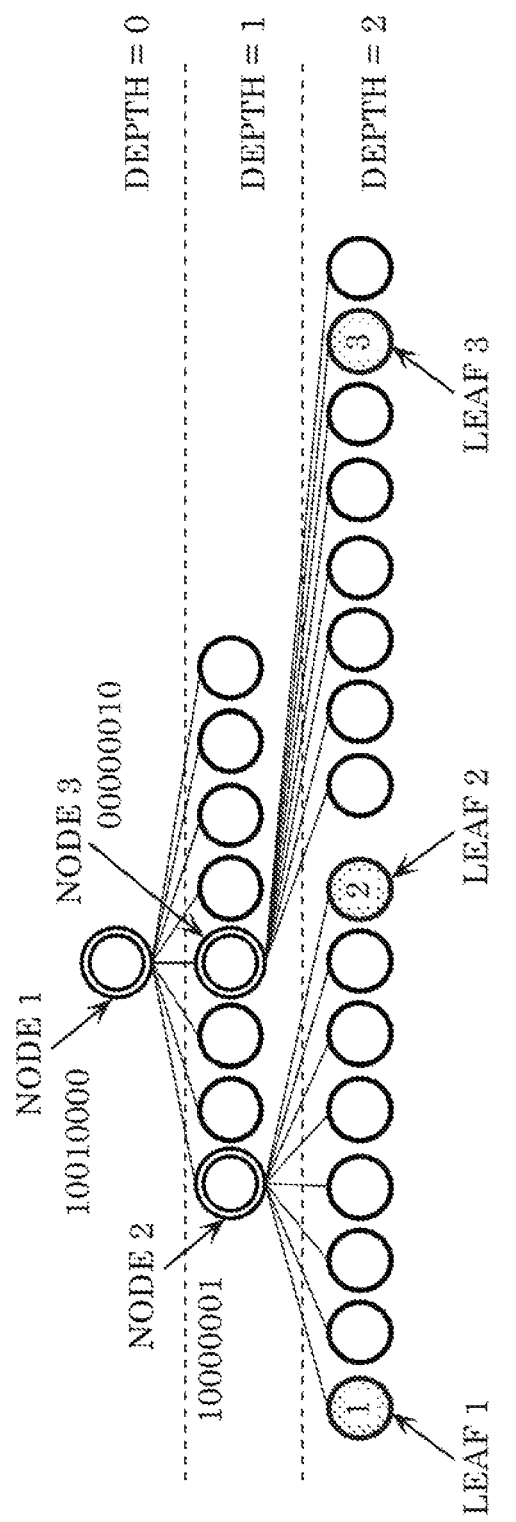
FIG. 11 is a diagram showing an example of an octree representation of geometry information according to Embodiment 1.

In the following, an octree representation and a scan order for geometry information will be described. Geometry information (geometry data) is transformed into an octree structure (octree transform) and then encoded. The octree structure includes nodes and leaves. Each node has eight nodes or leaves, and each leaf has voxel (VXL) information. FIG. 10 is a diagram showing an example structure of geometry information including a plurality of voxels. FIG. 11 is a diagram showing an example in which the geometry information shown in FIG. 10 is transformed into an octree structure. Here, of leaves shown in FIG. 11, leaves 1, 2, and 3 represent voxels VXL1, VXL2, and VXL3 shown in FIG. 10, respectively, and each represent VXL containing a point cloud (referred to as a valid VXL, hereinafter).

Specifically, node 1 corresponds to the entire space comprising the geometry information in FIG. 10. The entire space corresponding to node 1 is divided into eight nodes, and among the eight nodes, a node containing valid VXL is further divided into eight nodes or leaves. This process is repeated for every layer of the tree structure. Here, each node corresponds to a subspace, and has information (occupancy code) that indicates where the next node or leaf is located after division as node information. A block in the bottom layer is designated as a leaf and retains the number of the points contained in the leaf as leaf information.

Figure 12:
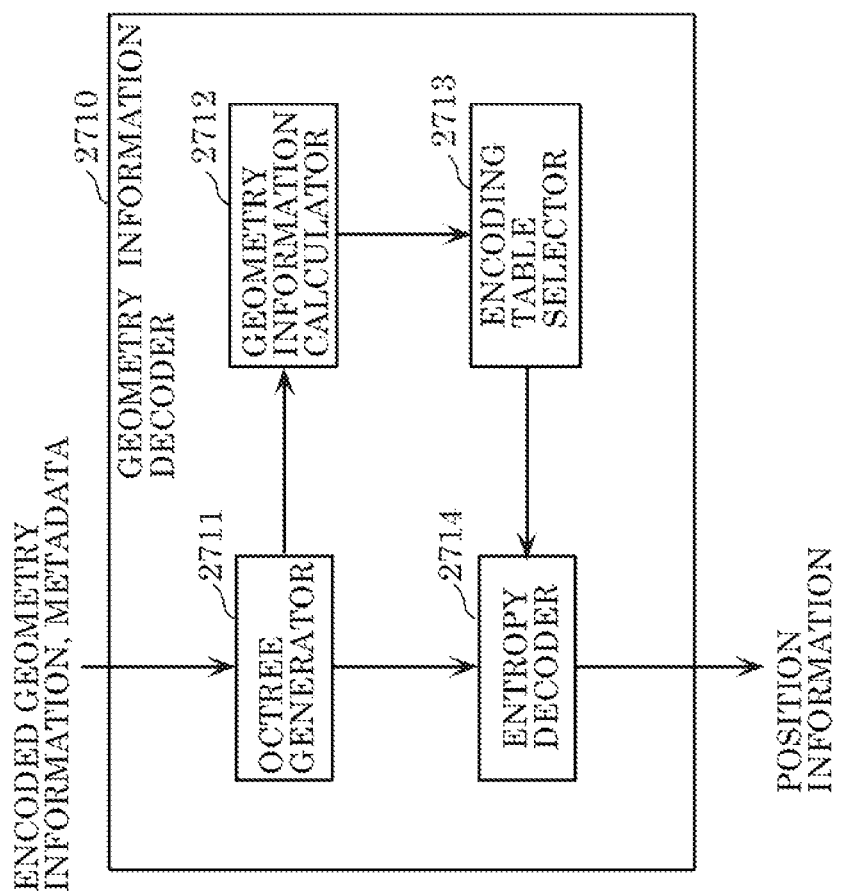
FIG. 12 is a block diagram of a three-dimensional data decoding device according to Embodiment 1.

Next, an example configuration of a geometry information decoder will be described. FIG. 12 is a block diagram of geometry information decoder 2710 according to this embodiment. Geometry information decoder 2710 includes octree generator 2711, geometry information calculator 2712, encoding table selector 2713, and entropy decoder 2714.

Octree generator 2711 generates an octree of a space (node) based on header information, metadata or the like of a bitstream. For example, octree generator 2711 generates an octree by generating a large space (root node) based on the sizes of a space in an x-axis direction, a y-axis direction, and a z-axis direction added to the header information and dividing the space into two parts in the x-axis direction, the y-axis direction, and the z-axis direction to generate eight small spaces A (nodes A0 to A7). Nodes A0 to A7 are sequentially designated as a current node.

Geometry information calculator 2712 obtains occupancy information that indicates whether a neighboring node of a current node is an occupied node or not. For example, geometry information calculator 2712 calculates occupancy information on a neighboring node from an occupancy code of a parent node to which a current node belongs. Geometry information calculator 2712 may save a decoded node in a list and search the list for a neighboring node. Note that geometry information calculator 2712 may change neighboring nodes in accordance with the position of the current node in the parent node.

Encoding table selector 2713 selects an encoding table (decoding table) used for entropy decoding of the current node based on the occupancy information on the neighboring node calculated by geometry information calculator 2712. For example, encoding table selector 2713 may generate a bit sequence based on the occupancy information on the neighboring node and select an encoding table of an index number generated from the bit sequence.

Entropy decoder 2714 generates position information by entropy-decoding the occupancy code of the current node using the selected encoding table. Note that entropy decoder 2714 may obtain information on the selected encoding table by decoding the bitstream, and entropy-decode the occupancy code of the current node using the encoding table indicated by the information.

Figure 13:
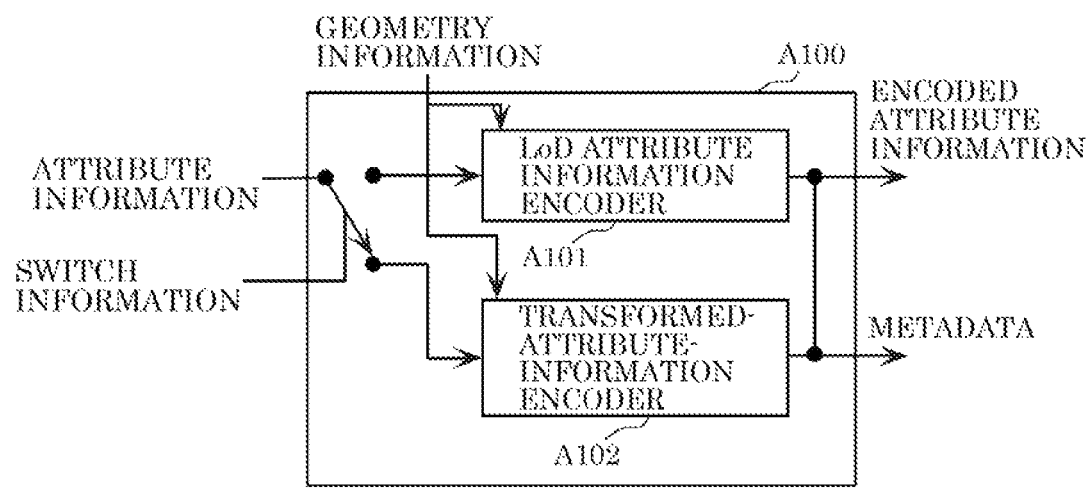
FIG. 13 is a block diagram of an attribute information encoder according to Embodiment 1.

In the following, configurations of an attribute information encoder and an attribute information decoder will be described. FIG. 13 is a block diagram showing an example configuration of attribute information encoder A100. The attribute information encoder may include a plurality of encoders that perform different encoding methods. For example, the attribute information encoder may selectively use any of the two methods described below in accordance with the use case.

Attribute information encoder A100 includes LoD attribute information encoder A101 and transformed-attribute-information encoder A102. LoD attribute information encoder A101 classifies three-dimensional points into a plurality of layers based on geometry information on the three-dimensional points, predicts attribute information on three-dimensional points belonging to each layer, and encodes a prediction residual therefor. Here, each layer into which a three-dimensional point is classified is referred to as a level of detail (LoD).

Transformed-attribute-information encoder A102 encodes attribute information using region adaptive hierarchical transform (RAHT). Specifically, transformed-attribute-information encoder A102 generates a high frequency component and a low frequency component for each layer by applying RAHT or Haar transform to each item of attribute information based on the geometry information on three-dimensional points, and encodes the values by quantization, entropy encoding or the like.

Figure 14:
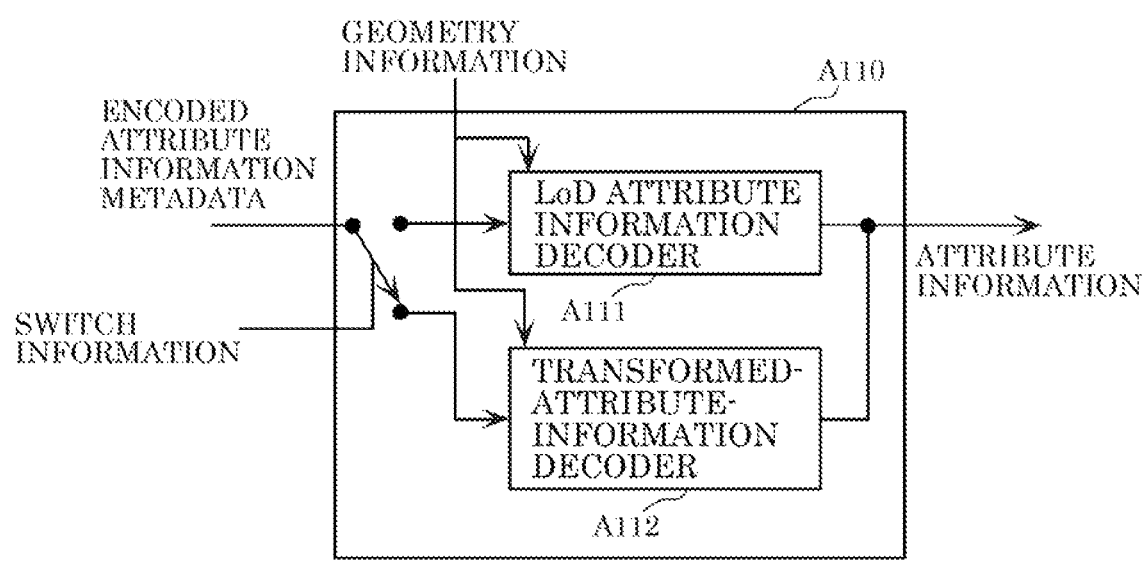
FIG. 14 is a block diagram of an attribute information decoder according to Embodiment 1.

FIG. 14 is a block diagram showing an example configuration of attribute information decoder A110. The attribute information decoder may include a plurality of decoders that perform different decoding methods. For example, the attribute information decoder may selectively use any of the two methods described below for decoding based on the information included in the header or metadata.

Attribute information decoder A110 includes LoD attribute information decoder A111 and transformed-attribute-information decoder A112. LoD attribute information decoder A111 classifies three-dimensional points into a plurality of layers based on the geometry information on the three-dimensional points, predicts attribute information on three-dimensional points belonging to each layer, and decodes attribute values thereof.

Transformed-attribute-information decoder A112 decodes attribute information using region adaptive hierarchical transform (RAHT). Specifically, transformed-attribute-information decoder A112 decodes each attribute value by applying inverse RAHT or inverse Haar transform to the high frequency component and the low frequency component of the attribute value based on the geometry information on the three-dimensional point.

Figure 15:
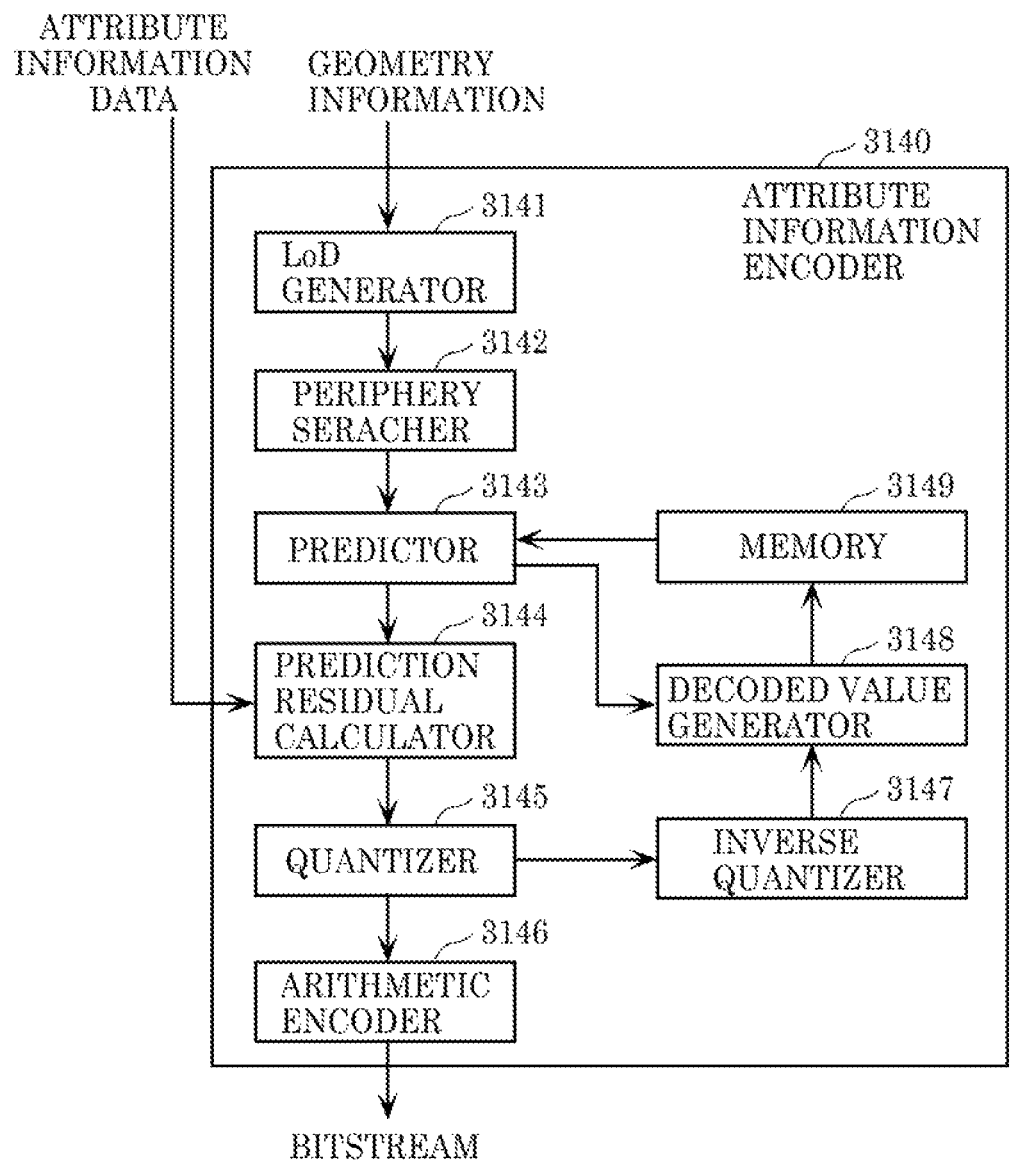
FIG. 15 is a block diagram showing a configuration of the attribute information encoder according to the variation of Embodiment 1.

FIG. 15 is a block diagram showing a configuration of attribute information encoder 3140 that is an example of LoD attribute information encoder A101.

Attribute information encoder 3140 includes LoD generator 3141, periphery searcher 3142, predictor 3143, prediction residual calculator 3144, quantizer 3145, arithmetic encoder 3146, inverse quantizer 3147, decoded value generator 3148, and memory 3149.

LoD generator 3141 generates an LoD using geometry information on a three-dimensional point.

Periphery searcher 3142 searches for a neighboring three-dimensional point neighboring each three-dimensional point using a result of LoD generation by LoD generator 3141 and distance information indicating distances between three-dimensional points.

Predictor 3143 generates a predicted value of an item of attribute information on a current (target) three-dimensional point to be encoded.

Prediction residual calculator 3144 calculates (generates) a prediction residual of the predicted value of the item of the attribute information generated by predictor 3143.

Quantizer 3145 quantizes the prediction residual of the item of attribute information calculated by prediction residual calculator 3144.

Arithmetic encoder 3146 arithmetically encodes the prediction residual quantized by quantizer 3145. Arithmetic encoder 3146 outputs a bitstream including the arithmetically encoded prediction residual to the three-dimensional data decoding device, for example.

The prediction residual may be binarized by quantizer 3145 before being arithmetically encoded by arithmetic encoder 3146.

Arithmetic encoder 3146 may initialize the encoding table used for the arithmetic encoding before performing the arithmetic encoding. Arithmetic encoder 3146 may initialize the encoding table used for the arithmetic encoding for each layer. Arithmetic encoder 3146 may output a bitstream including information that indicates the position of the layer at which the encoding table is initialized.

Inverse quantizer 3147 inverse-quantizes the prediction residual quantized by quantizer 3145.

Decoded value generator 3148 generates a decoded value by adding the predicted value of the item of attribute information generated by predictor 3143 and the prediction residual inverse-quantized by inverse quantizer 3147 together.

Memory 3149 is a memory that stores a decoded value of an item of attribute information on each three-dimensional point decoded by decoded value generator 3148. For example, when generating a predicted value of a three-dimensional point yet to be encoded, predictor 3143 may generate the predicted value using a decoded value of an item of attribute information on each three-dimensional point stored in memory 3149.

Figure 16:
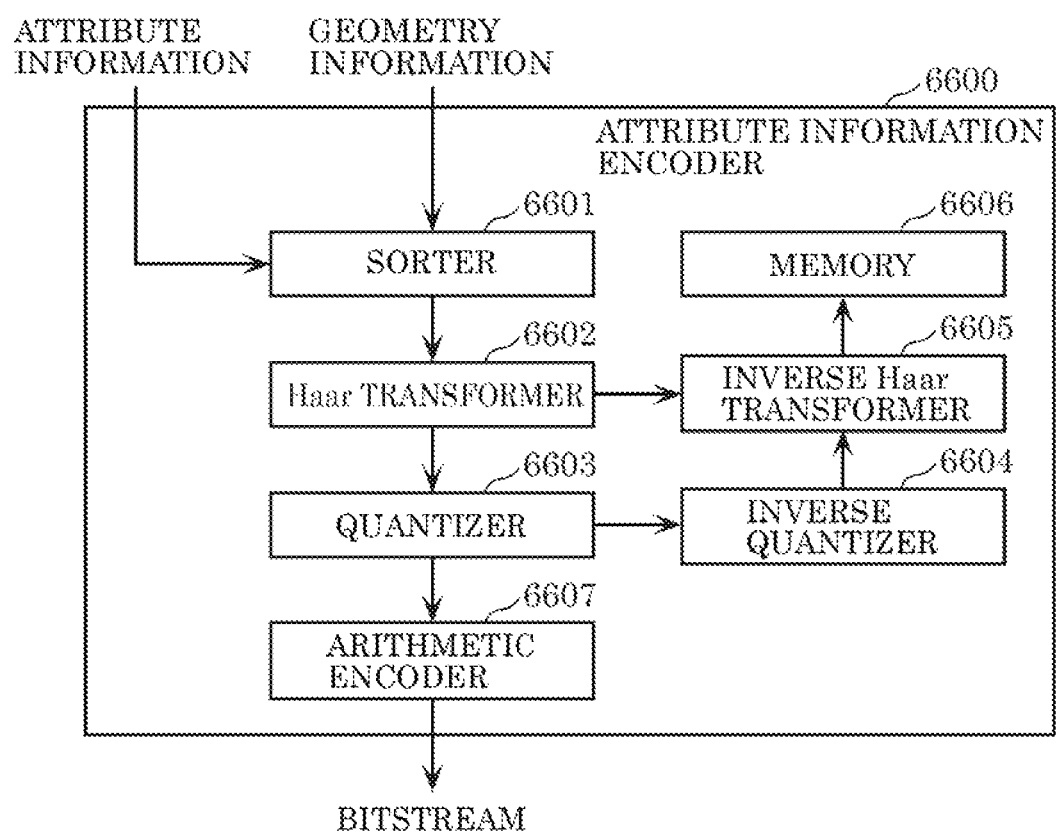
FIG. 16 is a block diagram of the attribute information encoder according to Embodiment 1.

FIG. 16 is a block diagram of attribute information encoder 6600 that is an example of transformation attribute information encoder A102. Attribute information encoder 6600 includes sorter 6601, Haar transformer 6602, quantizer 6603, inverse quantizer 6604, inverse Haar transformer 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar transform to the attribute information. Quantizer 6603 quantizes the coding coefficient of the attribute information.

Inverse quantizer 6604 inverse quantizes the coding coefficient after the quantization. Inverse Haar transformer 6605 applies the inverse Haar transform to the coding coefficient. Memory 6606 stores the values of items of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 17:
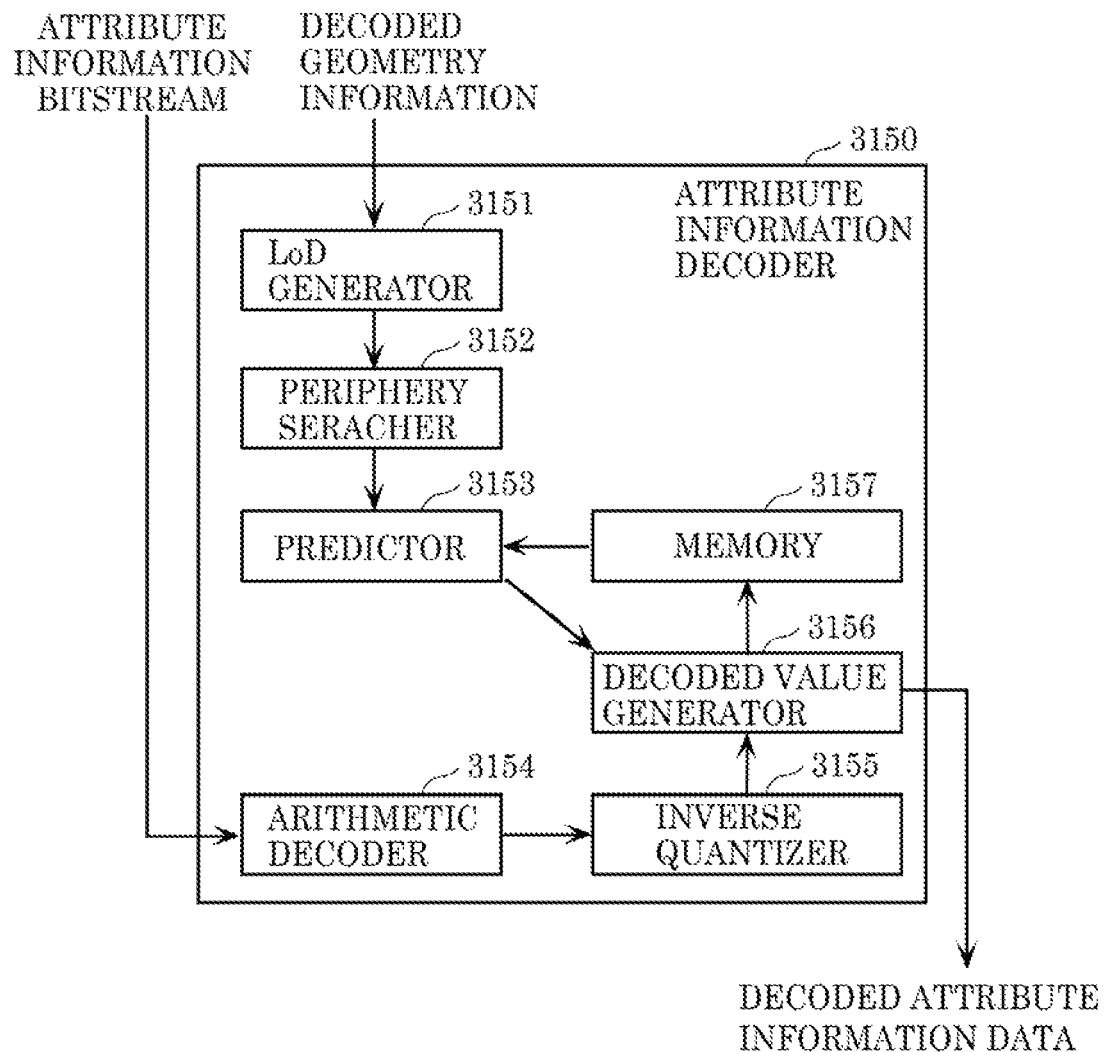
FIG. 17 is a block diagram showing a configuration of the attribute information decoder according to the variation of Embodiment 1.

FIG. 17 is a block diagram showing a configuration of attribute information decoder 3150 that is an example of LoD attribute information decoder A111.

Attribute information decoder 3150 includes LoD generator 3151, periphery searcher 3152, predictor 3153, arithmetic decoder 3154, inverse quantizer 3155, decoded value generator 3156, and memory 3157.

LoD generator 3151 generates an LoD using geometry information on a three-dimensional point decoded by the geometry information decoder (not shown in FIG. 17).

Periphery searcher 3152 searches for a neighboring three-dimensional point neighboring each three-dimensional point using a result of LoD generation by LoD generator 3151 and distance information indicating distances between three-dimensional points.

Predictor 3153 generates a predicted value of attribute information item on a current three-dimensional point to be decoded.

Arithmetic decoder 3154 arithmetically decodes the prediction residual in the bitstream obtained from attribute information encoder 3140 shown in FIG. 15. Note that arithmetic decoder 3154 may initialize the decoding table used for the arithmetic decoding. Arithmetic decoder 3154 initializes the decoding table used for the arithmetic decoding for the layer for which the encoding process has been performed by arithmetic encoder 3146 shown in FIG. 15.

Arithmetic decoder 3154 may initialize the decoding table used for the arithmetic decoding for each layer. Arithmetic decoder 3154 may initialize the decoding table based on the information included in the bitstream that indicates the position of the layer for which the encoding table has been initialized.

Inverse quantizer 3155 inverse-quantizes the prediction residual arithmetically decoded by arithmetic decoder 3154.

Decoded value generator 3156 generates a decoded value by adding the predicted value generated by predictor 3153 and the prediction residual inverse-quantized by inverse quantizer 3155 together. Decoded value generator 3156 outputs the decoded attribute information data to another device.

Memory 3157 is a memory that stores a decoded value of an item of attribute information on each three-dimensional point decoded by decoded value generator 3156. For example, when generating a predicted value of a three-dimensional point yet to be decoded, predictor 3153 generates the predicted value using a decoded value of an item of attribute information on each three-dimensional point stored in memory 3157.

Figure 18:
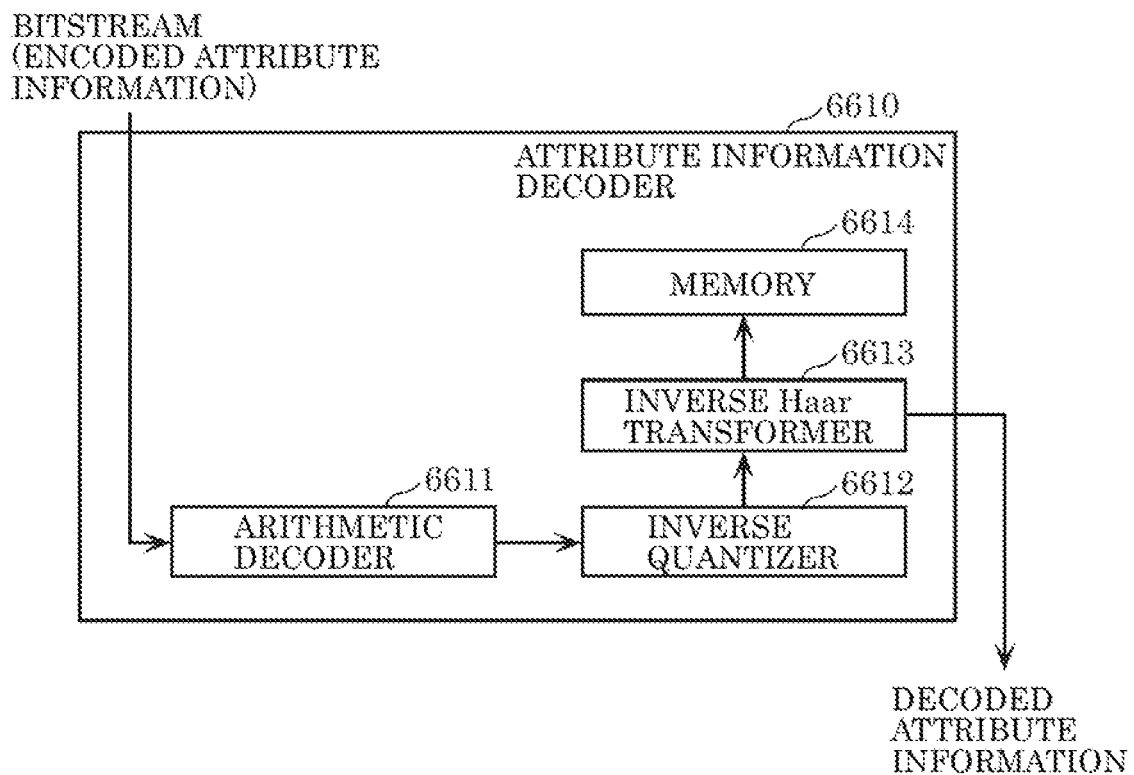
FIG. 18 is a block diagram of the attribute information decoder according to Embodiment 1.

FIG. 18 is a block diagram of attribute information decoder 6610 that is an example of transformation attribute information decoder A112. Attribute information decoder 6610 includes arithmetic decoder 6611, inverse quantizer 6612, inverse Haar transformer 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar transformer 6613 applies the inverse Haar transform to the coding coefficient after the inverse quantization. Memory 6614 stores the values of items of attribute information of a plurality of decoded three-dimensional points. For example, the attribute information of the decoded three-dimensional points stored in memory 6614 may be utilized for prediction of an undecoded three-dimensional point.

Figure 19:
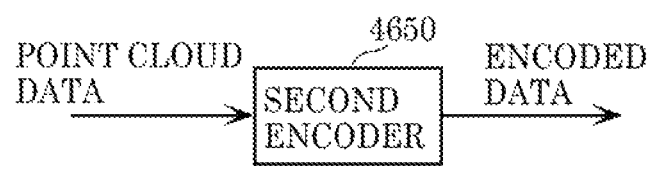
FIG. 19 is a diagram illustrating a structure of a second encoder according to Embodiment 1.
Figure 20:
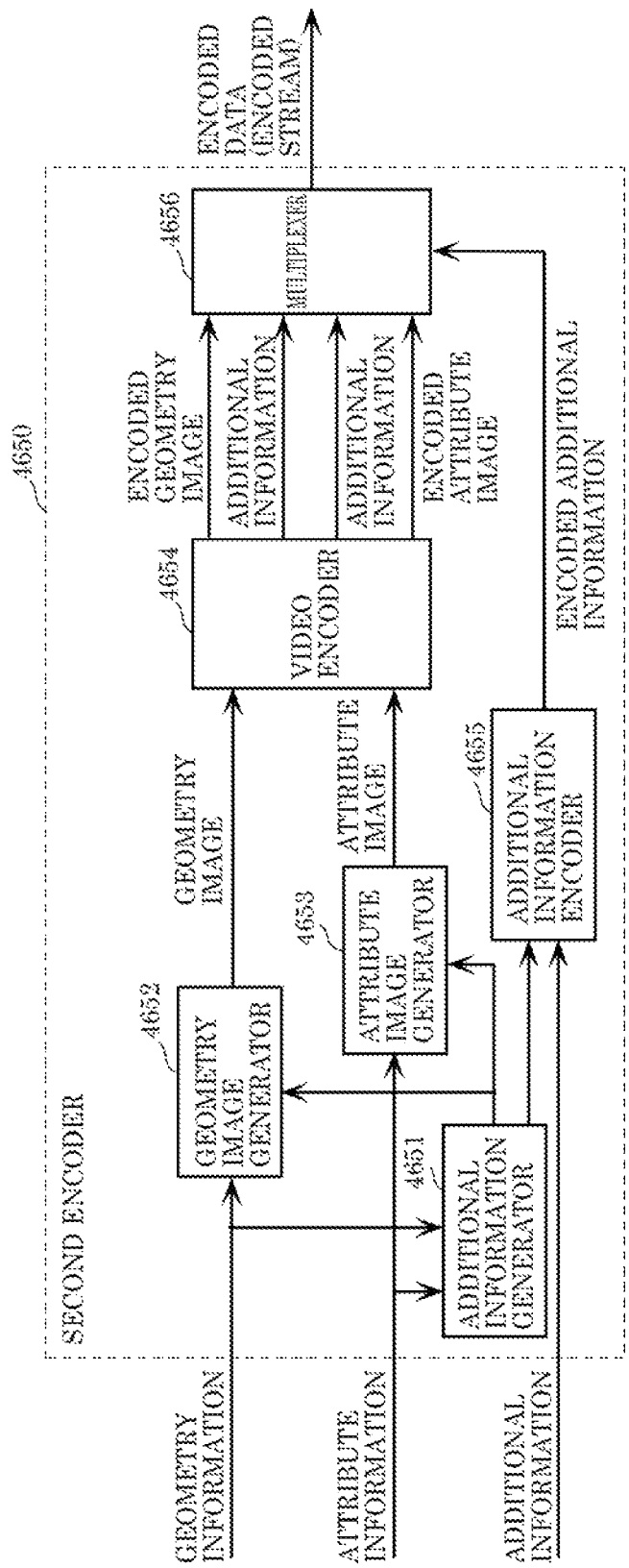
FIG. 20 is a block diagram illustrating the second encoder according to Embodiment 1.

Next, second encoder 4650, which is an example of encoder 4613 that performs encoding in the second encoding method, will be described. FIG. 19 is a diagram showing a configuration of second encoder 4650. FIG. 20 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 21:
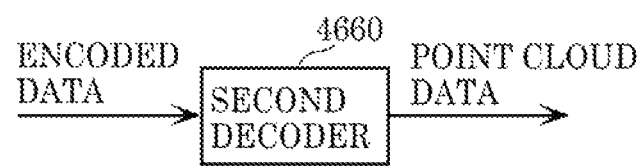
FIG. 21 is a diagram illustrating a structure of a second decoder according to Embodiment 1.
Figure 22:
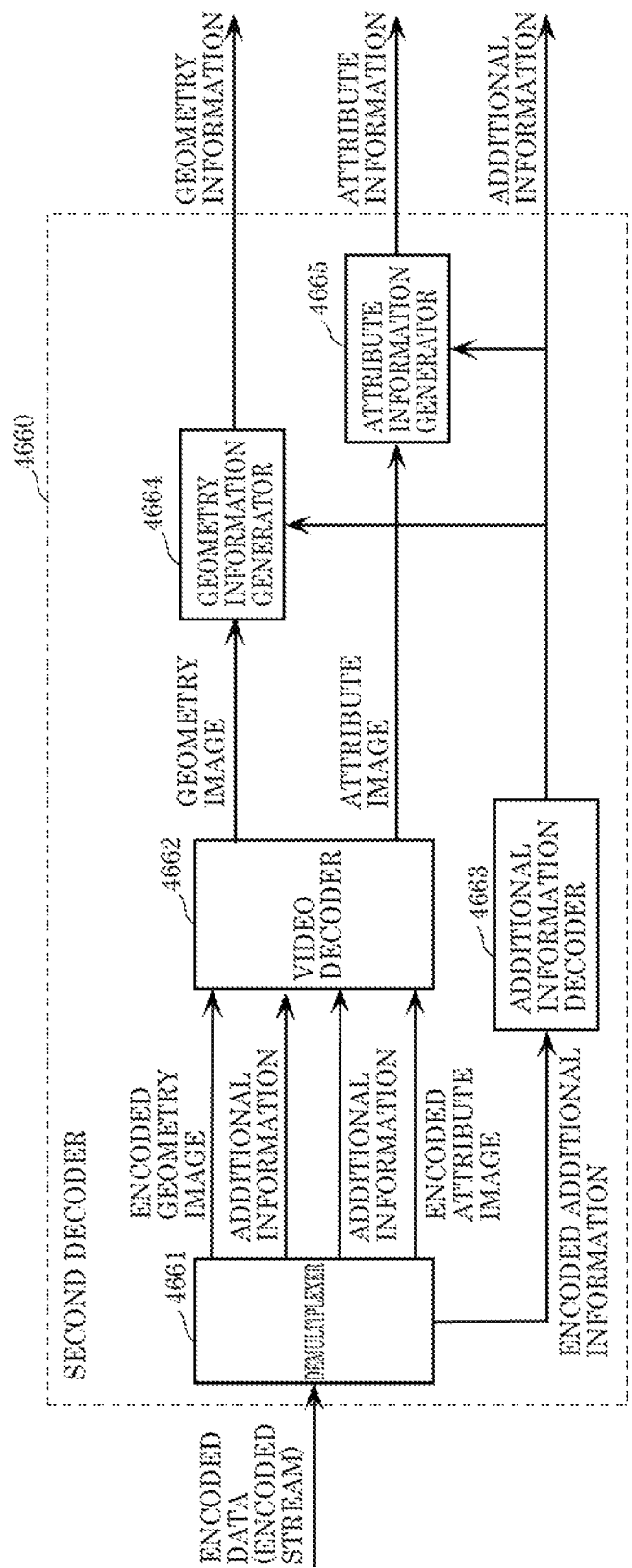
FIG. 22 is a block diagram illustrating the second decoder according to Embodiment 1.

Next, second decoder 4660, which is an example of decoder 4624 that performs decoding in the second encoding method, will be described. FIG. 21 is a diagram showing a configuration of second decoder 4660. FIG. 22 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 23:
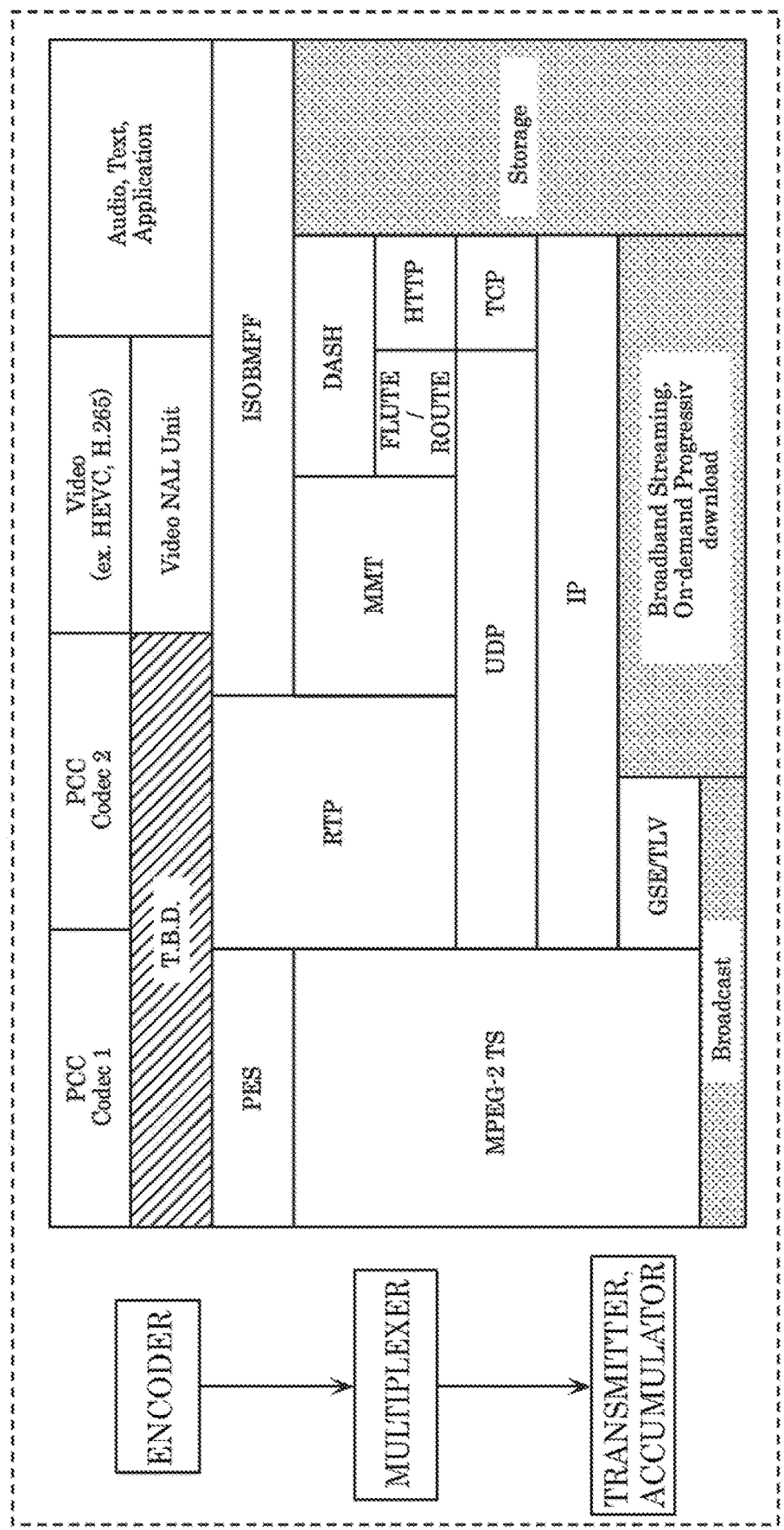
FIG. 23 is a diagram illustrating a protocol stack related to PCC encoded data according to Embodiment 1.

In the following, a problem with the PCC encoding scheme will be described. FIG. 23 is a diagram showing a protocol stack relating to PCC-encoded data. FIG. 23 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

EMBODIMENT 2

In this embodiment, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 24:
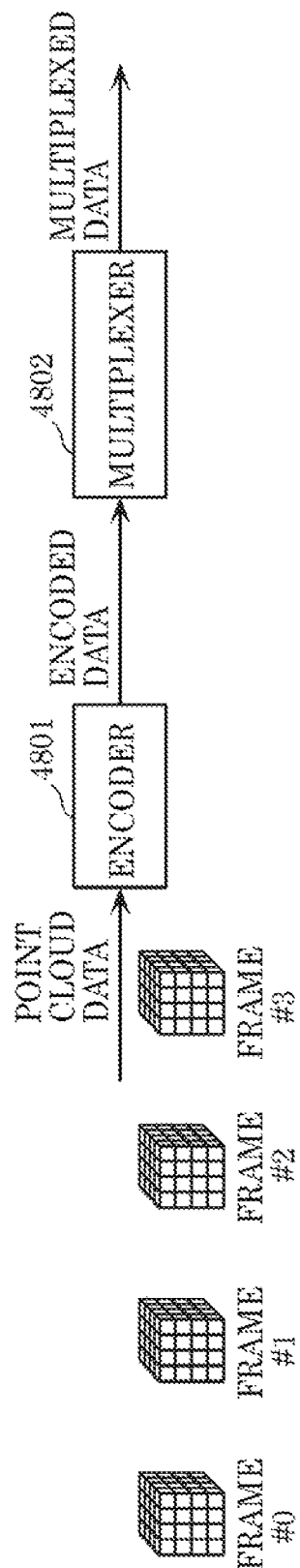
FIG. 24 is a diagram illustrating structures of an encoder and a multiplexer according to Embodiment 2.

FIG. 24 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 25:
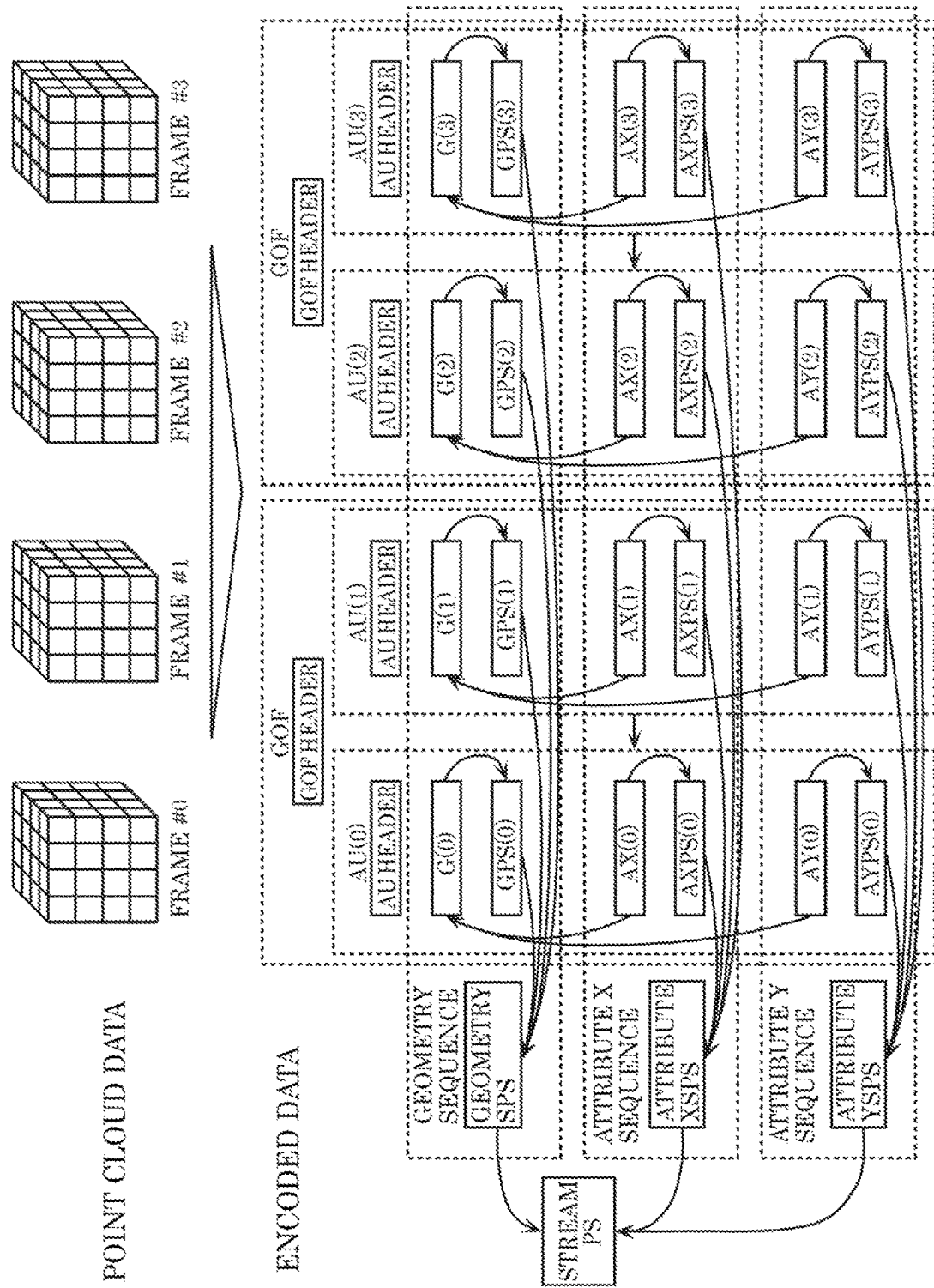
FIG. 25 is a diagram illustrating a structure example of encoded data according to Embodiment 2.

FIG. 25 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 25 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 25 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 25 shows an example in which there is one type of geometry information, and there are two types of attribute information, the present disclosure is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 26:
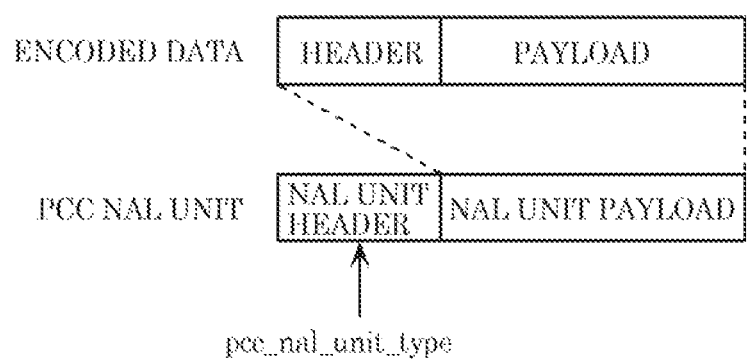
FIG. 26 is a diagram illustrating a structure example of encoded data and a NAL unit according to Embodiment 2.

For example, a data format is defined for each type of encoded data. FIG. 26 is a diagram showing an example of encoded data and a NAL unit.

For example, as shown in FIG. 26, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 27 is a diagram showing a semantics example of pcc_nal_unit_type.

As shown in FIG. 27, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 28:
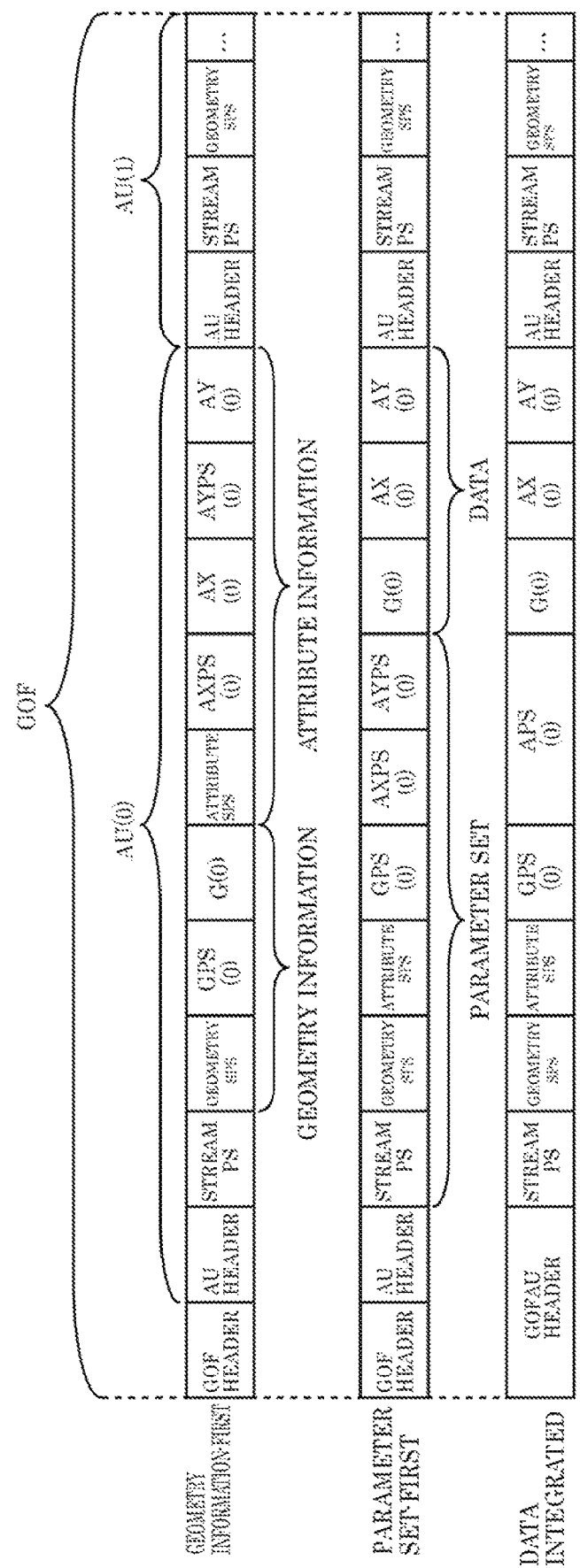
FIG. 28 is a diagram illustrating an example of a transmitting order of NAL units according to Embodiment 2.

FIG. 28 is a diagram showing examples of the order of transmission of NAL units. FIG. 28 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 28 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 28, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a the or slice or data storing a parameter is defined in pcc_nal_unit_type.

Figure 29:
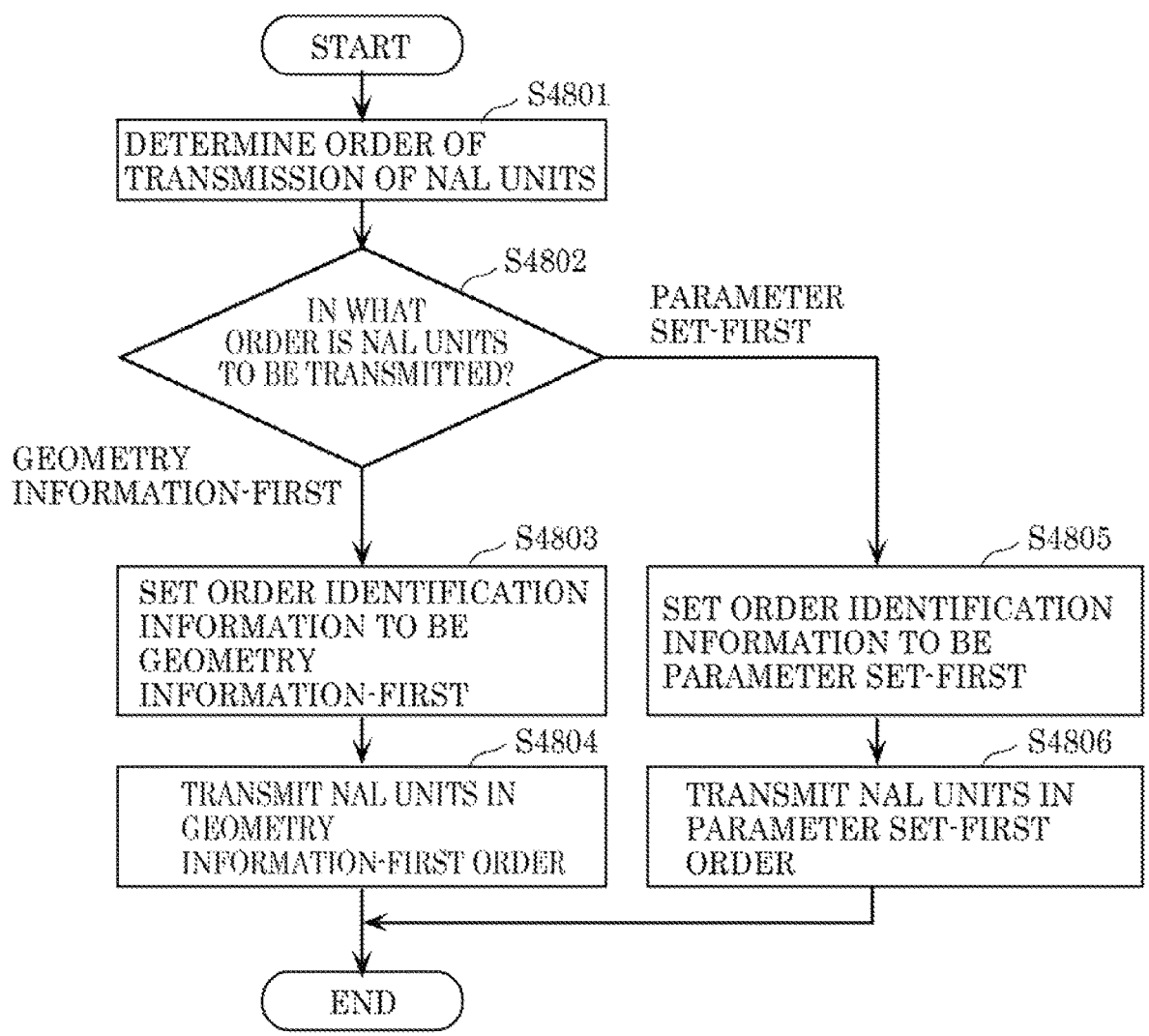
FIG. 29 is a flowchart of processing performed by a three-dimensional data encoding device according to Embodiment 2.

In the following, a process relating to order identification information will be described. FIG. 29 is a flowchart showing a process performed by the three-dimensional data encoding device (encoder 4801 and multiplexer 4802) that involves the order of transmission of NAL units.

First, the three-dimensional data encoding device determines the order of transmission of NAL units (geometry information-first or parameter set-first) (S4801). For example, the three-dimensional data encoding device determines the order of transmission based on a specification from a user or an external device (the three-dimensional data decoding device, for example).

If the determined order of transmission is geometry information-first (if "geometry information-first" in S4802), the three-dimensional data encoding device sets the order identification information included in the stream PS to geometry information-first (S4803). That is, in this case, the order identification information indicates that the NAL units are transmitted in the geometry information-first order. The three-dimensional data encoding device then transmits the NAL units in the geometry information-first order (S4804).

On the other hand, if the determined order of transmission is parameter set-first (if "parameter set-first" in S4802), the three-dimensional data encoding device sets the order identification information included in the stream PS to parameter set-first (S4805). That is, in this case, the order identification information indicates that the NAL units are transmitted in the parameter set-first order. The three-dimensional data encoding device then transmits the NAL units in the parameter set-first order (S4806).

Figure 30:
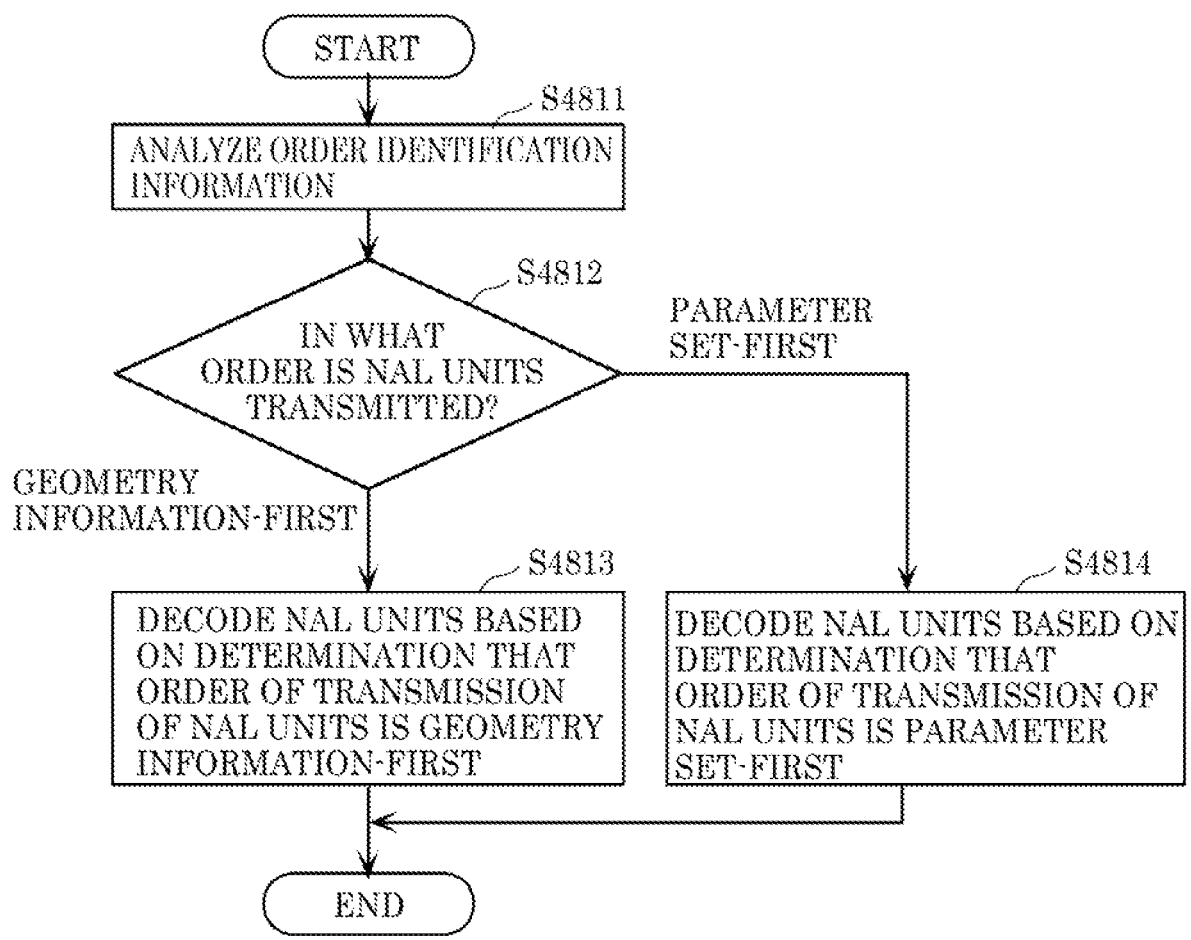
FIG. 30 is a flowchart of processing performed by a three-dimensional data decoding device according to Embodiment 2.

FIG. 30 is a flowchart showing a process performed by the three-dimensional data decoding device that involves the order of transmission of NAL units. First, the three-dimensional data decoding device analyzes the order identification information included in the stream PS (S4811).

If the order of transmission indicated by the order identification information is geometry information-first (if "geometry information-first" in S4812), the three-dimensional data decoding device decodes the NAL units based on the determination that the order of transmission of the NAL units is geometry information-first (S4813).

On the other hand, if the order of transmission indicated by the order identification information is parameter set-first (if "parameter set-first" in S4812), the three-dimensional data decoding device decodes the NAL units based on the determination that the order of transmission of the NAL units is parameter set-first (S4814).

For example, if the three-dimensional data decoding device does not decode attribute information, in step S4813, the three-dimensional data decoding device does not obtain the entire NAL units but can obtain a part of a NAL unit relating to the geometry information and decode the obtained NAL unit to obtain the geometry information.

Figure 31:
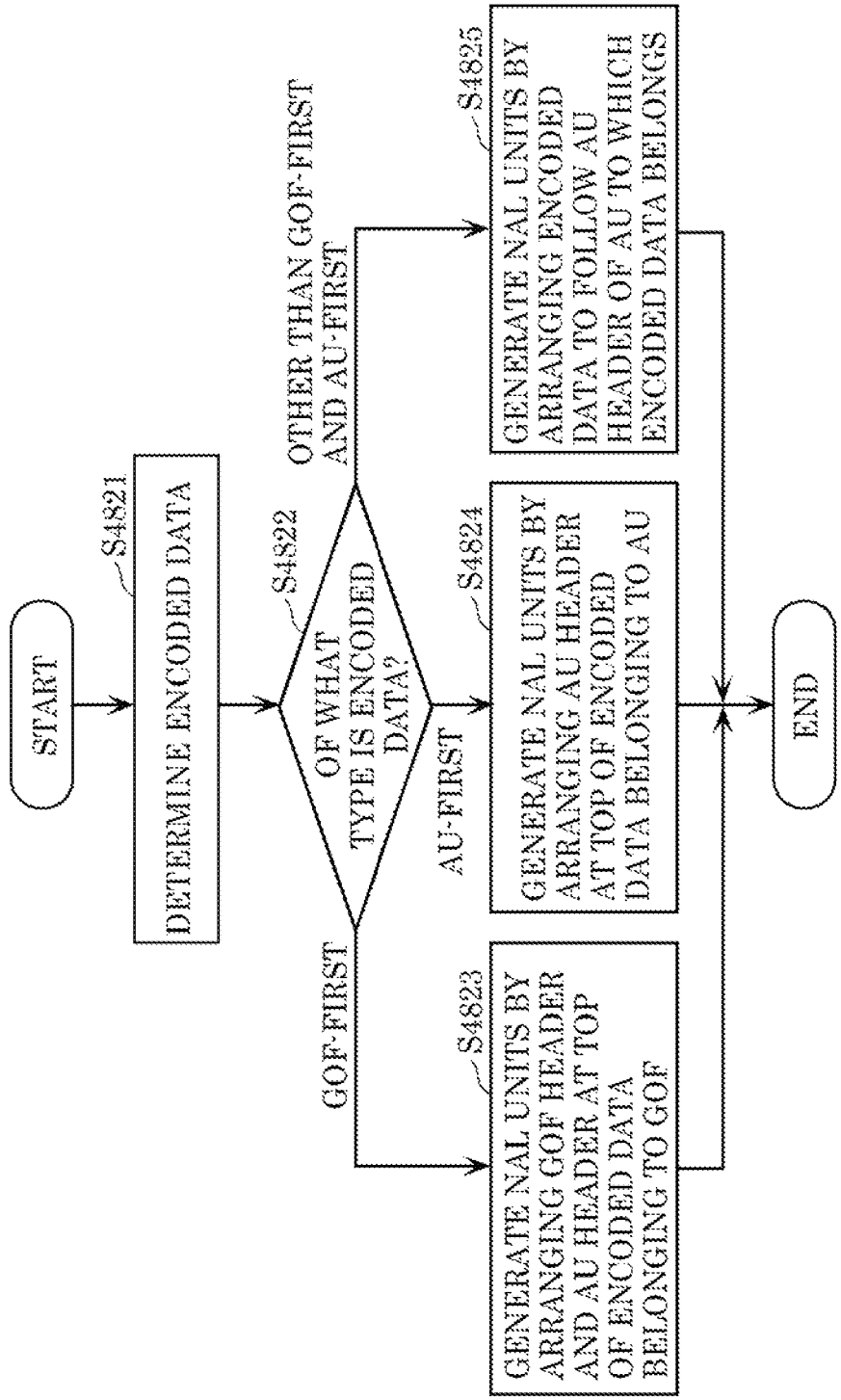
FIG. 31 is a flowchart of multiplexing processing according to Embodiment 2.

Next, a process relating to generation of an AU and a GOF will be described. FIG. 31 is a flowchart showing a process performed by the three-dimensional data encoding device (multiplexer 4802) that relates to generation of an AU and a GOF in multiplexing of NAL units.

First, the three-dimensional data encoding device determines the type of the encoded data (S4821). Specifically, the three-dimensional data encoding device determines whether the encoded data to be processed is AU-first data, GOF-first data, or other data.

If the encoded data is GOF-first data (if "GOF-first" in S4822), the three-dimensional data encoding device generates NAL units by arranging a GOF header and an AU header at the top of the encoded data belonging to the GOF (S4823).

If the encoded data is AU-first data (if "AU-first" in S4822), the three-dimensional data encoding device generates NAL units by arranging an AU header at the top of the encoded data belonging to the AU (S4824).

If the encoded data is neither GOF-first data nor AU-first data (if "other than GOF-first and AU-first" in S4822), the three-dimensional data encoding device generates NAL units by arranging the encoded data to follow the AU header of the AU to which the encoded data belongs (S4825).

Figure 32:
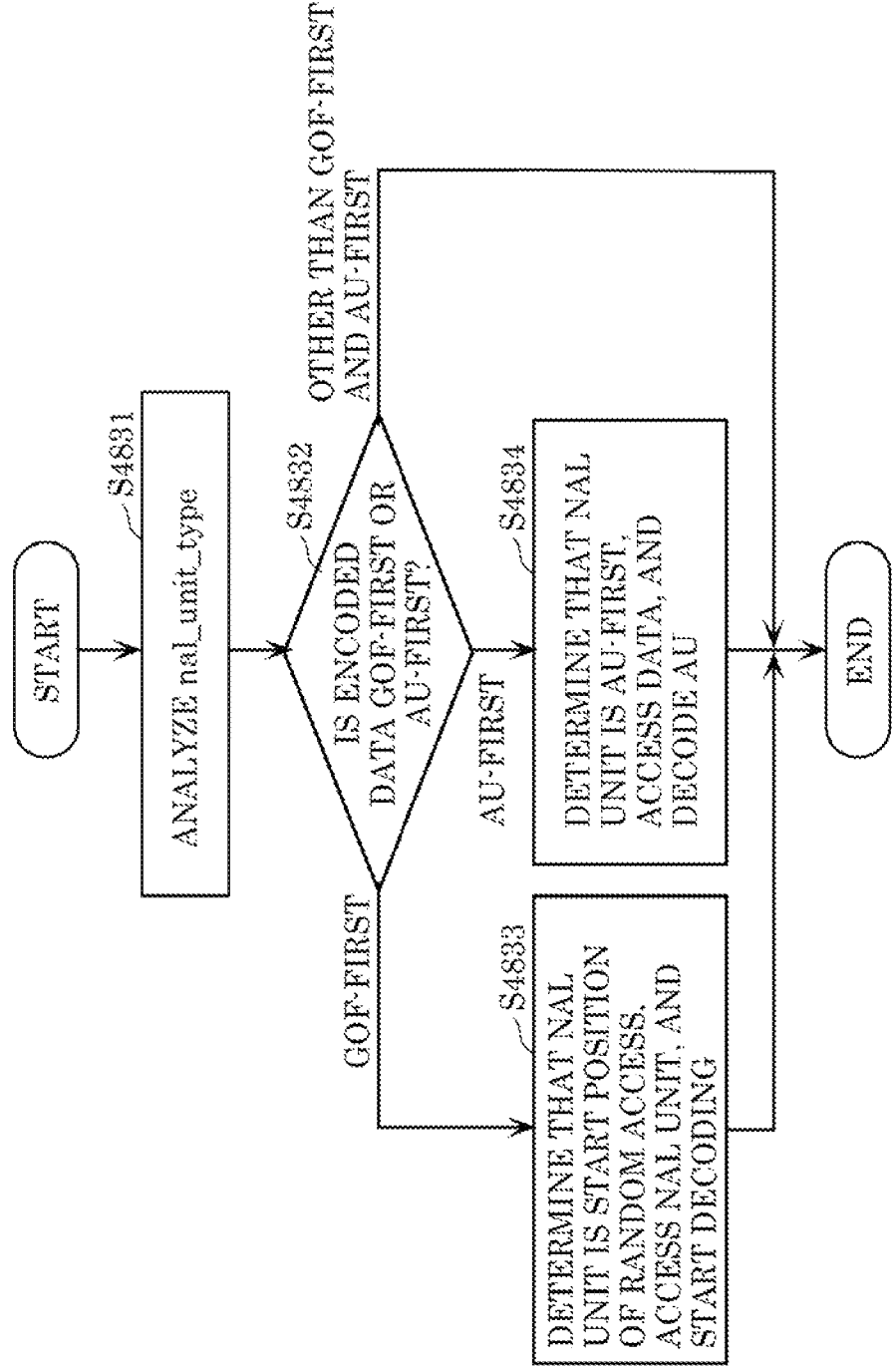
FIG. 32 is a flowchart of demultiplexing processing according to Embodiment 2.

Next, a process relating to access to an AU and a GOF will be described. FIG. 32 is a flowchart showing a process performed by the three-dimensional data decoding device that involves accessing to an AU and a GOF in demultiplexing of a NAL unit.

First, the three-dimensional data decoding device determines the type of the encoded data included in the NAL unit by analyzing nal_unit_type in the NAL unit (S4831). Specifically, the three-dimensional data decoding device determines whether the encoded data included in the NAL unit is AU-first data, GOF-first data, or other data.

If the encoded data included in the NAL unit is GOF-first data (if "GOF-first" in S4832), the three-dimensional data decoding device determines that the NAL unit is a start position of random access, accesses the NAL unit, and starts the decoding process (S4833).

If the encoded data included in the NAL unit is AU-first data (if "AU-first" in S4832), the three-dimensional data decoding device determines that the NAL unit is AU-first, accesses the data included in the NAL unit, and decodes the AU (S4834).

If the encoded data included in the NAL unit is neither GOF-first data nor AU-first data (if "other than GOF-first and AU-first" in S4832), the three-dimensional data decoding device does not process the NAL unit.

EMBODIMENT 3

Information of a three-dimensional point cloud includes geometry information (geometry) and attribute information (attribute). Geometry information includes coordinates (x-coordinate, y-coordinate, z-coordinate) with respect to a certain point. When geometry information is encoded, a method of representing the position of each of three-dimensional points in octree representation and encoding the octree information to reduce a code amount is used instead of directly encoding the coordinates of the three-dimensional point.

On the other hand, attribute information includes information indicating, for example, color information (RGB, YUV, etc.) of each three-dimensional point, a reflectance, and a normal vector. For example, a three-dimensional data encoding device is capable of encoding attribute information using an encoding method different from a method used to encode geometry information.

In the present embodiment, a method of encoding attribute information is explained. It is to be noted that, in the present embodiment, the method is explained based on an example case using integer values as values of attribute information. For example, when each of RGB or YUV color components is of an 8-bit accuracy, the color component is an integer value in a range from 0 to 255. When a reflectance value is of 10-bit accuracy, the reflectance value is an integer in a range from 0 to 1023. It is to be noted that, when the bit accuracy of attribute information is a decimal accuracy, the three-dimensional data encoding device may multiply the value by a scale value to round it to an integer value so that the value of the attribute information becomes an integer value. It is to be noted that the three-dimensional data encoding device may add the scale value to, for example, a header of a bitstream.

As a method of encoding attribute information of a three-dimensional point, it is conceivable to calculate a predicted value of the attribute information of the three-dimensional point and encode a difference (prediction residual) between the original value of the attribute information and the predicted value. For example, when the value of attribute information at three-dimensional point p is Ap and a predicted value is Pp, the three-dimensional data encoding device encodes differential absolute value Diffp=|Ap−Pp|. In this case, when highly-accurate predicted value Pp can be generated, differential absolute value Diffp is small. Thus, for example, it is possible to reduce the code amount by entropy encoding differential absolute value Diffp using a coding table that reduces an occurrence bit count more when differential absolute value Diffp is smaller.

As a method of generating a prediction value of attribute information, it is conceivable to use attribute information of a reference three-dimensional point that is another three-dimensional point which neighbors a current three-dimensional point to be encoded. Here, a reference three-dimensional point is a three-dimensional point in a range of a predetermined distance from the current three-dimensional point. For example, when there are current three-dimensional point p=(x1, y1, z1) and three-dimensional point q=(x2, y2, z2), the three-dimensional data encoding device calculates Euclidean distance d (p, q) between three-dimensional point p and three-dimensional point q represented by (Equation A1).

[Math. 1]
$$d(p, q) = \sqrt{(x1 - y1)^2 + (x2 - y2)^2 + (x3 - y3)^2}$$ (Equation A1)

The three-dimensional data encoding device determines that the position of three-dimensional point q is closer to the position of current three-dimensional point p when Euclidean distance d (p, q) is smaller than predetermined threshold value THd, and determines to use the value of the attribute information of three-dimensional point q to generate a predicted value of the attribute information of current three-dimensional point p. It is to be noted that the method of calculating the distance may be another method, and a Mahalanobis distance or the like may be used. In addition, the three-dimensional data encoding device may determine not to use, in prediction processing, any three-dimensional point outside the predetermined range of distance from the current three-dimensional point. For example, when three-dimensional point r is present, and distance d (p, r) between current three-dimensional point p and three-dimensional point r is larger than or equal to threshold value THd, the three-dimensional data encoding device may determine not to use three-dimensional point r for prediction. It is to be noted that the three-dimensional data encoding device may add the information indicating threshold value THd to, for example, a header of a bitstream.

Figure 33:
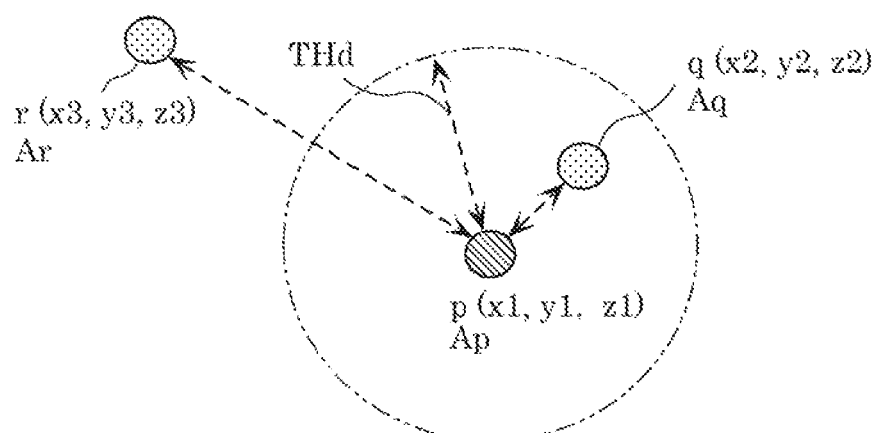
FIG. 33 is a diagram illustrating an example of three-dimensional points according to Embodiment 3.

FIG. 33 is a diagram illustrating an example of three-dimensional points. In this example, distance d (p, q) between current three-dimensional point p and three-dimensional point q is smaller than threshold value THd. Thus, the three-dimensional data encoding device determines that three-dimensional point q is a reference three-dimensional point of current three-dimensional point p, and determines to use the value of attribute information Aq of three-dimensional point q to generate predicted value Pp of attribute information Ap of current three-dimensional point p.

In contrast, distance d (p, r) between current three-dimensional point p and three-dimensional point r is larger than or equal to threshold value THd. Thus, the three-dimensional data encoding device determines that three-dimensional point r is not any reference three-dimensional point of current three-dimensional point p, and determines not to use the value of attribute information Ar of three-dimensional point r to generate predicted value Pp of attribute information Ap of current three-dimensional point p.

In addition, when encoding the attribute information of the current three-dimensional point using a predicted value, the three-dimensional data encoding device uses a three-dimensional point whose attribute information has already been encoded and decoded, as a reference three-dimensional point. Likewise, when decoding the attribute information of a current three-dimensional point to be decoded, the three-dimensional data decoding device uses a three-dimensional point whose attribute information has already been decoded, as a reference three-dimensional point. In this way, it is possible to generate the same predicted value at the time of encoding and decoding. Thus, a bitstream of the three-dimensional point generated by the encoding can be decoded correctly at the decoding side.

Figure 34:
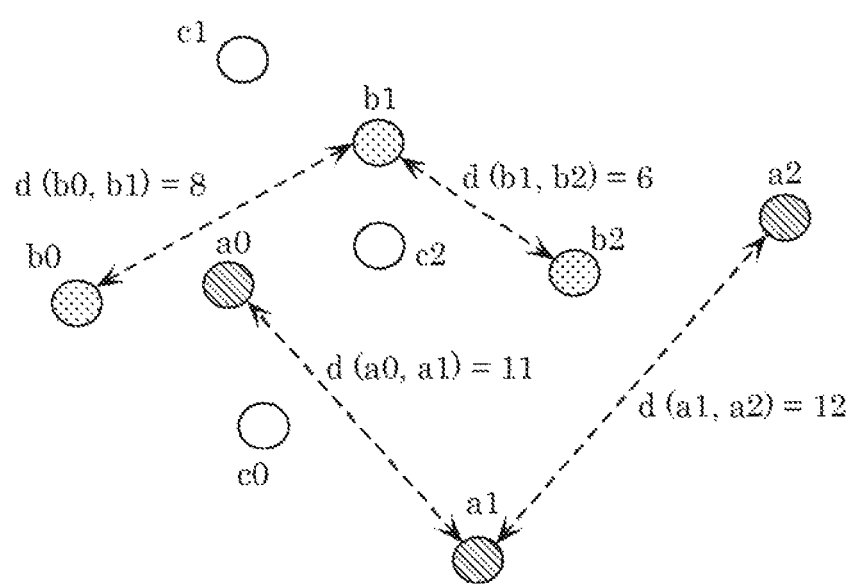
FIG. 34 is a diagram illustrating an example of setting LoDs according to Embodiment 3.

Furthermore, when encoding attribute information of each of three-dimensional points, it is conceivable to classify the three-dimensional point into one of a plurality of layers using geometry information of the three-dimensional point and then encode the attribute information. Here, each of the layers classified is referred to as a Level of Detail (LoD). A method of generating LoDs is explained with reference to FIG. 34.

First, the three-dimensional data encoding device selects initial point a0 and assigns initial point a0 to LoD0. Next, the three-dimensional data encoding device extracts point a1 distant from point a0 more than threshold value Thres_LoD [0] of LoD0 and assigns point a1 to LoD0. Next, the three-dimensional data encoding device extracts point a2 distant from point a1 more than threshold value Thres_LoD [0] of LoD0 and assigns point a2 to LoD0. In this way, the three-dimensional data encoding device configures LoD0 in such a manner that the distance between the points in LoD0 is larger than threshold value Thres_LoD[0].

Next, the three-dimensional data encoding device selects point b0 which has not yet been assigned to any LoD and assigns point b0 to LoD1. Next, the three-dimensional data encoding device extracts point b1 which is distant from point b0 more than threshold value Thres_LoD[1] of LoD1 and which has not yet been assigned to any LoD, and assigns point b1 to LoD1. Next, the three-dimensional data encoding device extracts point b2 which is distant from point b1 more than threshold value Thres_LoD[1] of LoD1 and which has not yet been assigned to any LoD, and assigns point b2 to LoD1. In this way, the three-dimensional data encoding device configures LoD1 in such a manner that the distance between the points in LoD1 is larger than threshold value Thres_LoD[1].

Figures 35, 36:
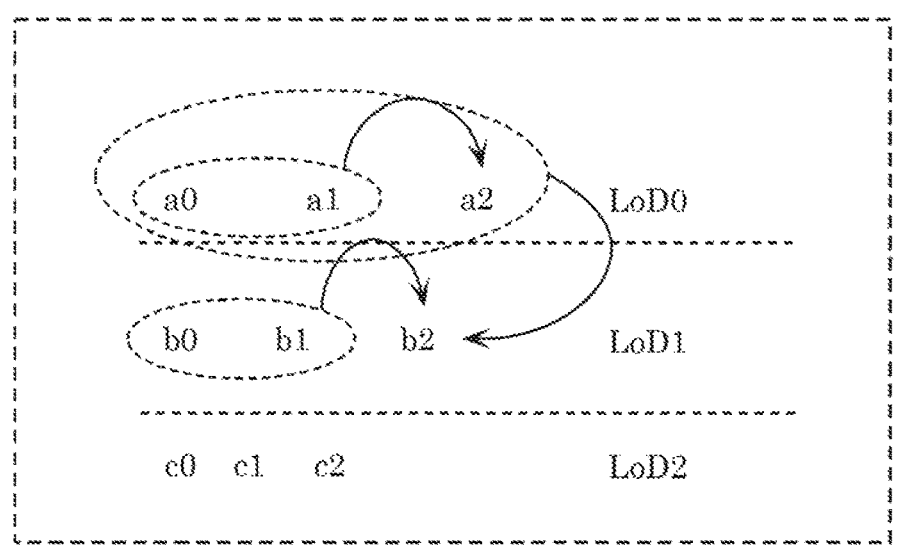
FIG. 35 is a diagram illustrating an example of setting LoDs according to Embodiment 3.
FIG. 36 is a diagram illustrating an example of attribute information to be used for predicted values according to Embodiment 3.

Next, the three-dimensional data encoding device selects point c0 which has not yet been assigned to any LoD and assigns point c0 to LoD2. Next, the three-dimensional data encoding device extracts point c1 which is distant from point c0 more than threshold value Thres_LoD[2] of LoD2 and which has not yet been assigned to any LoD, and assigns point c1 to LoD2. Next, the three-dimensional data encoding device extracts point c2 which is distant from point c1 more than threshold value Thres_LoD[2] of LoD2 and which has not yet been assigned to any LoD, and assigns point c2 to LoD2. In this way, the three-dimensional data encoding device configures LoD2 in such a manner that the distance between the points in LoD2 is larger than threshold value Thres_LoD[2]. For example, as illustrated in FIG. 35, threshold values Thres_LoD[0], Thres_LoD[1], and Thres_LoD[2] of respective LoDs are set.

In addition, the three-dimensional data encoding device may add the information indicating the threshold value of each LoD to, for example, a header of a bitstream. For example, in the case of the example illustrated in FIG. 35, the three-dimensional data encoding device may add threshold values Thres_LoD[0], Thres_LoD[1], and Thres_LoD[2] of respective LoDs to a header.

Alternatively, the three-dimensional data encoding device may assign all three-dimensional points which have not yet been assigned to any LoD in the lowermost-layer LoD. In this case, the three-dimensional data encoding device is capable of reducing the code amount of the header by not assigning the threshold value of the lowermost-layer LoD to the header. For example, in the case of the example illustrated in FIG. 35, the three-dimensional data encoding device assigns threshold values Thres_LoD[0] and Thres_LoD[1] to the header, and does not assign Thres_LoD[2] to the header. In this case, the three-dimensional data encoding device may estimate value 0 of Thres_LoD[2]. In addition, the three-dimensional data encoding device may add the number of LoDs to a header. In this way, the three-dimensional data encoding device is capable of determining the lowermost-layer LoD using the number of LoDs.

In addition, setting threshold values for the respective layers LoDs in such a manner that a larger threshold value is set to a higher layer makes a higher layer (layer closer to LoD0) to have a sparse point cloud (sparse) in which three-dimensional points are more distant and makes a lower layer to have a dense point cloud (dense) in which three-dimensional points are closer. It is to be noted that, in an example illustrated in FIG. 35, LoD0 is the uppermost layer.

In addition, the method of selecting an initial three-dimensional point at the time of setting each LoD may depend on an encoding order at the time of geometry information encoding. For example, the three-dimensional data encoding device configures LoD0 by selecting the three-dimensional point encoded first at the time of the geometry information encoding as initial point a0 of LoD0, and selecting point a1 and point a2 from initial point a0 as the origin. The three-dimensional data encoding device then may select the three-dimensional point whose geometry information has been encoded at the earliest time among three-dimensional points which do not belong to LoD0, as initial point b0 of LoD1. In other words, the three-dimensional data encoding device may select the three-dimensional point whose geometry information has been encoded at the earliest time among three-dimensional points which do not belong to layers (LoD0 to LoDn−1) above LoDn, as initial point n0 of LoDn. In this way, the three-dimensional data encoding device is capable of configuring the same LoD as in encoding by using, in decoding, the initial point selecting method similar to the one used in the encoding, which enables appropriate decoding of a bitstream. More specifically, the three-dimensional data encoding device selects the three-dimensional point whose geometry information has been decoded at the earliest time among three-dimensional points which do not belong to layers above LoDn, as initial point n0 of LoDn.

Hereinafter, a description is given of a method of generating the predicted value of the attribute information of each three-dimensional point using information of LoDs. For example, when encoding three-dimensional points starting with the three-dimensional points included in LoD0, the three-dimensional data encoding device generates current three-dimensional points which are included in LoD1 using encoded and decoded (hereinafter also simply referred to as "encoded") attribute information included in LoD0 and LoD1. In this way, the three-dimensional data encoding device generates a predicted value of attribute information of each three-dimensional point included in LoDn using encoded attribute information included in LoDn' (n'≤n). In other words, the three-dimensional data encoding device does not use attribute information of each of three-dimensional points included in any layer below LoDn to calculate a predicted value of attribute information of each of the three-dimensional points included in LoDn.

For example, the three-dimensional data encoding device calculates an average of attribute information of N or less three-dimensional points among encoded three-dimensional points surrounding a current three-dimensional point to be encoded, to generate a predicted value of attribute information of the current three-dimensional point. In addition, the three-dimensional data encoding device may add value N to, for example, a header of a bitstream. It is to be noted that the three-dimensional data encoding device may change value N for each three-dimensional point, and may add value N for each three-dimensional point. This enables selection of appropriate N for each three-dimensional point, which makes it possible to increase the accuracy of the predicted value. Accordingly, it is possible to reduce the prediction residual. Alternatively, the three-dimensional data encoding device may add value N to a header of a bitstream, and may fix the value indicating N in the bitstream. This eliminates the need to encode or decode value N for each three-dimensional point, which makes it possible to reduce the processing amount. In addition, the three-dimensional data encoding device may encode the values of N separately for each LoD. In this way, it is possible to increase the coding efficiency by selecting appropriate N for each LoD.

Alternatively, the three-dimensional data encoding device may calculate a predicted value of attribute information of three-dimensional point based on weighted average values of attribute information of encoded N neighbor three-dimensional points. For example, the three-dimensional data encoding device calculates weights using distance information between a current three-dimensional point and each of N neighbor three-dimensional points.

When encoding value N for each LoD, for example, the three-dimensional data encoding device sets larger value N to a higher layer LoD, and sets smaller value N to a lower layer LoD. The distance between three-dimensional points belonging to a higher layer LoD is large, there is a possibility that it is possible to increase the prediction accuracy by setting large value N. selecting a plurality of neighbor three-dimensional points, and averaging the values. Furthermore, the distance between three-dimensional points belonging to a lower layer LoD is small, it is possible to perform efficient prediction while reducing the processing amount of averaging by setting smaller value N.

FIG. 36 is a diagram illustrating an example of attribute information to be used for predicted values. As described above, the predicted value of point P included in LoDN is generated using encoded neighbor point P' included in LoDN' (N'≤N). Here, neighbor point P' is selected based on the distance from point P. For example, the predicted value of attribute information of point b2 illustrated in FIG. 36 is generated using attribute information of each of points a0, a1, b0, and b1.

Neighbor points to be selected vary depending on the values of N described above. For example, in the case of N=5, a0, a1, a2, b0, and b1 are selected as neighbor points. In the case of N=4, a0, a1, a2, and b1 are selected based on distance information.

The predicted value is calculated by distance-dependent weighted averaging. For example, in the example illustrated in FIG. 36, predicted value a2p of point a2 is calculated by weighted averaging of attribute information of each of point a0 and a1, as represented by (Equation A2) and (Equation A3). It is to be noted that $A_i$ is an attribute information value of ai.

[Math. 2]

$$a2p = \sum_{i=0}^{1} w_i \times A_i \quad \text{(Equation A2)}$$

$$w_i = \frac{\frac{1}{d(a2, ai)}}{\sum_{j=0}^{1} \frac{1}{d(a2, aj)}} \quad \text{(Equation A3)}$$

In addition, predicted value b2p of point b2 is calculated by weighted averaging of attribute information of each of point a0, a1, a2, b0, and b1, as represented by (Equation A4) and (Equation A6). It is to be noted that $B_i$ is an attribute information value of bi.

[Math. 3]

$$b2p = \sum_{i=0}^{2} wa_i \times A_i + \sum_{i=0}^{1} wb_i \times B_i \quad \text{(Equation A4)}$$

$$wa_i = \frac{\frac{1}{d(b2, ai)}}{\sum_{j=0}^{2} \frac{1}{d(b2, aj)} + \sum_{j=0}^{1} \frac{1}{d(b2, bj)}} \quad \text{(Equation A5)}$$

$$wb_i = \frac{\frac{1}{d(b2, bi)}}{\sum_{j=0}^{2} \frac{1}{d(b2, aj)} + \sum_{j=0}^{1} \frac{1}{d(b2, bj)}} \quad \text{(Equation A6)}$$

In addition, the three-dimensional data encoding device may calculate a difference value (prediction residual) generated from the value of attribute information of a three-dimensional point and neighbor points, and may quantize the calculated prediction residual. For example, the three-dimensional data encoding device performs quantization by dividing the prediction residual by a quantization scale (also referred to as a quantization step). In this case, an error (quantization error) which may be generated by quantization reduces as the quantization scale is smaller. In the other case where the quantization scale is larger, the resulting quantization error is larger.

It is to be noted that the three-dimensional data encoding device may change the quantization scale to be used for each LoD. For example, the three-dimensional data encoding device reduces the quantization scale more for a higher layer, and increases the quantization scale more for a lower layer. The value of attribute information of a three-dimensional point belonging to a higher layer may be used as a predicted value of attribute information of a three-dimensional point belonging to a lower layer. Thus, it is possible to increase the coding efficiency by reducing the quantization scale for the higher layer to reduce the quantization error that can be generated in the higher layer and to increase the prediction accuracy of the predicted value. It is to be noted that the three-dimensional data encoding device may add the quantization scale to be used for each LoD to, for example, a header. In this way, the three-dimensional data encoding device can decode the quantization scale correctly, thereby appropriately decoding the bitstream.

In addition, the three-dimensional data encoding device may convert a signed integer value (signed quantized value) which is a quantized prediction residual into an unsigned integer value (unsigned quantized value). This eliminates the need to consider occurrence of a negative integer when entropy encoding the prediction residual. It is to be noted that the three-dimensional data encoding device does not always need to convert a signed integer value into an unsigned integer value, and, for example, that the three-dimensional data encoding device may entropy encode a sign bit separately.

The prediction residual is calculated by subtracting a prediction value from the original value. For example, as represented by (Equation A7), prediction residual a2r of point a2 is calculated by subtracting predicted value a2p of point a2 from value $A_2$ of attribute information of point a2. As represented by (Equation A8), prediction residual b2r of point b2 is calculated by subtracting predicted value b2p of point b2 from value $B_2$ of attribute information of point b2.

$$a2r = A_2 - a2p \quad \text{(Equation A7)}$$

$$b2r = B_2 - b2p \quad \text{(Equation A8)}$$

In addition, the prediction residual is quantized by being divided by a Quantization Step (QS). For example, quantized value a2q of point a2 is calculated according to (Equation A9). Quantized value b2q of point b2 is calculated according to (Equation A10). Here, QS_LoD0 is a QS for LoD0, and QS_LoD1 is a QS for LoD1. In other words, a QS may be changed according to an LoD.

$$a2q = a2r/\text{QS\_LoD0} \quad \text{(Equation A9)}$$

$$b2q = b2r/\text{QS\_LoD1} \quad \text{(Equation A10)}$$

In addition, the three-dimensional data encoding device converts signed integer values which are quantized values as indicated below into unsigned integer values as indicated below. When signed integer value a2q is smaller than 0, the three-dimensional data encoding device sets unsigned integer value a2u to $-1-(2\times a2q)$. When signed integer value a2q is 0 or more, the three-dimensional data encoding device sets unsigned integer value a2u to $2\times a2q$.

Likewise, when signed integer value b2q is smaller than 0, the three-dimensional data encoding device sets unsigned integer value b2u to $-1-(2\times b2q)$. When signed integer value b2q is 0 or more, the three-dimensional data encoding device sets unsigned integer value b2u to $2\times b2q$.

In addition, the three-dimensional data encoding device may encode the quantized prediction residual (unsigned integer value) by entropy encoding. For example, the three-dimensional data encoding device may binarize the unsigned integer value and then apply binary arithmetic encoding to the binary value.

It is to be noted that, in this case, the three-dimensional data encoding device may switch binarization methods according to the value of a prediction residual. For example, when prediction residual pu is smaller than threshold value R_TH, the three-dimensional data encoding device binarizes prediction residual pu using a fixed bit count required for representing threshold value R_TH. In addition, when prediction residual pu is larger than or equal to threshold value R_TH, the three-dimensional data encoding device binarizes the binary data of threshold value R_TH and the value of (pu−R_TH), using exponential-Golomb coding, or the like.

For example, when threshold value R_TH is 63 and prediction residual pu is smaller than 63, the three-dimensional data encoding device binarizes prediction residual pu using 6 bits. When prediction residual pu is larger than or equal to 63, the three-dimensional data encoding device performs arithmetic encoding by binarizing the binary data (111111) of threshold value R_TH and (pu−63) using exponential-Golomb coding.

In a more specific example, when prediction residual pu is 32, the three-dimensional data encoding device generates 6-bit binary data (100000), and arithmetic encodes the bit sequence. In addition, when prediction residual pu is 66, the three-dimensional data encoding device generates binary data (111111) of threshold value R_TH and a bit sequence (00100) representing value 3 (66-63) using exponential-Golomb coding, and arithmetic encodes the bit sequence (111111+00100).

In this way, the three-dimensional data encoding device can perform encoding while preventing a binary bit count from increasing abruptly in the case where a prediction residual becomes large by switching binarization methods according to the magnitude of the prediction residual. It is to be noted that the three-dimensional data encoding device may add threshold value R_TH to, for example, a header of a bitstream.

For example, in the case where encoding is performed at a high bit rate, that is, when a quantization scale is small, a small quantization error and a high prediction accuracy are obtained. As a result, a prediction residual may not be large. Thus, in this case, the three-dimensional data encoding device sets large threshold value R_TH. This reduces the possibility that the binary data of threshold value R_TH is encoded, which increases the coding efficiency. In the opposite case where encoding is performed at a low bit rate, that is, when a quantization scale is large, a large quantization error and a low prediction accuracy are obtained. As a result, a prediction residual may be large. Thus, in this case, the three-dimensional data encoding device sets small threshold value R_TH. In this way, it is possible to prevent abrupt increase in bit length of binary data.

In addition, the three-dimensional data encoding device may switch threshold value R_TH for each LoD, and may add threshold value R_TH for each LoD to, for example, a header. In other words, the three-dimensional data encoding device may switch binarization methods for each LoD. For example, since distances between three-dimensional points are large in a higher layer, a prediction accuracy is low, which may increase a prediction residual. Thus, the three-dimensional data encoding device prevents abrupt increase in bit length of binary data by setting small threshold value R_TH to the higher layer. In addition, since distances between three-dimensional points are small in a lower layer, a prediction accuracy is high, which may reduce a prediction residual. Thus, the three-dimensional data encoding device increases the coding efficiency by setting large threshold value R_TH to the lower layer.

FIG. 37 is a diagram indicating examples of exponential-Golomb codes. The diagram indicates the relationships between pre-binarization values (non-binary values) and post-binarization bits (codes). It is to be noted that 0 and 1 indicated in FIG. 37 may be inverted.

The three-dimensional data encoding device applies arithmetic encoding to the binary data of prediction residuals. In this way, the coding efficiency can be increased. It is to be noted that, in the application of the arithmetic encoding, there is a possibility that occurrence probability tendencies of 0 and 1 in each bit vary, in binary data, between an n-bit code which is a part binarized by n bits and a remaining code which is a part binarized using exponential-Golomb coding. Thus, the three-dimensional data encoding device may switch methods of applying arithmetic encoding between the n-bit code and the remaining code.

For example, the three-dimensional data encoding device performs arithmetic encoding on the n-bit code using one or more coding tables (probability tables) different for each bit. At this time, the three-dimensional data encoding device may change the number of coding tables to be used for each bit. For example, the three-dimensional data encoding device performs arithmetic encoding using one coding table for first bit b0 in an n-bit code. The three-dimensional data encoding device uses two coding tables for the next bit b1. The three-dimensional data encoding device switches coding tables to be used for arithmetic encoding of bit b1 according to the value (0 or 1) of b0. Likewise, the three-dimensional data encoding device uses four coding tables for the next bit b2. The three-dimensional data encoding device switches coding tables to be used for arithmetic encoding of bit b2 according to the values (in a range from 0 to 3) of b0 and b1.

In this way, the three-dimensional data encoding device uses $2^{n-1}$ coding tables when arithmetic encoding each bit bn−1 in n-bit code. The three-dimensional data encoding device switches coding tables to be used according to the values (occurrence patterns) of bits before bn−1. In this way, the three-dimensional data encoding device can use coding tables appropriate for each bit, and thus can increase the coding efficiency.

It is to be noted that the three-dimensional data encoding device may reduce the number of coding tables to be used for each bit. For example, the three-dimensional data encoding device may switch $2^m$ coding tables according to the values (occurrence patterns) of m bits (m<n−1) before bn−1 when arithmetic encoding each bit bn−1. In this way, it is possible to increase the coding efficiency while reducing the number of coding tables to be used for each bit. It is to be noted that the three-dimensional data encoding device may update the occurrence probabilities of 0 and 1 in each coding table according to the values of binary data occurred actually. In addition, the three-dimensional data encoding device may fix the occurrence probabilities of 0 and 1 in coding tables for some bit(s). In this way, it is possible to reduce the number of updates of occurrence probabilities, and thus to reduce the processing amount.

For example, when an n-bit code is b0, b1, b2, . . . , bn−1, the coding table for b0 is one table (CTb0). Coding tables for b1 are two tables (CTb10 and CTb11). Coding tables to be used are switched according to the value (0 or 1) of b0. Coding tables for b2 are four tables (CTb20, CTb21, CTb22, and CTb23). Coding tables to be used are switched according to the values (in the range from 0 to 3) of b0 and b1. Coding tables for bn−1 are $2^{n-1}$ tables (CTbn0, CTbn1, . . . , CTbn ($2^{n-1}$−1)). Coding tables to be used are switched according to the values (in a range from 0 to $2^{n-1}$−1) of b0, b1, . . . , bn−2.

It is to be noted that the three-dimensional data encoding device may apply, to an n-bit code, arithmetic encoding (m=$2^n$) by m-ary that sets the value in the range from 0 to $2^n$−1 without binarization. When the three-dimensional data encoding device arithmetic encodes an n-bit code by an m-ary, the three-dimensional data decoding device may reconstruct the n-bit code by arithmetic decoding the m-ary.

FIG. 38 is a diagram for illustrating processing in the case where remaining codes are exponential-Golomb codes. As indicated in FIG. 38, each remaining code which is a part binarized using exponential-Golomb coding includes a prefix and a suffix. For example, the three-dimensional data encoding device switches coding tables between the prefix and the suffix. In other words, the three-dimensional data encoding device arithmetic encodes each of bits included in the prefix using coding tables for the prefix, and arithmetic encodes each of bits included in the suffix using coding tables for the suffix.

It is to be noted that the three-dimensional data encoding device may update the occurrence probabilities of 0 and 1 in each coding table according to the values of binary data occurred actually. In addition, the three-dimensional data encoding device may fix the occurrence probabilities of 0 and 1 in one of coding tables. In this way, it is possible to reduce the number of updates of occurrence probabilities, and thus to reduce the processing amount. For example, the three-dimensional data encoding device may update the occurrence probabilities for the prefix, and may fix the occurrence probabilities for the suffix.

In addition, the three-dimensional data encoding device decodes a quantized prediction residual by inverse quantization and reconstruction, and uses a decoded value which is the decoded prediction residual for prediction of a current three-dimensional point to be encoded and the following three-dimensional point(s). More specifically, the three-dimensional data encoding device calculates an inverse quantized value by multiplying the quantized prediction residual (quantized value) with a quantization scale, and adds the inverse quantized value and a prediction value to obtain the decoded value (reconstructed value).

For example, quantized value a2iq of point a2 is calculated using quantized value a2q of point a2 according to (Equation A11). Inverse quantized value b2iq of point b2q is calculated using quantized value b2q of point b2 according to (Equation A12). Here, QS_LoD0 is a QS for LoD0, and QS_LoD1 is a QS for LoD1. In other words, a QS may be changed according to an LoD.

$$a2iq = a2q \times QS\_LoD0 \quad \text{(Equation A11)}$$
$$b2iq = b2q \times QS\_LoD1 \quad \text{(Equation A12)}$$

For example, as represented by (Equation A13), decoded value a2rec of point a2 is calculated by adding inverse quantization value a2iq of point a2 to predicted value a2p of point a2. As represented by (Equation A14), decoded value b2rec of point b2 is calculated by adding inverse quantized value b2iq of point b2 to predicted value b2p of point b2.

$$a2rec = a2iq + a2p \quad \text{(Equation A13)}$$
$$b2rec = b2iq + b2p \quad \text{(Equation A14)}$$

Hereinafter, a syntax example of a bitstream according to the present embodiment is described. FIG. 39 is a diagram indicating the syntax example of an attribute header (attribute_header) according to the present embodiment. The attribute header is header information of attribute information. As indicated in FIG. 39, the attribute header includes the number of layers information (NumLoD), the number of three-dimensional points information (NumOfPoint[i]), a layer threshold value (Thres_LoD[i]), the number of neighbor points information (NumNeighborPoint[i]), a prediction threshold value (THd[i]), a quantization scale (QS[i]), and a binarization threshold value (R_TH[i]).

The number of layers information (NumLoD) indicates the number of LoDs to be used.

The number of three-dimensional points information (NumOfPoint[i]) indicates the number of three-dimensional points belonging to layer i. It is to be noted that the three-dimensional data encoding device may add, to another header, the number of three-dimensional points information indicating the total number of three-dimensional points. In this case, the three-dimensional data encoding device does not need to add, to a header, NumOfPoint [NumLoD−1] indicating the number of three-dimensional points belonging to the lowermost layer. In this case, the three-dimensional data decoding device is capable of calculating NumOfPoint [NumLoD−1] according to (Equation A15). In this case, it is possible to reduce the code amount of the header.

[Math. 4]

$$NumOfPoint[NumLoD - 1] = \quad \text{(Equation A15)}$$
$$AllNumOfPoint - \sum_{j=0}^{NumLoD-2} NumOfPoint[j]$$

The layer threshold value (Thres_LoD[i]) is a threshold value to be used to set layer i. The three-dimensional data encoding device and the three-dimensional data decoding device configure LoDi in such a manner that the distance between points in LoDi becomes larger than threshold value Thres_LoD[i]. The three-dimensional data encoding device does not need to add the value of Thres_LoD [NumLoD−1] (lowermost layer) to a header. In this case, the three-dimensional data decoding device may estimate 0 as the value of Thres_LoD [NumLoD−1]. In this case, it is possible to reduce the code amount of the header.

The number of neighbor points information (NumNeighborPoint[i]) indicates the upper limit value of the number of neighbor points to be used to generate a predicted value of a three-dimensional point belonging to layer i. The three-dimensional data encoding device may calculate a predicted value using the number of neighbor points M when the number of neighbor points M is smaller than NumNeighborPoint[i] (M<NumNeighborPoint[i]). Furthermore, when there is no need to differentiate the values of NumNeighborPoint[i] for respective LoDs, the three-dimensional data encoding device may add a piece of the number of neighbor points information (NumNeighborPoint) to be used in all LoDs to a header.

The prediction threshold value (THd[i]) indicates the upper limit value of the distance between a current three-dimensional point to be encoded or decoded in layer i and each of neighbor three-dimensional points to be used to predict the current three-dimensional point. The three-dimensional data encoding device and the three-dimensional data decoding device do not use, for prediction, any three-dimensional point distant from the current three-dimensional point over THd[i]. It is to be noted that, when there is no need to differentiate the values of THd[i] for respective LoDs, the three-dimensional data encoding device may add a single prediction threshold value (THd) to be used in all LoDs to a header.

The quantization scale (QS[i]) indicates a quantization scale to be used for quantization and inverse quantization in layer i.

The binarization threshold value (R_TH[i]) is a threshold value for switching binarization methods of prediction residuals of three-dimensional points belonging to layer i. For example, the three-dimensional data encoding device binarizes prediction residual pu using a fixed bit count when a prediction residual is smaller than threshold value R_TH, and binarizes the binary data of threshold value R_TH and the value of (pu−R_TH) using exponential-Golomb coding when a prediction residual is larger than or equal to threshold value R_TH. It is to be noted that, when there is no need to switch the values of R_TH[i] between LoDs, the three-dimensional data encoding device may add a single binarization threshold value (R_TH) to be used in all LoDs to a header.

It is to be noted that R_TH[i] may be the maximum value which can be represented by n bits. For example, R_TH is 63 in the case of 6 bits, and R_TH is 255 in the case of 8 bits. Alternatively, the three-dimensional data encoding device may encode a bit count instead of encoding the maximum value which can be represented by n bits as a binarization threshold value. For example, the three-dimensional data encoding device may add value 6 in the case of R_TH[i]=63 to a header, and may add value 8 in the case of R_TH[i]=255 to a header. Alternatively, the three-dimensional data encoding device may define the minimum value (minimum bit count) representing R_TH[i], and add a relative bit count from the minimum value to a header. For example, the three-dimensional data encoding device may add value 0 to a header when R_TH[i]=63 is satisfied and the minimum bit count is 6, and may add value 2 to a header when R_TH[i]=255 is satisfied and the minimum bit count is 6.

Alternatively, the three-dimensional data encoding device may entropy encode at least one of NumLoD, Thres_LoD[i], NumNeighborPoint[i], THd[i], QS[i], and R_TH[i], and add the entropy encoded one to a header. For example, the three-dimensional data encoding device may binarize each value and perform arithmetic encoding on the binary value. In addition, the three-dimensional data encoding device may encode each value using a fixed length in order to reduce the processing amount.

Alternatively, the three-dimensional data encoding device does not always need to add at least one of NumLoD, Thres_LoD[i], NumNeighborPoint[i], THd[i], QS[i], and R_TH[i] to a header. For example, at least one of these values may be defined by a profile or a level in a standard, or the like. In this way, it is possible to reduce the bit amount of the header.

FIG. 40 is a diagram indicating the syntax example of attribute data (attribute_data) according to the present embodiment. The attribute data includes encoded data of the attribute information of a plurality of three-dimensional points. As indicated in FIG. 40, the attribute data includes an n-bit code and a remaining code.

The n-bit code is encoded data of a prediction residual of a value of attribute information or a part of the encoded data. The bit length of the n-bit code depends on value R_TH[i]. For example, the bit length of the n-bit code is 6 bits when the value indicated by R_TH[i] is 63, the bit length of the n-bit code is 8 bits when the value indicated by R_TH[i] is 255.

The remaining code is encoded data encoded using exponential-Golomb coding among encoded data of the prediction residual of the value of the attribute information. The remaining code is encoded or decoded when the value of the n-bit code is equal to R_TH[i]. The three-dimensional data decoding device decodes the prediction residual by adding the value of the n-bit code and the value of the remaining code. It is to be noted that the remaining code does not always need to be encoded or decoded when the value of the n-bit code is not equal to R_TH[i].

Hereinafter, a description is given of a flow of processing in the three-dimensional data encoding device. FIG. 41 is a flowchart of a three-dimensional data encoding process performed by the three-dimensional data encoding device.

First, the three-dimensional data encoding device encodes geometry information (geometry) (S3001). For example, the three-dimensional data encoding is performed using octree representation.

When the positions of three-dimensional points changed by quantization, etc, after the encoding of the geometry information, the three-dimensional data encoding device re-assigns attribute information of the original three-dimensional points to the post-change three-dimensional points (S3002). For example, the three-dimensional data encoding device interpolates values of attribute information according to the amounts of change in position to re-assign the attribute information. For example, the three-dimensional data encoding device detects pre-change N three-dimensional points closer to the post-change three-dimensional positions, and performs weighted averaging of the values of attribute information of the N three-dimensional points. For example, the three-dimensional data encoding device determines weights based on distances from the post-change three-dimensional positions to the respective N three-dimensional positions in weighted averaging. The three-dimensional data encoding device then determines the values obtained through the weighted averaging to be the values of the attribute information of the post-change three-dimensional points. When two or more of the three-dimensional points are changed to the same three-dimensional position through quantization, etc., the three-dimensional data encoding device may assign the average value of the attribute information of the pre-change two or more three-dimensional points as the values of the attribute information of the post-change three-dimensional points.

Next, the three-dimensional data encoding device encodes the attribute information (attribute) re-assigned (S3003). For example, when encoding a plurality of kinds of attribute information, the three-dimensional data encoding device may encode the plurality of kinds of attribute information in order. For example, when encoding colors and reflectances as attribute information, the three-dimensional data encoding device may generate a bitstream added with the color encoding results and the reflectance encoding results after the color encoding results. It is to be noted that the order of the plurality of encoding results of attribute information to be added to a bitstream is not limited to the order, and may be any order.

Alternatively, the three-dimensional data encoding device may add, to a header for example, information indicating the start location of encoded data of each attribute information in a bitstream. In this way, the three-dimensional data decoding device is capable of selectively decoding attribute information required to be decoded, and thus is capable of skipping the decoding process of the attribute information not required to be decoded. Accordingly, it is possible to reduce the amount of processing by the three-dimensional data decoding device. Alternatively, the three-dimensional data encoding device may encode a plurality of kinds of attribute information in parallel, and may integrate the encoding results into a single bitstream. In this way, the three-dimensional data encoding device is capable of encoding the plurality of kinds of attribute information at high speed.

FIG. 42 is a flowchart of an attribute information encoding process (S3003). First, the three-dimensional data encoding device sets LoDs (S3011). In other words, the three-dimensional data encoding device assigns each of three-dimensional points to any one of the plurality of LoDs.

Next, the three-dimensional data encoding device starts a loop for each LoD (S3012). In other words, the three-dimensional data encoding device iteratively performs the processes of Steps from S3013 to S3021 for each LoD.

Next, the three-dimensional data encoding device starts a loop for each three-dimensional point (S3013). In other words, the three-dimensional data encoding device iteratively performs the processes of Steps from S3014 to S3020 for each three-dimensional point.

First, the three-dimensional data encoding device searches a plurality of neighbor points which are three-dimensional points present in the neighborhood of a current three-dimensional point to be processed and are to be used to calculate a predicted value of the current three-dimensional point (S3014). Next, the three-dimensional data encoding device calculates the weighted average of the values of attribute information of the plurality of neighbor points, and sets the resulting value to predicted value P (S3015). Next, the three-dimensional data encoding device calculates a prediction residual which is the difference between the attribute information of the current three-dimensional point and the predicted value (S3016). Next, the three-dimensional data encoding device quantizes the prediction residual to calculate a quantized value (S3017). Next, the three-dimensional data encoding device arithmetic encodes the quantized value (S3018).

Next, the three-dimensional data encoding device inverse quantizes the quantized value to calculate an inverse quantized value (S3019). Next, the three-dimensional data encoding device adds a prediction value to the inverse quantized value to generate a decoded value (S3020). Next, the three-dimensional data encoding device ends the loop for each three-dimensional point (S3021). Next, the three-dimensional data encoding device ends the loop for each LoD (S3022).

Hereinafter, a description is given of a three-dimensional data decoding process in the three-dimensional data decoding device which decodes a bitstream generated by the three-dimensional data encoding device.

The three-dimensional data decoding device generates decoded binary data by arithmetic decoding the binary data of the attribute information in the bitstream generated by the three-dimensional data encoding device, according to the method similar to the one performed by the three-dimensional data encoding device. It is to be noted that when methods of applying arithmetic encoding are switched between the part (n-bit code) binarized using n bits and the part (remaining code) binarized using exponential-Golomb coding in the three-dimensional data encoding device, the three-dimensional data decoding device performs decoding in conformity with the arithmetic encoding, when applying arithmetic decoding.

For example, the three-dimensional data decoding device performs arithmetic decoding using coding tables (decoding tables) different for each bit in the arithmetic decoding of the n-bit code. At this time, the three-dimensional data decoding device may change the number of coding tables to be used for each bit. For example, the three-dimensional data decoding device performs arithmetic decoding using one coding table for first bit b0 in the n-bit code. The three-dimensional data decoding device uses two coding tables for the next bit b1. The three-dimensional data decoding device switches coding tables to be used for arithmetic decoding of bit b1 according to the value (0 or 1) of b0. Likewise, the three-dimensional data decoding device uses four coding tables for the next bit b2. The three-dimensional data decoding device switches coding tables to be used for arithmetic decoding of bit b2 according to the values (in the range from 0 to 3) of b0 and b1.

In this way, the three-dimensional data decoding device uses $2^{n-1}$ coding tables when arithmetic decoding each bit bn−1 in the n-bit code. The three-dimensional data decoding device switches coding tables to be used according to the values (occurrence patterns) of bits before bn−1. In this way, the three-dimensional data decoding device is capable of appropriately decoding a bitstream encoded at an increased coding efficiency using the coding tables appropriate for each bit.

It is to be noted that the three-dimensional data decoding device may reduce the number of coding tables to be used for each bit. For example, the three-dimensional data decoding device may switch $2^m$ coding tables according to the values (occurrence patterns) of m bits (m<n−1) before bn−1 when arithmetic decoding each bit bn−1. In this way, the three-dimensional data decoding device is capable of appropriately decoding the bitstream encoded at the increased coding efficiency while reducing the number of coding tables to be used for each bit. It is to be noted that the three-dimensional data decoding device may update the occurrence probabilities of 0 and 1 in each coding table according to the values of binary data occurred actually. In addition, the three-dimensional data decoding device may fix the occurrence probabilities of 0 and 1 in coding tables for some bit(s). In this way, it is possible to reduce the number of updates of occurrence probabilities, and thus to reduce the processing amount.

For example, when an n-bit code is b0, b1, b2, . . . , bn−1, the coding table for b0 is one (CTb0). Coding tables for b1 are two tables (CTb10 and CTb11). Coding tables to be used are switched according to the value (0 or 1) of b0. Coding tables for b2 are four tables (CTb20, CTb21, CTb22, and CTb23). Coding tables to be used according to the values (in the range from 0 to 3) of b0 and b1. Coding tables for bn−1 are $2^{n-1}$ tables (CTbn0, CTbn1, . . . , CTbn ($2^{n-1}$−1)). Coding tables to be used are switched according to the values (in the range from 0 to $2^{n-1}$−1) of b0, b1, . . . , bn−2.

FIG. 43 is a diagram for illustrating processing in the case where remaining codes are exponential-Golomb codes. As indicated in FIG. 43, the part (remaining part) binarized and encoded by the three-dimensional data encoding device using exponential-Golomb coding includes a prefix and a suffix. For example, the three-dimensional data decoding device switches coding tables between the prefix and the suffix. In other words, the three-dimensional data decoding device arithmetic decodes each of bits included in the prefix using coding tables for the prefix, and arithmetic decodes each of bits included in the suffix using coding tables for the suffix.

It is to be noted that the three-dimensional data decoding device may update the occurrence probabilities of 0 and 1 in each coding table according to the values of binary data occurred at the time of decoding. In addition, the three-dimensional data decoding device may fix the occurrence probabilities of 0 and 1 in one of coding tables. In this way, it is possible to reduce the number of updates of occurrence probabilities, and thus to reduce the processing amount. For example, the three-dimensional data decoding device may update the occurrence probabilities for the prefix, and may fix the occurrence probabilities for the suffix.

Furthermore, the three-dimensional data decoding device decodes the quantized prediction residual (unsigned integer value) by debinarizing the binary data of the prediction residual arithmetic decoded according to a method in conformity with the encoding method used by the three-dimensional data encoding device. The three-dimensional data decoding device first arithmetic decodes the binary data of an n-bit code to calculate a value of the n-bit code. Next, the three-dimensional data decoding device compares the value of the n-bit code with threshold value R_TH.

In the case where the value of the n-bit code and threshold value R_TH match, the three-dimensional data decoding device determines that a bit encoded using exponential-Golomb coding is present next, and arithmetic decodes the remaining code which is the binary data encoded using exponential-Golomb coding. The three-dimensional data decoding device then calculates, from the decoded remaining code, a value of the remaining code using a reverse lookup table indicating the relationship between the remaining code and the value. FIG. 44 is a diagram indicating an example of a reverse lookup table indicating relationships between remaining codes and the values thereof. Next, the three-dimensional data decoding device adds the obtained value of the remaining code to R_TH, thereby obtaining a debinarized quantized prediction residual.

In the opposite case where the value of the n-bit code and threshold value R_TH do not match (the value of the n-bit code is smaller than value R_TH), the three-dimensional data decoding device determines the value of the n-bit code to be the debinarized quantized prediction residual as it is. In this way, the three-dimensional data decoding device is capable of appropriately decoding the bitstream generated while switching the binarization methods according to the values of the prediction residuals by the three-dimensional data encoding device.

It is to be noted that, when threshold value R_TH is added to, for example, a header of a bitstream, the three-dimensional data decoding device may decode threshold value R_TH from the header, and may switch decoding methods using decoded threshold value R_TH. When threshold value R_TH is added to, for example, a header for each LoD, the three-dimensional data decoding device switch decoding methods using threshold value R_TH decoded for each LoD.

For example, when threshold value R_TH is 63 and the value of the decoded n-bit code is 63, the three-dimensional data decoding device decodes the remaining code using exponential-Golomb coding, thereby obtaining the value of the remaining code. For example, in the example indicated in FIG. 44, the remaining code is 00100, and 3 is obtained as the value of the remaining code. Next, the three-dimensional data decoding device adds 63 that is threshold value R_TH and 3 that is the value of the remaining code, thereby obtaining 66 that is the value of the prediction residual.

In addition, when the value of the decoded n-bit code is 32, the three-dimensional data decoding device sets 32 that is the value of the n-bit code to the value of the prediction residual.

In addition, the three-dimensional data decoding device converts the decoded quantized prediction residual, for example, from an unsigned integer value to a signed integer value, through processing inverse to the processing in the three-dimensional data encoding device. In this way, when entropy decoding the prediction residual, the three-dimensional data decoding device is capable of appropriately decoding the bitstream generated without considering occurrence of a negative integer. It is to be noted that the three-dimensional data decoding device does not always need to convert an unsigned integer value to a signed integer value, and that, for example, the three-dimensional data decoding device may decode a sign bit when decoding a bitstream generated by separately entropy encoding the sign bit.

The three-dimensional data decoding device performs decoding by inverse quantizing and reconstructing the quantized prediction residual after being converted to the signed integer value, to obtain a decoded value. The three-dimensional data decoding device uses the generated decoded value for prediction of a current three-dimensional point to be decoded and the following three-dimensional point(s). More specifically, the three-dimensional data decoding device multiplies the quantized prediction residual by a decoded quantization scale to calculate an inverse quantized value and adds the inverse quantized value and the predicted value to obtain the decoded value.

The decoded unsigned integer value (unsigned quantized value) is converted into a signed integer value through the processing indicated below. When the least significant bit (LSB) of decoded unsigned integer value a2u is 1, the three-dimensional data decoding device sets signed integer value a2q to $-((a2u+1)>>1)$. When the LSB of unsigned integer value a2u is not 1, the three-dimensional data decoding device sets signed integer value a2q to $((a2u>>1))$.

Likewise, when an LSB of decoded unsigned integer value b2u is 1, the three-dimensional data decoding device sets signed integer value b2q to $-((b2u+1)>>1)$. When the LSB of decoded unsigned integer value n2u is not 1, the three-dimensional data decoding device sets signed integer value b2q to $((b2u>>1))$.

Details of the inverse quantization and reconstruction processing by the three-dimensional data decoding device are similar to the inverse quantization and reconstruction processing in the three-dimensional data encoding device.

Figure 45:
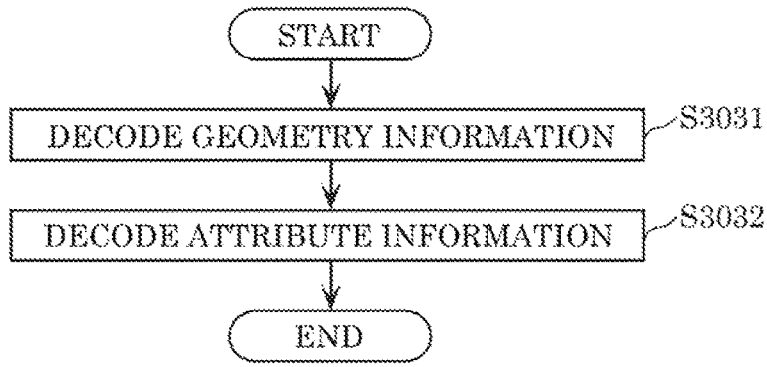
FIG. 45 is a flowchart of a three-dimensional data decoding process according to Embodiment 3.

Hereinafter, a description is given of a flow of processing in the three-dimensional data decoding device. FIG. 45 is a flowchart of a three-dimensional data decoding process performed by the three-dimensional data decoding device. First, the three-dimensional data decoding device decodes geometry information (geometry) from a bitstream (S3031). For example, the three-dimensional data decoding device performs decoding using octree representation.

Next, the three-dimensional data decoding device decodes attribute information (attribute) from the bitstream (S3032). For example, when decoding a plurality of kinds of attribute information, the three-dimensional data decoding device may decode the plurality of kinds of attribute information in order. For example, when decoding colors and reflectances as attribute information, the three-dimensional data decoding device decodes the color encoding results and the reflectance encoding results in order of assignment in the bitstream. For example, when the reflectance encoding results are added after the color encoding results in a bitstream, the three-dimensional data decoding device decodes the color encoding results, and then decodes the reflectance encoding results. It is to be noted that the three-dimensional data decoding device may decode, in any order, the encoding results of the attribute information added to the bitstream.

Alternatively, the three-dimensional data encoding device may add, to a header for example, information indicating the start location of encoded data of each attribute information in a bitstream. In this way, the three-dimensional data decoding device is capable of selectively decoding attribute information required to be decoded, and thus is capable of skipping the decoding process of the attribute information not required to be decoded. Accordingly, it is possible to reduce the amount of processing by the three-dimensional data decoding device. In addition, the three-dimensional data decoding device may decode a plurality of kinds of attribute information in parallel, and may integrate the decoding results into a single three-dimensional point cloud. In this way, the three-dimensional data decoding device is capable of decoding the plurality of kinds of attribute information at high speed.

Figure 46:
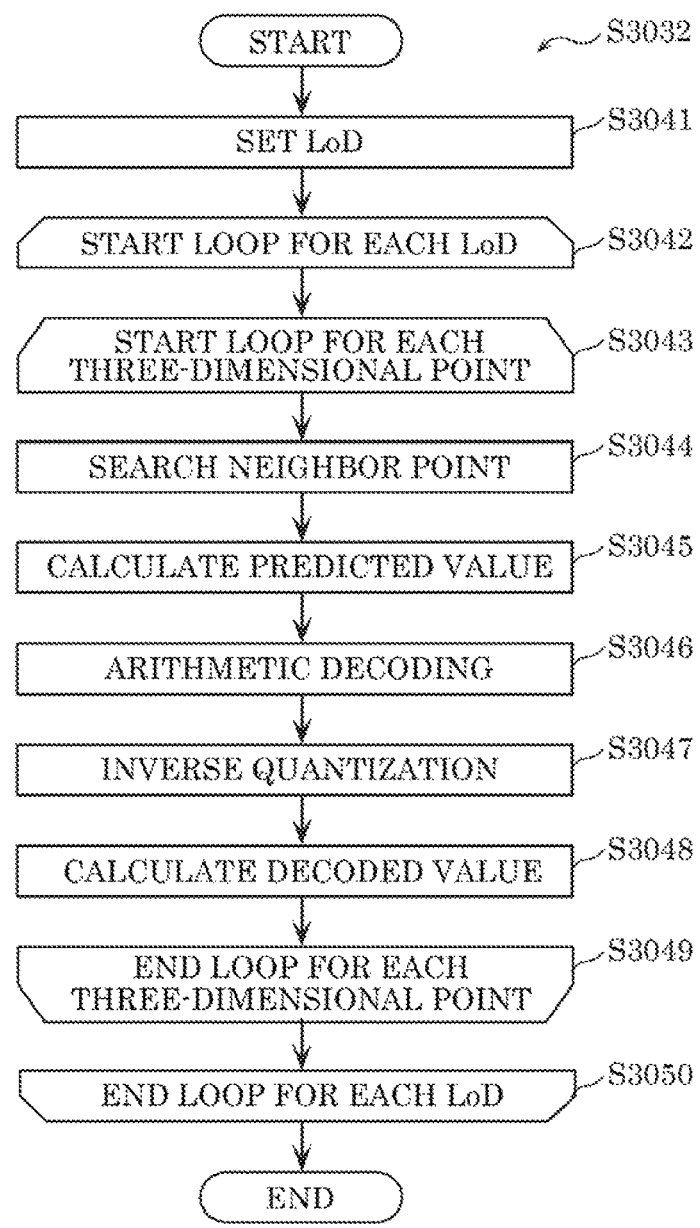
FIG. 46 is a flowchart of an attribute information decoding process according to Embodiment 3.

FIG. 46 is a flowchart of an attribute information decoding process (S3032). First, the three-dimensional data decoding device sets LoDs (S3041). In other words, the three-dimensional data decoding device assigns each of three-dimensional points having the decoded geometry information to any one of the plurality of LoDs. For example, this assignment method is the same as the assignment method used in the three-dimensional data encoding device.

Next, the three-dimensional data decoding device starts a loop for each LoD (S3042). In other words, the three-dimensional data decoding device iteratively performs the processes of Steps from S3043 to S3049 for each LoD.

Next, the three-dimensional data decoding device starts a loop for each three-dimensional point (S3043). In other words, the three-dimensional data decoding device iteratively performs the processes of Steps from S3044 to S3048 for each three-dimensional point.

First, the three-dimensional data decoding device searches a plurality of neighbor points which are three-dimensional points present in the neighborhood of a current three-dimensional point to be processed and are to be used to calculate a predicted value of the current three-dimensional point to be processed (S3044). Next, the three-dimensional data decoding device calculates the weighted average of the values of attribute information of the plurality of neighbor points, and sets the resulting value to predicted value P (S3045). It is to be noted that these processes are similar to the processes in the three-dimensional data encoding device.

Next, the three-dimensional data decoding device arithmetic decodes the quantized value from the bitstream (S3046). The three-dimensional data decoding device inverse quantizes the decoded quantized value to calculate an inverse quantized value (S3047). Next, the three-dimensional data decoding device adds a predicted value to the inverse quantized value to generate a decoded value (S3048). Next, the three-dimensional data decoding device ends the loop for each three-dimensional point (S3049). Next, the three-dimensional data encoding device ends the loop for each LoD (S3050).

Figure 47:
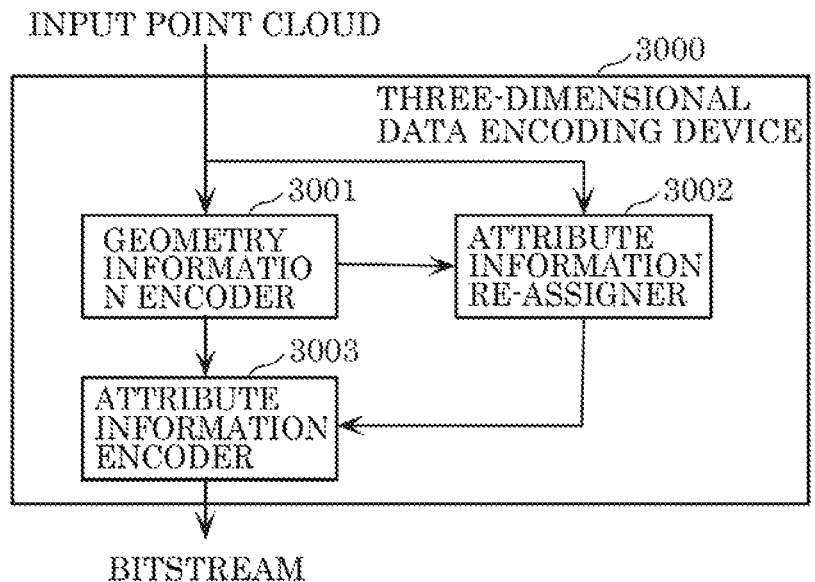
FIG. 47 is a block diagram of a three-dimensional data encoding device according to Embodiment 3.

The following describes configurations of the three-dimensional data encoding device and three-dimensional data decoding device according to the present embodiment. FIG. 47 is a block diagram illustrating a configuration of three-dimensional data encoding device 3000 according to the present embodiment. Three-dimensional data encoding device 3000 includes geometry information encoder 3001, attribute information re-assigner 3002, and attribute information encoder 3003.

Attribute information encoder 3003 encodes geometry information (geometry) of a plurality of three-dimensional points included in an input point cloud. Attribute information re-assigner 3002 re-assigns the values of attribute information of the plurality of three-dimensional points included in the input point cloud, using the encoding and decoding results of the geometry information. Attribute information encoder 3003 encodes the re-assigned attribute information (attribute). Furthermore, three-dimensional data encoding device 3000 generates a bitstream including the encoded geometry information and the encoded attribute information.

Figure 48:
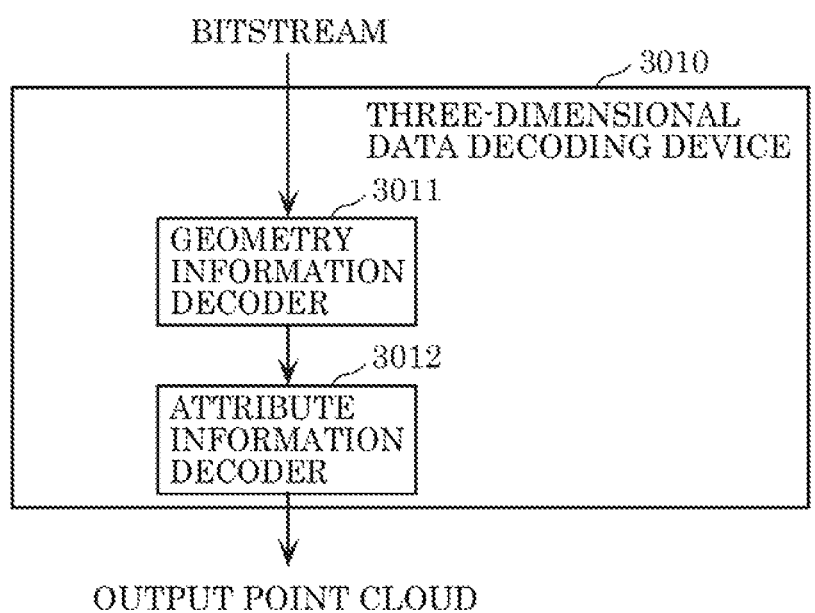
FIG. 48 is a block diagram of a three-dimensional data decoding device according to Embodiment 3.

FIG. 48 is a block diagram illustrating a configuration of three-dimensional data decoding device 3010 according to the present embodiment. Three-dimensional data decoding device 3010 includes geometry information decoder 3011 and attribute information decoder 3012.

Geometry information decoder 3011 decodes the geometry information (geometry) of a plurality of three-dimensional points from a bitstream. Attribute information decoder 3012 decodes the attribute information (attribute) of the plurality of three-dimensional points from the bitstream. Furthermore, three-dimensional data decoding device 3010 integrates the decoded geometry information and the decoded attribute information to generate an output point cloud.

EMBODIMENT 4

Hereinafter, a three-dimensional point to be encoded is referred to as a first three-dimensional point, and one or more three-dimensional points in the vicinity of the first three-dimensional point is referred to as one or more second three-dimensional points in some cases.

For example, in generating of a predicted value of an attribute information item (attribute information) of a three-dimensional point, an attribute value as it is of a closest three-dimensional point among encoded and decoded three-dimensional points in the vicinity of a three-dimensional point to be encoded may be generated as a predicted value. In the generating of the predicted value, prediction mode information (PredMode) may be appended for each three-dimensional point, and one predicted value may be selected from a plurality of predicted values to allow generation of a predicted value. Specifically, for example, it is conceivable that, for total number M of prediction modes, an average value is assigned to prediction mode 0, an attribute value of three-dimensional point A is assigned to prediction mode 1, . . . , and an attribute value of three-dimensional point Z is assigned to prediction mode M−1, and the prediction mode used for prediction is appended to a bitstream for each three-dimensional point. As such, a first prediction mode value indicating a first prediction mode for calculating, as a predicted value, an average of attribute information items of the surrounding three-dimensional points may be smaller than a second prediction mode value indicating a second prediction mode for calculating, as a predicted value, an attribute information item as it is of a surrounding three-dimensional point. Here, the "average value" as the predicted value calculated in prediction mode 0 is an average value of the attribute values of the three-dimensional points in the vicinity of the three-dimensional point to be encoded.

Figures 49, 50:
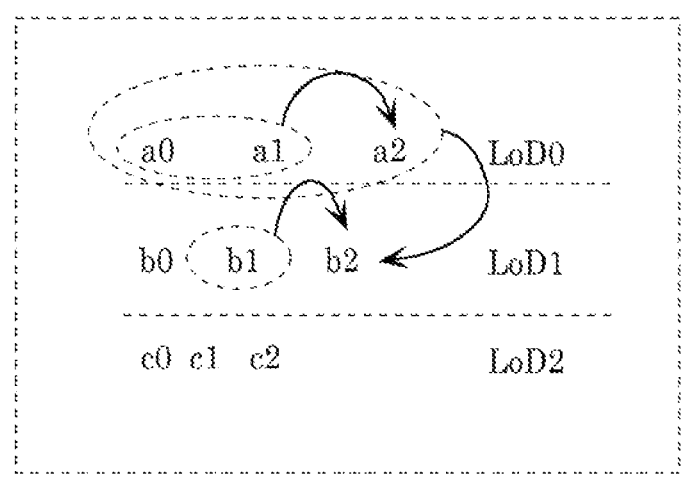
FIG. 49 is a diagram showing a first example of a table representing predicted values calculated in prediction modes according to Embodiment 4.
FIG. 50 is a diagram showing examples of attribute information items (pieces of attribute information) used as the predicted values according to Embodiment 4.

FIG. 49 is a diagram showing a first example of a table representing predicted values calculated in the prediction modes according to Embodiment 4. FIG. 50 is a diagram showing examples of attribute information items used as the predicted values according to Embodiment 4. FIG. 51 is a diagram showing a second example of a table representing predicted values calculated in the prediction modes according to Embodiment 4.

Number M of prediction modes may be appended to a bitstream. Number M of prediction modes may be defined by a profile or a level of standards rather than appended to the bitstream. Number M of prediction modes may be also calculated from number N of three-dimensional points used for prediction. For example, number M of prediction modes may be calculated by M=N+1.

The table in FIG. 49 is an example of a case with number N of three-dimensional points used for prediction being 4 and number M of prediction modes being 5. A predicted value of an attribute information item of point b2 can be generated by using attribute information items of points a0, a1, a2, b1. In selecting one prediction mode from a plurality of prediction modes, a prediction mode for generating, as a predicted value, an attribute value of each of points a0, a1, a2, b1 may be selected in accordance with distance information from point b2 to each of points a0, a1, a2, b1. The prediction mode is appended for each three-dimensional point to be encoded. The predicted value is calculated in accordance with a value corresponding to the appended prediction mode.

The table in FIG. 51 is, as in FIG. 49, an example of a case with number N of three-dimensional points used for prediction being 4 and number M of prediction modes being 5. A predicted value of an attribute information item of point a2 can be generated by using attribute information items of points a0, a1. In selecting one prediction mode from a plurality of prediction modes, a prediction mode for generating, as a predicted value, an attribute value of each of points a0 and a1 may be selected in accordance with distance information from point a2 to each of points a0, a1. The prediction mode is appended for each three-dimensional point to be encoded. The predicted value is calculated in accordance with a value corresponding to the appended prediction mode.

When the number of neighboring points, that is, number N of surrounding three-dimensional points is smaller than four such as at point a2 above, a prediction mode to which a predicted value is not assigned may be written as "not available" in the table.

Assignment of values of the prediction modes may be determined in accordance with the distance from the three-dimensional point to be encoded. For example, prediction mode values indicating a plurality of prediction modes decrease with decreasing distance from the three-dimensional point to be encoded to the surrounding three-dimensional points having the attribute information items used as the predicted values. The example in FIG. 49 shows that points b1, a2, a1, a0 are sequentially located closer to point b2 as the three-dimensional point to be encoded. For example, in the calculating of the predicted value, the attribute information item of point b1 is calculated as the predicted value in a prediction mode indicated by a prediction mode value of "1" among two or more prediction modes, and the attribute information item of point a2 is calculated as the predicted value in a prediction mode indicated by a prediction mode value of "2". As such, the prediction mode value indicating the prediction mode for calculating, as the predicted value, the attribute information item of point b1 is smaller than the prediction mode value indicating the prediction mode for calculating, as the predicted value, the attribute information item of point a2 farther from point b2 than point b1.

Thus, a small prediction mode value can be assigned to a point that is more likely to be predicted and selected due to a short distance, thereby reducing a bit number for encoding the prediction mode value. Also, a small prediction mode value may be preferentially assigned to a three-dimensional point belonging to the same LoD as the three-dimensional point to be encoded.

FIG. 52 is a diagram showing a third example of a table representing predicted values calculated in the prediction modes according to Embodiment 4. Specifically, the third example is an example of a case where an attribute information item used as a predicted value is a value of color information (YUV) of a surrounding three-dimensional point. As such, the attribute information item used as the predicted value may be color information indicating a color of the three-dimensional point.

As shown in FIG. 52, a predicted value calculated in a prediction mode indicated by a prediction mode value of "0" is an average of Y, U, and V components defining a YUV color space. Specifically, the predicted value includes a weighted average Yave of Y component values Yb1, Ya2, Ya1, Ya0 corresponding to points b1, a2, a1, a0, respectively, a weighted average Uave of U component values Ub1, Ua2, Ua1, Ua0 corresponding to points b1, a2, a1, a0, respectively, and a weighted average Vave of V component values Vb1, Va2, Va1, Va0 corresponding to points b1, a2, a1, a0, respectively. Predicted values calculated in prediction modes indicated by prediction mode values of "1" to "4" include color information of the surrounding three-dimensional points b1, a2, a1, a0. The color information is indicated by combinations of the Y, U, and V component values.

In FIG. 52, the color information is indicated by a value defined by the YUV color space, but not limited to the YUV color space. The color information may be indicated by a value defined by an RGB color space or a value defined by any other color space.

As such, in the calculating of the predicted value, two or more averages or two or more attribute information items may be calculated as the predicted values of the prediction modes. The two or more averages or the two or more attribute information items may indicate two or more component values each defining a color space.

For example, when a prediction mode indicated by a prediction mode value of "2" in the table in FIG. 52 is selected, a Y component, a U component, and a V component as attribute values of the three-dimensional point to be encoded may be encoded as predicted values Ya2, Ua2, Va2. In this case, the prediction mode value of "2" is appended to the bitstream.

FIG. 53 is a diagram showing a fourth example of a table representing predicted values calculated in the prediction modes according to Embodiment 4. Specifically, the fourth example is an example of a case where an attribute information item used as a predicted value is a value of reflectance information of a surrounding three-dimensional point. The reflectance information is, for example, information indicating reflectance R.

As shown in FIG. 53, a predicted value calculated in a prediction mode indicated by a prediction mode value of "0" is weighted average Rave of reflectances Rb1, Ra2, Ra1, Ra0 corresponding to points b1, a2, a1, a0, respectively. Predicted values calculated in prediction modes indicated by prediction mode values of "1" to "4" are reflectances Rb1, Ra2, Ra1, Ra0 of surrounding three-dimensional points b1, a2, a1, a0, respectively.

For example, when a prediction mode indicated by a prediction mode value of "3" in the table in FIG. 53 is selected, a reflectance as an attribute value of a three-dimensional point to be encoded may be encoded as predicted value Ra1. In this case, the prediction mode value of "3" is appended to the bitstream.

As shown in FIGS. 52 and 53, the attribute information item may include a first attribute information item and a second attribute information item different from the first attribute information item. The first attribute information item is, for example, color information. The second attribute information item is, for example, reflectance information. In the calculating of the predicted value, a first predicted value may be calculated by using the first attribute information item, and a second predicted value may be calculated by using the second attribute information item.

When the attribute information item includes a plurality of components like color information such as a YUV color space or an RGB color space, predicted values may be calculated in different prediction modes for the respective components. For example, for the YUV space, predicted values using a Y component, a U component, and a V component may be calculated in prediction modes selected for the respective components. For example, prediction mode values may be selected in prediction mode Y for calculating the predicted value using the Y component, prediction mode U for calculating the predicted value using the U component, and prediction mode V for calculating the predicted value using the V component. In this case, values in tables in FIGS. 54 to 56 described later may be used as the prediction mode values indicating the prediction modes of the components, and the prediction mode values may be appended to the bitstream. The YUV color space has been described above, but the same applies to the RGB color space.

Predicted values including two or more components among a plurality of components of an attribute information item may be calculated in a common prediction mode. For example, for the YUV color space, prediction mode values may be selected in prediction mode Y for calculating the predicted value using the Y component and prediction mode UV for calculating the predicted value using the UV components. In this case, values in tables in FIGS. 54 and 57 described later may be used as the prediction mode values indicating the prediction modes of the components, and the prediction mode values may be appended to the bitstream.

FIG. 54 is a diagram showing a fifth example of a table representing predicted values calculated in the prediction modes according to Embodiment 4. Specifically, the fifth example is an example of a case where an attribute information item used as a predicted value is a Y component value of color information of a surrounding three-dimensional point.

As shown in FIG. 54, a predicted value calculated in prediction mode Y indicated by a prediction mode value of "0" is weighted average Yave of Y component values Yb1, Ya2, Ya1, Ya0 corresponding to points b1, a2, a1, a0, respectively. Predicted values calculated in prediction modes indicated by prediction mode values of "1" to "4" are Y component values Yb1, Ya2, Ya1, Ya0 of surrounding three-dimensional points b1, a2, a1, a0, respectively.

For example, when prediction mode Y indicated by a prediction mode value of "2" in the table in FIG. 54 is selected, a Y component as an attribute value of a three-dimensional point to be encoded may be used as predicted value Ya2 and encoded. In this case, the prediction mode value of "2" is appended to the bitstream.

FIG. 55 is a diagram showing a sixth example of a table representing predicted values calculated in the prediction modes according to Embodiment 4. Specifically, the sixth example is an example of a case where an attribute information item used as a predicted value is a U component value of color information of a surrounding three-dimensional point.

As shown in FIG. 55, a predicted value calculated in prediction mode U indicated by a prediction mode value of "0" is weighted average Uave of U component values Ub1, Ua2, Ua1, Ua0 corresponding to points b1, a2, a1, a0, respectively. Predicted values calculated in prediction modes indicated by prediction mode values of "1" to "4" are U component values Ub1, Ua2, Ua1, Ua0 of surrounding three-dimensional points b1, a2, a1, a0, respectively.

For example, when prediction mode U indicated by a prediction mode value of "1" in the table in FIG. 55 is selected, a U component as an attribute value of a three-dimensional point to be encoded may be encoded as predicted value Ub1. In this case, the prediction mode value of "1" is appended to the bitstream.

FIG. 56 is a diagram showing a seventh example of a table representing predicted values calculated in the prediction modes according to Embodiment 4. Specifically, the seventh example is an example of a case where an attribute information item used as a predicted value is a V component value of color information of a surrounding three-dimensional point.

As shown in FIG. 56, a predicted value calculated in prediction mode V indicated by a prediction mode value of "0" is weighted average Vave of V component values Vb1, Va2, Va1, Va0 corresponding to points b1, a2, a1, a0, respectively. Predicted values calculated in prediction modes indicated by prediction mode values of "1" to "4" are V component values Vb1, Va2, Va1, Va0 of surrounding three-dimensional points b1, a2, a1, a0, respectively.

For example, when prediction mode V indicated by a prediction mode value of "4" in the table in FIG. 56 is selected, a V component as an attribute value of a three-dimensional point to be encoded may be used as predicted value Va0 and encoded. In this case, the prediction mode value of "4" is appended to the bitstream.

FIG. 57 is a diagram showing an eighth example of a table representing predicted values calculated in the prediction modes according to Embodiment 4. Specifically, the eighth example is an example of a case where attribute information items used as predicted values are a U component value and a V component value of color information of a surrounding three-dimensional point.

As shown in FIG. 57, a predicted value calculated in prediction mode U indicated by a prediction mode value of "0" includes weighted average Uave of U component values Ub1, Ub2, Ua1, Ua0 corresponding to points b1, a2, a1, a0, respectively and weighted average Vave of V component values Vb1, Va2, Va1, Va0 corresponding to points b1, a2, a1, a0, respectively. Predicted values calculated in prediction modes indicated by prediction mode values of "1" to "4" include U component values and V component values of surrounding three-dimensional points b1, a2, a1, a0, respectively.

For example, when prediction mode UV indicated by a prediction mode value of "1" in the table in FIG. 57 is selected, a U component and a V component as attribute values of a three-dimensional point to be encoded may be used as predicted values Ub1, Vb1 and encoded. In this case, the prediction mode value of "1" is appended to the bitstream.

A prediction mode in encoding may be selected by RD optimization. For example, it is conceivable that cost cost(P) when certain prediction mode P is selected is calculated, and prediction mode P with minimum cost(P) is selected. Cost cost(P) may be calculated by Equation D1 using, for example, prediction residual residual(P) when a predicted value of prediction mode P is used, bit number bit(P)

required for encoding prediction mode P, and adjustment parameter value λ.

$$\text{cost}(P) = \text{abs}(\text{residual}(P)) + \lambda \times \text{bit}(P) \quad \text{(Equation D1)}$$

where abs(x) denotes an absolute value of x.

A square value of x may be used instead of abs(x).

Using Equation D1 above allows selection of a prediction mode considering balance between a size of a prediction residual and a bit number required for encoding the prediction mode. Different adjustment parameter values λ may be set in accordance with values of a quantization scale. For example, at a small quantization scale (at a high bit rate), value λ may be set smaller to select a prediction mode with smaller prediction residual residual(P) to increase prediction accuracy as much as possible. At a large quantization scale (at a low bit rate), value λ may be set larger to select an appropriate prediction mode while considering bit number bit(P) required for encoding prediction mode P.

"At a small quantization scale" is, for example, when the quantization scale is smaller than a first quantization scale. "At a large quantization scale" is, for example, when the quantization scale is larger than a second quantization scale equal to or greater than the first quantization scale. Values λ may be set smaller at smaller quantization scales.

Prediction residual residual(P) is calculated by subtracting a predicted value of prediction mode P from an attribute value of a three-dimensional point to be encoded. Instead of prediction residual residual(P) in calculating of cost, prediction residual residual(P) may be quantized or inverse quantized and added to the predicted value to obtain a decoded value, and a difference (encoding error) from a decoded value when an attribute value of an original three-dimensional point and prediction mode P are used may be reflected in the cost value. This allows selection of a prediction mode with a small encoding error.

In binarizing and encoding a prediction mode, for example, a binarized bit number may be used as bit number bit(P) required for encoding prediction mode P. For example, with number M of prediction modes being 5, as in FIG. 58, a prediction mode value indicating the prediction mode may be binarized by a truncated unary code in accordance with number M of prediction modes with a maximum value of 5. In this case, 1 bit for a prediction mode value of "0", 2 bits for a prediction mode value of "1", 3 bits for a prediction mode value of "2", and 4 bits for prediction mode values of "4" and "5" are used as bit numbers bit(P) required for encoding the prediction mode values. By using the truncated unary code, the bit number is set smaller for smaller prediction mode values. This can reduce an encoding amount of a prediction mode value indicating a prediction mode for calculating a predicted value that is more likely to be selected, for example, that is more likely to minimize cost(P), such as an average value calculated as a predicted value when the prediction mode value is "0", or an attribute information item of a three-dimensional point calculated as a predicted value when the prediction mode value is "1", that is, an attribute information item of a three-dimensional point dose to the three-dimensional point to be encoded.

When a maximum value of the number of prediction modes is not determined, as in FIG. 59, a prediction mode value indicating a prediction mode may be binarized by a unary code. When a probability of appearance of each prediction mode is dose, as shown in FIG. 60, the prediction mode value indicating the prediction mode may be binarized by a fixed code to reduce an encoding amount.

As bit number bit(P) required for encoding the prediction mode value indicating prediction mode P, binarized data of the prediction mode value indicating prediction mode P may be arithmetic-encoded, and an encoding amount after the arithmetic-encoding may be used as a value of bit(P). This allows calculation of cost using more accurate required bit number bit(P), thereby allowing selection of a more appropriate prediction mode.

FIG. 58 is a diagram showing a first example of a binarization table in binarizing and encoding the prediction mode values according to Embodiment 4. Specifically, the first example is an example of binarizing the prediction mode values with a truncated unary code with number M of prediction modes being 5.

FIG. 59 is a diagram showing a second example of a binarization table in binarizing and encoding the prediction mode values according to Embodiment 4. Specifically, the second example is an example of binarizing the prediction mode values with a unary code with number M of prediction modes being 5.

FIG. 60 is a diagram showing a third example of a binarization table in binarizing and encoding the prediction mode values according to Embodiment 4. Specifically, the third example is an example of binarizing the prediction mode values with a fixed code with number M of prediction modes being 5.

A prediction mode value indicating a prediction mode (PredMode) may be arithmetic-encoded after binarized, and appended to the bitstream. As described above, the prediction mode value may be binarized, for example, by the truncated unary code in accordance with number M of prediction modes. In this case, a maximum bit number after binarization of the prediction mode value is M−1.

The binary data after binarization may be arithmetic-encoded with reference to an encoding table. In this case, for example, encoding tables may be switched for encoding for each bit of the binary data, thereby improving an encoding efficiency. Also, to reduce the number of encoding tables, among the binary data, the beginning bit one bit may be encoded with reference to encoding table A for one bit, and each of remaining bits may be encoded with reference to encoding table B for remaining bits. For example, in encoding binarized data "1110" with a prediction mode value of "3" in FIG. 61, the beginning bit one bit "1" may be encoded with reference to encoding table A, and each of remaining bits "110" may be encoded with reference to encoding table B.

Figures 61, 62:
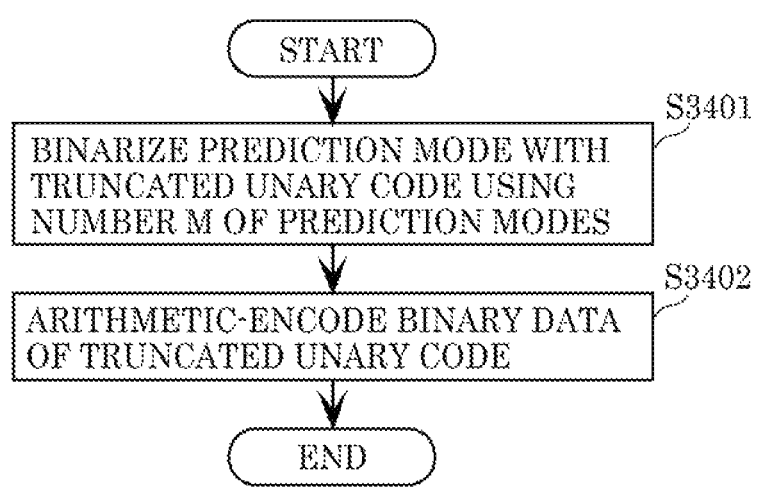
FIG. 61 is a diagram for describing an example of encoding binary data in the binarization table in binarizing and encoding the prediction modes according to Embodiment 4.
FIG. 62 is a flowchart of an example of encoding a prediction mode value according to Embodiment 4.

FIG. 61 is a diagram for describing an example of encoding binary data in the binarization table in binarizing and encoding the prediction modes according to Embodiment 4. The binarization table in FIG. 61 is an example of binarizing the prediction mode values with a truncated unary code with number M of prediction modes being 5.

Thus, an encoding efficiency can be improved by switching the encoding tables in accordance with a bit position of the binary data while reducing the number of encoding tables. Further, in encoding the remaining bits, arithmetic-encoding may be performed by switching the encoding tables for each bit, or decoding may be performed by switching the encoding tables in accordance with a result of the arithmetic-encoding.

In binarizing and encoding the prediction mode value with the truncated unary code using number M of prediction modes, number M of prediction modes used in the truncated unary code may be appended to a header and the like of the bitstream so that the prediction mode can be specified from binary data decoded on a decoding side. Also, value MaxM that may be a value of the number of prediction modes may be defined by standards or the like, and value MaxM−M (M≤MaxM) may be appended to the header. Number M of prediction modes may be defined by a profile or a level of standards rather than appended to the stream.

It is considered that the prediction mode value binarized by the truncated unary code is arithmetic-encoded by switching the encoding tables between one bit part and a remaining part as described above. The probability of appearance of 0 and 1 in each encoding table may be updated in accordance with actually generated binary data. Also, the probability of appearance of 0 and 1 in either of the encoding tables may be fixed. Thus, an update frequency of the probability of appearance may be reduced to reduce a processing amount. For example, the probability of appearance of the one bit part may be updated, and the probability of appearance of the remaining bit part may be fixed.

Figures 63, 64:
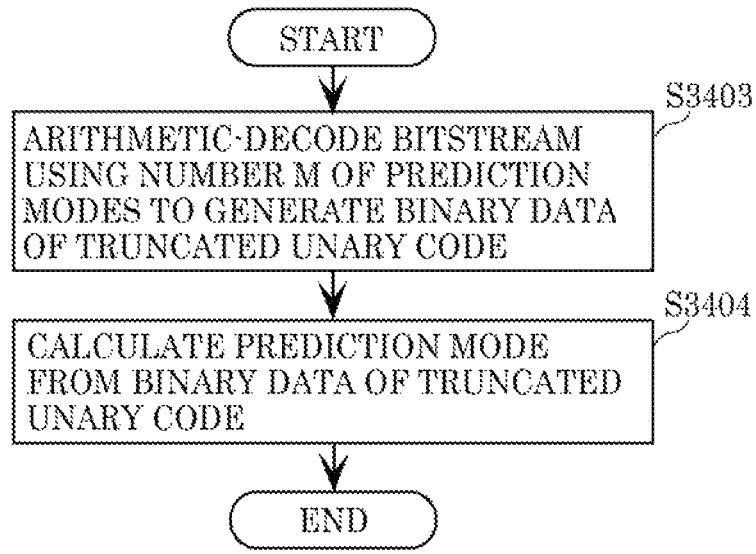
FIG. 63 is a flowchart of an example of decoding a prediction mode value according to Embodiment 4.
FIG. 64 is a diagram showing another example of a table representing predicted values calculated in the prediction modes according to Embodiment 4.

FIG. 62 is a flowchart of an example of encoding a prediction mode value according to Embodiment 4. FIG. 63 is a flowchart of an example of decoding a prediction mode value according to Embodiment 4.

As shown in FIG. 62, in encoding the prediction mode value, first, the prediction mode value is binarized by a truncated unary code in accordance with number M of prediction modes (S3401).

Then, binary data of the truncated unary code is arithmetic-encoded (S3402). Thus, the binary data is included as a prediction mode in the bitstream.

Also, as shown in FIG. 63, in decoding the prediction mode value, first, the bitstream is arithmetic-decoded by using number M of prediction modes to generate binary data of the truncated unary code (S3403).

Then, the prediction mode value is calculated from the binary data of the truncated unary code (S3404).

As a method of binarizing the prediction mode value indicating the prediction mode (PredMode), the example of binarizing with the truncated unary code using number M of prediction modes has been described, but not limited to this. For example, the prediction mode value may be binarized by a truncated unary code in accordance with number L (L≤M) of prediction modes assigned with predicted values. For example, with number M of prediction modes being 5, when two surrounding three-dimensional points are available for prediction of a certain three-dimensional point to be encoded, as shown in FIG. 64, three prediction modes are available and the remaining two prediction modes are not available in some cases. For example, as shown in FIG. 64, with number M of prediction modes being 5, two three-dimensional points in the vicinity of the three-dimensional point to be encoded are available for prediction, and predicted values are not assigned to prediction modes indicated by prediction mode values of "3" and "4" in some cases.

In this case, as shown in FIG. 65, the prediction mode value is binarized by a truncated unary code in accordance with number L of prediction modes assigned with predicted values as a maximum value. This may reduce the bit number after binarization as compared to when the prediction mode value is binarized by the truncated unary code in accordance with number M of prediction modes. For example, in this case, L is 3, and the prediction mode value can be binarized by a truncated unary code in accordance with a maximum value of 3 to reduce the bit number. As such, binarization by the truncated unary code in accordance with number L of prediction modes assigned with predicted values as a maximum value may reduce the bit number after binarization of the prediction mode value.

The binary data after binarization may be arithmetic-encoded with reference to an encoding table. In this case, for example, encoding tables may be switched for encoding for each bit of the binary data, thereby improving an encoding efficiency. Also, to reduce the number of encoding tables, among binarized data, the beginning bit one bit may be encoded with reference to encoding table A for one bit, and each of remaining bits may be encoded with reference to encoding table B for remaining bits. For example, in encoding binarized data "11" with a prediction mode value of "2" in FIG. 65, the beginning bit one bit "1" may be encoded with reference to encoding table A, and remaining bit "1" may be encoded with reference to encoding table B.

FIG. 65 is a diagram for describing an example of encoding binary data in the binarization table in binarizing and encoding the prediction modes according to Embodiment 4. The binarization table in FIG. 65 is an example of binarizing the prediction mode values with a truncated unary code with number L of prediction modes assigned with predicted values being 3.

Thus, an encoding efficiency can be improved by switching the encoding tables in accordance with a bit position of the binary data while reducing the number of encoding tables. Further, in encoding the remaining bits, arithmetic-encoding may be performed by switching the encoding tables for each bit, or decoding may be performed by switching the encoding tables in accordance with a result of the arithmetic-encoding.

In binarizing and encoding the prediction mode value with the truncated unary code using number L of prediction modes assigned with predicted values, a predicted value may be assigned to a prediction mode to calculate number L in the same manner as in encoding and the prediction mode may be decoded by using calculated number L so that the prediction mode can be specified from binary data decoded on a decoding side.

It is considered that the prediction mode value binarized by the truncated unary code is arithmetic-encoded by switching the encoding tables between one bit part and a remaining part as described above. The probability of appearance of 0 and 1 in each encoding table may be updated in accordance with actually generated binary data. Also, the probability of appearance of 0 and 1 in either of the encoding tables may be fixed. Thus, an update frequency of the probability of appearance may be reduced to reduce a processing amount. For example, the probability of appearance of the one bit part may be updated, and the probability of appearance of the remaining bit part may be fixed.

Figure 67:
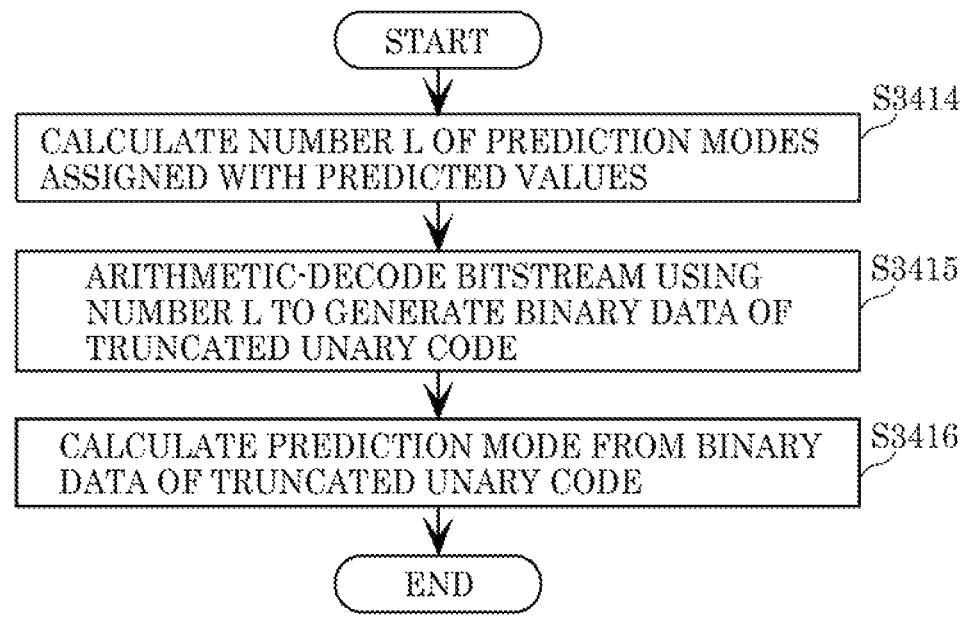
FIG. 67 is a flowchart of another example of decoding a prediction mode value according to Embodiment 4.

FIG. 66 is flowchart of another example of encoding a prediction mode value according to Embodiment 4. FIG. 67 is a flowchart of another example of decoding a prediction mode value according to Embodiment 4.

As shown in FIG. 66, in encoding the prediction mode value, first, number L of prediction modes assigned with predicted values is calculated (S3411).

Then, the prediction mode value is binarized by a truncated unary code in accordance with number L (S3412).

Then, binary data of the truncated unary code is arithmetic-encoded (S3413).

Also, as shown in FIG. 67, in decoding the prediction mode value, first, number L of prediction modes assigned with predicted values is calculated (S3414).

Then, the bitstream is arithmetic-decoded by using number L to generate binary data of the truncated unary code (S3415).

Then, the prediction mode value is calculated from the binary data of the truncated unary code (S3416).

The prediction mode value needs not be appended for all attribute values. For example, if a certain condition is satisfied, the prediction mode may be fixed so that the prediction mode value is not appended to the bitstream, and if the certain condition is not satisfied, the prediction mode may be selected to append the prediction mode value to the bitstream. For example, if condition A is satisfied, the prediction mode value may be fixed at "0" and a predicted value may be calculated from an average value of surrounding three-dimensional points. If condition A is not satisfied, one prediction mode may be selected from a plurality of prediction modes and a prediction mode value indicating the selected prediction mode may be append to the bitstream.

Certain condition A is, for example, that calculated maximum absolute differential value maxdiff of attribute values (a[0] to a[N−1]) of N (encoded and decoded) three-dimensional points in the vicinity of a three-dimensional point to be encoded is smaller than threshold Thfix. When the maximum absolute differential value of the attribute values of the surrounding three-dimensional points is smaller than threshold Thfix, it is determined that there is a small difference between the attribute values of the three-dimensional points and selecting a prediction mode causes no difference in the predicted value. Then, the prediction mode value is fixed at "0" and the prediction mode value is not encoded, thereby allowing generation of an appropriate predicted value while reducing an encoding amount for encoding the prediction mode.

Threshold Thfix may be appended to the header and the like of the bitstream, and the encoder may perform encoding while changing threshold Thfix. For example, in encoding at a high bit rate, the encoder may set threshold Thfix smaller than that at a low bit rate and append threshold Thfix to the header and increase the case of encoding by selecting a prediction mode, and thus perform encoding so that the prediction residual is as small as possible. Also, in encoding at the low bit rate, the encoder sets threshold Thfix larger than that at the high bit rate and appends threshold Thfix to the header, and performs encoding in a fixed prediction mode. As such, increasing the case of encoding in the fixed prediction mode at the low bit rate can improve an encoding efficiency while reducing a bit amount for encoding the prediction mode. Threshold Thfix may be defined by a profile or a level of standards rather than appended to the bitstream.

The N three-dimensional points in the vicinity of the three-dimensional point to be encoded, which are used for prediction, are N encoded and decoded three-dimensional points with a distance from the three-dimensional point to be encoded being smaller than threshold THd. A maximum value of N may be appended as NumNeighborPoint to the bitstream. The value of N needs not always match NumNeighborPoint as in the case where the number of surrounding encoded and decoded three-dimensional points is smaller than NumNeighborPoint.

The example has been given in which the prediction mode value is fixed at "0" if maximum absolute differential value maxdiff of the attribute values of the three-dimensional points in the vicinity of the three-dimensional point to be encoded, which are used for prediction, is smaller than threshold Thfix[i]. However, not limited to this, the prediction mode value may be fixed at any of "0" to "M−1". The prediction mode value to be fixed may be appended to the bitstream.

Figure 68:
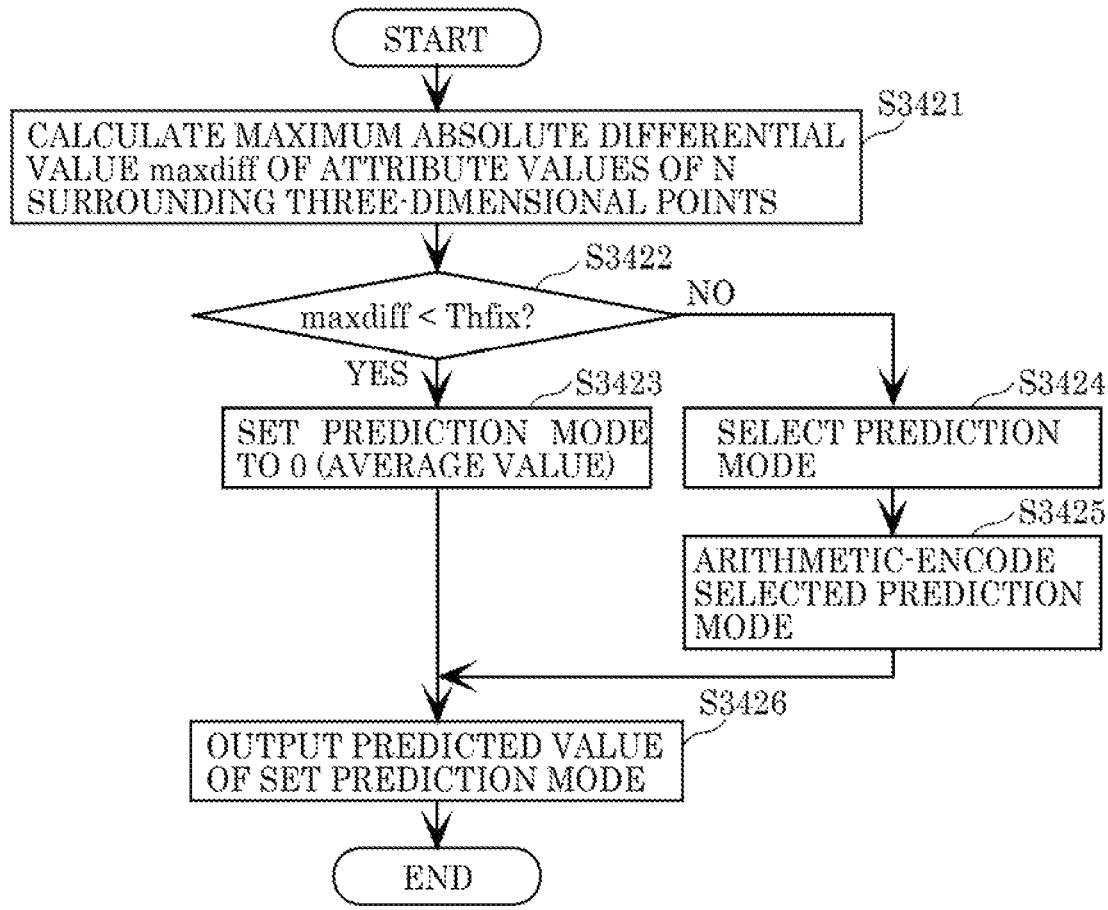
FIG. 68 is a flowchart of an example of a process of determining whether or not a prediction mode value is fixed under condition A in encoding according to Embodiment 4.
Figures 69, 70:
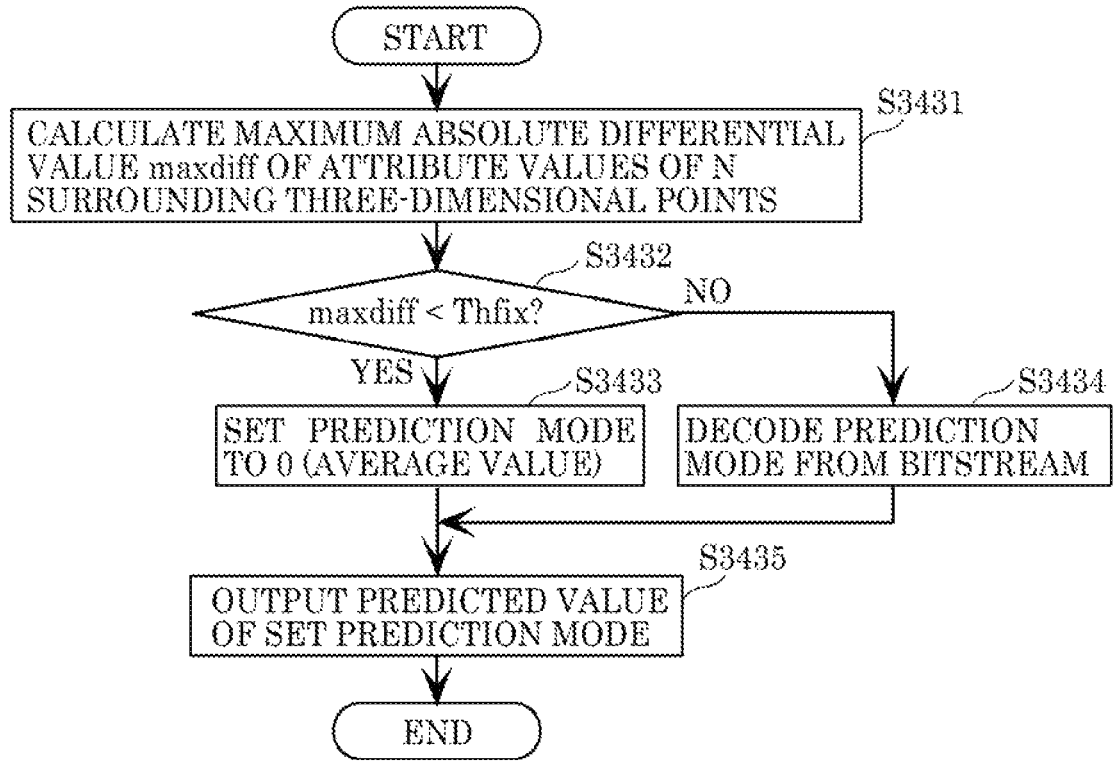
FIG. 69 is a flowchart of an example of a process of determining whether the prediction mode value is fixed or decoded under condition A in decoding according to Embodiment 4.
FIG. 70 is a diagram for describing maximum absolute differential value maxdiff according to Embodiment 4.

FIG. 68 is a flowchart of an example of a process of determining whether or not a prediction mode value is fixed under condition A in encoding according to Embodiment 4. FIG. 69 is a flowchart of an example of a process of determining whether the prediction mode value is fixed or decoded under condition A in decoding according to Embodiment 4.

As shown in FIG. 68, first, the three-dimensional data encoding device calculates maximum absolute differential value maxdiff of attribute values of N three-dimensional points in the vicinity of a three-dimensional point to be encoded (S3421).

Then, the three-dimensional data encoding device determines whether or not maximum absolute differential value maxdiff is smaller than threshold Thfix (S3422). Threshold Thfix may be encoded and appended to the header and the like of the stream.

When maximum absolute differential value maxdiff is smaller than threshold Thfix (Yes in S3422), the three-dimensional data encoding device sets the prediction mode value to "0" (S3423).

When maximum absolute differential value maxdiff is equal to or greater than threshold Thfix (No in S3422), the three-dimensional data encoding device selects one prediction mode from a plurality of prediction modes (S3424). A process of selecting the prediction mode will be described later in detail with reference to FIG. 76.

Then, the three-dimensional data encoding device arithmetic-encodes a prediction mode value indicating the selected prediction mode (S3425). Specifically, the three-dimensional data encoding device performs steps S3401 and S3402 described with reference to FIG. 62 to arithmetic-encode the prediction mode value. The three-dimensional data encoding device may perform arithmetic-encoding by binarizing prediction mode PredMode with a truncated unary code using the number of prediction modes assigned with predicted values. Specifically, the three-dimensional data encoding device may perform steps S3411 to S3413 described with reference to FIG. 66 to arithmetic-encode the prediction mode value.

The three-dimensional data encoding device calculates a predicted value of the prediction mode set in step S3423 or the prediction mode selected in step S3425 to output the calculated predicted value (S3426). When using the prediction mode value set in step S3423, the three-dimensional data encoding device calculates an average of attribute values of N surrounding three-dimensional points as a predicted value of a prediction mode indicated by the prediction mode value of "0".

Also, as shown in FIG. 69, first, the three-dimensional data decoding device calculates maximum absolute differential value maxdiff of attribute values of N three-dimensional points in the vicinity of a three-dimensional point to be decoded (S3431). Maximum absolute differential value maxdiff may be calculated as shown in FIG. 70. Maximum absolute differential value maxdiff is, for example, a maximum value of a plurality of calculated absolute values of differences between all possible pairs when any two of the N surrounding three-dimensional points are paired.

Then, the three-dimensional data decoding device determines whether or not maximum absolute differential value maxdiff is smaller than threshold Thfix (S3432). Threshold Thfix may be set by decoding the header and the like of the stream.

When maximum absolute differential value maxdiff is smaller than threshold Thfix (Yes in S3432), the three-dimensional data decoding device sets the prediction mode value to "0" (S3433).

When maximum absolute differential value maxdiff is equal to or greater than threshold Thfix (No in S3432), the three-dimensional data decoding device decodes the prediction mode value from the bitstream (S3434).

The three-dimensional data decoding device calculates a predicted value of a prediction mode indicated by the prediction mode value set in step S3433 or the prediction mode value decoded in step S3434 to output the calculated predicted value (S3435). When using the prediction mode value set in step S3433, the three-dimensional data decoding device calculates an average of attribute values of N surrounding three-dimensional points as a predicted value of a prediction mode indicated by the prediction mode value of "0".

FIG. 71 is a diagram showing an example of a syntax according to Embodiment 4. NumLoD, NumNeighborPoint[i], NumPredMode[i], Thfix[i], and NumOfPoint[i] in the syntax in FIG. 71 will be sequentially described.

NumLoD indicates the number of LoDs.

NumNeighborPoint[i] indicates an upper limit value of the number of surrounding points used for generating a predicted value of a three-dimensional point belonging to level i. When number M of surrounding points is smaller than NumNeighborPoint[i] (M<NumNeighborPoint[i]), the predicted value may be calculated by using number M of surrounding points. When a value of NumNeighborPoint[i] needs not be divided among LoDs, one NumNeighborPoint may be appended to the header.

NumPredMode[i] is a total number (M) of prediction modes used for predicting an attribute value of level i. Possible value MaxM of the number of prediction modes may be defined by standards or the like, and value MaxM−M (0<M≤MaxM) may be appended to the header as NumPredMode[i] and binarized by a truncated unary code in accordance with maximum value MaxM−1 and encoded. Number of prediction modes NumPredMode[i] may be defined by a profile or a level of standards rather than appended to the stream. The number of prediction modes may be defined by NumNeighborPoint[i]+NumPredMode[i]. When the value of NumPredMode[i] needs not be divided among LoDs, one NumPredMode may be appended to the header.

Thfix[i] indicates a threshold of a maximum absolute differential value for determining whether or not a prediction mode of level i is fixed. If the maximum absolute differential value of attribute values of surrounding three-dimensional points used for prediction is smaller than Thfix[i], the prediction mode is fixed at 0. Thfix[i] may be defined by a profile or a level of standards rather than appended to the stream. When the value of Thfix[i] needs not be divided among LoDs, one Thfix may be appended to the header.

NumOfPoint[i] indicates the number of three-dimensional points belonging to level i. When total number AllNumOfPoint of three-dimensional points is appended to another header, NumOfPoint[NumLoD−1] (the number of three-dimensional points belonging to the lowest level) may be calculated by the following equation:

[Math. 5]

$$AllNumOfPoint - \sum_{j=0}^{NumLoD-2} NumOfPoint[j] \quad \text{(Equation D2)}$$

rather than appended to the header. This can reduce an encoding amount of the header.

As a setting example of NumPredMode[i], the value of NumPredMode[i] may be set larger for a higher level at which prediction is more difficult due to a longer distance between three-dimensional points belonging to the level, thereby increasing the number of selectable prediction modes. Also, the value NumPredMode[i] may be set smaller for a lower level at which prediction is easy, thereby reducing a bit amount required for encoding the prediction mode. Such setting can increase the number of selectable prediction modes to reduce a prediction residual at the upper level, and reduce an encoding amount of a prediction mode at the lower level, thereby improving an encoding efficiency.

As a setting example of Thfix[i], the value of Thfix[i] may be set smaller for a higher level at which prediction is difficult due to a long distance from the three-dimensional point belonging to LoD, thereby increasing the case of selecting the prediction mode. Also, the value of Thfix[i] may be set larger value for a lower level at which prediction is easy, and the prediction mode may be fixed to reduce a bit amount required for encoding the prediction mode. Such setting can increase the case of selecting the prediction mode to reduce a prediction residual at the upper level, and fix the prediction mode to reduce an encoding amount of the prediction mode at the lower level, thereby improving an encoding efficiency.

NumLoD, NumNeighborPoint[i], NumPredMode[i], Thfix[i], or NumOfPoint[i] described above may be entropy encoded and appended to the header. For example, the values may be binarized and arithmetic-encoded. The values may be encoded at a fixed length to reduce a processing amount.

Figures 72, 73:
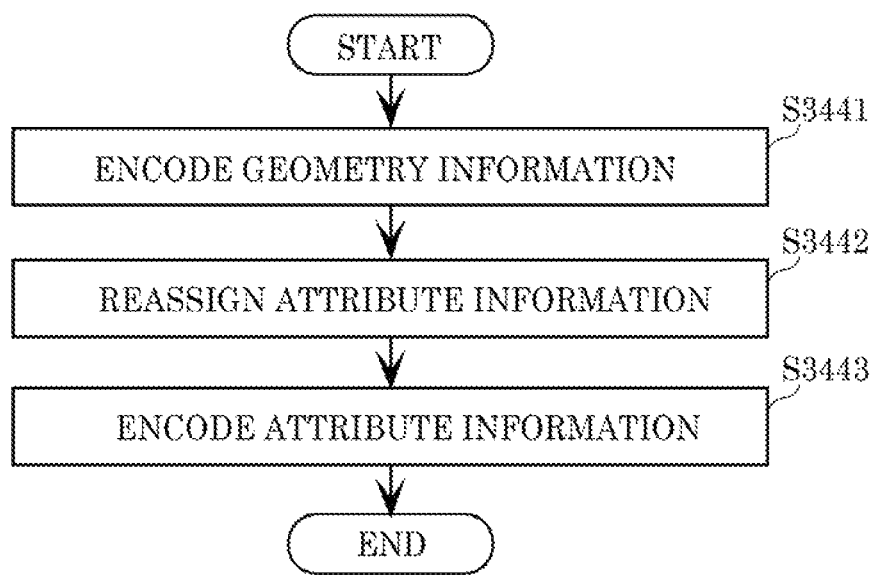
FIG. 72 is a diagram showing an example of a syntax according to Embodiment 4.
FIG. 73 is a flowchart of a three-dimensional data encoding process by a three-dimensional data encoding device according to Embodiment 4.

FIG. 72 is a diagram showing an example of a syntax according to Embodiment 4. PredMode, n-bit code, and remaining code in the syntax in FIG. 72 will be sequentially described.

PredMode indicates a prediction mode for encoding and decoding an attribute value of a j-th three-dimensional point in level i. PredMode is "0" to "M−1" (M is a total number of prediction modes). When PredMode is not in the bitstream (maxdiff Thfix[i] && NumPredMode[i]>1 as a condition is not satisfied), the value of PredMode may be estimated as 0. The value of PredMode may be estimated as any of "0" to "M−1", not limited to "0". An estimated value when PredMode is not in the bitstream may be separately appended to the header and the like. PredMode may be binarized by a truncated unary code in accordance with the number of prediction modes assigned with predicted values and arithmetic-encoded.

The n-bit code indicates encoded data of a prediction residual of a value of an attribute information item. A bit length of the n-bit code depends on a value of R_TH[i]. The bit length of the n-bit code is, for example, 6 bits when the value of R_TH[i] is 63, and 8 bits when the value of R_TH[i] is 255.

The remaining code indicates encoded data encoded by Exponential-Golomb among encoded data of the prediction residual of the attribute information item. The remaining code is decoded when the n-bit code is equal to R_TH[i], and the value of the n-bit code is added to the value of the remaining code to decode the prediction residual. When the n-bit code is not equal to R_TH[i], the remaining code needs not be decoded.

Now, a flow of a process of the three-dimensional data encoding device will be described. FIG. 73 is a flowchart of a three-dimensional data encoding process by the three-dimensional data encoding device according to Embodiment 4.

First, the three-dimensional data encoding device encodes geometry information (geometry) (S3441). For example, three-dimensional data encoding is encoding by using an octree representation.

When a position of a three-dimensional point is changed by quantization or the like after encoding of geometry information, the three-dimensional data encoding device reassigns an attribute information item of an original three-dimensional point to the three-dimensional point after change (S3442). For example, the three-dimensional data encoding device performs reassignment by interpolating a value of the attribute information item in accordance with a change amount of the position. For example, the three-dimensional data encoding device detects N three-dimensional points before change close to the three-dimensional position after change, and performs weighted averaging of values of attribute information items of the N three-dimensional points. For example, the three-dimensional data encoding device determines, in the weighted averaging, a weight based on a distance from the three-dimensional position after change to each of the N three-dimensional points. Then, the three-dimensional data encoding device sets the value obtained by the weighted averaging to a value of an attribute information item of the three-dimensional point after change. When two or more three-dimensional points are changed to the same three-dimensional position by quantization or the like, the three-dimensional data encoding device may assign an average value of attribute information items of two or more three-dimensional points before change as a value of an attribute information item of a three-dimensional point after change.

Then, the three-dimensional data encoding device encodes the attribute information item (Attribute) after reassignment (S3443). For example, when encoding multiple types of attribute information items, the three-dimensional data encoding device may sequentially encode the multiple types of attribute information items. For example, when encoding a color and a reflectance as attribute information items, the three-dimensional data encoding device may generate a bitstream appended with a color encoding result followed by a reflectance encoding result. The plurality of encoding results of the attribute information items may be appended to the bitstream in any order, not limited to this.

The three-dimensional data encoding device may append information indicating an encoded data start location of each attribute information item in the bitstream to the header and the like. Thus, the three-dimensional data decoding device can selectively decode an attribute information item that requires decoding, thereby omitting a decoding process of an attribute information item that does not require decoding. This can reduce a processing amount of the three-dimensional data decoding device. The three-dimensional data encoding device may concurrently encode multiple types of attribute information items, and combine encoding results into one bitstream. Thus, the three-dimensional data encoding device can quickly encode the multiple types of attribute information items.

Figure 74:
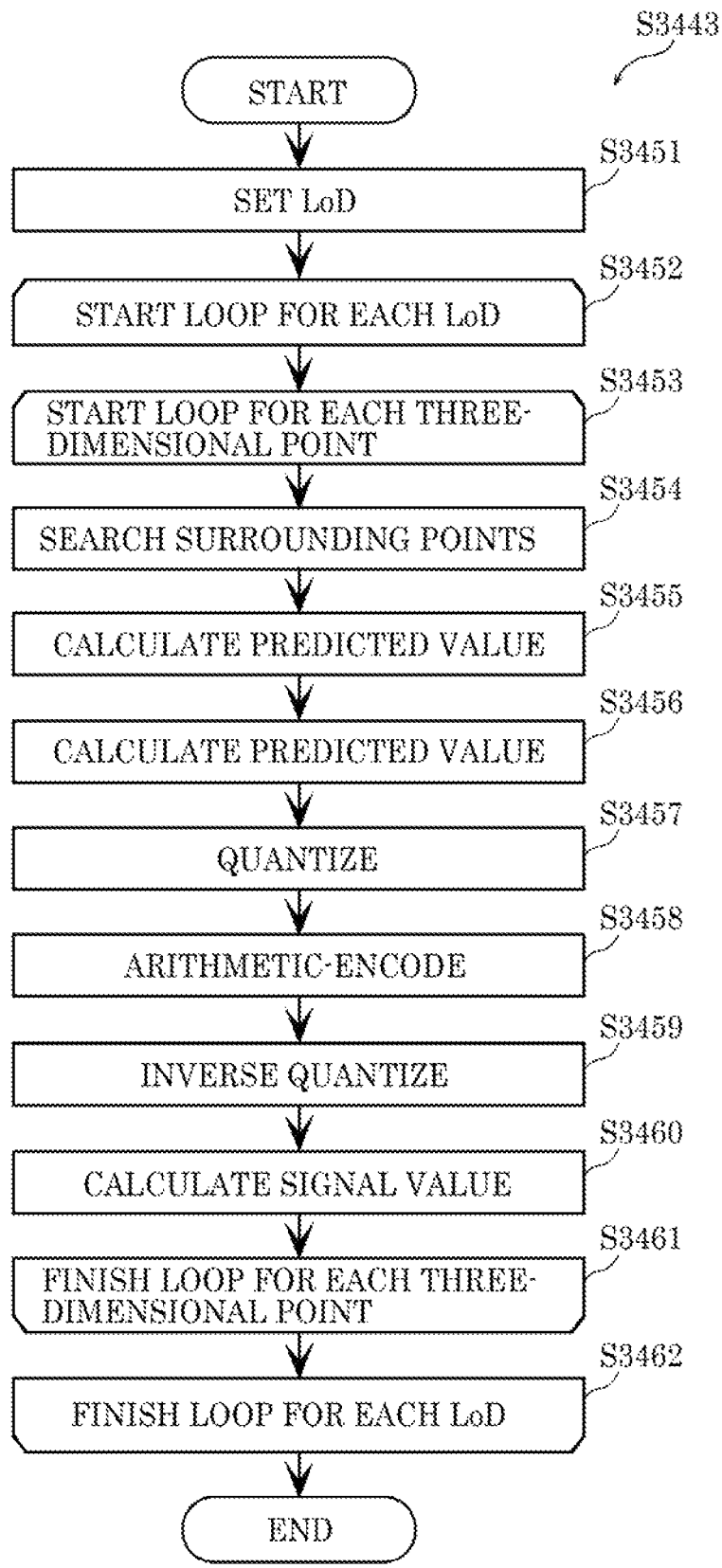
FIG. 74 is a flowchart of an attribute information encoding process according to Embodiment 4.

FIG. 74 is a flowchart of an attribute information item encoding process (S3443) according to Embodiment 4. First, the three-dimensional data encoding device sets LoD (S3451). Specifically, the three-dimensional data encoding device assigns each three-dimensional point to any of a plurality of LoDs.

Then, the three-dimensional data encoding device starts a loop for each LoD (S3452). Specifically, the three-dimensional data encoding device repeats processes in steps S3453 to S3461 for each LoD.

Then, the three-dimensional data encoding device starts a loop for each three-dimensional point (S3453). Specifically, the three-dimensional data encoding device repeats processes in steps S3454 to S3460 for each three-dimensional point.

First, the three-dimensional data encoding device searches a plurality of surrounding points that are three-dimensional points in the vicinity of a target three-dimensional point to be processed and used for calculating a predicted value of the target three-dimensional point (S3454).

Then, the three-dimensional data encoding device calculates predicted value P of the target three-dimensional point (S3455). A specific example of a calculation process of predicted value P will be described later with reference to FIG. 75.

Then, the three-dimensional data encoding device calculates, as a prediction residual, a difference between an attribute information item of the target three-dimensional point and the predicted value (S3456).

Then, the three-dimensional data encoding device quantizes the prediction residual to calculate a quantized value (S3457).

Then, the three-dimensional data encoding device arithmetic-encodes the quantized value (S3458).

The three-dimensional data encoding device inverse quantizes the quantized value to calculate an inverse quantized value (S3459).

Then, the three-dimensional data encoding device adds the predicted value to the inverse quantized value to generate a decoded value (S3460).

Then, the three-dimensional data encoding device finishes the loop for each three-dimensional point (S3461).

The three-dimensional data encoding device also finishes the loop for each LoD (S3462).

Figure 75:
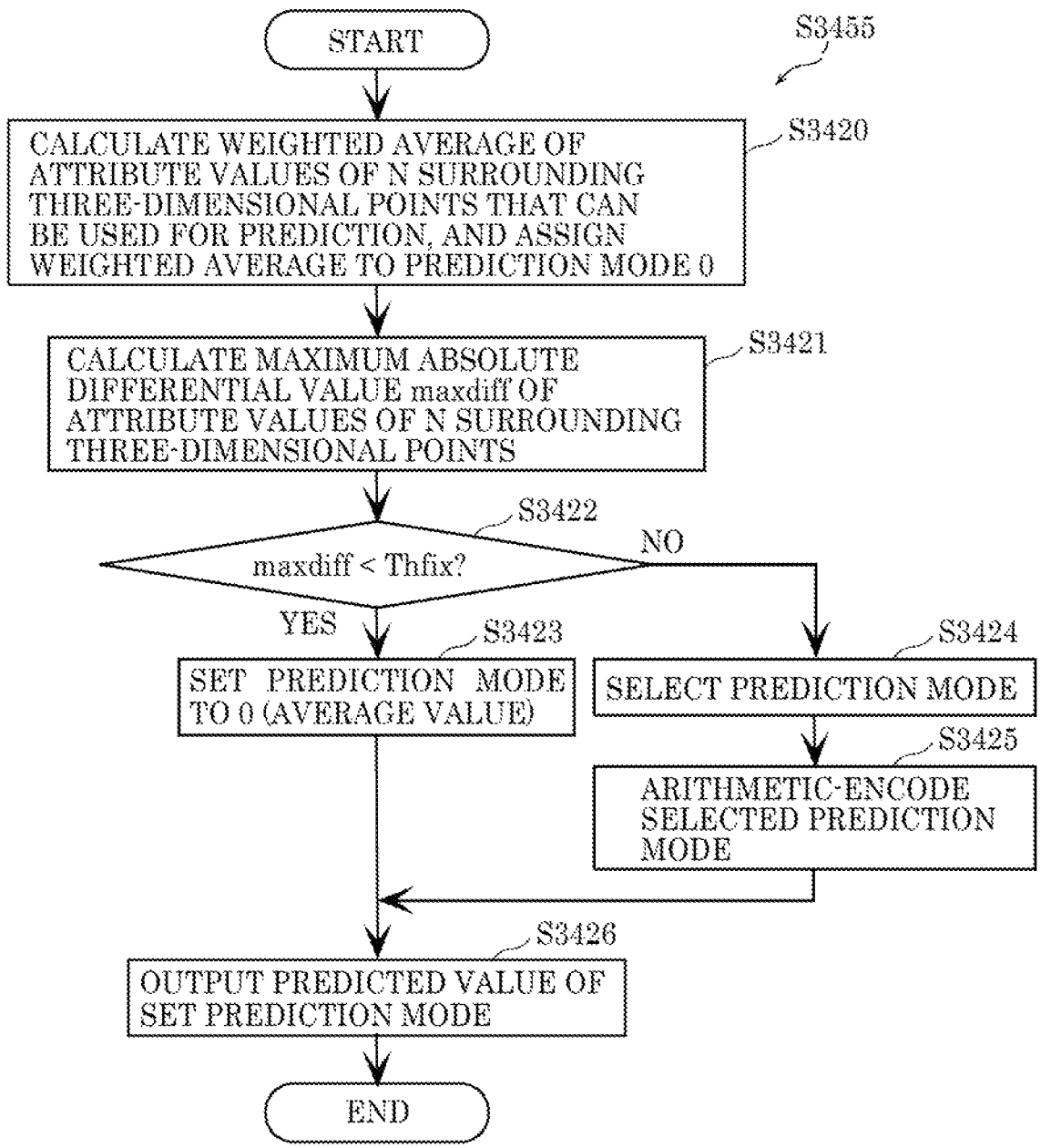
FIG. 75 is a flowchart of a predicted value calculation process by the three-dimensional data encoding device according to Embodiment 4.

FIG. 75 is a flowchart of a predicted value calculation process (S3455) by the three-dimensional data encoding device according to Embodiment 4.

First, the three-dimensional data encoding device calculates a weighted average of attribute values of the N three-dimensional points in the vicinity of the target three-dimensional point to be processed, which can be used for predicting a predicted value of the target three-dimensional point, and assigns the calculated weighted average to a prediction mode indicated by a prediction mode value of "0" (S3420).

Then, the three-dimensional data encoding device performs steps S3421 to S3426 described with reference to FIG. 68 to output a predicted value of the target three-dimensional point.

Figure 76:
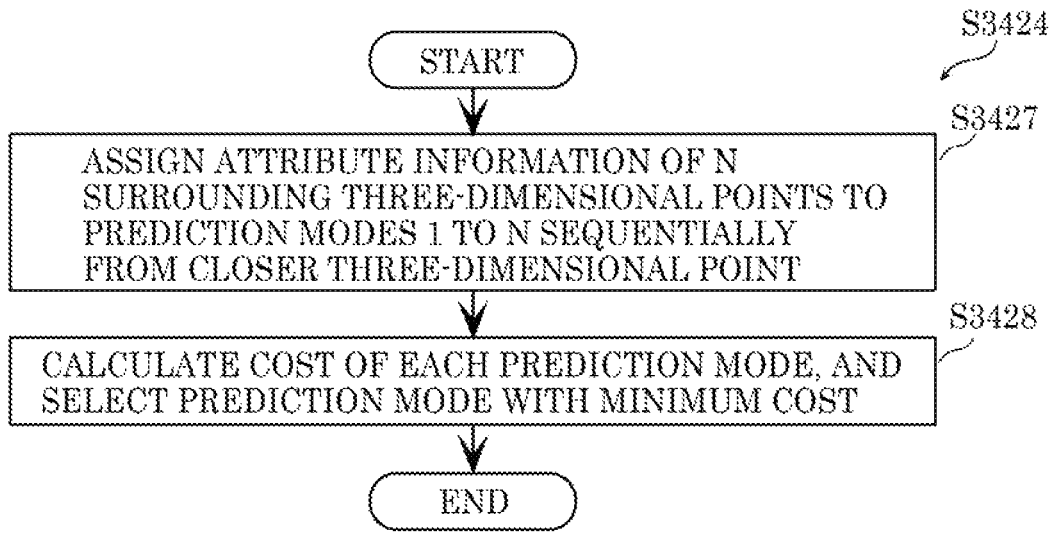
FIG. 76 is a flowchart of a prediction mode selection process according to Embodiment 4.

FIG. 76 is a flowchart of a prediction mode selection process (S3424) according to Embodiment 4.

First, the three-dimensional data encoding device assigns attribute information items of the N three-dimensional points in the vicinity of the target three-dimensional point to prediction mode values of "1" to "N" in one increment sequentially from a three-dimensional point closer to the target three-dimensional point (S3427). The prediction mode values of "0" to "N" are assigned, and thus a total of N+1 prediction modes are generated. When N+1 is larger than maximum number M of prediction modes (NumPredMode) appended to the bitstream, the three-dimensional data encoding device may generate up to M prediction modes.

Then, the three-dimensional data encoding device calculates cost of each prediction mode, and selects a prediction mode with minimum cost (S3428).

Figure 77:
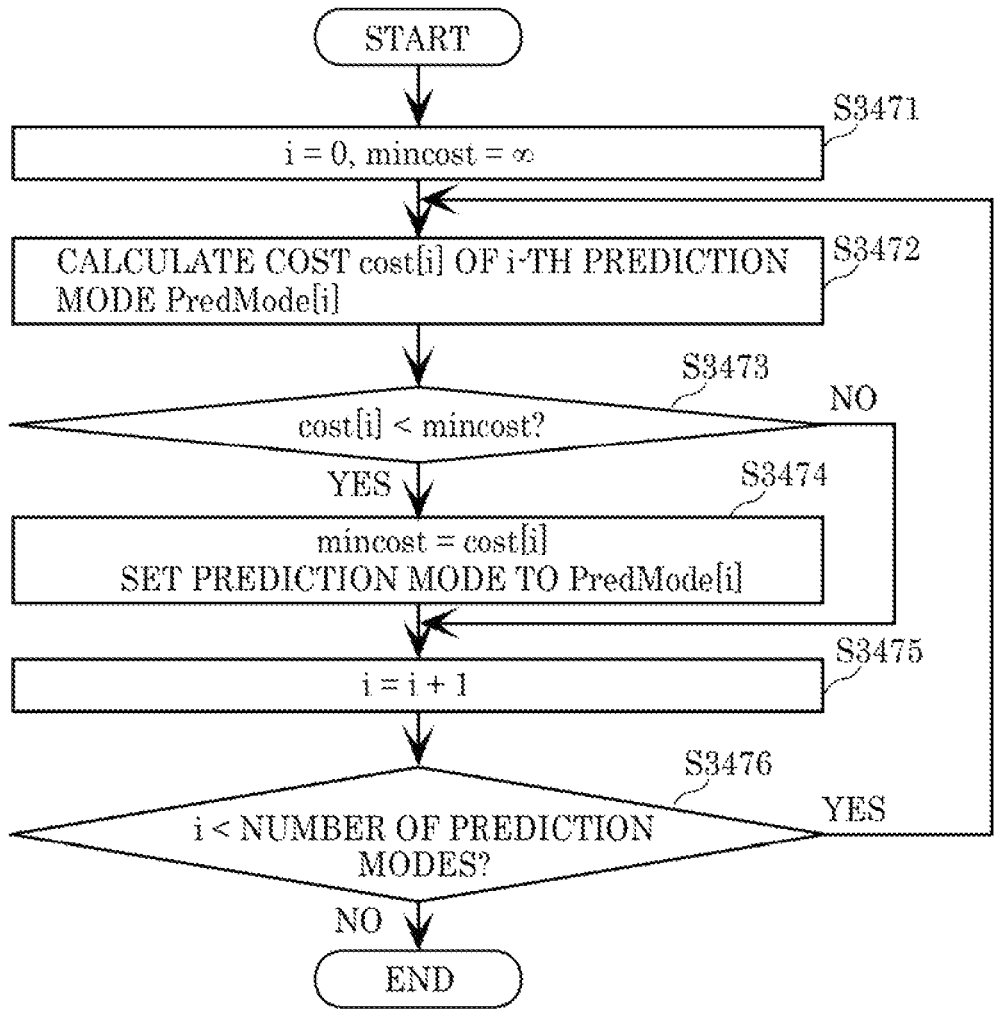
FIG. 77 is a flowchart of a prediction mode selection process that minimizes cost according to Embodiment 4.

FIG. 77 is a flowchart of a prediction mode selection process (S3428) that minimizes cost according to Embodiment 4.

First, the three-dimensional data encoding device sets i=0 and mincost=∞ as initial values (S3471). The set initial values of i and mincost are stored in a memory of the three-dimensional data encoding device.

Then, the three-dimensional data encoding device calculates cost cost[i] of i-th prediction mode PredMode[i] using, for example, Equation D1 (S3472).

Then, the three-dimensional data encoding device determines whether or not calculated cost cost[i] is smaller than mincost stored in the memory (S3473).

Then, when calculated cost cost[i] is smaller than mincost stored in the memory (Yes in S3473), the three-dimensional data encoding device sets mincost=cost[i], sets the prediction mode to predmode[i](S3474), and goes to step S3475. Specifically, the value of mincost stored in the memory is updated to the value of cost[i], and predmodeIil is stored as a prediction mode in the memory.

When, calculated cost cost[i] is equal to or greater than mincost stored in the memory (No in S3473), the three-dimensional data encoding device goes to step S3475.

Then, the three-dimensional data encoding device increments the value of i by one (S3475).

Then, the three-dimensional data encoding device determines whether or not i is smaller than the number of prediction modes (S3476).

When i is smaller than the number of prediction modes (Yes in S3476), the three-dimensional data encoding device returns to step S3472, and when not (No in S3476), the three-dimensional data encoding device finishes the process of selecting the prediction mode that minimizes cost.

Figure 78:
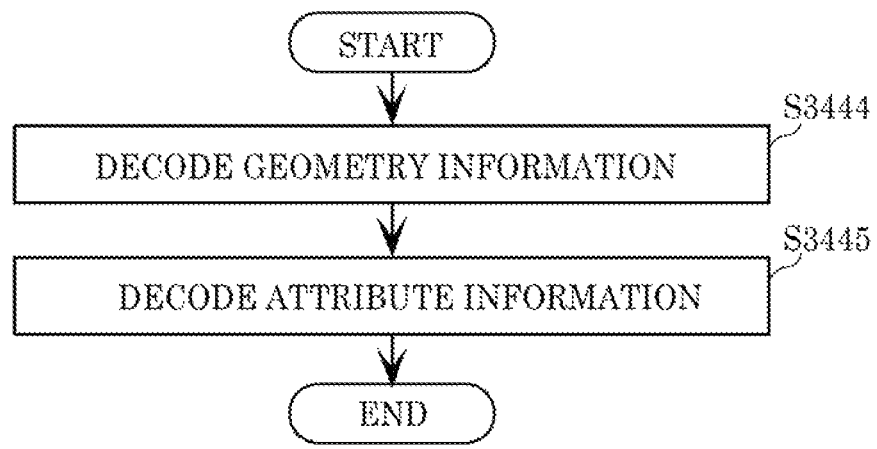
FIG. 78 is a flowchart of a three-dimensional data decoding process by a three-dimensional data decoding device according to Embodiment 4.

Now, a flow of a process of the three-dimensional data decoding device will be described. FIG. 78 is a flowchart of a three-dimensional data decoding process by the three-dimensional data decoding device according to Embodiment 4. First, the three-dimensional data decoding device decodes the geometry information (geometry) from the bitstream (S3444). For example, the three-dimensional data decoding device performs decoding by using an octree representation.

Then, the three-dimensional data decoding device decodes an attribute information item (Attribute) from the bitstream (S3445). For example, when decoding multiple types of attribute information items, the three-dimensional data decoding device may sequentially decode the multiple types of attribute information items. For example, when decoding a color and a reflectance as attribute information items, the three-dimensional data decoding device decodes a color encoding result and a reflectance encoding result in the order of appending to the bitstream. For example, when the bitstream is appended with the color encoding result followed by the reflectance encoding result, the three-dimensional data decoding device decodes the color encoding result and then decodes the reflectance encoding result. The three-dimensional data decoding device may decode encoding results of the attribute information items appended to the bitstream in any order.

The three-dimensional data decoding device may obtain information indicating an encoded data start location of each attribute information item in the bitstream by decoding the header and the like. Thus, the three-dimensional data decoding device can selectively decode an attribute information item that requires decoding, thereby omitting a decoding process of an attribute information item that does not require decoding. This can reduce a processing amount of the three-dimensional data decoding device. The three-dimensional data decoding device may concurrently decode multiple types of attribute information items, and combine decoding results into one three-dimensional point cloud. Thus, the three-dimensional data decoding device can quickly decode the multiple types of attribute information items.

Figure 79:
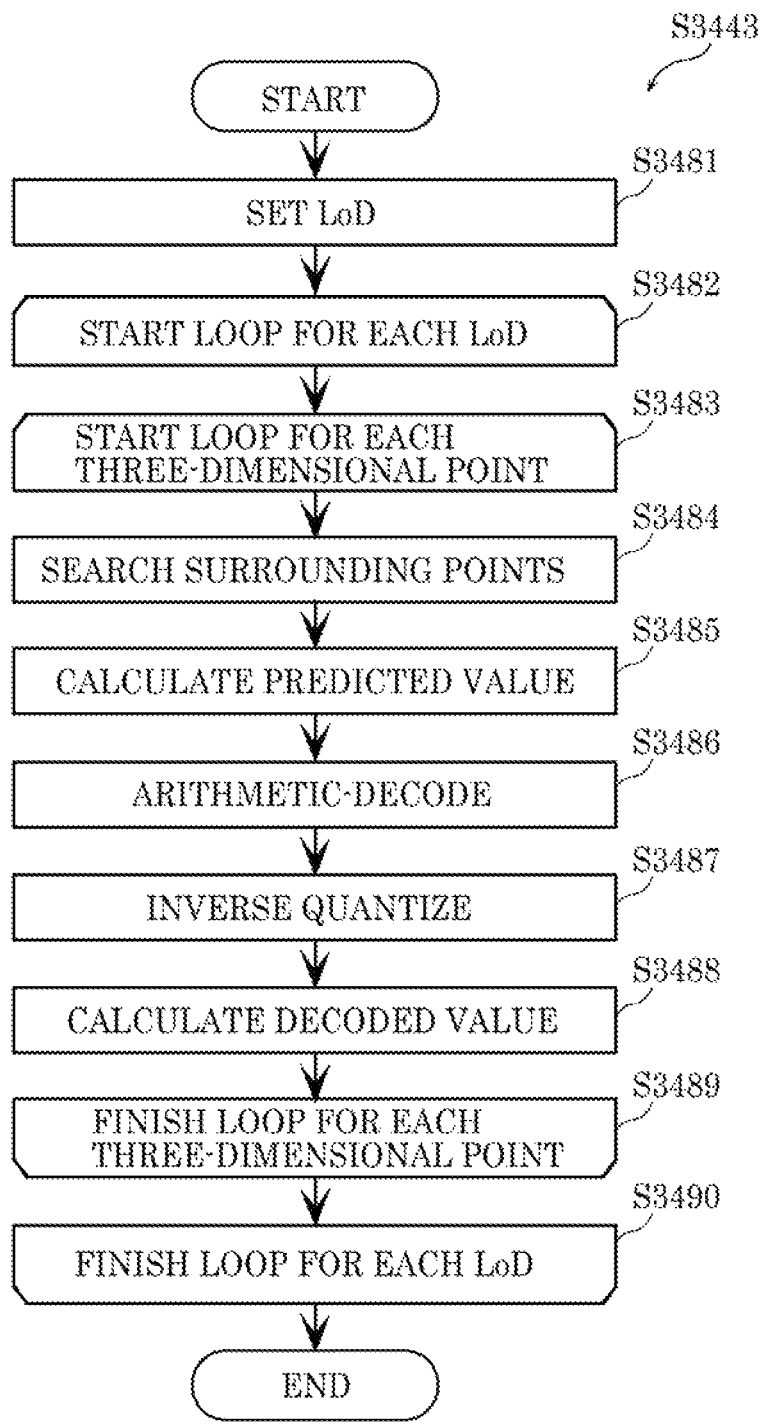
FIG. 79 is a flowchart of an attribute information decoding process according to Embodiment 4.

FIG. 79 is a flowchart of an attribute information item decoding process (S3445) according to Embodiment 4. First, the three-dimensional data decoding device sets LoD (S3481). Specifically, the three-dimensional data decoding device assigns each of a plurality of three-dimensional points having decoded geometry information to any of a plurality of LoDs. For example, this assignment method is the same as that used by the three-dimensional data encoding device.

Then, the three-dimensional data decoding device starts a loop for each LoD (S3482). Specifically, the three-dimensional data decoding device repeats processes in steps S3483 to S3489 for each LoD.

Then, the three-dimensional data decoding device starts a loop for each three-dimensional point (S3483). Specifically, the three-dimensional data decoding device repeats processes in steps S3484 to S3488 for each three-dimensional point.

First, the three-dimensional data decoding device searches a plurality of surrounding points that are three-dimensional points in the vicinity of a target three-dimensional point to be processed and used for calculating a predicted value of the target three-dimensional point (S3484). This process is the same as that by the three-dimensional data encoding device.

Then, the three-dimensional data decoding device calculates predicted value P of the target three-dimensional point (S3485).

Then, the three-dimensional data decoding device arithmetic-decodes a quantized value from the bitstream (S3486).

The three-dimensional data decoding device also inverse quantizes the decoded quantized value to calculate an inverse quantized value (S3487).

Then, the three-dimensional data decoding device adds the predicted value to the inverse quantized value to generate a decoded value (S3488).

Then, the three-dimensional data decoding device finishes the loop for each three-dimensional point (S3489).

The three-dimensional data decoding device also finishes the loop for each LoD (S3490).

Figure 80:
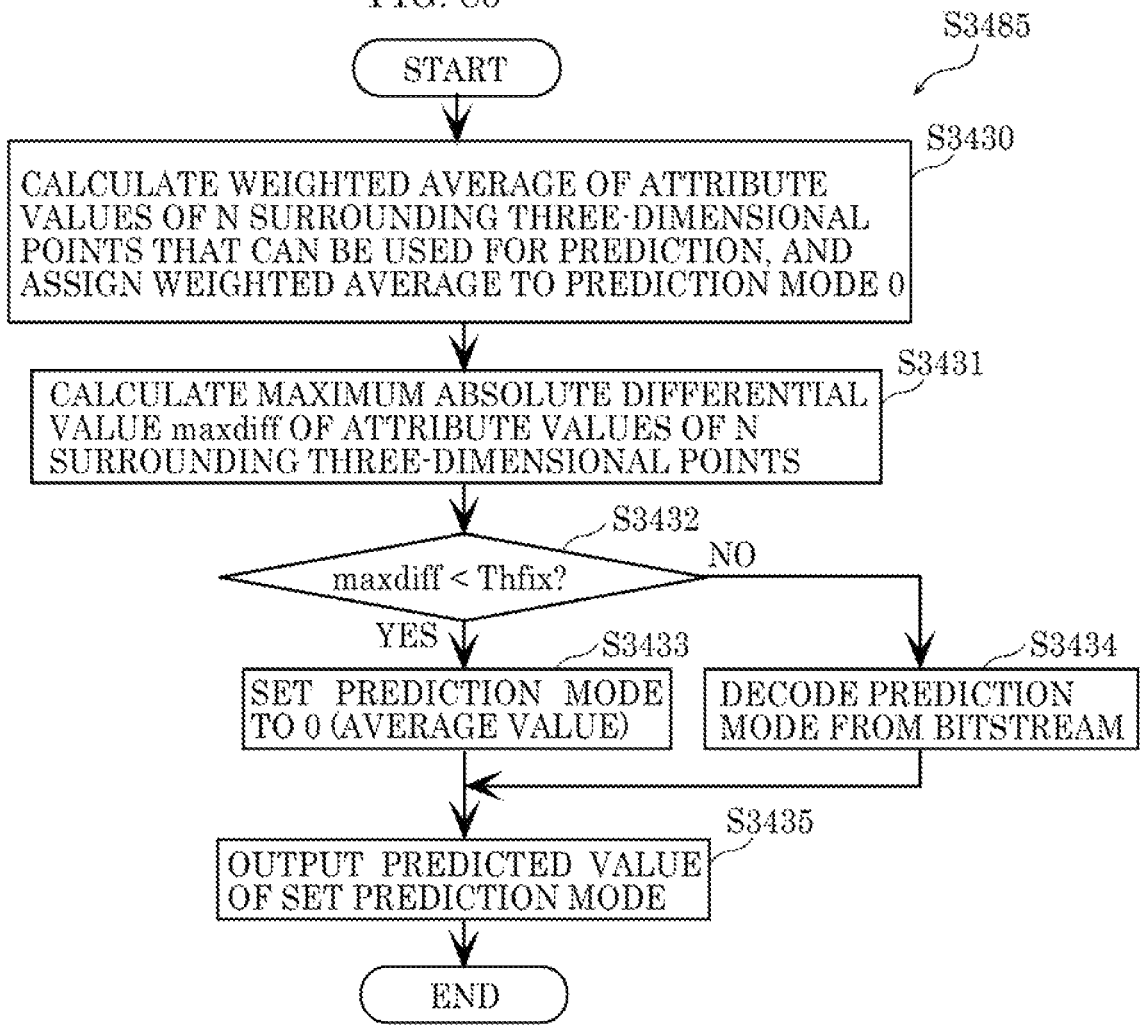
FIG. 80 is a flowchart of a predicted value calculation process by the three-dimensional data decoding device according to Embodiment 4.

FIG. 80 is a flowchart of a predicted value calculation process (S3485) by the three-dimensional data decoding device according to Embodiment 4.

First, the three-dimensional data decoding device calculates a weighted average of attribute values of the N three-dimensional points in the vicinity of the target three-dimensional point to be processed, which can be used for predicting a predicted value of the target three-dimensional point, and assigns the calculated weighted average to a prediction mode indicated by a prediction mode value of "0" (S3430).

Then, the three-dimensional data decoding device performs steps S3431 to S3435 described with reference to FIG. 69 to output a predicted value of the target three-dimensional point.

Instead of performing step S3430, after it is determined Yes in step S3432 or when the prediction mode value decoded in step S3434 is "0", the weighted average of the attribute values of the N three-dimensional points in the vicinity of the target three-dimensional point to be processed, which can be used for predicting a predicted value of the target three-dimensional point, may be calculated as a predicted value. This eliminates the need to calculate the average value in prediction modes other than the prediction mode indicated by the prediction mode value of "0", thereby reducing a processing amount.

Figure 81:
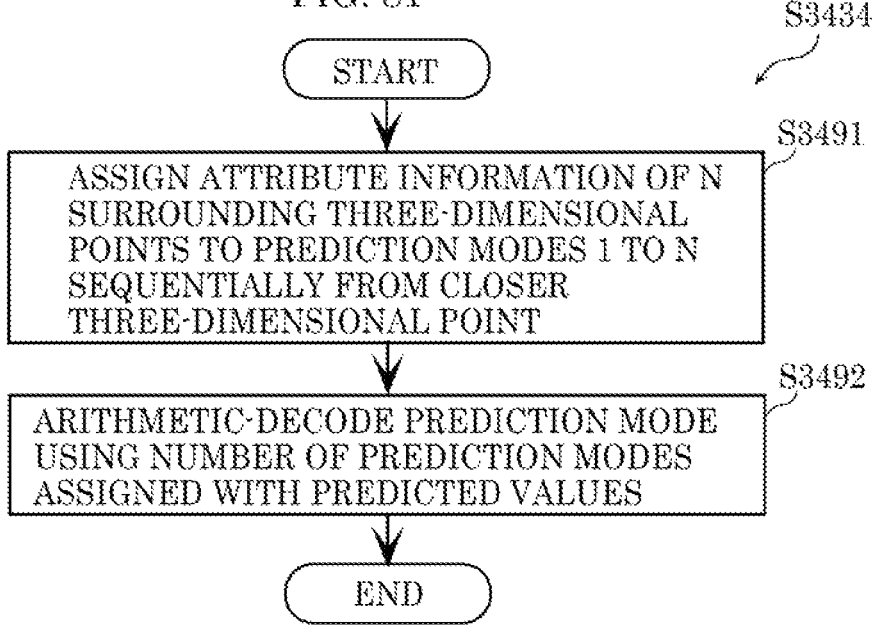
FIG. 81 is a flowchart of a prediction mode decoding process according to Embodiment 4.

FIG. 81 is a flowchart of a prediction mode decoding process (S3434) according to Embodiment 4.

First, the three-dimensional data decoding device assigns attribute information items of the N three-dimensional points in the vicinity of the target three-dimensional point to prediction mode values of "1" to "N" in one increment sequentially from a three-dimensional point closer to the target three-dimensional point (S3491). The prediction mode values of "0" to "N" are assigned, and thus a total of N+1 prediction modes are generated. When N+1 is larger than maximum number M of prediction modes (NumPredMode) appended to the bitstream, the three-dimensional data decoding device may generate up to M prediction modes.

Then, the three-dimensional data decoding device arithmetic-decodes the prediction mode by using the number of prediction modes (S3492). Specifically, the three-dimensional data decoding device may perform steps S3403 and S3404 described with reference to FIG. 63 to arithmetic-decode the prediction mode. The three-dimensional data decoding device may also perform steps S3414 to S3416 described with reference to FIG. 67 to arithmetic-decode the prediction mode.

Figure 82:
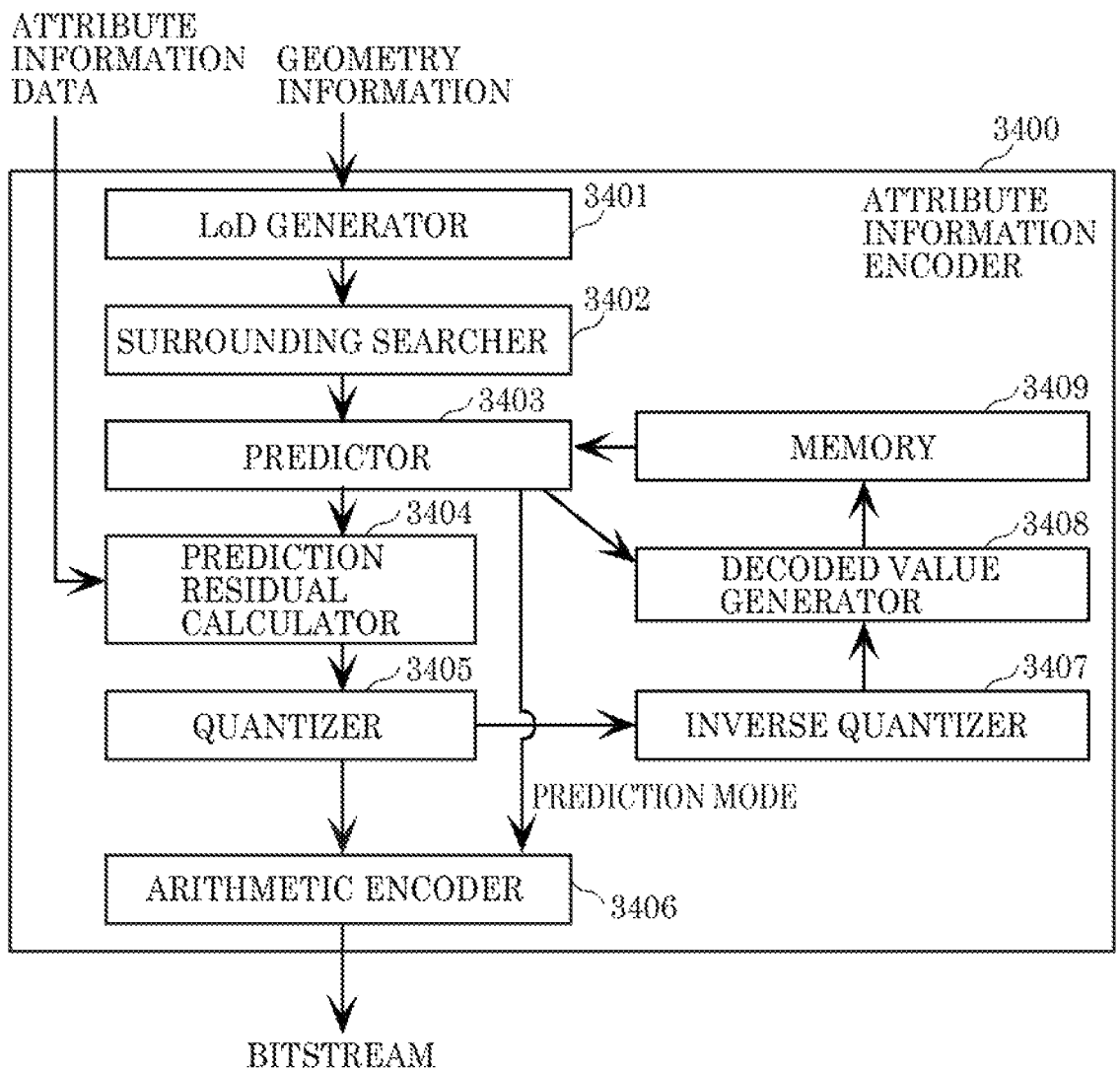
FIG. 82 is a block diagram showing a configuration of an attribute information encoder included in the three-dimensional data encoding device according to Embodiment 4.

FIG. 82 is a block diagram showing a configuration of attribute information encoder 3100 included in the three-dimensional data encoding device according to Embodiment 4. FIG. 82 shows an attribute information encoder in detail among a geometry information encoder, an attribute information item reassigner, and the attribute information encoder included in the three-dimensional data encoding device.

Attribute information encoder 3400 includes LoD generator 3401, surrounding searcher 3402, predictor 3403, prediction residual calculator 3404, quantizer 3405, arithmetic encoder 3406, inverse quantizer 3407, decoded value generator 3408, and memory 3409.

LoD generator 3401 generates LoD by using geometry information (geometry) of a three-dimensional point.

Surrounding searcher 3402 searches a neighboring three-dimensional point adjacent to each three-dimensional point by using an LoD generation result by LoD generator 3401 and distance information indicating a distance between three-dimensional points.

Predictor 3403 generates a predicted value of an attribute information item of a target three-dimensional point to be encoded. Specifically, predictor 3403 assigns predicted values to prediction modes indicated by prediction mode values of "0" to "M−1", and selects a prediction mode. Predictor 3403 outputs the selected prediction mode, specifically, the prediction mode value indicating the prediction mode to the arithmetic encoder. Predictor 3403 performs, for example, the process in step S3455.

Prediction residual calculator 3404 calculates (generates) a prediction residual of the predicted value of the attribute information item generated by predictor 3403. Prediction residual calculator 3404 performs the process in step S3456.

Quantizer 3405 quantizes the prediction residual of the attribute information item calculated by prediction residual calculator 3404.

Arithmetic encoder 3106 arithmetic-encodes the prediction residual quantized by quantizer 3105. Arithmetic encoder 3406 outputs a bitstream including the arithmetic-encoded prediction residual, for example, to the three-dimensional data decoding device.

The prediction residual may be binarized, for example, by quantizer 3405 before arithmetic-encoded by arithmetic encoder 3406. Arithmetic encoder 3406 may generate and encode various header information items (header information). Arithmetic encoder 3406 may also obtain a prediction mode used for encoding from Prediction block, and arithmetic-encode and append the prediction mode to the bitstream.

Inverse quantizer 3407 inverse quantizes the prediction residual quantized by quantizer 3405. Inverse quantizer 3407 performs the process in step S3459.

Decoded value generator 3408 adds the predicted value of the attribute information item generated by predictor 3403 to the prediction residual inverse quantized by inverse quantizer 3407 to generate a decoded value.

Memory 3409 stores a decoded value of an attribute information item of each three-dimensional point decoded by decoded value generator 3408. For example, when generating a predicted value of a three-dimensional point having been not yet encoded, predictor 3403 generates a predicted value by using the decoded value of the attribute information item of each three-dimensional point stored in memory 3409.

Figure 83:
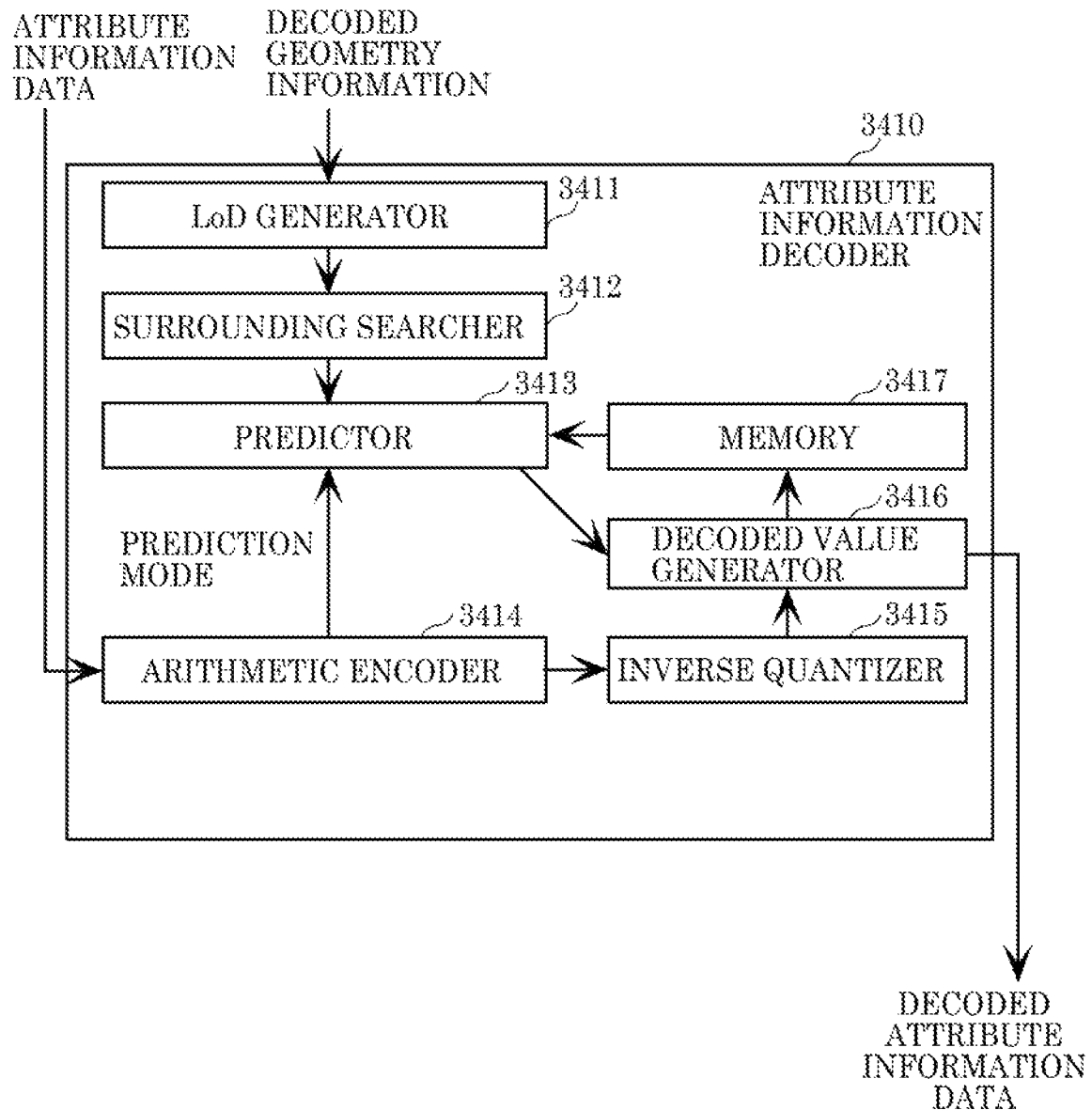
FIG. 83 is a block diagram showing a configuration of an attribute information decoder included in the three-dimensional data decoding device according to Embodiment 4.

FIG. 83 is a block diagram of a configuration of attribute information decoder 3410 included in the three-dimensional data decoding device according to Embodiment 4. FIG. 83 shows an attribute information decoder in detail among a geometry information decoder and the attribute information decoder included in the three-dimensional data decoding device.

Attribute information decoder 3410 includes LoD generator 3411, surrounding searcher 3412, predictor 3413, arithmetic decoder 3414, inverse quantizer 3415, decoded value generator 3416, and memory 3417.

LoD generator 3411 generates LoD by using geometry information (geometry information) of a three-dimensional point decoded by a geometry information decoder (not shown).

Surrounding searcher 3412 searches a neighboring three-dimensional point adjacent to each three-dimensional point by using an LoD generation result by LoD generator 3411 and distance information indicating a distance between three-dimensional points.

Predictor 3413 generates a predicted value of an attribute information item of a target three-dimensional point to be decoded. Predictor 3413 performs, for example, the process in step S3485.

Arithmetic decoder 3414 arithmetic-decodes the prediction residual in the bitstream obtained by attribute information encoder 3400. Arithmetic decoder 3414 may decode various header information items. Arithmetic decoder 3414 may also output an arithmetic-decoded prediction mode to predictor 3413. In this case, predictor 3413 may calculate a predicted value by using the prediction mode obtained by arithmetic decoding by arithmetic decoder 3414.

Inverse quantizer 3415 inverse quantizes the prediction residual arithmetic-decoded by arithmetic decoder 3414.

Decoded value generator 3416 adds the predicted value generated by predictor 3413 and the prediction residual inverse quantized by inverse quantizer 3415 to generate a decoded value. Decoded value generator 3416 outputs decoded attribute information data to any other device.

Memory 3417 stores a decoded value of an attribute information item of each three-dimensional point decoded by decoded value generator 3416. For example, when generating a predicted value of a three-dimensional point having been not yet decoded, predictor 3413 generates a predicted value by using the decoded value of the attribute information item of each three-dimensional point stored in memory 3417;

EMBODIMENT 5

As described above, the three-dimensional data encoding device calculates a maximum absolute differential value of attribute values of N three-dimensional points (surrounding three-dimensional points) in the vicinity of a target three-dimensional point to be encoded, which can be used for prediction by the three-dimensional data encoding device and the three-dimensional data decoding device (that is, a maximum absolute value of a difference between attribute values of any two three-dimensional points among the N three-dimensional points). The three-dimensional data encoding device also switches between fixing a prediction mode in accordance with the calculated maximum absolute differential value, that is, using an arbitrarily predetermined prediction mode, and selecting and appending a prediction mode to the bitstream.

However, the three-dimensional data encoding device needs not switch between fixing a prediction mode in accordance with the maximum absolute differential value, and selecting and appending a prediction mode to the bitstream. For example, the three-dimensional data encoding device may select whether to fix the prediction mode under the condition described above or select the prediction mode, and append the result as a prediction mode fixing flag to the bitstream.

Thus, the three-dimensional data decoding device can decode the prediction mode fixing flag appended to the bitstream to determine whether the three-dimensional data encoding device has fixed the prediction mode or has selected and encoded the prediction mode.

When the three-dimensional data encoding device has fixed the prediction mode, the three-dimensional data decoding device can determine that the prediction mode is not encoded in the bitstream. When the three-dimensional data encoding device has selected the prediction mode, the three-dimensional data decoding device can determine that the prediction mode in the bitstream requires decoding. Thus, the three-dimensional data decoding device can correctly decode the encoded prediction mode included in the bitstream.

Also, the three-dimensional data decoding device can arithmetic-decode the prediction mode without calculating a maximum absolute differential value of attribute values of N three-dimensional points in the vicinity of a target three-dimensional point to be encoded, which can be used for prediction. Thus, the three-dimensional data decoding device can concurrently perform arithmetic-decoding of the bitstream and LoD generation and the like. As a result, the three-dimensional data decoding device can increase throughput of the entire process.

The three-dimensional data encoding device may append a prediction mode fixing flag for each three-dimensional point.

Thus, the three-dimensional data decoding device can switch between fixing the prediction mode and selecting the prediction mode for each three-dimensional point in accordance with the prediction mode fixing flag. Thus, the three-dimensional data encoding device can improve an encoding efficiency.

The three-dimensional data encoding device may set a prediction mode fixing flag for each LoD. For example, the three-dimensional data encoding device sets the prediction mode fixing flag to 0 to select a prediction mode for an upper level, among LoDs, at which prediction is difficult, and sets the prediction mode fixing flag to 1 to fix the prediction mode for a lower level at which prediction is easy. Thus, the three-dimensional data encoding device can reduce an encoding amount for appending the prediction mode.

Figure 84:
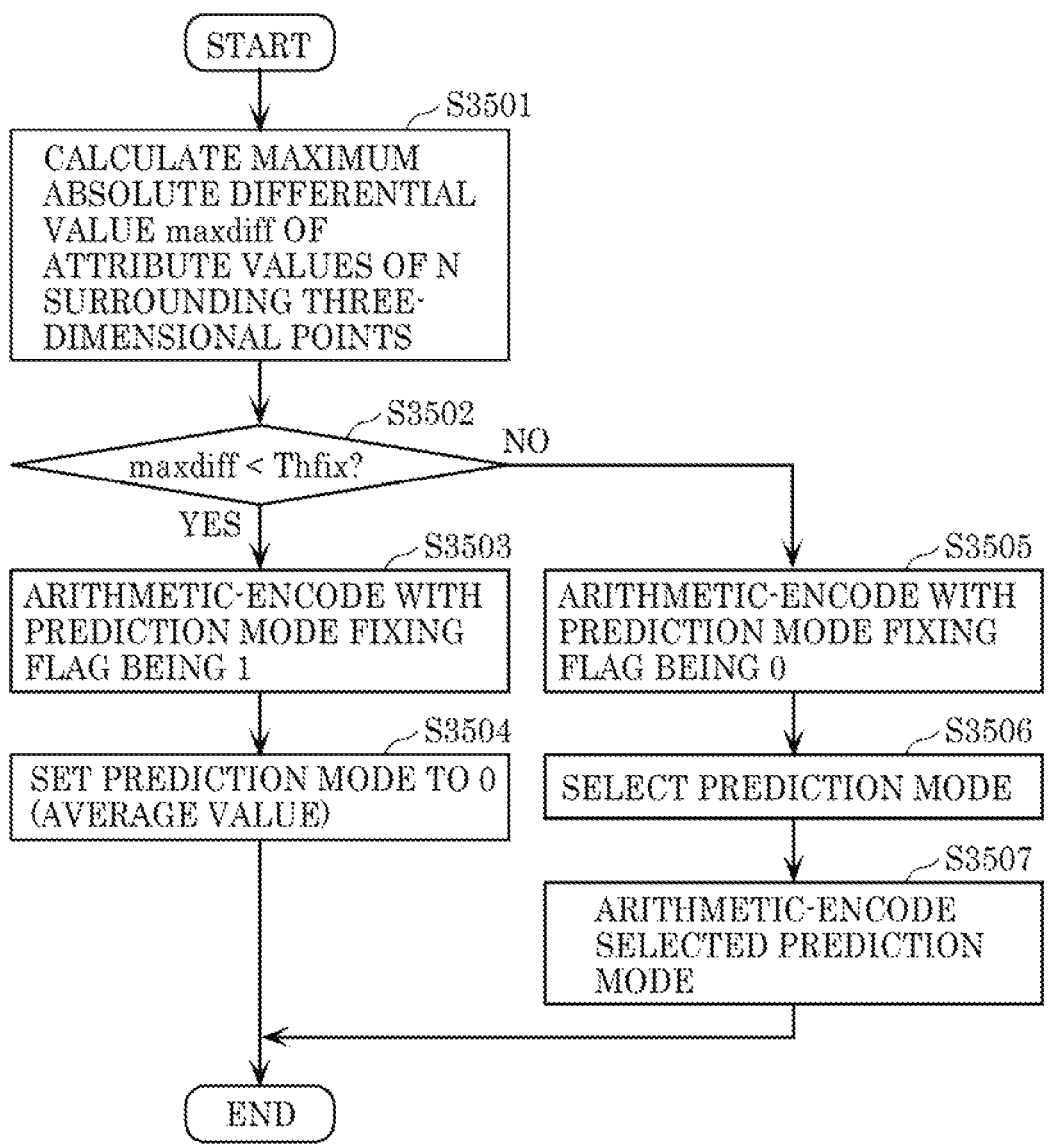
FIG. 84 is a flowchart of a prediction mode determination process performed by a three-dimensional data encoding device according to Embodiment 5.

FIG. 84 is a flowchart of a prediction mode determination process performed by the three-dimensional data encoding device according to this embodiment.

First, the three-dimensional data encoding device calculates maximum absolute differential value maxdiff of attribute values of N three-dimensional points in the vicinity of a target three-dimensional point to be encoded (S3501).

FIG. 85 is a diagram showing an example of a syntax of the prediction mode determination process performed by the three-dimensional data encoding device according to this embodiment. Specifically, FIG. 85 shows an example of a syntax in step S3501 shown in FIG. 84.

In FIG. 85, the attribute values of the N three-dimensional points in the vicinity of the target three-dimensional point to be encoded are denoted by a[0] to a[N−1], and the maximum absolute differential value is denoted by maxdiff. The attribute values of the N three-dimensional points in the vicinity of the target three-dimensional point to be encoded are attribute values encoded by the three-dimensional data encoding device and decoded by the three-dimensional data decoding device.

The three-dimensional data encoding device calculates maximum absolute differential value maxdiff, for example, by the example of the syntax shown in FIG. 85.

The N three-dimensional points in the vicinity of the target three-dimensional point to be encoded, which are used for prediction by the three-dimensional data encoding device, are N encoded and decoded three-dimensional points with a distance from the target three-dimensional point to be encoded shorter than threshold THd.

Here, as described above, the three-dimensional data encoding device may append a maximum value of N as NumNeighborPoint to the bitstream. The value of N needs not match NumNeighborPoint as in the case where the number of encoded and decoded three-dimensional points in attribute information items (pieces of attribute information) of the three-dimensional points in the vicinity of the target three-dimensional point to be encoded is smaller than NumNeighborPoint.

Again with reference to FIG. 84, the three-dimensional data encoding device then determines whether or not maxdiff<Thfix is satisfied (S3502). Thfix is an arbitrarily predetermined constant.

When determining that maxdiff<Thfix is satisfied (Yes in S3502), the three-dimensional data encoding device performs arithmetic-encoding with a prediction mode fixing flag (fixedPredMode) being 1 (S3503).

Then, the three-dimensional data encoding device sets a prediction mode value (PredMode/hereinafter also simply referred to as a prediction mode) to 0 (S3504).

When determining that maxdiff<Thfix is not satisfied (No in S3502), the three-dimensional data encoding device performs arithmetic-encoding with the prediction mode fixing flag being 0 (S3505).

Then, the three-dimensional data encoding device selects a prediction mode (S3506).

Then, the three-dimensional data encoding device arithmetic-encodes the selected prediction mode (S3507).

The example has been given above in which the three-dimensional data encoding device fixes the prediction mode at 0 if the maximum absolute differential value of the attribute values of the three-dimensional points in the vicinity of the target three-dimensional point to be encoded, which are used for prediction, is smaller than Thfix[i], but not limited to this. For example, the three-dimensional data encoding device may fix the prediction mode at any of 0 to M−1.

The three-dimensional data encoding device may append a value of a fixed prediction mode (also referred to as PredMode or mode number) to the bitstream.

Figure 86:
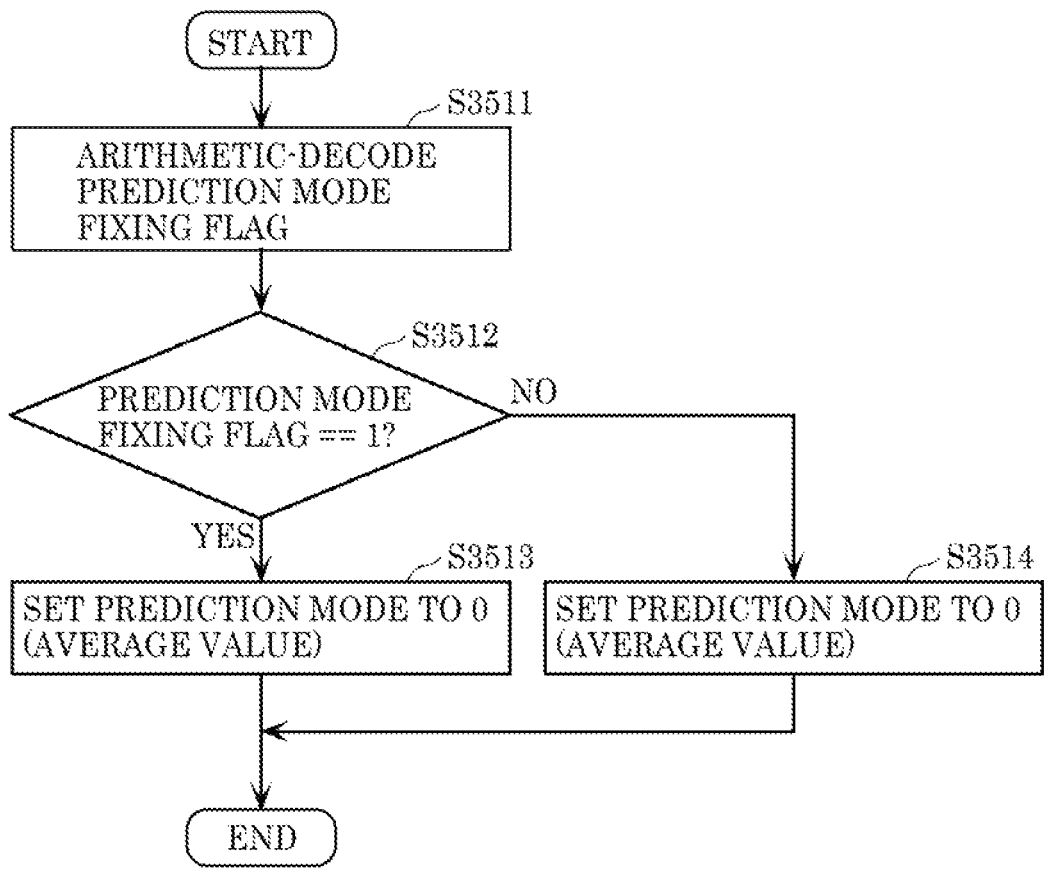
FIG. 86 is a flowchart of a prediction mode determination process performed by a three-dimensional data decoding device according to Embodiment 5.

FIG. 86 is a flowchart of a prediction mode determination process performed by the three-dimensional data decoding device according to this embodiment.

First, the three-dimensional data decoding device arithmetic-decodes an encoded prediction mode fixing flag included in the bitstream (S3511).

Then, the three-dimensional data decoding device determines whether or not the prediction mode fixing flag=1 is satisfied (S3512).

When determining that the prediction mode fixing flag==1 is satisfied (Yes in S3512), the three-dimensional data decoding device sets the prediction mode value to 0 (S3513).

When determining that the prediction mode fixing flag==1 is not satisfied (No in S3512), the three-dimensional data decoding device decodes the prediction mode value from the bitstream and determines the prediction mode value (S3514).

The three-dimensional data decoding device determines a predicted value in accordance with the determined prediction mode.

The prediction mode fixing flag may be provided in any position.

FIG. 87 is a diagram showing an example of a syntax of attribute data when a prediction mode fixing flag is provided for each three-dimensional point.

fixedPredMode is a flag indicating if the three-dimensional data encoding device fixes a prediction mode. For example, when a value of fixedPredMode is 1, the three-dimensional data encoding device may fix a prediction mode, and when the value of fixedPredMode is 0, the three-dimensional data encoding device may select a prediction mode.

fixedPredMode may be also set for each LoD as in FIG. 88.

FIG. 88 is a diagram showing an example of a syntax of attribute data when a prediction mode fixing flag is provided for each LoD.

fixedPredMode[i] is a flag indicating if a prediction mode of level i of LoD is fixed.

PredMode is a value indicating a prediction mode for encoding and decoding an attribute value of a j-th three-dimensional point at level i. PredMode takes any of 0 to M−1 (M is a total number of prediction modes). When PredMode is not in the bitstream (specifically, when !fixedPredMode&&NumPredMode[i]>1 is not satisfied), the three-dimensional data decoding device may estimate PredMode as 0.

When PredMode is not in the bitstream, the three-dimensional data decoding device needs not set PredMode to 0, and may use any of 0 to M−1 as an estimated value.

The three-dimensional data encoding device may separately append, to a header and the like, the estimated value when PredMode is not in the bitstream.

As described above, the three-dimensional data encoding device may binarize PredMode by truncated unary coding using total number M of prediction modes, and arithmetic-encode the binarized value.

The truncated unary coding is one method of binarization. By using the truncated unary coding, for a multivalued signal taking a value other than a maximum value, a signal is generated including the same number of is as indicated by the multivalued signal, with 0 at the end. For a multivalued signal taking a maximum value, the maximum value is previously set, and a signal is generated including the same number of is as indicated by the multivalued signal (without 0 at the end). For example, as described above, when the number of prediction modes is 5, and the three-dimensional data encoding device binarizes each of the prediction modes by using the truncated unary coding, prediction modes 0 to 4 are sequentially represented by 0, 10, 110, 1110, 1111. As such, the three-dimensional data encoding device binarizes the prediction mode by the truncated unary coding using the number of prediction modes (that is, in accordance with the number of prediction modes).

By using the truncated unary coding, for a multivalued signal taking a value other than the maximum value, a signal may be generated including the same number of 0s as indicated by the multivalued signal, with 1 at the end. Specifically, 0(s) and 1(s) described above may be inverted.

The three-dimensional data encoding device may arithmetic-encode, as NumPredMode, the value of total number M of prediction modes, and append NumPredMode to the header.

NumPredMode is a value indicating the total number of prediction modes.

Thus, the three-dimensional data decoding device can decode NumPredMode in the header to calculate total number M of prediction modes, and decode PredMode in accordance with total number M of prediction modes. Thus, the three-dimensional data decoding device can set (generate) LoD, calculate three-dimensional points in the vicinity of a target three-dimensional point to be decoded, which can be used for prediction, and perform arithmetic-decoding of the bitstream without waiting for calculation of the number of prediction modes assigned with predicted values. As a result, the three-dimensional data decoding device can concurrently perform arithmetic-decoding of the bitstream and LoD generation and the like, thereby increasing throughput of the entire process.

An n-bit code is encoded data of a prediction residual of a value of an attribute information item (attribute information). A bit length of the n-bit code depends on a value of R_TH[i]. For example, the bit length is 6 bits when the value of R_TH[i] is 63, and 8 bits when the value of R_TH[i] is 255. Any value of R_TH may be previously set.

A remaining code is encoded data encoded by an Exponential-Golomb code among encoded data of the prediction residual of the value of the attribute information item. The three-dimensional data decoding device decodes the remaining code when the n-bit code is equal to R_TH[i], and adds the value of the n-bit code to the value of the remaining code to decode the prediction residual.

When the n-bit code is not equal to R_TH[i], the three-dimensional data decoding device needs not decode the remaining code.

Figure 89:
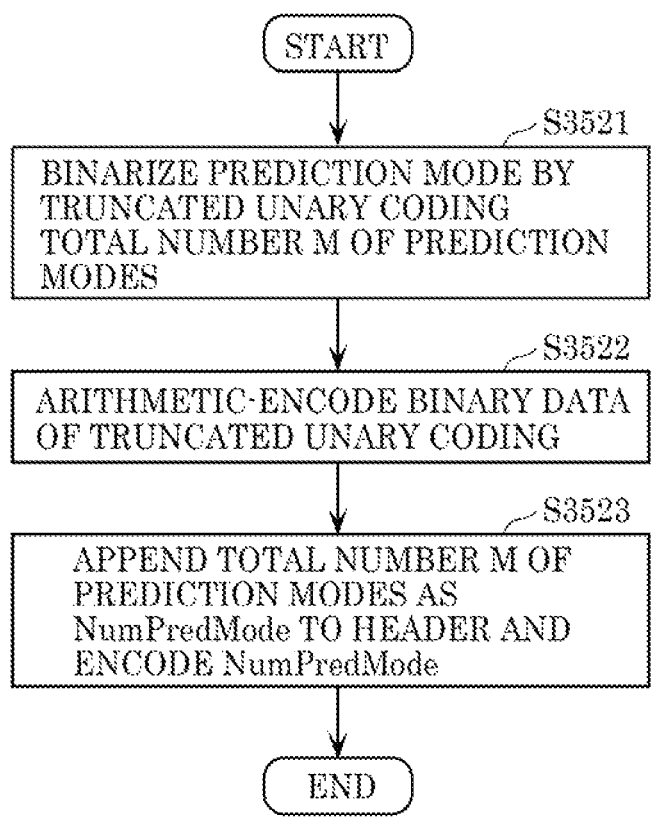
FIG. 89 is a flowchart of an example of a prediction mode encoding process by the three-dimensional data encoding device according to Embodiment 5.

FIG. 89 is a flowchart of an example of a prediction mode encoding process by the three-dimensional data encoding device.

First, the three-dimensional data encoding device binarizes the prediction mode by the truncated unary coding using total number M of prediction modes (S3521).

Then, the three-dimensional data encoding device arithmetic-encodes binary data of the truncated unary coding (S3522).

Then, the three-dimensional data encoding device appends total number M of prediction modes as NumPredMode to the header and encodes NumPredMode (S3523).

The three-dimensional data encoding device transmits a bitstream including, for example, encoded NumPredMode to the three-dimensional data decoding device.

Figure 90:
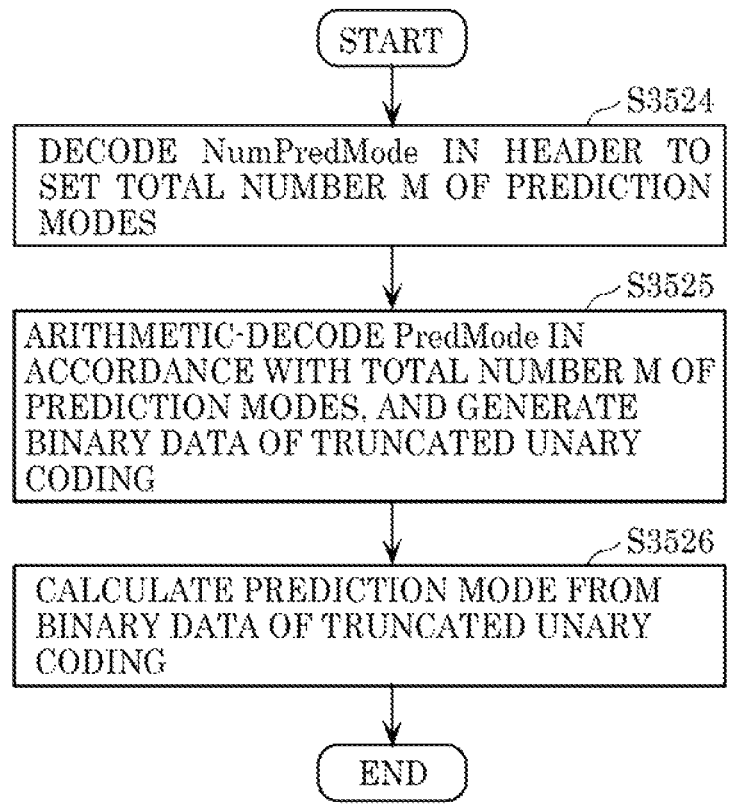
FIG. 90 is a flowchart of an example of a prediction mode decoding process by the three-dimensional data decoding device according to Embodiment 5.

FIG. 90 is a flowchart of an example of a prediction mode decoding process by the three-dimensional data decoding device.

First, the three-dimensional data decoding device decodes encoded NumPredMode included in the bitstream to set total number M of prediction modes (S3524).

Then, the three-dimensional data decoding device arithmetic-decodes encoded PredMode in accordance with decoded total number M of prediction modes, and generates binary data of the truncated unary coding (S3525).

Then, the three-dimensional data decoding device calculates a prediction mode from the binary data of the truncated unary coding (S3526).

The three-dimensional data encoding device may arithmetic-encode fixedPredMode descried above with reference to an encoding table. The three-dimensional data encoding device may update the probability of appearance of 0 and 1 in the encoding table in accordance with a value of actually generated fixedPredMode. The three-dimensional data encoding device may fix the probability of appearance of 0 and 1 in either of encoding tables. Thus, the three-dimensional data encoding device can reduce an update frequency of the probability of appearance of 0 and 1 in the encoding table to reduce a processing amount.

Figure 91:
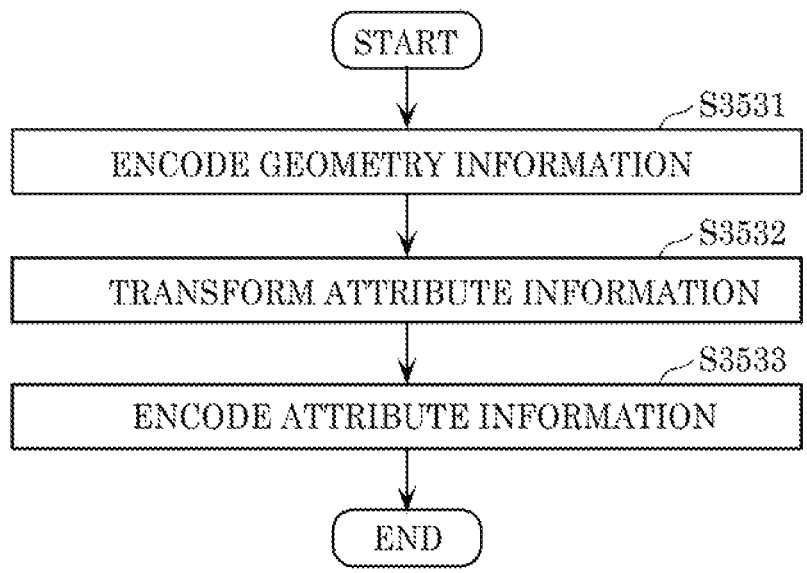
FIG. 91 is a flowchart of a three-dimensional data encoding process by the three-dimensional data encoding device according to Embodiment 5.

FIG. 91 is a flowchart of a three-dimensional data encoding process by the three-dimensional data encoding device according to this embodiment.

First, the three-dimensional data encoding device encodes geometry information (geometry) (S3531). For example, the three-dimensional data encoding device may perform encoding by using an octree representation.

Then, when a position of a three-dimensional point is changed by quantization or the like after encoding of the geometry information, the three-dimensional data encoding device reassigns an attribute information item of an original three-dimensional point to the three-dimensional point after change (S3532).

The three-dimensional data encoding device may perform reassignment by interpolating a value of the attribute information item in accordance with a change amount of the position. For example, the three-dimensional data encoding device may detect N three-dimensional points before change in the vicinity of a target three-dimensional point to be encoded, which are close to the three-dimensional position after change. Then, the three-dimensional data encoding device may perform weighted averaging of values of attribute information items of the detected N three-dimensional points in accordance with a distance from the target three-dimensional position to be encoded after change to each of the N three-dimensional points, and set the weighted average value as a value of an attribute information item of the three-dimensional point after change. When two or more three-dimensional points are changed to the same three-dimensional position by quantization or the like, the three-dimensional data encoding device may assign an average value of attribute information items of two or more three-dimensional points before change as a value of an attribute information item of a three-dimensional point after change.

Then, the three-dimensional data encoding device encodes the attribute information item (Attribute) after reassignment (S3533). For example, the three-dimensional data encoding device may sequentially encode a plurality of attribute information items.

Also, for example, when encoding a color and a reflectance as attribute information items, the three-dimensional data encoding device may generate a bitstream appended with a color encoding result followed by a reflectance encoding result.

The three-dimensional data encoding device may append the encoding results of the attribute information items to the bitstream in any order. The three-dimensional data encoding device may append, to the header and the like, an encoded data start location of each attribute information item in the bitstream.

Thus, the three-dimensional data decoding device can decode an attribute information item that requires decoding. As a result, the three-dimensional data decoding device can omit a decoding process of an attribute information item that does not require decoding, thereby reducing a processing amount.

The three-dimensional data encoding device may concurrently encode a plurality of attribute information items, and combine encoding results into one bitstream.

Thus, the three-dimensional data encoding device can quickly encode the plurality of attribute information items.

Figure 92:
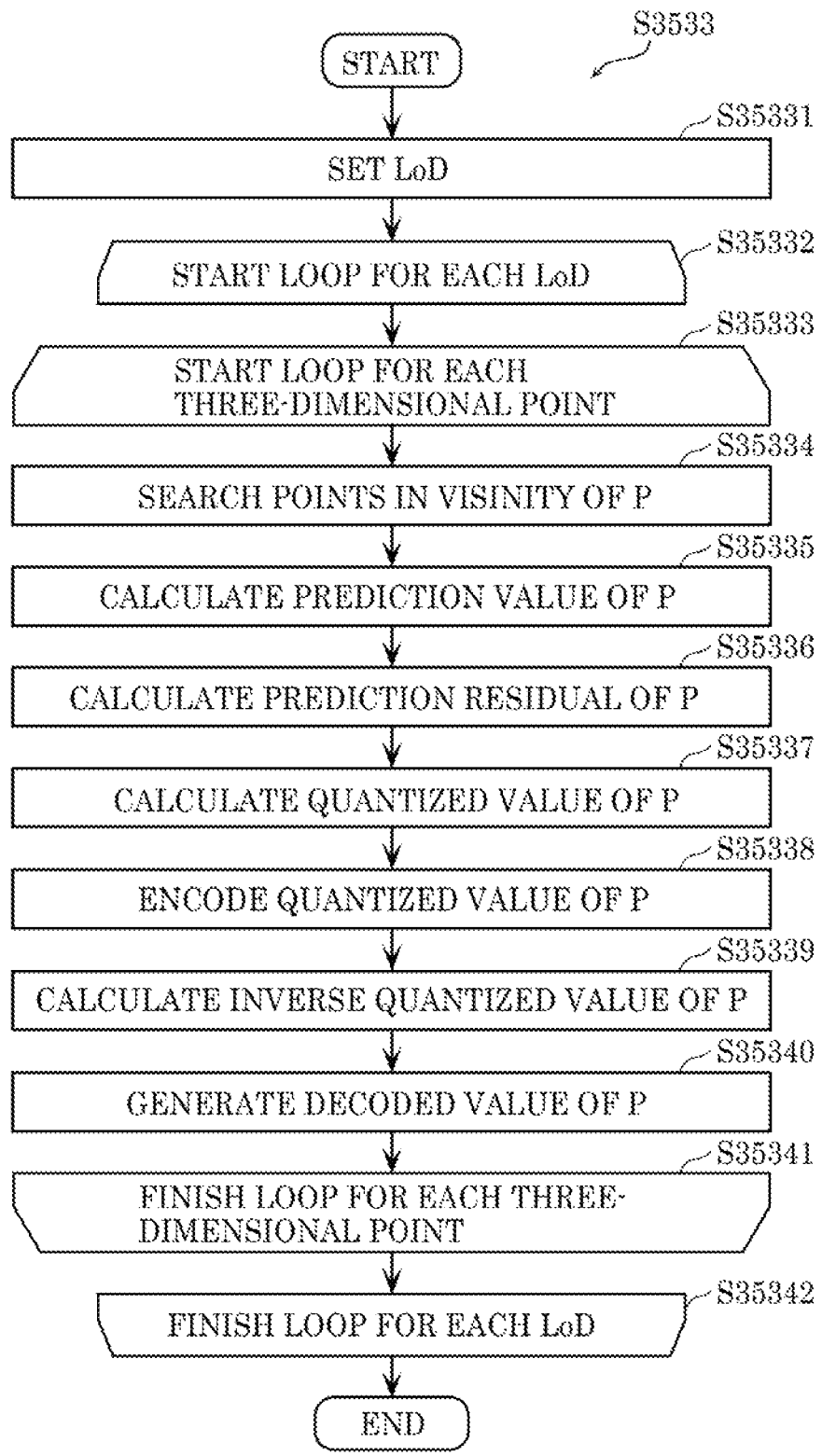
FIG. 92 is a flowchart of an attribute information encoding process shown in FIG. 91.

FIG. 92 is a flowchart of an attribute information item encoding process (S3533) shown in FIG. 91.

First, the three-dimensional data encoding device sets LoD (S35331). Specifically, the three-dimensional data encoding device assigns each three-dimensional point to any of a plurality of LoDs.

Then, the three-dimensional data encoding device starts a loop for each LoD (S35332). Specifically, the three-dimensional data encoding device repeats processes in steps S35333 to S35341 for each LoD.

Then, the three-dimensional data encoding device starts a loop for each three-dimensional point (S35333). Specifically, the three-dimensional data encoding device repeats processes in steps S35334 to S35340 for each three-dimensional point at a certain LoD. FIG. 92 shows encoding of target three-dimensional point P to be encoded.

Then, the three-dimensional data encoding device searches a plurality of surrounding points that are three-dimensional points in the vicinity of target three-dimensional point P to be processed and used for calculating a predicted value of target three-dimensional point P (S35334).

Then, the three-dimensional data encoding device calculates a predicted value of target three-dimensional point P (S35335).

Then, the three-dimensional data encoding device calculates, as a prediction residual, a difference between an attribute information item of target three-dimensional point P and the predicted value (S35336).

Then, the three-dimensional data encoding device quantizes the prediction residual to calculate a quantized value (S35337).

Then, the three-dimensional data encoding device arithmetic-encodes the quantized value (S35338).

Then, the three-dimensional data encoding device inverse quantizes the quantized value to calculate an inverse quantized value (S35339).

Then, the three-dimensional data encoding device adds the predicted value to the inverse quantized value to generate a decoded value (S35340).

Then, the three-dimensional data encoding device finishes the loop for each three-dimensional point (S35341).

The three-dimensional data encoding device also finishes the loop for each LoD (S35342).

Figure 93:
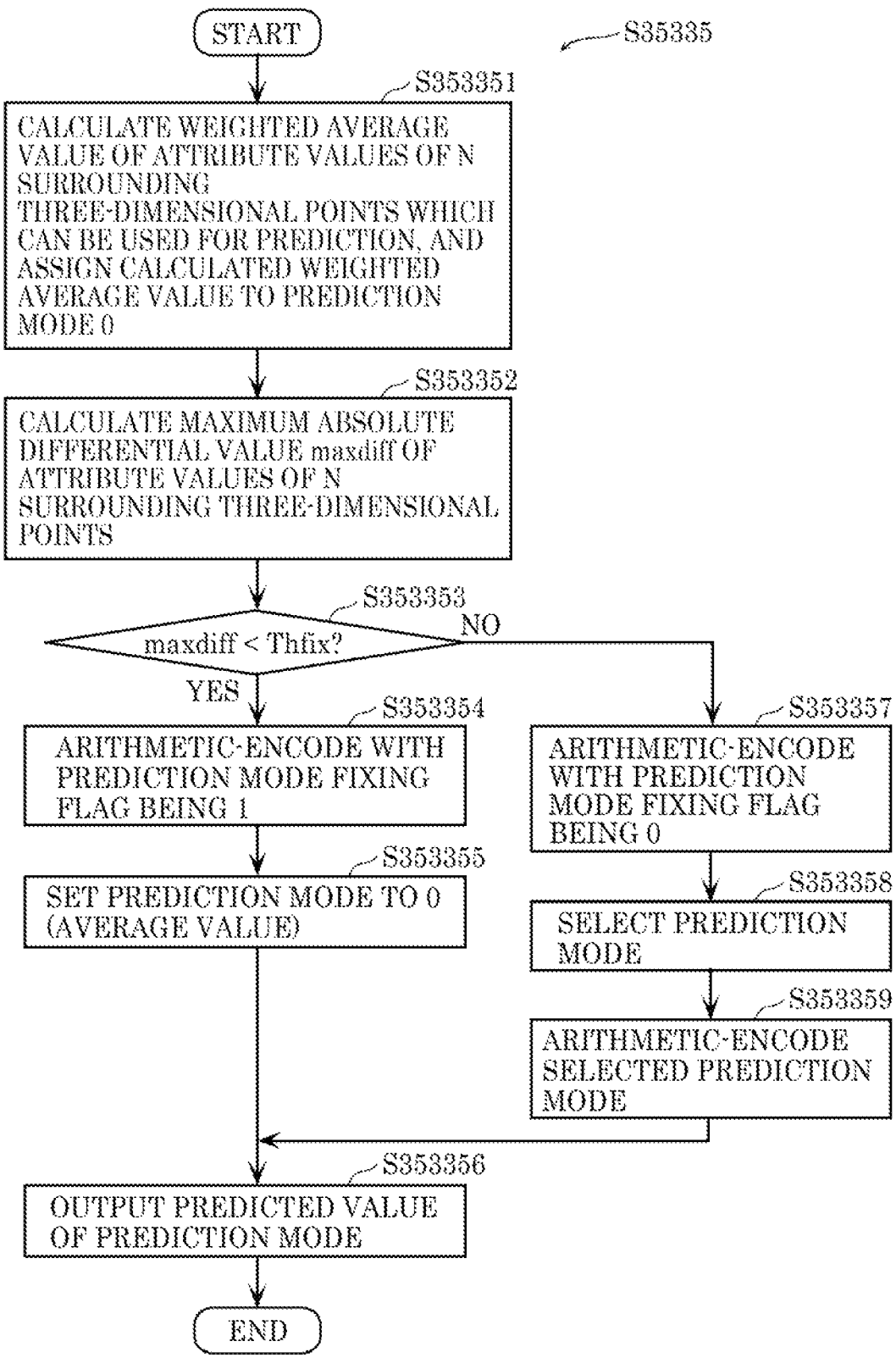
FIG. 93 is a flowchart of a predicted-value calculation process shown in FIG. 92.

FIG. 93 is a flowchart of a predicted-value calculation process (S35335) shown in FIG. 92.

First, the three-dimensional data encoding device calculates a weighted average value of attribute values of the N three-dimensional points in the vicinity of the target three-dimensional point to be encoded, which can be used for prediction, and assigns the calculated weighted average value to prediction mode 0 (S353351).

Then, the three-dimensional data encoding device calculates maximum absolute differential value maxdiff of the attribute values of the N three-dimensional points in the vicinity of the target three-dimensional point to be encoded (S353352).

Then, the three-dimensional data encoding device determines whether or not maximum absolute differential value maxdiff<Thfix is satisfied (S353353).

When determining that maximum absolute differential value maxdiff<Thfix is satisfied (Yes in S353353), the three-dimensional data encoding device performs arithmetic-encoding with a prediction mode fixing flag being 1 (S353354).

Then, the three-dimensional data encoding device sets the prediction mode to 0 (prediction mode for indicating the weighted average value as a predicted value) (S353355).

Then, the three-dimensional data encoding device arithmetic-encodes the predicted value of the set prediction mode, and outputs the predicted value to, for example, the three-dimensional data decoding device (S353356).

When determining that maximum absolute differential value maxdiff<Thfix is not satisfied (No in S353353), the three-dimensional data encoding device performs arithmetic-encoding with the prediction mode fixing flag being 0 (S353357).

Then, the three-dimensional data encoding device selects and determines a prediction mode (S353358).

Then, the three-dimensional data encoding device arithmetic-encodes the selected and determined prediction mode (S353359).

As described above, the three-dimensional data encoding device may binarize prediction mode PredMode by truncated unary coding using total number M of prediction modes and arithmetic-encode PredMode. The three-dimensional data encoding device may encode total number M of prediction modes as NumPredMode and append NumPredMode to the header.

Thus, the three-dimensional data decoding device can decode NumPredMode in the header, thereby correctly decoding prediction mode PredMode.

When NumPredMode is 1, the three-dimensional data encoding device needs not encode PredMode. Thus, the three-dimensional data encoding device can reduce an encoding amount when NumPredMode is 1.

Figure 94:
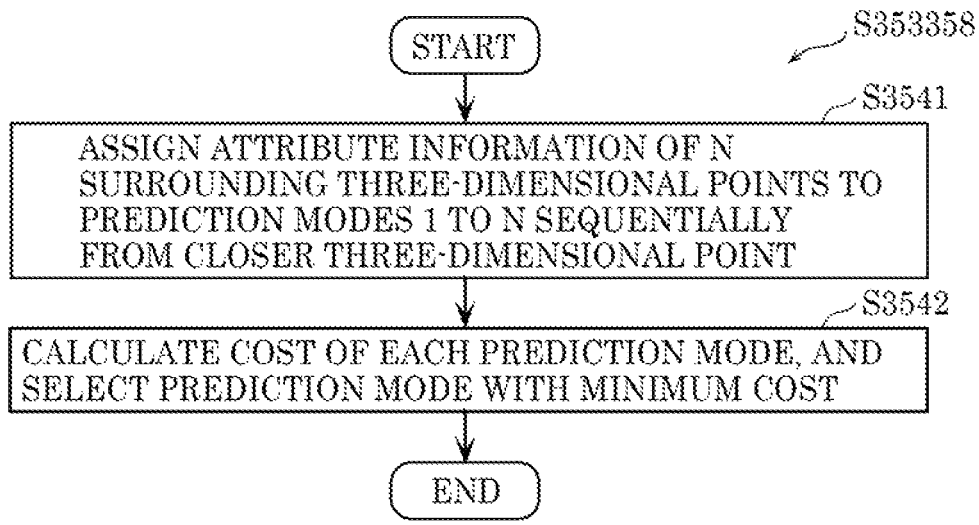
FIG. 94 is a flowchart of a prediction mode selection process shown in FIG. 93.

FIG. 94 is a flowchart of a prediction mode selection process (S353358) shown in FIG. 93.

First, the three-dimensional data encoding device assigns attribute information items of the N three-dimensional points in the vicinity of the target three-dimensional point to be encoded to prediction modes 1 to N sequentially from a three-dimensional point closer to the target three-dimensional point (S3541). For example, the three-dimensional data encoding device generates N+1 prediction modes. When N+1 is larger than total number M of prediction modes (NumPredMode) appended to the bitstream, the three-dimensional data encoding device may generate up to M prediction modes.

Then, the three-dimensional data encoding device calculates cost of each prediction mode, and selects a prediction mode with minimum cost (S3542).

Figure 95:
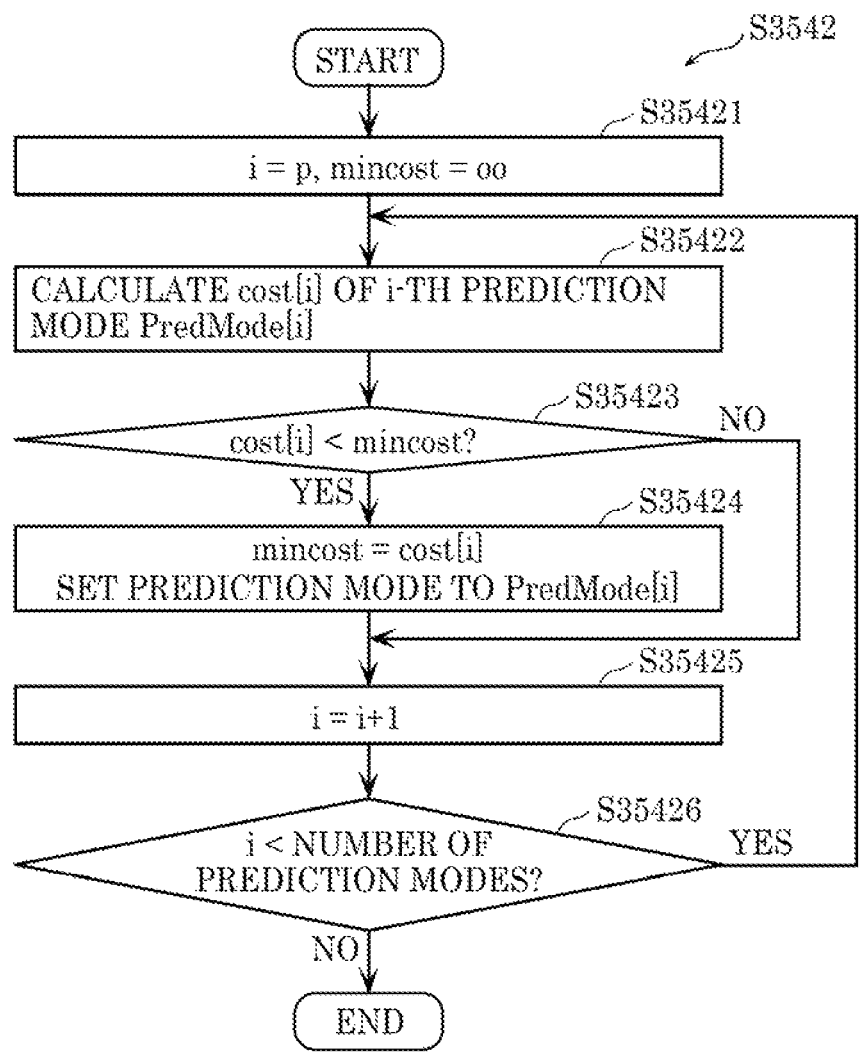
FIG. 95 is a flowchart of a specific example of the prediction mode selection process shown in FIG. 94.

FIG. 95 is a flowchart of a specific example of the prediction mode selection process (S3542) shown in FIG. 94.

First, the three-dimensional data encoding device sets i=0 and mincost=∞ (S35421).

Then, the three-dimensional data encoding device calculates cost (cost[i]) of i-th prediction mode PredMode[i] (S35422).

Then, the three-dimensional data encoding device determines whether or not cost[i]<mincost is satisfied (S35423).

Then, when determining that cost[i]<mincost is satisfied (Yes in S35423), the three-dimensional data encoding device sets mincost=cost[i], and sets the prediction mode to PredMode[i](S35424).

Following step S35424 or when determining that cost[i]<mincost is not satisfied (No in S35423), the three-dimensional data encoding device sets i=i+1 (S35425).

Then, the three-dimensional data encoding device determines whether or not i<the number of prediction modes (total number of prediction modes) is satisfied (S35426).

When determining that i<the number of prediction modes is not satisfied (No in S35426), the three-dimensional data encoding device finishes the selection process. When determining that i<the number of prediction modes is satisfied (Yes in S35426), the three-dimensional data encoding device returns the process to step S35422.

Figure 96:
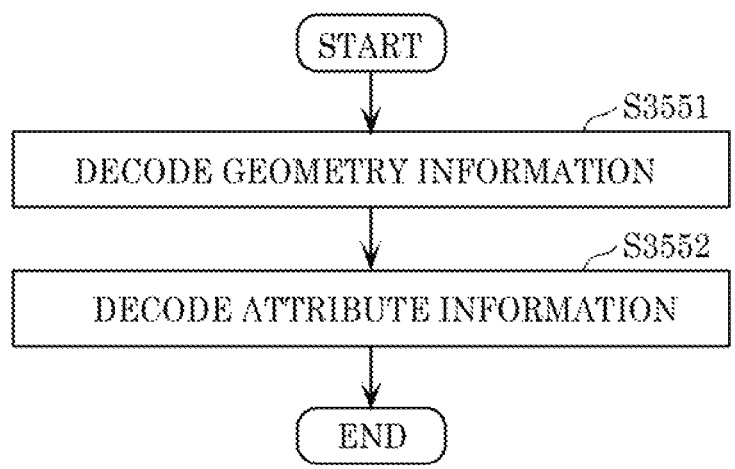
FIG. 96 is a flowchart of a three-dimensional data decoding process by the three-dimensional data decoding device according to Embodiment 5.

FIG. 96 is a flowchart of a three-dimensional data decoding process by the three-dimensional data decoding device according to this embodiment.

The three-dimensional data decoding device decodes geometry information (geometry) of an encoded three-dimensional point (S3551). For example, the three-dimensional data decoding device may decode the geometry information by using an octree representation.

Then, the three-dimensional data decoding device decodes an attribute information item of the encoded three-dimensional point (S3552).

The three-dimensional data decoding device may sequentially decode a plurality of attribute information items. For example, when decoding a color and a reflectance as attribute information items, the three-dimensional data decoding device may decode a bitstream appended with a color encoding result followed by a reflectance encoding result in this order.

The three-dimensional data decoding device may decode the encoding results of the attribute information items appended to the bitstream in any order.

The three-dimensional data decoding device may obtain an encoded data start location of each attribute information item in the bitstream by decoding the header and the like.

Thus, the three-dimensional data decoding device can decode an attribute information item that requires decoding. As a result, the three-dimensional data decoding device can omit a decoding process of an attribute information item that does not require decoding, thereby reducing a processing amount.

The three-dimensional data decoding device may concurrently decode a plurality of attribute information items, and combine decoding results into one three-dimensional point cloud.

Thus, the three-dimensional data decoding device can quickly decode the plurality of attribute information items.

Figure 97:
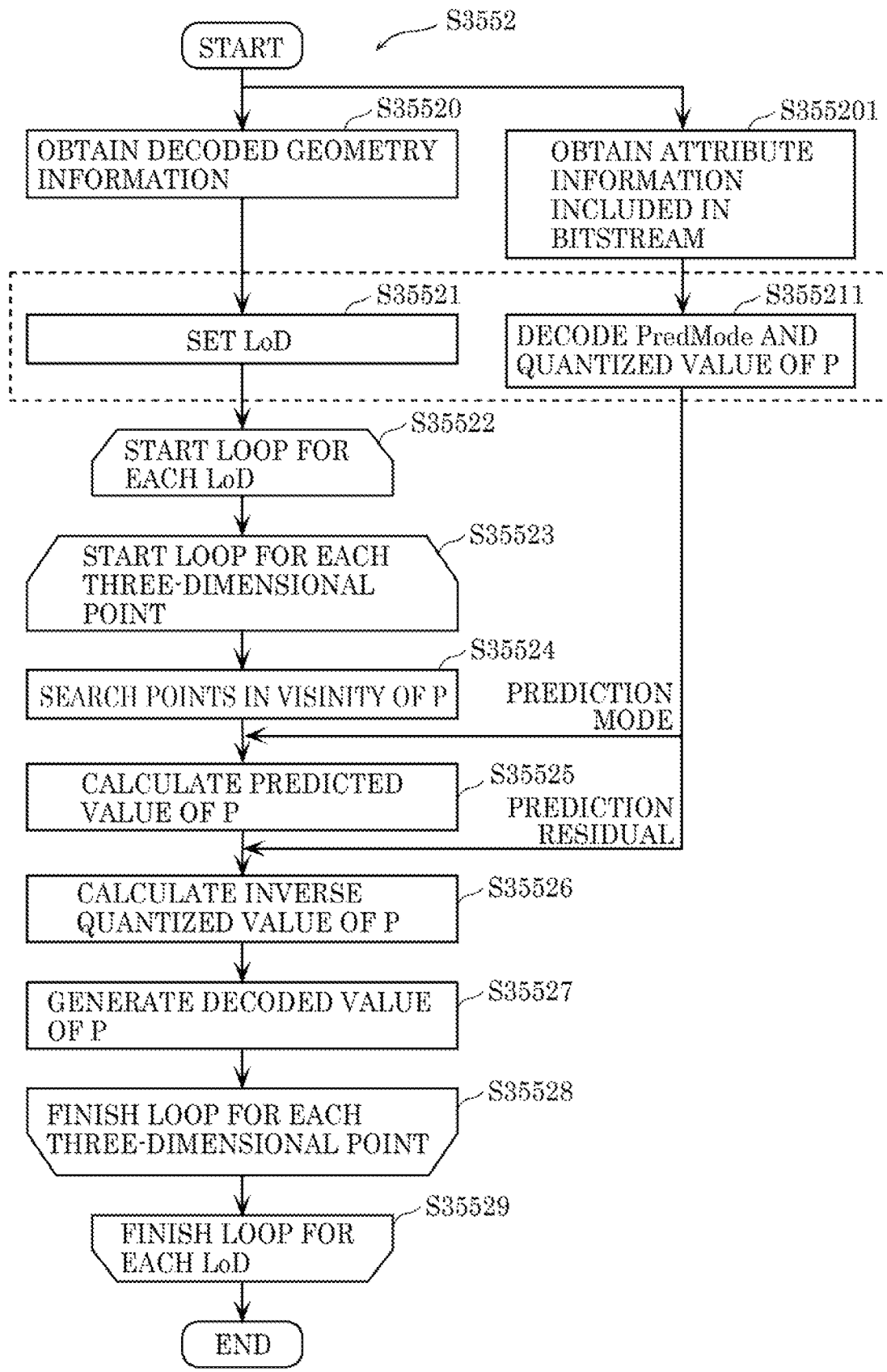
FIG. 97 is a flowchart of a predicted-value calculation process shown in FIG. 96.

FIG. 97 is a flowchart of a calculation process of a predicted value of P (S3552) shown in FIG. 96.

First, the three-dimensional data decoding device obtains decoded geometry information of a three-dimensional point included in the bitstream (S35520). Specifically, the three-dimensional data decoding device decodes encoded geometry information of a three-dimensional point included in the bitstream transmitted from the three-dimensional data encoding device, and thus obtains the decoded geometry information.

Then, the three-dimensional data decoding device sets LoD (S35521). Specifically, the three-dimensional data decoding device assigns each three-dimensional point to any of a plurality of LoDs.

Then, the three-dimensional data decoding device starts a loop for each LoD (S35522). Specifically, the three-dimensional data decoding device repeats processes in steps S35523 to S35528 for each LoD.

The three-dimensional data decoding device obtains an attribute information item included in the bitstream concurrently with, for example, the processes in step S35520 and thereafter (S355201).

The three-dimensional data decoding device decodes PredMode and a quantized value of P (S355211).

For example, in steps in the dashed-line encircled portion (more specifically, steps S35521 and step S355211) in FIG. 97, the three-dimensional data decoding device can append the number of three-dimensional points NumOfPoint for each LoD to the header and the like, and thus independently perform a decoding process of PredMode in the bitstream and a process of calculating three-dimensional points in the vicinity of a target three-dimensional point to be decoded, which can be used for prediction after LoD generation. Thus, the three-dimensional data decoding device can independently perform LoD generation and searching of a neighboring point of P, and an arithmetic-decoding process of PredMode, an n-bit code, and a remaining code (decoding of PredMode and quantized value of P). Thus, the three-dimensional data decoding device may concurrently perform the processes.

Thus, the three-dimensional data decoding device can reduce time for the entire process.

Then, the three-dimensional data decoding device starts a loop for each three-dimensional point (S35523). Specifically, the three-dimensional data decoding device repeats processes in steps S35524 to S35527 for each three-dimensional point at a certain LoD. FIG. 97 shows decoding of target three-dimensional point P to be decoded.

Then, the three-dimensional data decoding device searches a plurality of surrounding points that are three-dimensional points in the vicinity of target three-dimensional point P to be processed and used for calculating a predicted value of target three-dimensional point P (S35524).

Then, the three-dimensional data decoding device calculates a predicted value of target three-dimensional point P in accordance with PredMode (that is, a prediction mode value) decoded in step S355211 (S35525).

Then, the three-dimensional data decoding device inverse quantizes a quantized value in accordance with a quantized value of P decoded in step S355211 to calculate an inverse quantized value (S35526).

Then, the three-dimensional data decoding device adds the predicted value to the inverse quantized value to generate a decoded value (S35527).

Then, the three-dimensional data decoding device finishes the loop for each three-dimensional point (S35528).

The three-dimensional data decoding device also finishes the loop for each LoD (S35529).

Figure 98:
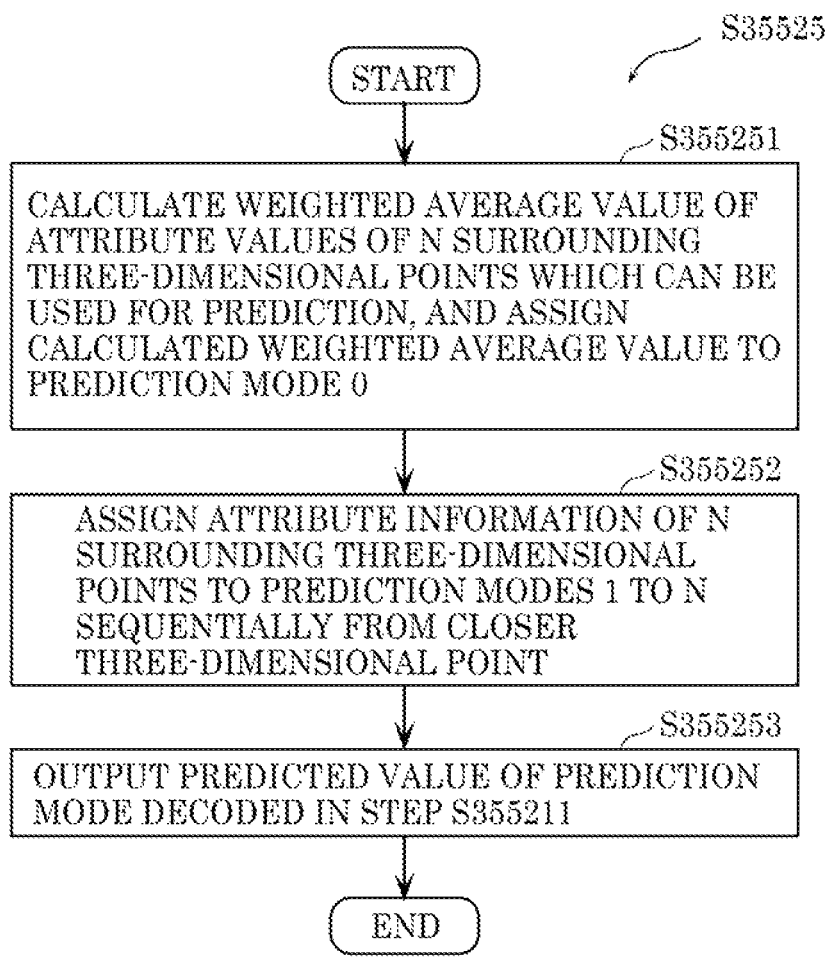
FIG. 98 is a flowchart of details of the predicted-value calculation process shown in FIG. 97.

FIG. 98 is a flowchart of details of the calculation process of the predicted value of P (S35525) shown in FIG. 97.

First, the three-dimensional data decoding device calculates a weighted average value of attribute values of the N three-dimensional points in the vicinity of the target three-dimensional point to be decoded, which can be used for prediction, and assigns the calculated weighted average value to prediction mode 0 (S355251).

Then, the three-dimensional data decoding device assigns attribute information items of the N three-dimensional points to prediction modes 1 to N sequentially from a three-dimensional point closer to the target three-dimensional point to be decoded (S355252).

Then, the three-dimensional data decoding device outputs the predicted value of the prediction mode decoded in step S355211 shown in FIG. 97 (S355253).

The three-dimensional data encoding device may calculate a weighted average value of attribute values of the N three-dimensional points in the vicinity of the target three-dimensional point to be encoded after setting the prediction mode to 0, that is, when maxdiff<Thfix is true or the decoded prediction mode is 0.

Thus, when the prediction mode is other than 0, the three-dimensional data decoding device needs not calculate a weighted average value. Thus, the three-dimensional data decoding device can reduce a processing amount.

Figure 99:
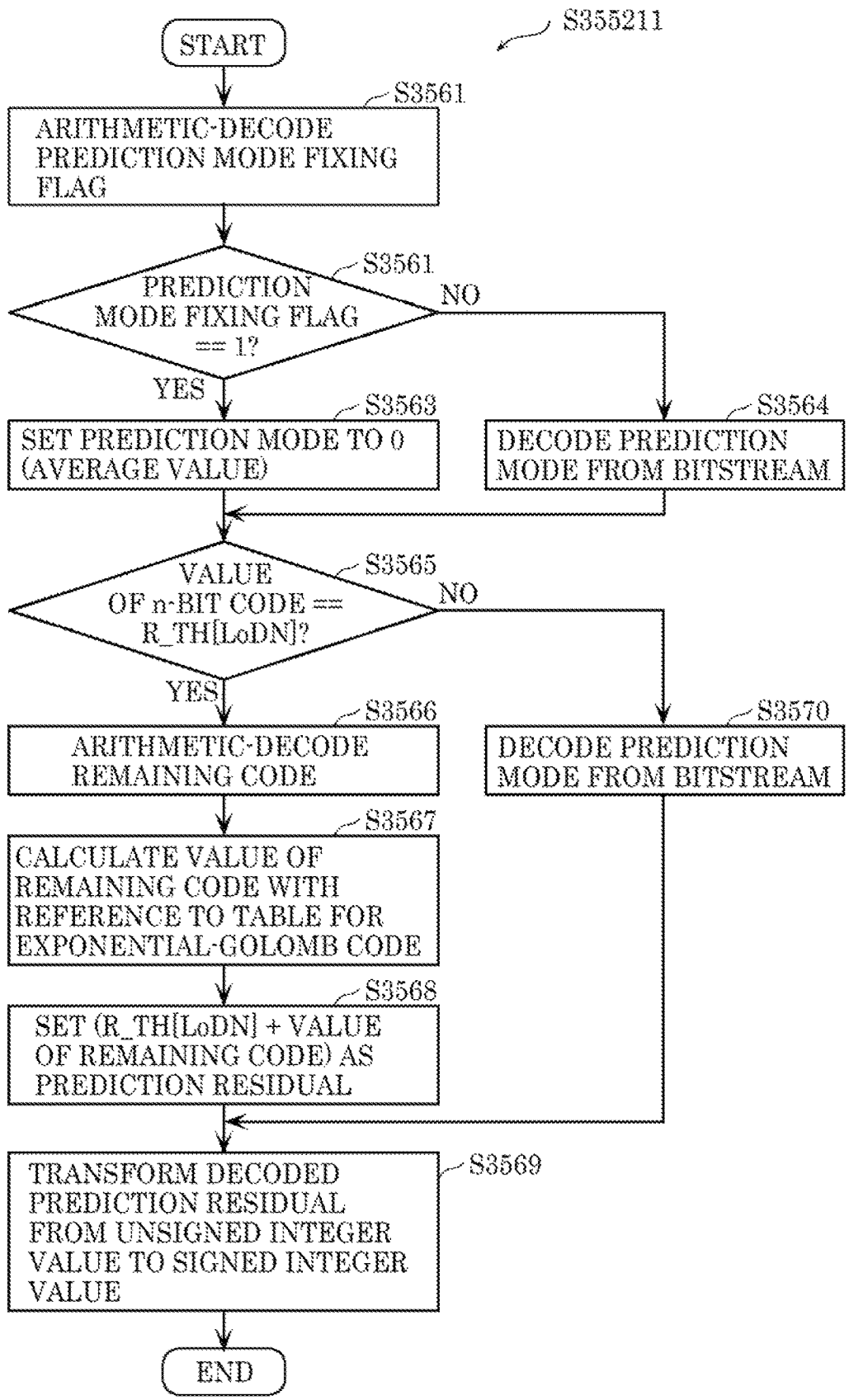
FIG. 99 is a flowchart of a calculation process of a prediction mode and a quantized value shown in FIG. 98.

FIG. 99 is a flowchart of a calculation process of a prediction mode and a quantized value of P (S355211) shown in FIG. 98.

First, the three-dimensional data decoding device arithmetic-decodes a prediction mode fixing flag (S3561).

Then, the three-dimensional data decoding device determines whether or not the arithmetic-decoded prediction mode fixing flag==1 is satisfied (S3562).

Then, when determining that the prediction mode fixing flag==1 is satisfied (Yes in S3562), the three-dimensional data decoding device fixes the prediction mode at 0 (weighted average value) (S3563).

When determining that the prediction mode fixing flag=1 is not satisfied (No in S3562), the three-dimensional data decoding device decodes the prediction mode from the bitstream (S3564).

As described above, the three-dimensional data decoding device may arithmetic-decode prediction mode PredMode in accordance with total number M of prediction modes obtained by decoding the header of the bitstream.

When total number M of prediction modes is 1, the three-dimensional data decoding device may estimate PredMode as 0 without decoding PredMode.

Then, the three-dimensional data decoding device determines whether or not a value of an n-bit code==R_TH [LoDN] is satisfied (S3565).

When determining that the value of the n-bit code==R_TH[LoDN] is satisfied (Yes in S3565), the three-dimensional data decoding device arithmetic-decodes a remaining code (S3566).

Then, the three-dimensional data decoding device calculates a value of the remaining code with reference to a table for an Exponential-Golomb code (S3567).

Then, the three-dimensional data decoding device sets (R_TH[LoDN]+value of remaining code) as a prediction residual (S3568).

Then, the three-dimensional data decoding device transforms the decoded prediction residual from an unsigned integer value to a signed integer value (S3569).

When determining that the value of the n-bit code==R_TH[LoDN] is not satisfied (No in S3565), the three-dimensional data decoding device decodes the prediction mode from the bitstream (S3570), and performs step S3569.

As described above, the three-dimensional data encoding device calculates a maximum absolute differential value of attribute values of N three-dimensional points in the vicinity of a target three-dimensional point to be encoded, which can be used for prediction by the three-dimensional data encoding device and the three-dimensional data decoding device. The three-dimensional data encoding device also switches between fixing a prediction mode in accordance with the calculated maximum absolute differential value and selecting and appending a prediction mode to the bitstream.

However, the three-dimensional data encoding device needs not switch between fixing a prediction mode in accordance with the maximum absolute differential value, and selecting and appending a prediction mode to the bitstream. For example, the three-dimensional data encoding device may always select a prediction mode and append the prediction mode to the bitstream.

Thus, the three-dimensional data decoding device can always decode the prediction mode appended to the bitstream, thereby correctly decoding the bitstream.

Also, the three-dimensional data decoding device can arithmetic-decode the prediction mode without calculating a maximum absolute differential value of attribute values of N three-dimensional points in the vicinity of a target three-dimensional point to be decoded, which can be used for prediction. Thus, the three-dimensional data decoding device can concurrently perform arithmetic-decoding of the bitstream and LoD generation and the like. As a result, the three-dimensional data decoding device can increase throughput of the entire process.

When total number M of prediction modes is 1, the three-dimensional data decoding device can estimate the prediction mode value as 0 without reference to the value. Thus, when total number M of prediction modes is 1, the three-dimensional data encoding device needs not append the prediction mode to the bitstream.

Thus, the three-dimensional data encoding device can reduce an encoding amount when total number M of prediction modes is 1.

Figure 100:
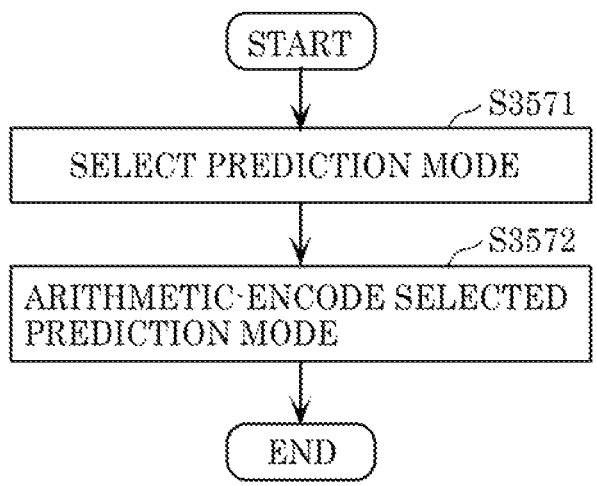
FIG. 100 is a flowchart of a process when the three-dimensional data encoding device does not fix a prediction mode according to Embodiment 5.

FIG. 100 is a flowchart of a process when the three-dimensional data encoding device does not fix a prediction mode according to this embodiment.

First, the three-dimensional data encoding device selects a prediction mode (S3571).

Then, the three-dimensional data encoding device arithmetic-encodes the selected prediction mode (S3572).

Figure 101:
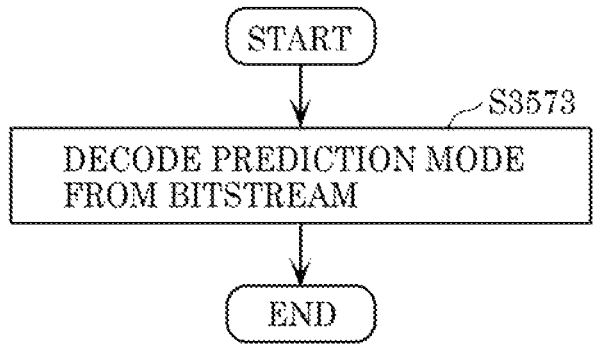
FIG. 101 is a flowchart of a process when the three-dimensional data decoding device does not fix a prediction mode according to Embodiment 5.

FIG. 101 is a flowchart of a process when the three-dimensional data decoding device does not fix a prediction mode according to this embodiment.

The three-dimensional data decoding device decodes the prediction mode from the bitstream (S3573).

The three-dimensional data encoding device may always select a prediction mode by any method. For example, Thfix[i]=0 in the example of the syntax may be used. Thus, the three-dimensional data encoding device can always append PredMode to the bitstream because a minimum value of maxdiff is 0.

For the three-dimensional data encoding device to always append PredMode to the bitstream, Thfix[i] may be any value as long as maxdiff≥Thfix[i] is true.

FIG. 102 is a diagram showing another example of a syntax of attribute data according to this embodiment.

PredMode is a value indicating a prediction mode for encoding and decoding an attribute value of a j-th three-dimensional point at level i of LoD. PredMode takes any of 0 to M−1 (M is a total number of prediction modes).

When PredMode is not in the bitstream (specifically, NumPredMode[i]>1 is not satisfied), the three-dimensional data decoding device may estimate PredMode as 0.

When PredMode is not in the bitstream, the three-dimensional data decoding device needs not set PredMode to 0, and may use any of 0 to M−1 as an estimated value.

The three-dimensional data encoding device may separately append, to the header and the like, the estimated value when PredMode is not in the bitstream.

As described above, the three-dimensional data encoding device may binarize PredMode by truncated unary coding using total number M of prediction modes, and arithmetic-encode the binarized value.

The three-dimensional data encoding device may encode, as NumPredMode, the value of total number M of prediction modes, and append NumPredMode to the header of the bitstream.

Thus, the three-dimensional data decoding device can decode NumPredMode in the header to calculate total number M of prediction modes, and decode PredMode in accordance with total number M of prediction modes. As a result, the three-dimensional data decoding device can generate LoD, calculate three-dimensional points in the vicinity of a target three-dimensional point to be decoded, which can be used for prediction, and perform arithmetic-decoding of the bitstream without waiting for calculation of the number of prediction modes assigned with predicted values.

Thus, the three-dimensional data decoding device can concurrently perform arithmetic-decoding of the bitstream and LoD generation and the like. As a result, the three-dimensional data decoding device can increase throughput of the entire process.

An n-bit code is encoded data of a prediction residual of a value of an attribute information item. A bit length of the n-bit code depends on a value of R_TH[i]. For example, the bit length is 6 bits when the value of R_TH[i] is 63, and 8 bits when the value of R_TH[i] is 255.

A remaining code is encoded data encoded by an Exponential-Golomb code among encoded data of the prediction residual of the value of the attribute information item. The three-dimensional data decoding device decodes the remaining code when the n-bit code is equal to R_TH[i], and adds the value of the n-bit code to the value of the remaining code to decode the prediction residual.

When the n-bit code is not equal to R_TH[i], the three-dimensional data decoding device needs not decode the remaining code.

Figure 103:
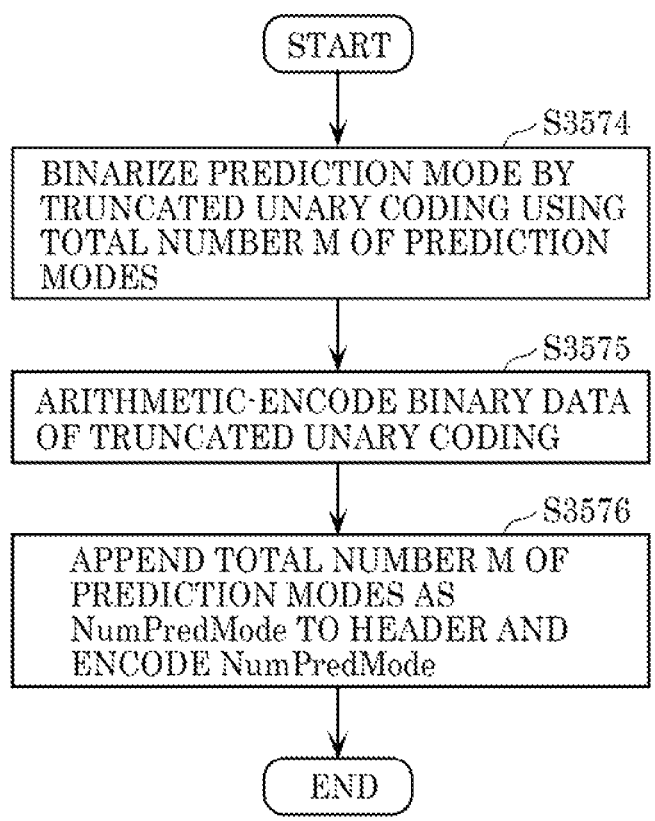
FIG. 103 is a flowchart of an example of a prediction mode encoding process by the three-dimensional data encoding device according to Embodiment 5.

FIG. 103 is a flowchart of an example of a prediction mode encoding process by the three-dimensional data encoding device according to this embodiment.

First, the three-dimensional data encoding device binarizes the prediction mode by the truncated unary coding using total number M of prediction modes (S3574).

Then, the three-dimensional data encoding device arithmetic-encodes binary data of the truncated unary coding (S3575).

Then, the three-dimensional data encoding device appends total number M of prediction modes as NumPredMode to the header and encodes NumPredMode (S3576).

Figure 104:
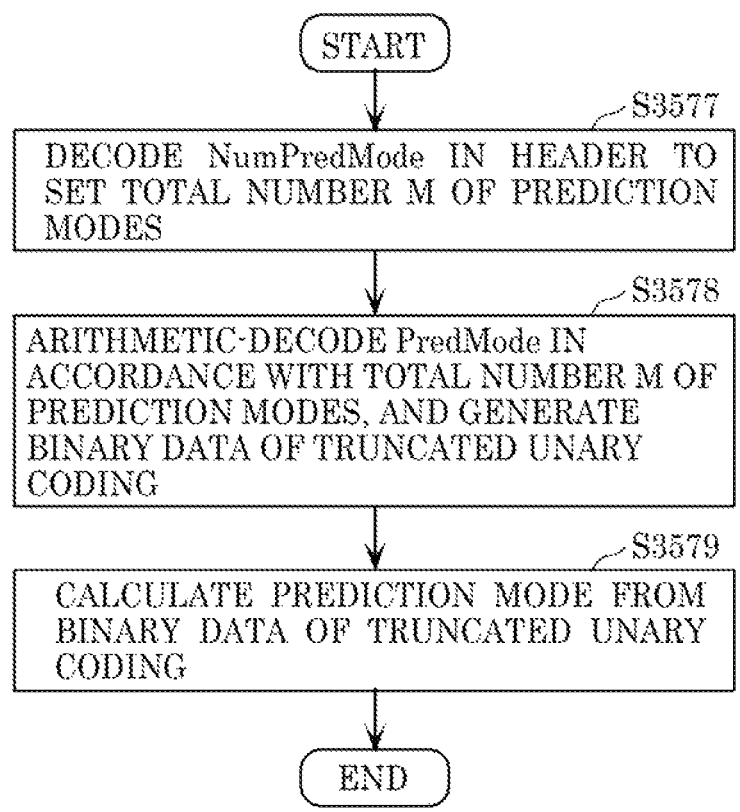
FIG. 104 is a flowchart of a prediction mode decoding process by the three-dimensional data decoding device according to Embodiment 5.

FIG. 104 is a flowchart of an example of a prediction mode decoding process by the three-dimensional data decoding device according to this embodiment.

First, the three-dimensional data decoding device decodes encoded NumPredMode included in the bitstream to set total number M of prediction modes (S3577).

Then, the three-dimensional data decoding device arithmetic-decodes encoded PredMode in accordance with decoded total number M of prediction modes, and generates binary data of the truncated unary coding (S3578).

Then, the three-dimensional data decoding device calculates a prediction mode from the binary data of the truncated unary coding (S3579).

Figure 105:
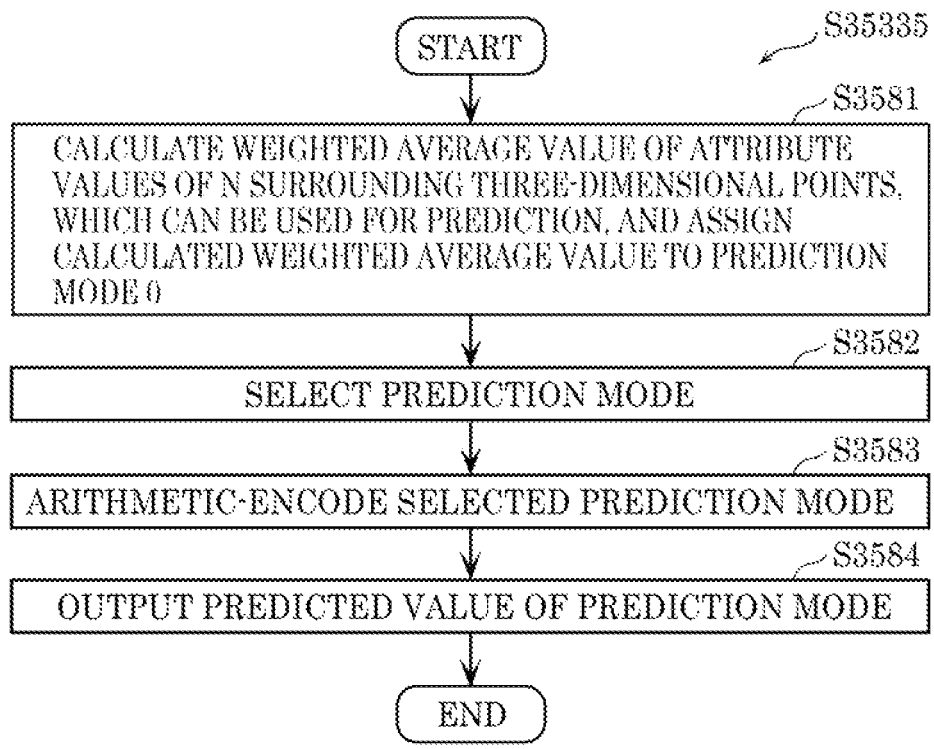
FIG. 105 is a flowchart of another example of the predicted-value calculation process shown in FIG. 92.

FIG. 105 is a flowchart of another example of the predicted-value calculation process (step S35335) shown in FIG. 92.

First, the three-dimensional data encoding device calculates a weighted average value of attribute values of the N three-dimensional points in the vicinity of the target three-dimensional point to be encoded, which can be used for prediction, and assigns the calculated weighted average value to prediction mode 0 (S3581).

Then, the three-dimensional data encoding device selects and determines a prediction mode (S3582).

Then, the three-dimensional data encoding device arithmetic-encodes the selected and determined prediction mode (S3583).

The three-dimensional data encoding device outputs a predicted value of the determined prediction mode (S3584).

As described above, the three-dimensional data encoding device may binarize prediction mode PredMode in accordance with total number M of prediction modes and arithmetic-encodes PredMode. The three-dimensional data encoding device may encode total number M of prediction modes as NumPredMode and append NumPredMode to the header.

Thus, the three-dimensional data decoding device can decode NumPredMode in the header, thereby correctly decoding prediction mode PredMode.

When NumPredMode is 1, the three-dimensional data encoding device needs not encode PredMode.

Thus, the three-dimensional data encoding device can reduce an encoding amount when NumPredMode is 1.

Figure 106:
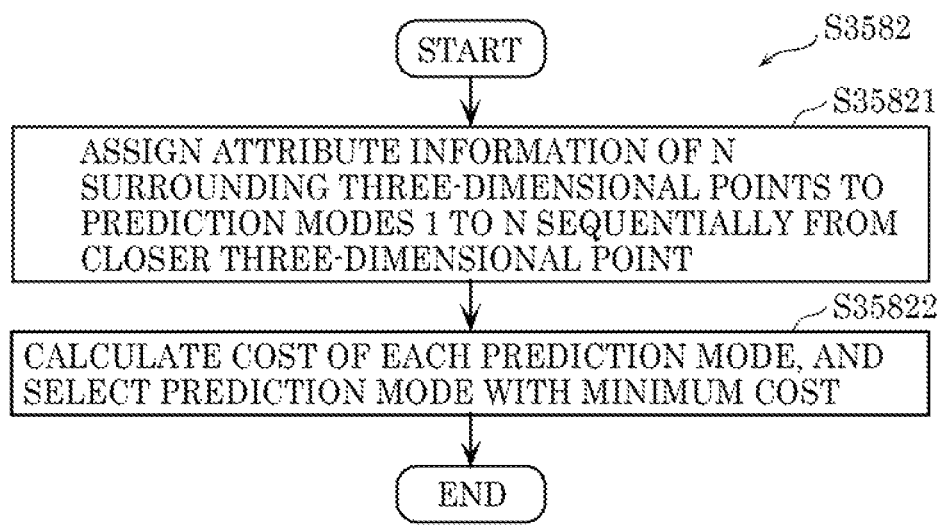
FIG. 106 is a flowchart of a prediction mode selection process shown in FIG. 105.

FIG. 106 is a flowchart of a prediction mode selection process (S3582) shown in FIG. 105.

First, the three-dimensional data encoding device assigns attribute information items of the N three-dimensional points in the vicinity of the target three-dimensional point to be encoded to prediction modes 1 to N sequentially from a three-dimensional point closer to the target three-dimensional point (S35821). For example, the three-dimensional data encoding device generates N+1 prediction modes. When N+1 is larger than total number M of prediction modes (NumPredMode) appended to the bitstream, the three-dimensional data encoding device may generate up to M prediction modes.

Then, the three-dimensional data encoding device calculates cost of each prediction mode, and selects a prediction mode with minimum cost (S35822).

Figure 107:
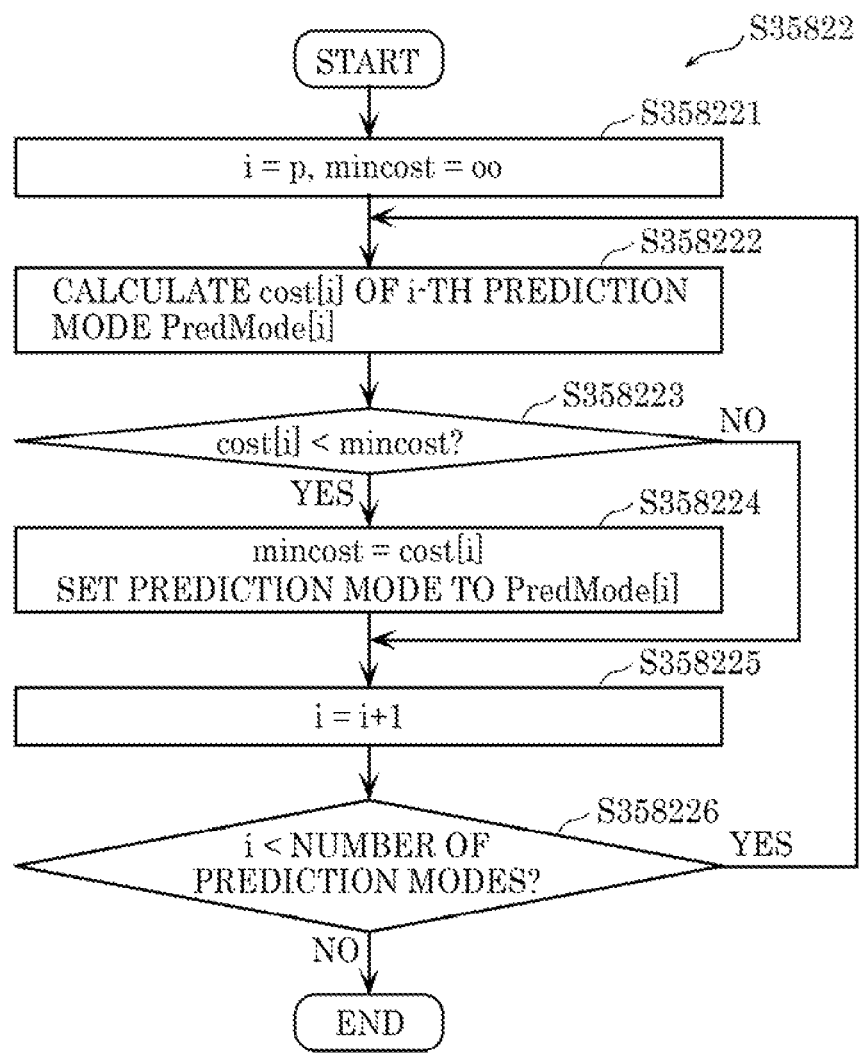
FIG. 107 is a flowchart of a specific example of the prediction mode selection process shown in FIG. 106.

FIG. 107 is a flowchart of a specific example of a prediction mode selection process (S35822) shown in FIG. 106.

First, the three-dimensional data encoding device sets i=0 and mincost=∞ (S358221).

Then, the three-dimensional data encoding device calculates cost[i] of i-th prediction mode PredMode[i] (S358222).

Then, the three-dimensional data encoding device determines whether or not cost[i]<mincost is satisfied (S358223).

Then, when determining that cost[i]<mincost is satisfied (Yes in S358223), the three-dimensional data encoding device sets mincost=cost[i], and sets the prediction mode to PredMode[i] (S358224).

Following step S358224 or when determining that cost[i]<mincost is not satisfied (No in S358223), the three-dimensional data encoding device sets i=i+1 (S358225).

Then, the three-dimensional data encoding device determines whether or not i<the number of prediction modes is satisfied (S358226).

When determining that i<the number of prediction modes is not satisfied (No in S358226), the three-dimensional data encoding device finishes the selection process. When determining that i<the number of prediction modes is satisfied (Yes in S358226), the three-dimensional data encoding device returns the process to step S358222.

When the number of three-dimensional points in the vicinity of the target three-dimensional point to be encoded is N, the three-dimensional data encoding device generates N+1 prediction modes. When N+1 is larger than total number M of prediction modes (NumPredMode) appended to the bitstream, the three-dimensional data encoding device may generate up to M prediction modes.

Figure 108:
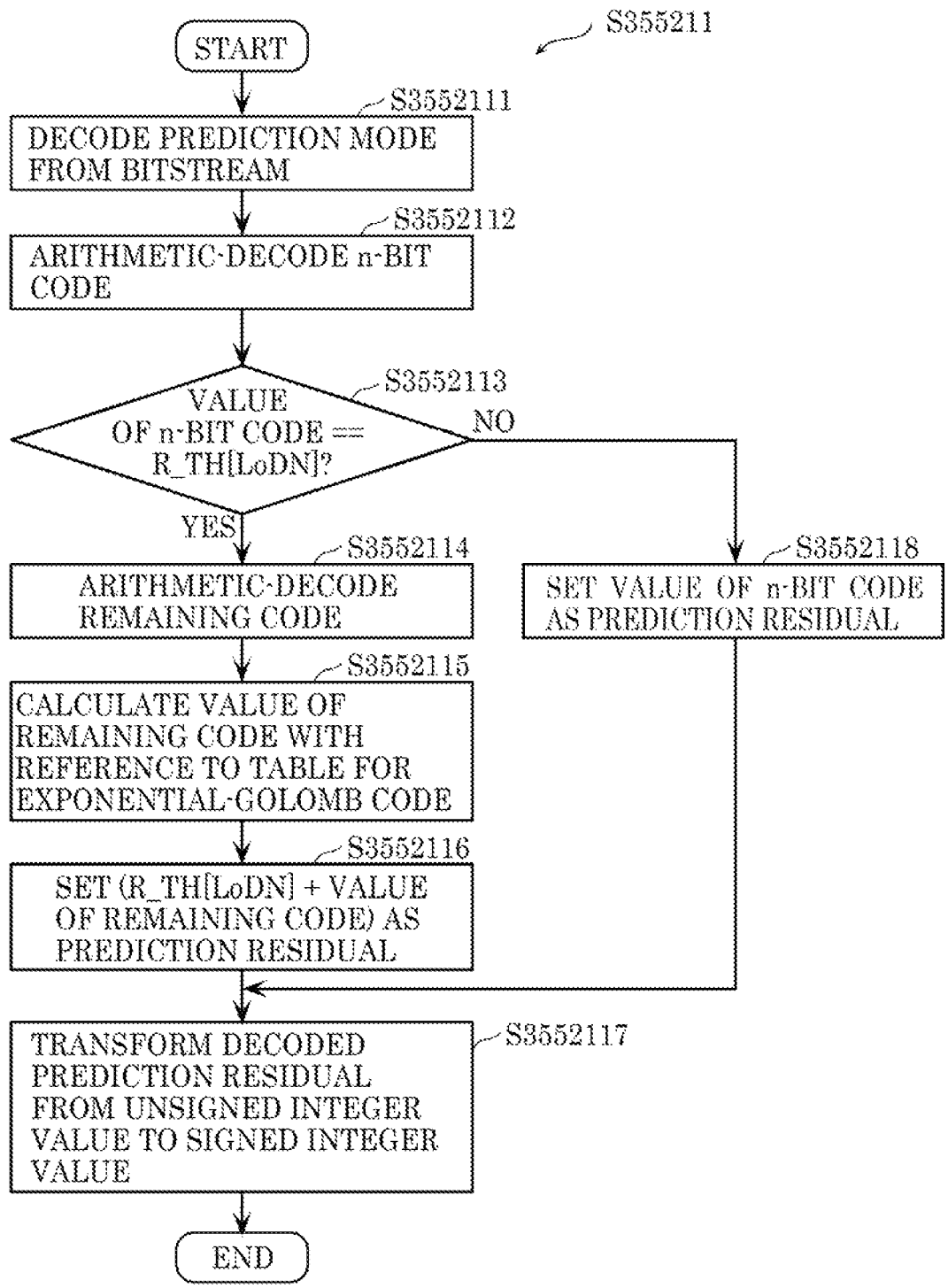
FIG. 108 is a flowchart of another example of the calculation process of a prediction mode and a quantized value shown in FIG. 97.

FIG. 108 is a flowchart of another example of the calculation process of a prediction mode and a quantized value of P (S355211) shown in FIG. 97.

First, the three-dimensional data decoding device decodes the prediction mode from the bitstream (S3552111).

As described above, the three-dimensional data decoding device may arithmetic-decode prediction mode PredMode in accordance with total number M of prediction modes obtained by decoding the header.

When total number M of prediction modes is 1, the three-dimensional data decoding device may estimate PredMode as 0 without decoding PredMode.

Then, the three-dimensional data decoding device arithmetic-decodes an n-bit code (S3552112).

Then, the three-dimensional data decoding device determines whether or not a value of the n-bit code==R_TH[LoDN] is satisfied (S3552113).

When determining that the value of the n-bit code==R_TH[LoDN] is satisfied (Yes in S3552113), the three-dimensional data decoding device arithmetic-decodes a remaining code (S3552114).

Then, the three-dimensional data decoding device calculates a value of the remaining code with reference to a table for an Exponential-Golomb code (S3552115).

Then, the three-dimensional data decoding device sets (R_TH[LoDN]+value of remaining code) as a prediction residual (S3552116).

Then, the three-dimensional data decoding device transforms the decoded prediction residual from an unsigned integer value to a signed integer value (S3552117).

When determining that the value of the n-bit code==R_TH[LoDN] is not satisfied (No in S3552113), the three-dimensional data decoding device decodes the prediction mode from the bitstream (S3552118), and performs step S3552117.

Figure 109:
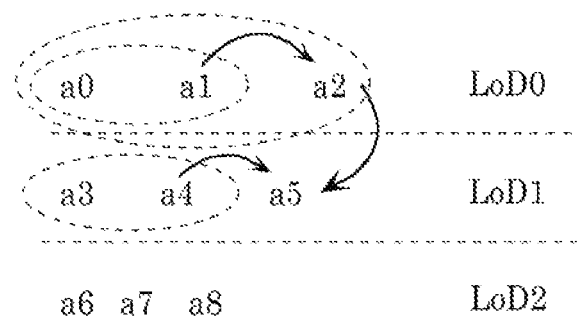
FIG. 109 is a diagram showing an example of attribute information used in calculating a predicted value.

FIG. 109 is a diagram showing an example of attribute information used in calculating a predicted value.

For example, a predicted value of attribute information on point a2 shown in FIG. 109 is generated using attribute information on points a0 and a1. Furthermore, for example, a predicted value of attribute information on point a5 shown in FIG. 109 is generated using attribute information on points a0, a1, a2, a3, and a4.

Note that the peripheral points selected varies with the value of N described above. For example, in the case of N=5, points a0, a1, a2, a3, and a4 are selected as peripheral points of point a5. In the case of N=4, points a0, a1, a2, and a4 are selected based on distance information.

The three-dimensional data encoding device may generate LoDs in descending order of level (beginning with LoD0, for example). Alternatively, the three-dimensional data encoding device may generate LoDs in ascending order of level (beginning with LoD2, for example).

The predicted value is calculated from an attribute value based on weighted averaging for neighboring points.

For example, in the example shown in FIG. 109, predicted value a2p of point a2 is calculated by weighted averaging of attribute values of points a0 and a1, as shown by the following equations (Equation F1), (Equation F2), and (Equation F3).

[Math. 6]

$$a2p = \sum_{i=0}^{1} w_i \times A_i \quad \text{(Equation F1)}$$

$$w_i = \frac{\frac{1}{|ai - ave|}}{\sum_{j=0}^{1} \frac{1}{|aj - ave|}} \quad \text{(Equation F2)}$$

$$ave = \frac{\sum_{k=1}^{1} A_k}{2} \quad \text{(Equation F3)}$$

Note that $A_i$ is a value of attribute information on point ai. ave denotes an average value of $A_i$.

Note that a median of $A_i$ may be used instead of the average value. Furthermore, $(ai-ave)^2$ and $(aj-ave)^2$ may be used instead of |ai−ave| and |aj−ave|.

For example, predicted value a5p of point a5 is calculated by weighted averaging of attribute information on points a0, a1, a2, a3, and a4, as shown by the following equations (Equation F4), (Equation F5), and (Equation F6).

[Math. 7]

$$a5p = \sum_{i=0}^{4} w_i \times A_i \quad \text{(Equation F4)}$$

$$w_i = \frac{\frac{1}{|ai - ave|}}{\sum_{j=0}^{4} \frac{1}{|aj - ave|}} \quad \text{(Equation F5)}$$

$$ave = \frac{\sum_{k=1}^{5} A_k}{5} \quad \text{(Equation F6)}$$

Here, if the value of ai and the value of ave are the same, |ai−ave| is 0, and it is difficult to appropriately calculate the value of $w_i$. To cope with this, when |ai−ave| is 0, for example, the three-dimensional data encoding device performs the calculation by setting |ai−ave| at 1.

In this way, the three-dimensional data encoding device can calculate the value of $w_i$.

If the value of aj and the value of ave are the same, |aj−ave| is 0, and it is difficult to appropriately calculate the value of $w_i$. To cope with this, when |aj−ave| is 0, for example, the three-dimensional data encoding device performs the calculation by setting |aj−ave| at 1.

In this way, the three-dimensional data encoding device can calculate the value of $w_i$.

Predicted value aNp of point aN is calculated by weighted averaging of attribute information on points N-4, N-3, N-2, and N-1, as shown by the following equations (Equation F7), (Equation F8), and (Equation F9). Note that N denotes a positive integer equal to or greater than 5.

[Math. 8]

$$aNp = \sum_{i=N-4}^{N-1} w_i \times A_i \quad \text{(Equation F7)}$$

$$w_i = \frac{\frac{1}{|ai - ave|}}{\sum_{j=N-4}^{N-1} \frac{1}{|aj - ave|}} \quad \text{(Equation F8)}$$

$$ave = \frac{\sum_{k=N-4}^{N-1} A_k}{4} \quad \text{(Equation F9)}$$

For example, the three-dimensional data encoding device performs the calculation by setting |ai−ave| at 1 in the case of |ai−ave|=0, and performs the calculation by setting |ai−ave| at |ai−ave| otherwise.

For example, the three-dimensional data encoding device performs the calculation by setting |aj−ave| at 1 in the case of |aj−ave|=0, and performs the calculation by setting |aj−ave| at |aj−ave| otherwise.

EMBODIMENT 6

As another example of encoding the attribute information of a three-dimensional point by using the information on the LoDs, a method will be described that encodes a plurality of three-dimensional points in order from the three-dimensional points included in the bottom layer of the LoDs. For example, when encoding a plurality of three-dimensional points in order from the three-dimensional points included in the bottom layer LoDn of the LoDs, the three-dimensional data encoding device may calculate the predicted values of the three-dimensional points included in the LoDn by using the attribute information of the three-dimensional points included in a layer higher than the LoDn of the LoDs.

Figure 110:
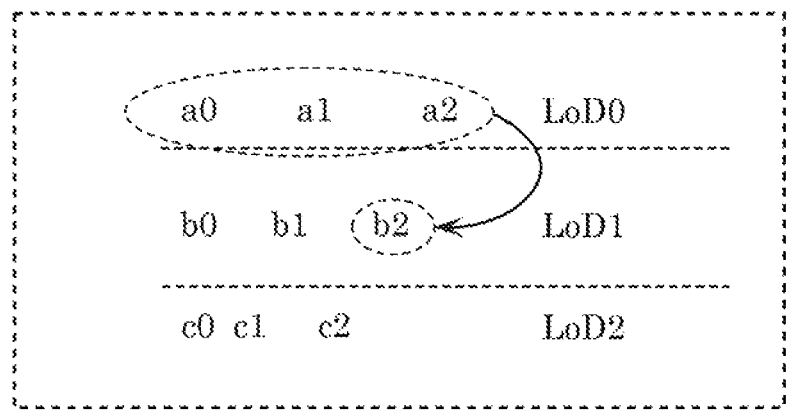
FIG. 110 is a diagram showing an example of the reference relationship according to Embodiment 6.

FIG. 110 is a diagram showing an example of the reference relationship. For example, in the case of the example shown in FIG. 110, the three-dimensional data encoding device calculates the predicted values of the three-dimensional points included in the LoD2 by using the attribute information of the three-dimensional points included in the LoD0 or the LoD1. Additionally, the three-dimensional data encoding device calculates the predicted values of the three-dimensional points included in the LoD1 by using the attribute information of the three-dimensional points included in the LoD0. In this case, the LoD0 or the LoD1 need not necessarily be the attribute information that has been encoded and decoded. In this case, the three-dimensional data encoding device may use, for example, the value before encoding.

In this manner, the three-dimensional data encoding device may generate the predicted values of the attribute information of the three-dimensional points included in the LoDn by using the attribute information included in the LoDn' (n'<n). Accordingly, since the plurality of three-dimensional points included in the LoDn do not refer to each other, the three-dimensional data encoding device can calculate in parallel the predicted values of the plurality of three-dimensional points included in the LoDn.

For example, the three-dimensional data encoding device generates the predicted value of the attribute information of a three-dimensional point by calculating the average of the attribute values of N or less three-dimensional points among the three-dimensional points around a current three-dimensional point to be encoded. Additionally, the three-dimensional data encoding device may add the value of N to the header of a bitstream or the like. Note that the three-dimensional data encoding device may change the value of N for each three-dimensional point, and may add the value of N for each three-dimensional point. Accordingly, since an appropriate N can be selected for each three-dimensional point, the accuracy of the predicted value can be improved. Therefore, the predicted residual can be reduced. Additionally, the three-dimensional data encoding device may add the value of N to the header of a bitstream, and may fix the value of N within the bitstream. Accordingly, since it becomes unnecessary to encode or decode the value of N for each three-dimensional point, the processing amount can be reduced. Additionally, the three-dimensional data encoding device may separately encode the value of N for each LoD. Accordingly, the coding efficiency can be improved by selecting an appropriate N for each LoD.

Alternatively, the three-dimensional data encoding device may calculate the predicted value of the attribute information of a three-dimensional point with the weighted average value of the attribute information of N peripheral three-dimensional points. For example, the three-dimensional data encoding device calculates the weight by using respective pieces of distance information of a current three-dimensional point and N peripheral three-dimensional points.

When separately encoding the value of N for each LoD, the three-dimensional data encoding device sets, for example, the value of N to be larger for the higher layers in the LoDs, and the value of N to be smaller for the lower layers. The distance between three-dimensional points belonging to the higher layers in the LoDs is larger than the distance between three-dimensional points belonging to the higher layer in the LoDs. Therefore, in the higher layers, there is a possibility that the prediction accuracy can be improved by averaging more peripheral three-dimensional points by setting the value of N to be large. Additionally, the distance between three-dimensional points belonging to the lower layers in the LoDs is short. Therefore, in the lower layers, it becomes possible to perform efficient prediction while suppressing the processing amount of averaging, by setting the value of N to be small.

As described above, the predicted value of the point P included in the LoDN is generated by using the encoded surrounding point P' included in the LoDN' (N'<=N). Here, the surrounding point P' is selected based on the distance from the point P. For example, the predicted value of the attribute information of the point b2 shown in FIG. 110 is generated by using the attribute information of the points a0, a1, and a2.

The peripheral points to be selected are changed according to the above-described value of N. For example, when N=3, the points a0, a1, and a2 are selected as the surrounding points of the point b2. When N=2, the points a1 and a2 are selected based on the distance information.

The predicted value is calculated by the distance-dependent weighted averaging. For example, in the example shown in FIG. 110, a predicted value b2p of the point b2 is calculated by the weighted average of the attribute information of the point a0 and the point a1, as shown in (Equation J1) and (Equation J2). Note that A$_i$ is the value of the attribute information of a point ai. Additionally, d (p, q) is, for example, the Euclid distance between the three-dimensional point p and the three-dimensional point q.

[Math. 9]

$$b2p = \sum_{i=0}^{2} w_i \times A_i \qquad \text{(Equation J1)}$$

$$w_i = \frac{\frac{1}{d(b2, ai)}}{\sum_{j=0}^{2} \frac{1}{d(b2, aj)}} \qquad \text{(Equation J2)}$$

Additionally, as shown in (Equation J3) and (Equation J4), a predicted value aNp of a point aN is calculated by the weighted average of the attribute information of points aN-4, aN-3, aN-2, and aN-1.

[Math. 10]

$$aNp = \sum_{i=N-4}^{N-1} w_i \times A_i \qquad \text{(Equation J3)}$$

$$w_i = \frac{\frac{1}{d(aN, ai)}}{\sum_{j=N-4}^{N-1} \frac{1}{d(aN, aj)}}. \qquad \text{(Equation J4)}$$

Additionally, the three-dimensional data encoding device may calculate the difference value (predicted residual) between the value of the attribute information of a three-dimensional point, and the predicted value generated from the surrounding points, and may quantize the calculated predicted residual. For example, the three-dimensional data encoding device performs quantization by dividing the predicted residual by a quantization scale (also called a quantization step). In this case, the smaller the quantization scale, the smaller the error (quantization error) that may occur due to quantization. Conversely, the larger the quantization scale, the larger the quantization error.

Note that the three-dimensional data encoding device may change the quantization scale to be used for each LoD. For example, the three-dimensional data encoding device makes the quantization scale smaller for the higher layers, and makes the quantization scale larger for the lower layers. Since the value of the attribute information of three-dimensional points belonging to the higher layers may be used as the predicted value of the attribute information of three-dimensional points belonging to the lower layers, the coding efficiency can be improved by suppressing the quantization error that may occur in the higher layers by making the quantization scale for the higher layers small to increase the accuracy of the predicted value. Note that the three-dimensional data encoding device may add the quantization scale used for each LoD to a header or the like. Accordingly, since the three-dimensional data decoding device can correctly decode the quantization scale, a bitstream can be appropriately decoded.

Additionally, the three-dimensional data encoding device may adaptively switch the quantization scale to be used according to the importance of a current three-dimensional point. For example, the three-dimensional data encoding device uses a small quantization scale for a three-dimensional point with high importance, and uses a large quantization scale for a three-dimensional point with low importance. Here, the importance may be calculated from, for example, the number of times that the current three-dimensional point has been referred to by the other three-dimensional points at the time of calculation of the predicted value, the weight at that time, or the like. For example, the value of the following QW (Quantization Weight) is used as the importance. The three-dimensional data encoding device sets the value of the QW of a three-dimensional point with high importance to be large, and makes the quantization scale small. Accordingly, since the quantization error of a three-dimensional point with high importance becomes small, the coding efficiency can be improved.

Figure 111:
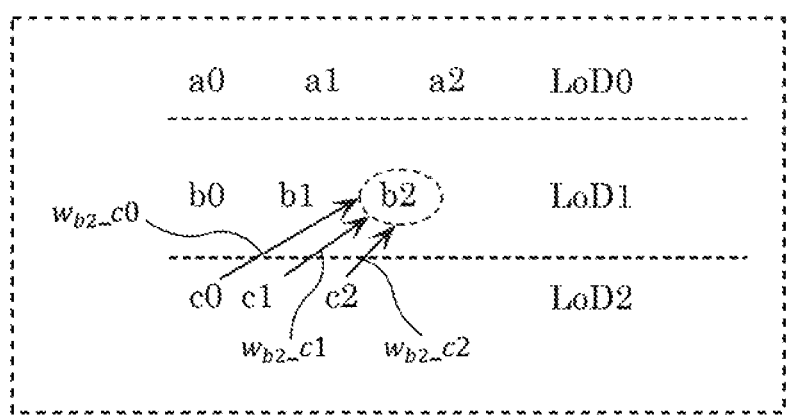
FIG. 111 is a diagram showing a calculation example of a QW according to Embodiment 6.

FIG. 111 is a diagram showing a calculation example of the QW. The QS (quantization step) may be changed according to the LoD. QS_LoD0 is the QS for the LoD0 and QS_LoD1 is the QS for LoD1.

The QW is the value representing the importance of a current three-dimensional point. For example, when the point b2 is used for calculation of the predicted value of the point c0, the value of the QW of the point c0 may be multiplied by a weight $W_{b2\_c0}$ for the point b2 calculated at the time of generation of the predicted value of the point c0, and the obtained value may be added to the value of the QW of the point b2. Accordingly, the value of the QW of a three-dimensional point that has been used often for generating the predicted value becomes large, and the prediction efficiency can be improved by suppressing the quantization error of the three-dimensional point.

For example, the three-dimensional data encoding device may first initialize the values of the QWs of all three-dimensional points with 1, and may update the QW of each three-dimensional point according to a prediction structure. Alternatively, the three-dimensional data encoding device may change an initial value according to the layer of a LoD, without initializing the QWs of all three-dimensional points with the value 1. For example, the three-dimensional data encoding device may make the quantization scale for the higher layers smaller by setting the initial values of the QWs for the higher layers to be larger. Accordingly, since the prediction errors for the higher layers can be suppressed, the prediction accuracy for the lower layers can be increased, and the coding efficiency can be improved.

Additionally, the three-dimensional data encoding device may convert a signed integer value (signed quantized value), which is the predicted residual after quantization, into an unsigned integer value (unsigned quantized value). Accordingly, when entropy encoding the predicted residual, it becomes unnecessary to consider the occurrence of a negative integer. Note that the three-dimensional data encoding device need not necessarily convert a signed integer value into an unsigned integer value, and may, for example, separately entropy encode a sign bit.

Figure 112:
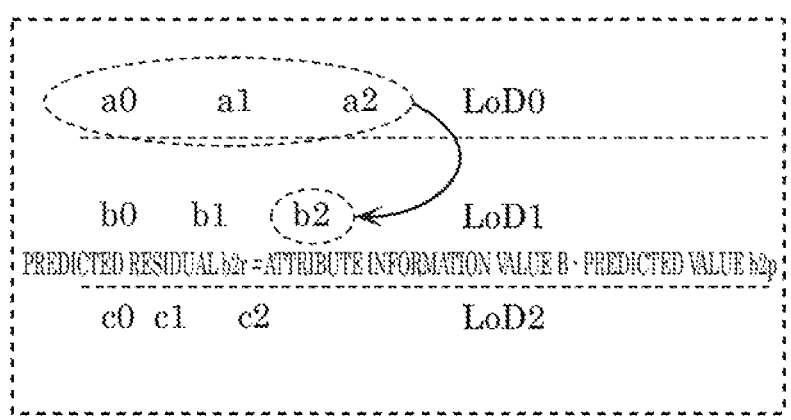
FIG. 112 is a diagram showing a calculation example of a predicted residual according to Embodiment 6.

FIG. 112 is a diagram showing a calculation example of a predicted residual. The predicted residual is calculated by subtracting a predicted value from an original value. For example, as shown in (Equation J5), the predicted residual b2r of the point b2 is calculated by subtracting the predicted value b2p of the point b2 from the value $B_2$ of the attribute information of the point b2.

$$b2r = B_2 - b2p \quad \text{(Equation J5)}$$

Additionally, the predicted residual is quantized by being divided by the QS (Quantization Step). For example, the quantized value b2q of the point b2 is calculated by (Equation J6). Here, QS_LoD1 is the QS for the LoD1. That is, the QS may be changed according to the LoD.

$$b2p = b2r/QS\_LoD1 \quad \text{(Equation J6)}$$

Additionally, when using the QW as described above, the quantized value b2q of the point b2 is calculated by (Equation J7) and (Equation J8).

[Math. 11]

$$b2q = \frac{b2r + \frac{QS\_LoD1}{2}}{QS\_LoD1} \times QWb2 \quad \text{(Equation J7)}$$

$$QWb2 = 1 + \sum_{i=0}^{2} w_{b2\_ci} \times QWci \quad \text{(Equation J8)}$$

Additionally, the three-dimensional data encoding device converts the signed integer value, which is the above-described quantized value, to an unsigned integer value as follows. When the signed integer value b2q is smaller than 0, the three-dimensional data encoding device sets the unsigned integer value b2u to −1−(2×b2q). When the signed integer value b2q is 0 or more, the three-dimensional data encoding device sets the unsigned integer value b2u to 2×b2q.

Additionally, the three-dimensional data encoding device scans and encodes the predicted residual (unsigned integer value) after quantization according to a certain order. For example, the three-dimensional data encoding device encodes a plurality of three-dimensional points in order from three-dimensional points included in the higher layers of the LoDs toward the lower layers.

Figures 113, 114:
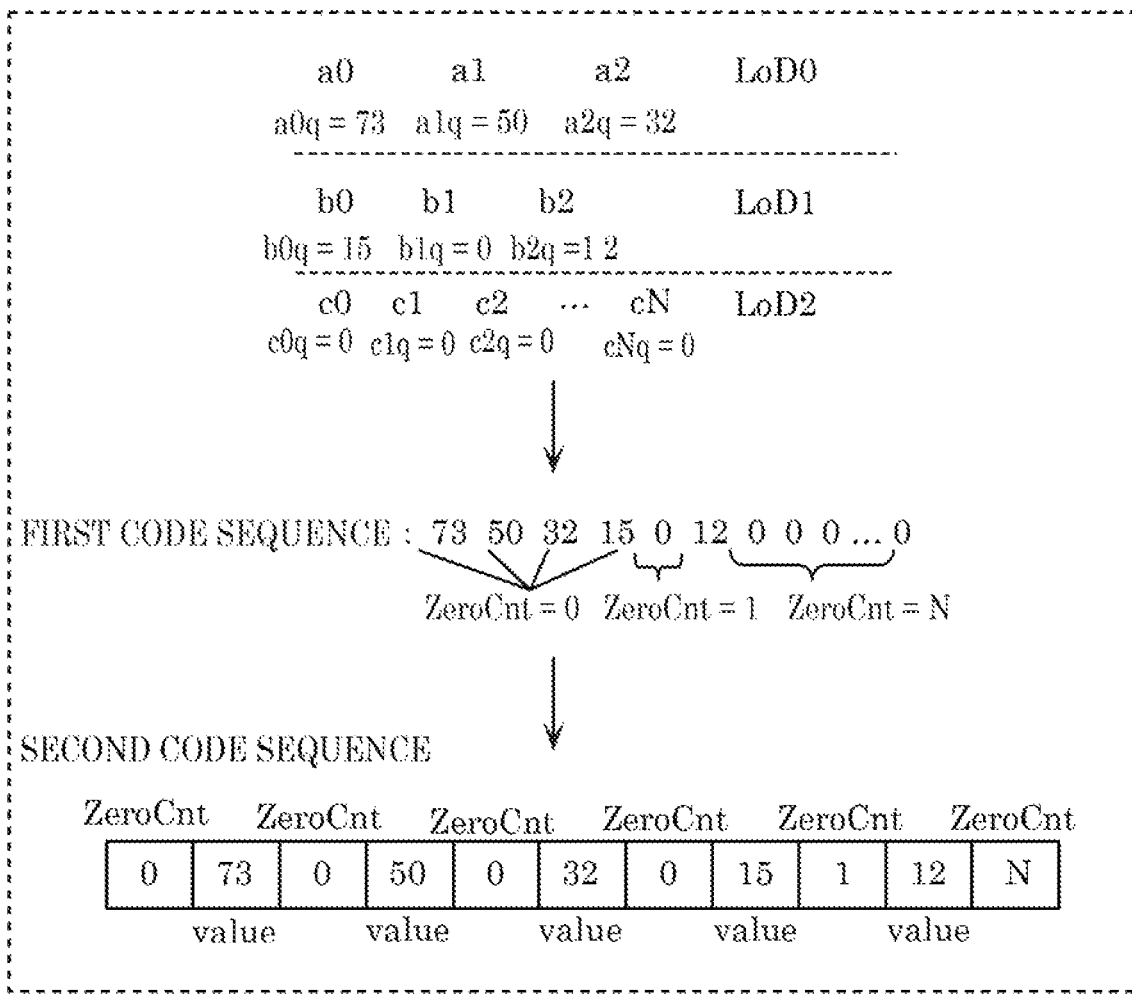
FIG. 113 is a diagram showing an example of the encoding processing according to Embodiment 6.
FIG. 114 is a diagram showing an example of the truncated unary code according to Embodiment 6.

FIG. 113 is a diagram showing an example of this encoding. In the case of the example shown in FIG. 113, the three-dimensional data encoding device encodes a plurality of three-dimensional points from the point a0 included in the higher layer LoD0 in the order of a1, a2, b0, b1, b2, c0, c1, c2, . . . , cN. Here, there is a tendency that the lower the LoD, the more likely it is that the predicted residual after quantization becomes 0. This can be due to the following and the like.

Since the predicted value of a three-dimensional point belonging to a lower layer of the LoDs is generated with reference to more three-dimensional points than the predicted value of a three-dimensional point of a higher layer, the prediction accuracy is high, and the predicted residual easily becomes 0. Additionally, by switching the quantization scale according to the above-described importance and the like, the lower the layer, the larger the quantization scale, and the more likely it is that the predicted residual after quantization becomes 0. In this manner, the lower layer three-dimensional points are more likely to have 0 for the predicted residual after quantization. Therefore, the value 0 is likely to be consecutively generated for a first code sequence in the lower layers. Here, the first code sequence is a code sequence in which the predicted residuals after quantization of a plurality of points according to the above-described encoding order are arranged as shown in FIG. 113.

On the other hand, the three-dimensional data encoding device counts the number of times that the value 0 occurs in the first code sequence, and encodes the number of times that the value 0 consecutively occurs, instead of the consecutive values 0. That is, the three-dimensional data encoding device generates a second code sequence by replacing the predicted residuals of the consecutive values 0 in the first code sequence with the number of consecutive times (ZeroCnt) of 0. Accordingly, when there are consecutive values 0 of the predicted residuals after quantization, the coding efficiency can be improved by encoding the number of consecutive times of 0, rather than encoding a lot of 0s.

Additionally, the three-dimensional data encoding device may entropy encode the value of ZeroCnt. For example, the three-dimensional data encoding device binarizes the value of ZeroCnt with the truncated unary code of the total number T of the encoded three-dimensional points, and arithmetically encodes each bit after the binarization. FIG. 114 is a diagram showing an example of the truncated unary code in the case where the total number of the encoded three-dimensional points is T. At this time, the three-dimensional data encoding device may improve the coding efficiency by using a different coding table for each bit. For example, the three-dimensional data encoding device uses coding table 1 for the first bit, uses coding table 2 for the second bit, and coding table 3 for the subsequent bits. In this manner, the three-dimensional data encoding device can improve the coding efficiency by switching the coding table for each bit.

Additionally, the three-dimensional data encoding device may arithmetically encode ZeroCnt after binarizing ZeroCnt with an Exponential-Golomb. Accordingly, when the value of ZeroCnt easily becomes large, the efficiency can be more improved than the binarizing arithmetic encoding with the truncated unary code. Note that the three-dimensional data encoding device may add a flag for switching between using the truncated unary code and using the Exponential-Golomb to a header. Accordingly, the three-dimensional data encoding device can improve the coding efficiency by selecting the optimum binarization method. Additionally, the three-dimensional data decoding device can correctly decode a bitstream by referring to the flag included in the header to switch the binarization method.

FIG. 115 is a diagram showing a syntax example of the attribute information (attribute_data). The attribute information (attribute_data) includes the number of consecutive zeros (ZeroCnt), the number of attribute dimensions (attribute_dimension), and the predicted residual (value[j][i]).

The number of consecutive zeros (ZeroCnt) indicates the number of times that the value 0 continues in the predicted residual after quantization. Note that the three-dimensional data encoding device may arithmetically encode ZeroCnt after binarizing ZeroCnt.

The number of attribute dimensions (attribute_dimension) indicate the number of dimensions of the attribute information. For example, when the attribute information is the color information (RGB, YUV, or the like) of a three-dimensional point, since the color information is three-dimensional, the number of attribute dimensions is set to a value 3. When the attribute information is the reflectance, since the reflectance is one-dimensional, the number of attribute dimensions is set to a value 1. Note that the number of attribute dimensions may be added to the header of the attribute information of a bitstream or the like.

The predicted residual (value[j][i]) indicates the predicted residual after quantization of the attribute information of the j-th dimension of the i-th three-dimensional point. For example, when the attribute information is color information, value [99] [1] indicates the predicted residual of the second dimension (for example, the G value) of the 100th three-dimensional point. Additionally, when the attribute information is reflectance information, value [119] [0] indicates the predicted residual of the first dimension (for example, the reflectance) of the 120th three-dimensional point.

Note that, when the following conditions are satisfied, the three-dimensional data encoding device may subtract the value 1 from value[j][i], and may entropy encode the obtained value. In this case, the three-dimensional data decoding device restores the predicted residual by adding the value 1 to value[j][i] after entropy decoding.

The above-described conditions are (1) when attribute_dimension=1, or (2) when attribute_dimension is 1 or more, and when the values of all the dimensions are equal. For example, when the attribute information is the reflectance, since attribute_dimension=1, the three-dimensional data encoding device subtracts the value 1 from the predicted residual to calculate the value, and encodes the calculated value. The three-dimensional data decoding device calculates the predicted residual by adding the value 1 to the value after decoding.

More specifically, for example, when the predicted residual of the reflectance is 10, the three-dimensional data encoding device encodes the value 9 obtained by subtracting the value 1 from the value 10 of the predicted residual. The three-dimensional data decoding device adds the value 1 to the decoded value 9 to calculate the value 10 of the predicted residual.

Additionally, since attribute_dimension=3 when the attribute information is the color, for example, when the predicted residual after quantization of each of the components R, G, and B is the same, the three-dimensional data encoding device subtracts the value 1 from each predicted residual, and encodes the obtained value. The three-dimensional data decoding device adds the value 1 to the value after decoding. More specifically, for example, when the predicted residual of R, G, and B=(1, 1, 1), the three-dimensional data encoding device encodes (0, 0, 0). The three-dimensional data decoding device adds 1 to each component of (0, 0, 0) to calculate (1, 1, 1). Additionally, when the predicted residual of R, G, and B=(2, 1, 2), the three-dimensional data encoding device encodes (2, 1, 2) as is. The three-dimensional data decoding device uses the decoded (2, 1, 2) as is as the predicted residual.

In this manner, by providing ZeroCnt, since the pattern in which all the dimensions are 0 as value is not generated, the value obtained by subtracting 1 from the value indicated by value can be encoded. Therefore, the coding efficiency can be improved.

The three-dimensional data encoding device may switch the calculation method of the value of ZeroCnt depending on the value of attribute_dimension. For example, when attribute_dimension=3, the three-dimensional data encoding device may count the number of times that the values of the predicted residuals of all the components (dimensions) become 0. FIG. 116 is a diagram showing an example of the predicted residual and ZeroCnt in this case. For example, in the case of the color information shown in FIG. 116, the three-dimensional data encoding device counts the number of the consecutive predicted residuals having 0 for all of the R, G, and B components, and adds the counted number to a bitstream as ZeroCnt. Accordingly, it becomes unnecessary to encode ZeroCnt for each component, and the overhead can be reduced. Therefore, the coding efficiency can be improved. Note that the three-dimensional data encoding device may calculate ZeroCnt for each dimension even when attribute_dimension is two or more, and may add the calculated ZeroCnt to a bitstream.

Figures 117, 118:
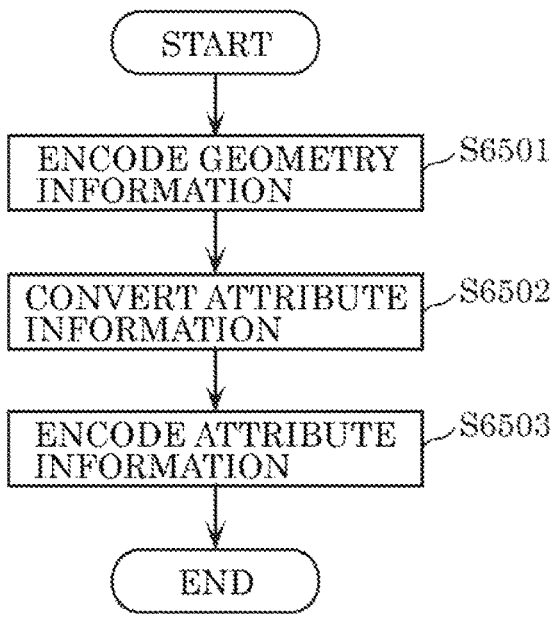
FIG. 117 is a diagram showing a syntax example of the attribute information according to Embodiment 6.
FIG. 118 is a flowchart of the three-dimensional data encoding processing according to Embodiment 6.

FIG. 117 is a diagram showing another syntax example of the attribute information (attribute_data). The attribute information shown in FIG. 117 further includes prediction mode information (PredMode) in addition to the attribute information shown in FIG. 115.

The prediction mode information (PredMode) indicates the prediction mode for encoding or decoding the attribute value of the j-th three-dimensional point. PredMode takes values from a value 0 to M−1 (M is the total number of prediction modes). When PredMode is not included in a bitstream (when maxdiff>=Thfix&&NumPredMode[i]>1, which is a condition, is not satisfied), the three-dimensional data decoding device may estimate that PredMode has a value 0.

Here, maxdiff is the maximum absolute difference value of the attribute information of a plurality of three-dimensional points that can be referred to. Thfix[i] is a predefined threshold value. Additionally, the value 0 of the prediction mode information is, for example, the prediction mode that uses the average of the attribute information of the plurality of three-dimensional points that can be referred to as the predicted value. That is, when the difference between the plurality of pieces of attribute information that can be referred to is less than a predefined value, a predefined prediction mode is used. Additionally, NumPredMode[i] indicates the number of available prediction modes. That is, when the number of available prediction modes is 1, the predefined prediction mode is used.

Note that the three-dimensional data decoding device may use not only the value 0, but any predefined value from 0 to M−1 as the estimated value. Additionally, the estimated value in the case where PredMode is not included in a bitstream may be separately added to a header or the like.

The three-dimensional data encoding device may arithmetically encode PredMode by binarizing PredMode with the truncated unary code by using the number of prediction modes to which the predicted value is assigned.

FIG. 118 is a flowchart of the three-dimensional data encoding processing according to the present embodiment. First, the three-dimensional data encoding device encodes geometry information (geometry) (S6501). For example, the three-dimensional data encoding device performs encoding by using an octree representation.

Next, the three-dimensional data encoding device converts the attribute information (S6502). For example, after the encoding of the geometry information, when the position of a three-dimensional point is changed due to quantization or the like, the three-dimensional data encoding device reassigns the attribute information of the original three-dimensional point to the three-dimensional point after the change. Note that the three-dimensional data encoding device may interpolate the value of the attribute information according to the amount of change of the position to perform the reassignment. For example, the three-dimensional data encoding device detects N three-dimensional points before the change near the three-dimensional position after the change, performs the weighted averaging of the value of the attribute information of the N three-dimensional points based on the distance from the three-dimensional position after the change to each of the N three-dimensional points, and determines the obtained value as the value of the attribute information of the three-dimensional point after the change. Additionally, when two or more three-dimensional points are changed to the same three-dimensional position due to quantization or the like, the three-dimensional data encoding device may assign the average value of the attribute information in the two or more three-dimensional points before the change as the value of the attribute information after the change.

Next, the three-dimensional data encoding device encodes the attribute information (S6503). For example, when encoding a plurality of pieces of attribute information, the three-dimensional data encoding device may encode the plurality of pieces of attribute information in order. For example, when encoding the color and the reflectance as the attribute information, the three-dimensional data encoding device generates a bitstream to which the encoding result of the reflectance is added after the encoding result of the color. Note that a plurality of encoding results of the attribute information added to a bitstream may be in any order.

Additionally, the three-dimensional data encoding device may add the information indicating the start location of the encoded data of each attribute information in a bitstream to a header or the like. Accordingly, since the three-dimensional data decoding device can selectively decode the attribute information that needs to be decoded, the decoding processing of the attribute information that does not need to be decoded can be omitted. Therefore, the processing amount for the three-dimensional data decoding device can be reduced. Additionally, the three-dimensional data encoding device may encode a plurality of pieces of attribute information in parallel, and may integrate the encoding results into one bitstream. Accordingly, the three-dimensional data encoding device can encode a plurality of pieces of attribute information at high speed.

Figure 119:
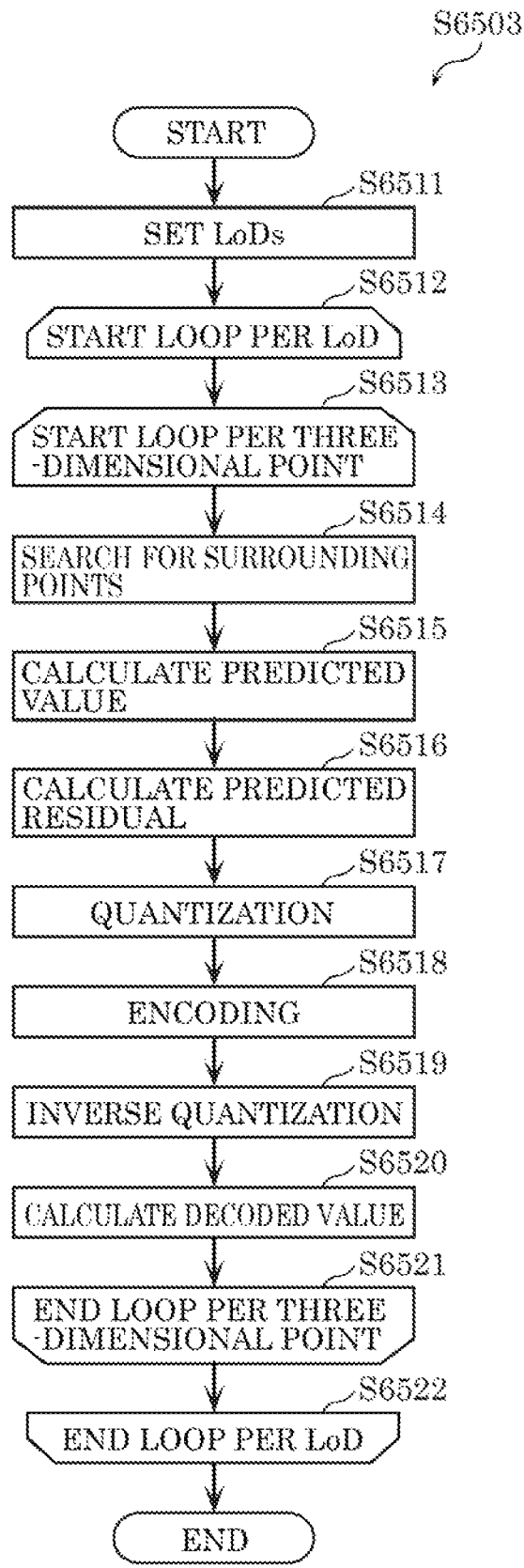

FIG. 119 is a flowchart of the attribute information encoding processing (S6503). First, the three-dimensional data encoding device sets LoDs (S6511). That is, the three-dimensional data encoding device assigns each three-dimensional point to any of a plurality of LoDs.

Next, the three-dimensional data encoding device starts a loop per LoD (S6512). That is, the three-dimensional data encoding device repeatedly performs the processing of steps S6513 to S6521 for each LoD.

Next, the three-dimensional data encoding device starts a loop per three-dimensional point (S6513). That is, the three-dimensional data encoding device repeatedly performs the processing of steps S6514 to S6520 for each three-dimensional point.

First, the three-dimensional data encoding device searches for a plurality of surrounding points, which are three-dimensional points that exist in the surroundings of a current three-dimensional point, and that are used for calculation of the predicted value of the current three-dimensional point (S6514). Next, the three-dimensional data encoding device calculates the weighted average of the value of the attribute information of the plurality of surrounding points, and sets the obtained value to the predicted value P (S6515). Next, the three-dimensional data encoding device calculates the predicted residual, which is the difference between the attribute information of the current three-dimensional point and the predicted value (S6516). Next, the three-dimensional data encoding device calculates the quantized value by quantizing the predicted residual (S6517). Next, the three-dimensional data encoding device arithmetically encode the quantized value (S6518).

Additionally, the three-dimensional data encoding device calculates the inverse quantized value by inverse quantizing the quantized value (S6519). Next, the three-dimensional data encoding device generates the decoded value by adding the predicted value to the inverse quantized value (S6520). Next, the three-dimensional data encoding device ends the loop in the unit of three-dimensional point (S6521). Additionally, the three-dimensional data encoding device ends the loop in the unit of LoD (S6522).

Figure 120:
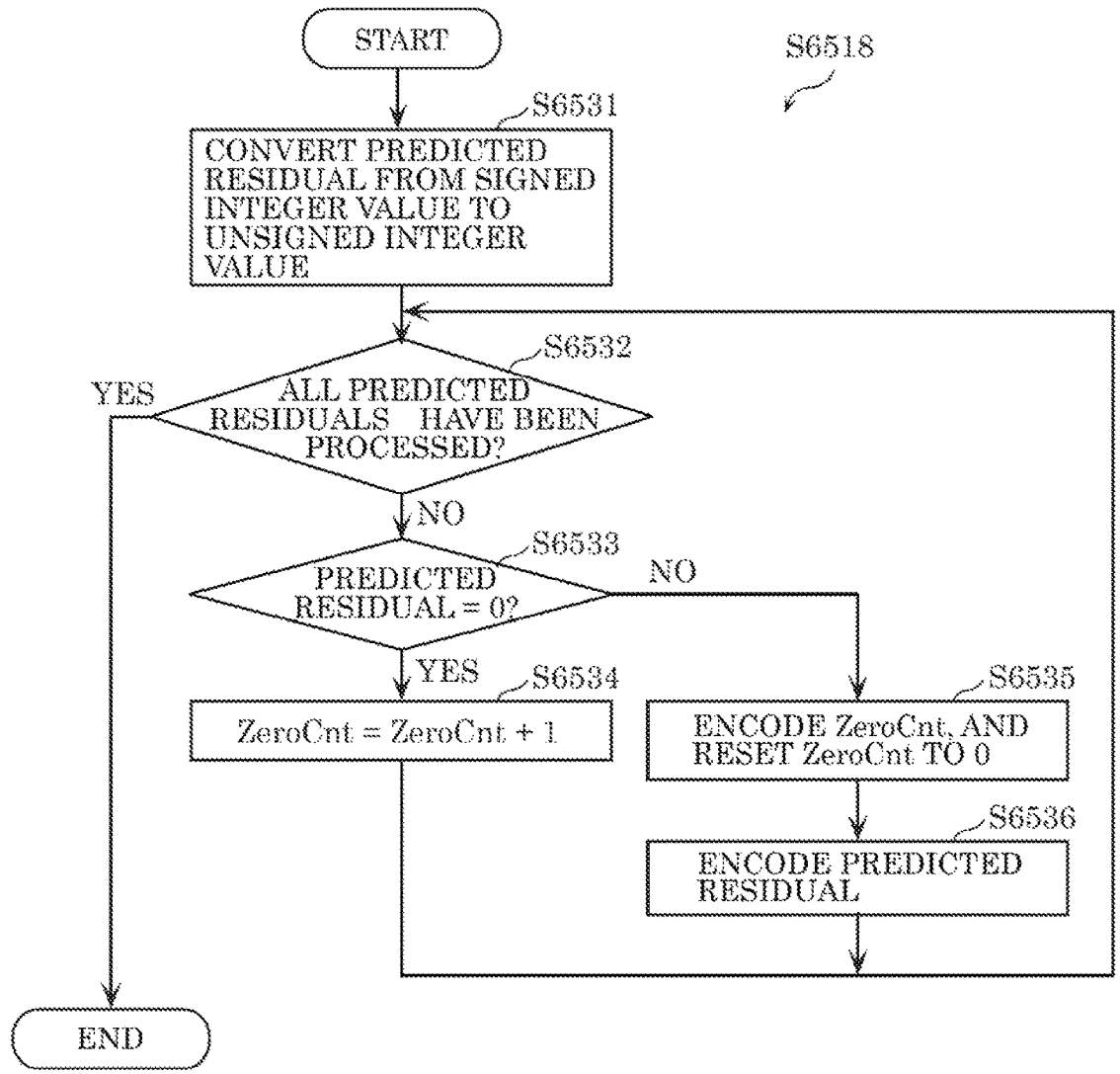

FIG. 120 is a flowchart of the predicted residual encoding processing (S6518). First, the three-dimensional data encoding device converts a predicted residual from a signed integer value to an unsigned integer value (S6531).

When not all predicted residuals have been processed (No in S6532), the three-dimensional data encoding device determines whether the value of the predicted residual to be processed is zero (S6533). When the value of the predicted residual to be processed is zero (Yes in S6533), the three-dimensional data encoding device increments ZeroCnt by 1 (S6534), and returns to step S6532.

When the value of the predicted residual to be processed is not zero (No in S6533), the three-dimensional data encoding device encodes ZeroCnt, and resets ZeroCnt to zero (S6535). Additionally, the three-dimensional data encoding device encodes the predicted residual to be processed (S6536), and returns to step S6532. For example, the three-dimensional data encoding device performs binary arithmetic encoding. Additionally, the three-dimensional data encoding device may subtract the value 1 from the predicted residual, and encode the obtained value.

Additionally, the processing of steps S6533 to S6536 is repeatedly performed for each predicted residual. In addition, when all the predicted residuals have been processed (Yes in S6532), the three-dimensional data encoding device ends processing.

Figure 121:
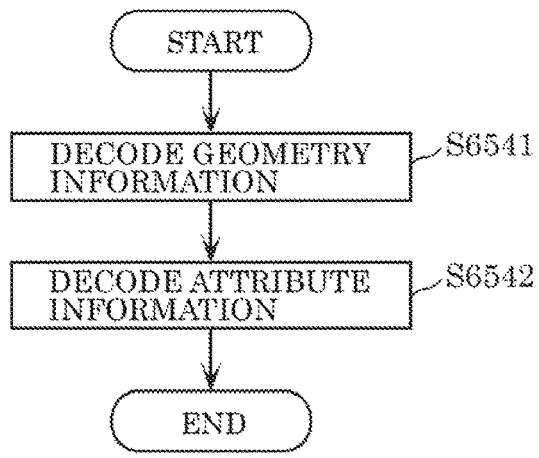

FIG. 121 is a flowchart of the three-dimensional data decoding processing according to the present embodiment. First, the three-dimensional data decoding device decodes geometry information (geometry) from a bitstream (S6541). For example, the three-dimensional data decoding device performs decoding by using an octree representation.

Next, the three-dimensional data decoding device decodes the attribute information from the bitstream (S6542). For example, when decoding a plurality of pieces of attribute information, the three-dimensional data decoding device may decode the plurality of pieces of attribute information in order. For example, when decoding the color and the reflectance as the attribute information, the three-dimensional data decoding device decodes the encoding result of the color and the encoding result of the reflectance according to the order in which they are added to the bitstream. For example, when the encoding result of the reflectance is added after the encoding result of the color in a bitstream, the three-dimensional data decoding device decodes the encoding result of the color, and thereafter decodes the encoding result of the reflectance. Note that the three-dimensional data decoding device may decode the encoding results of the attribute information added to a bitstream in any order.

Additionally, the three-dimensional data decoding device may obtain the information indicating the start location of the encoded data of each attribute information in a bitstream by decoding a header or the like. Accordingly, since the three-dimensional data decoding device can selectively decode the attribute information that needs to be decoded, the decoding processing of the attribute information that does not need to be decoded can be omitted. Therefore, the processing amount for the three-dimensional data decoding device can be reduced. Additionally, the three-dimensional data decoding device may decode a plurality of pieces of attribute information in parallel, and may integrate the decoding results into one three-dimensional point cloud. Accordingly, the three-dimensional data decoding device can decode a plurality of pieces of attribute information at high speed.

Figure 122:
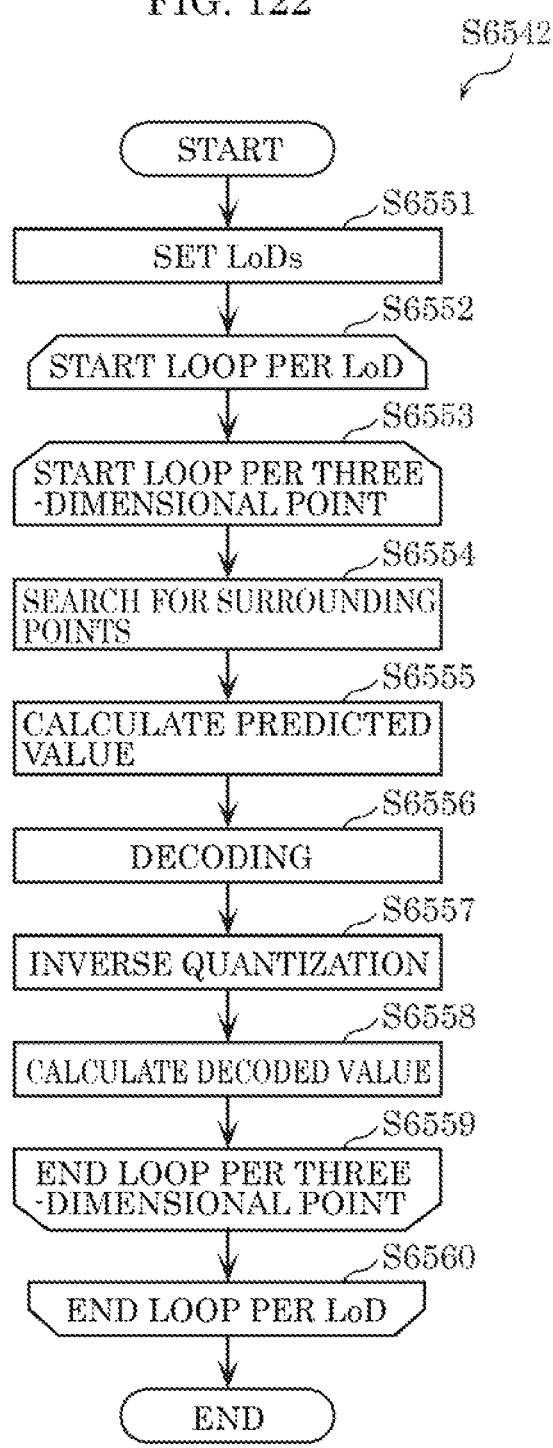

FIG. 122 is a flowchart of the attribute information decoding processing (S6542). First, the three-dimensional data decoding device sets LoDs (S6551). That is, the three-dimensional data decoding device assigns each of a plurality of three-dimensional points having the decoded geometry information to any of a plurality of LoDs. For example, this assigning method is the same method as the assigning method used by the three-dimensional data encoding device.

Next, the three-dimensional data decoding device starts a loop per LoD (S6552). That is, the three-dimensional data decoding device repeatedly performs the processing of steps S6553 to S6559 for each LoD.

Next, the three-dimensional data decoding device starts a loop per three-dimensional point (S6553). That is, the three-dimensional data decoding device repeatedly performs the processing of steps S6554 to S6558 for each three-dimensional point.

First, the three-dimensional data decoding device searches for a plurality of surrounding points, which are three-dimensional points that exist in the surroundings of a current three-dimensional point, and that are used for calculation of the predicted value of the current three-dimensional point (S6554). Next, the three-dimensional data decoding device calculates the weighted average of the value of the attribute information of the plurality of surrounding points, and sets the obtained value to the predicted value P (S6555). Note that these processings are the same as the processings in the three-dimensional data encoding device.

Next, the three-dimensional data decoding device arithmetically decodes the quantized value from a bitstream (S6556). Additionally, the three-dimensional data decoding device calculates the inverse quantized value by performing inverse quantization of the decoded quantized value (S6557). Next, the three-dimensional data decoding device generates the decoded value by adding the predicted value to the inverse quantized value (S6558). Next, the three-dimensional data decoding device ends the loop per three-dimensional point (S6559). Additionally, the three-dimensional data decoding device ends the loop per LoD (S6560).

Figure 123:
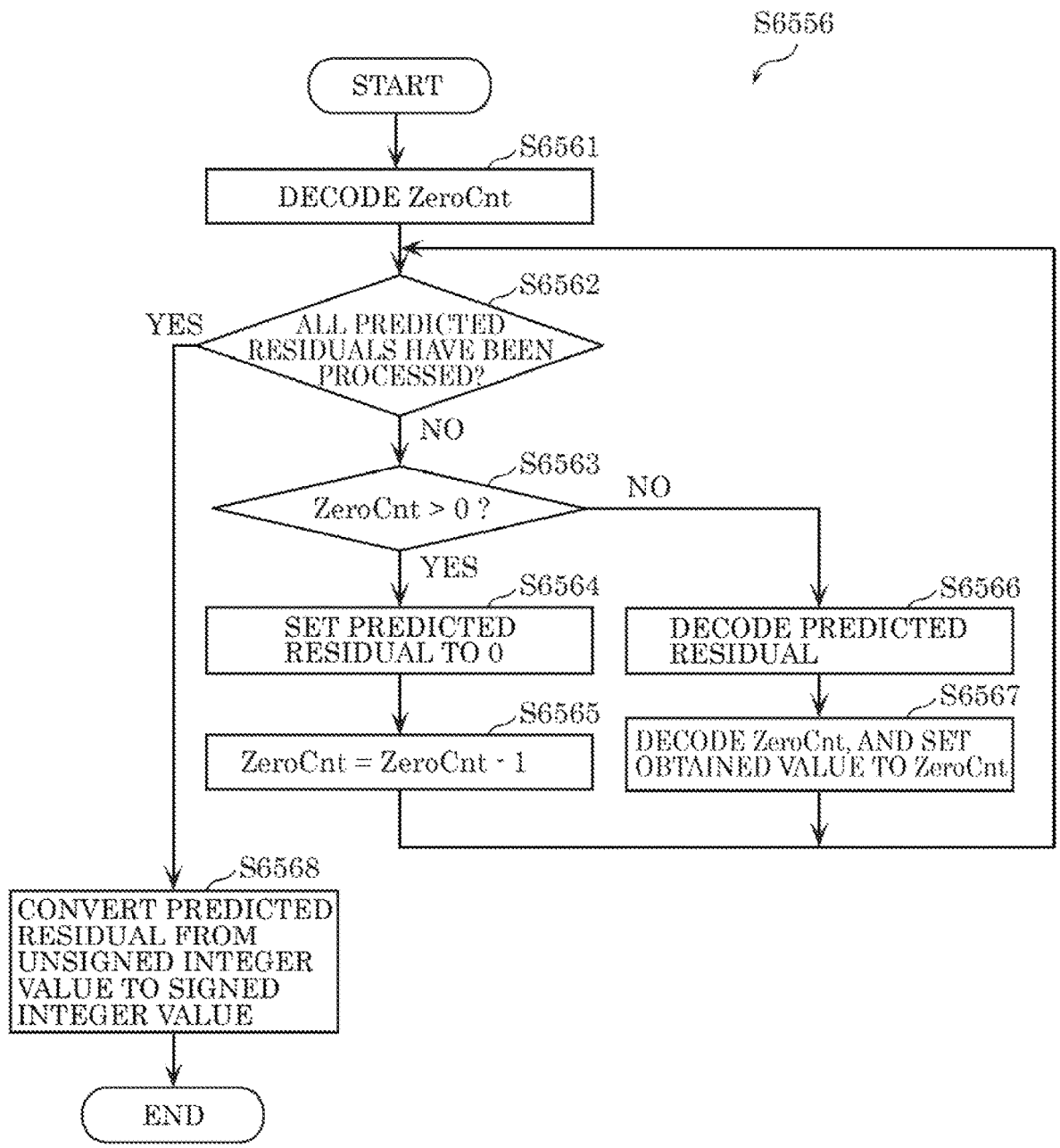

FIG. 123 is a flowchart of the predicted residual decoding processing (S6556). First, the three-dimensional data decoding device decodes ZeroCnt from a bitstream (S6561). When not all predicted residuals have been processed (No in S6562), the three-dimensional data decoding device determines whether ZeroCnt is larger than 0 (S6563).

When ZeroCnt is larger than zero (Yes in S6563), the three-dimensional data decoding device sets the predicted residual to be processed to 0 (S6564). Next, the three-dimensional data decoding device subtracts 1 from ZeroCnt (S6565), and returns to step S6562.

When ZeroCnt is zero (No in S6563), the three-dimensional data decoding device decodes the predicted residual to be processed (S6566). For example, the three-dimensional data decoding device uses binary arithmetic decoding. Additionally, the three-dimensional data decoding device may add the value 1 to the decoded predicted residual.

Next, the three-dimensional data decoding device decodes ZeroCnt, sets the obtained value to ZeroCnt (S6567), and returns to step S6562.

Additionally, the processing of steps S6563 to S6567 is repeatedly performed for each predicted residual. In addition, when all the predicted residuals have been processed (Yes in S6562), the three-dimensional data encoding device converts a plurality of decoded predicted residuals from unsigned integer values to signed integer values (S6568).

Figure 124:
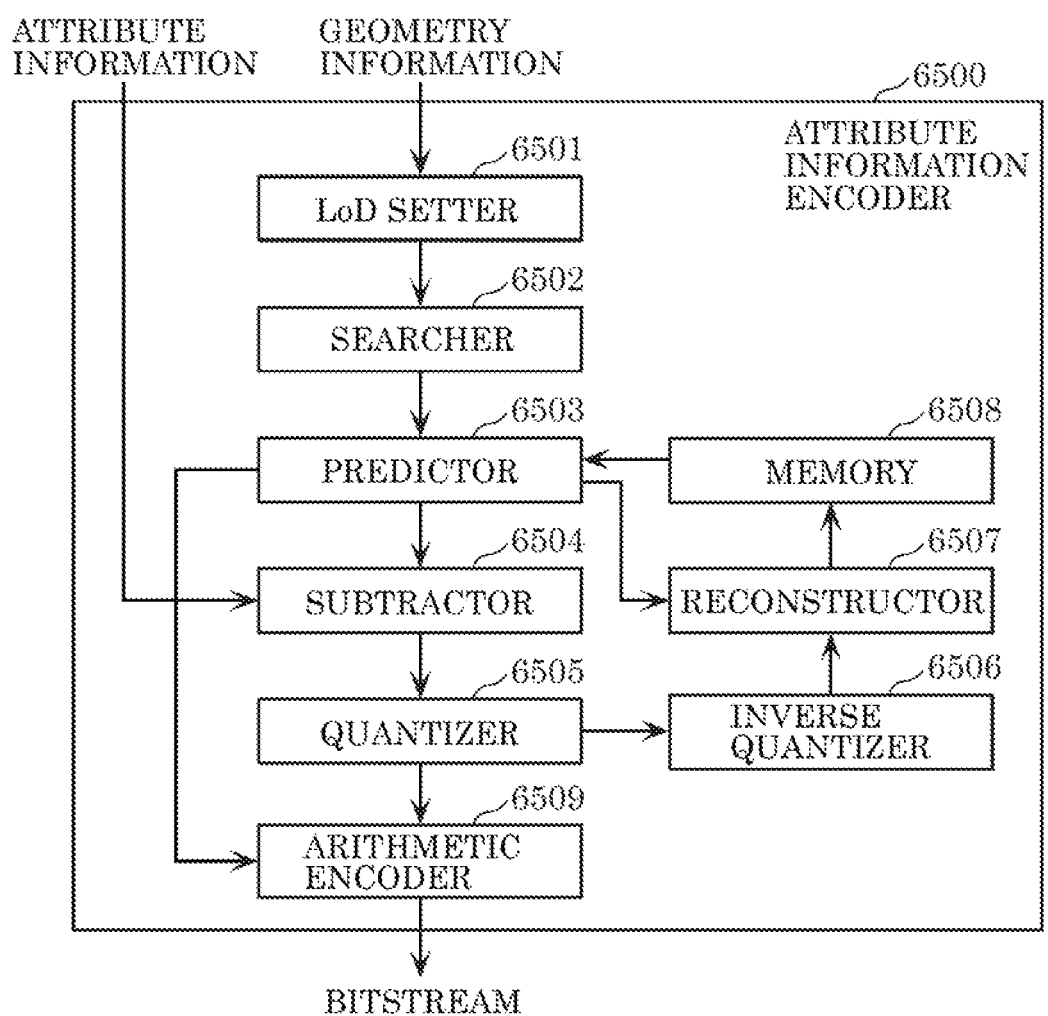

FIG. 124 is a block diagram of attribute information encoder 6500 included in the three-dimensional data encoding device. Attribute information encoder 6500 includes LoD setter 6501, searcher 6502, predictor 6503, subtractor 6504, quantizer 6505, inverse quantizer 6506, reconstructor 6507, and memory 6508.

LoD setter 6501 generates LoDs by using the geometry information of three-dimensional points. Searcher 6502 searches for neighboring three-dimensional points of each three-dimensional point by using the LoD generation result and the distance information between three-dimensional points. Predictor 6503 generates the predicted value of the attribute information of a current three-dimensional point. Additionally, predictor 6503 assigns the predicted value to a plurality of prediction modes 0 to M−1, and selects the prediction mode to be used from the plurality of prediction modes.

Subtractor 6504 generates the predicted residual by subtracting the predicted value from the attribute information. Quantizer 6505 quantizes the predicted residual of the attribute information. Inverse quantizer 6506 performs inverse quantization of the predicted residual after quantization. Reconstructor 6507 generates the decoded value by adding the predicted value and the predicted residual after inverse quantization. Memory 6508 stores the value (decoded value) of the attribute information of each decoded three-dimensional point. The attribute information of the decoded three-dimensional point stored in memory 6508 is utilized for prediction of an unencoded three-dimensional point by predictor 6503.

Arithmetic encoder 6509 calculates ZeroCnt from the predicted residual after quantization, and arithmetically encodes ZeroCnt. Additionally, arithmetic encoder 6509 arithmetically encodes the non-zero predicted residual after quantization. Arithmetic encoder 6509 may binarize the predicted residual before arithmetic encoding. In addition, arithmetic encoder 6509 may generate and encode various kinds of header information. Further, arithmetic encoder 6509 may arithmetically encode the prediction mode information (PredMode) indicating the prediction mode used for encoding by predictor 6503, and may add the prediction mode information to a bitstream.

Figure 125:
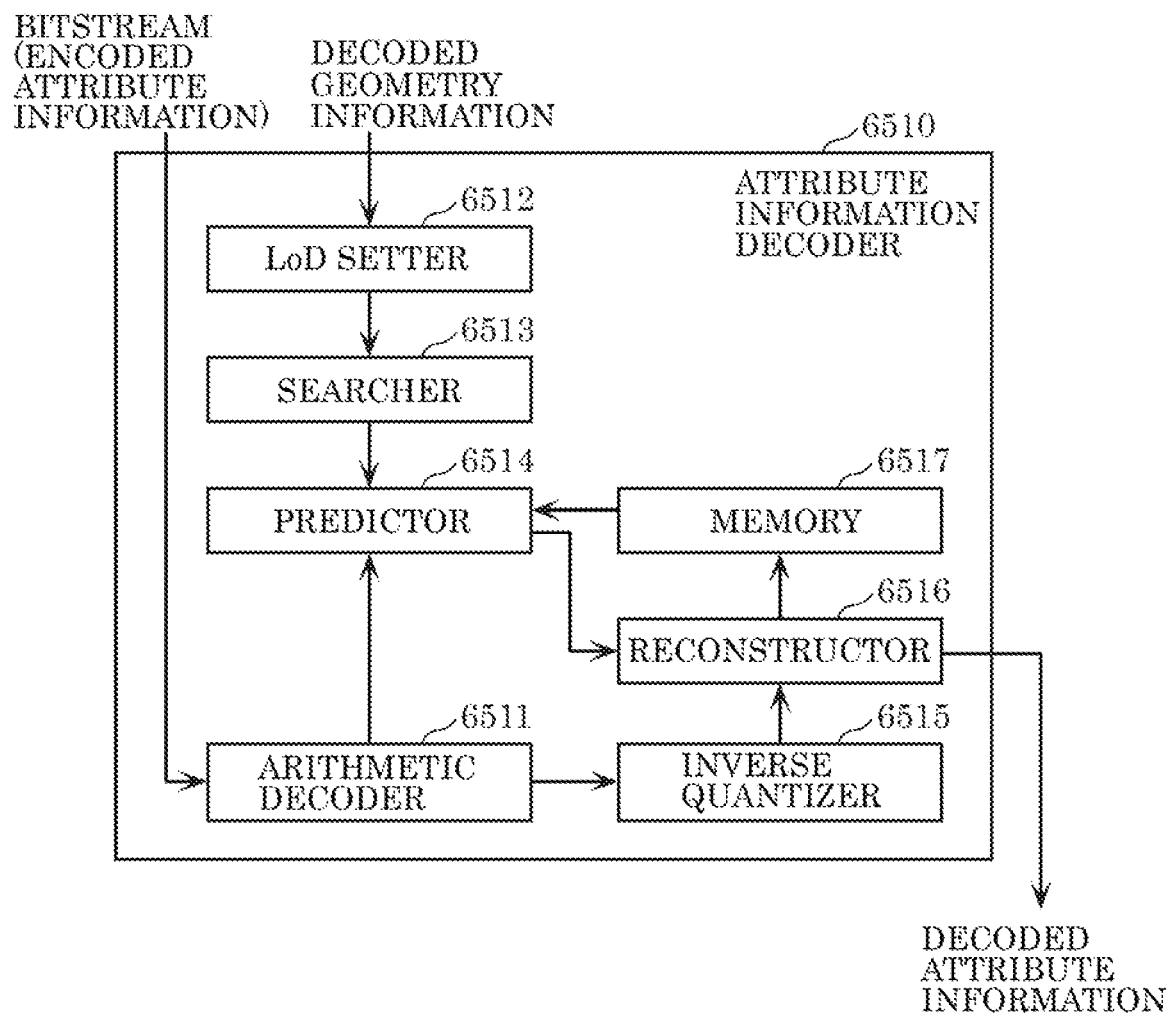

FIG. 125 is a block diagram of attribute information decoder 6510 included in the three-dimensional data decoding device. Attribute information decoder 6510 includes arithmetic decoder 6511, LoD setter 6512, searcher 6513, predictor 6514, inverse quantizer 6515, reconstructor 6516, and memory 6517.

Arithmetic decoder 6511 arithmetically decodes ZeroCnt and the predicted residual included in a bitstream. Additionally, arithmetic decoder 6511 decodes various kinds of header information. In addition, arithmetic decoder 6511 arithmetically decodes the prediction mode information (PredMode) from the bitstream, and outputs the obtained prediction mode information to predictor 6514.

LoD setter 6512 generates LoDs by using the geometry information of decoded three-dimensional points. Searcher 6513 searches for the neighboring three-dimensional points of each three-dimensional point by using the LoD generation result and the distance information between three-dimensional points.

Predictor 6514 generates the predicted value of the attribute information of a current three-dimensional point to be decoded. Inverse quantizer 6515 performs inverse quantization of the arithmetically decoded predicted residual. Reconstructor 6516 generates the decoded value by adding the predicted value and the predicted residual after inverse quantization. Memory 6517 stores the value (decoded value) of the attribute information of each decoded three-dimensional point. The attribute information of the decoded three-dimensional point stored in memory 6517 is utilized for prediction of an undecoded three-dimensional point by predictor 6514.

EMBODIMENT 7

In the present embodiment, another example will be illustrated in which LoD (Level of Detail) layers are generated with low processing volume in the case of predicting and encoding the pieces of attribute information of three-dimensional points.

As described above, the three-dimensional data encoding device generates the LoD layers by, for example, calculating the distance information between a plurality of three-dimensional points that are input. The three-dimensional data encoding device may generate the LoD layers by aligning the input three-dimensional points in the order of Morton codes, and selecting (sampling) a three-dimensional point for every certain constant number of points for the aligned three-dimensional points.

Accordingly, since the three-dimensional data encoding device can generate the LoD layers without calculating the distance information between the three-dimensional points, the processing amount can be reduced.

Hereinafter, the present embodiment will be described by using diagrams.

Figure 126:
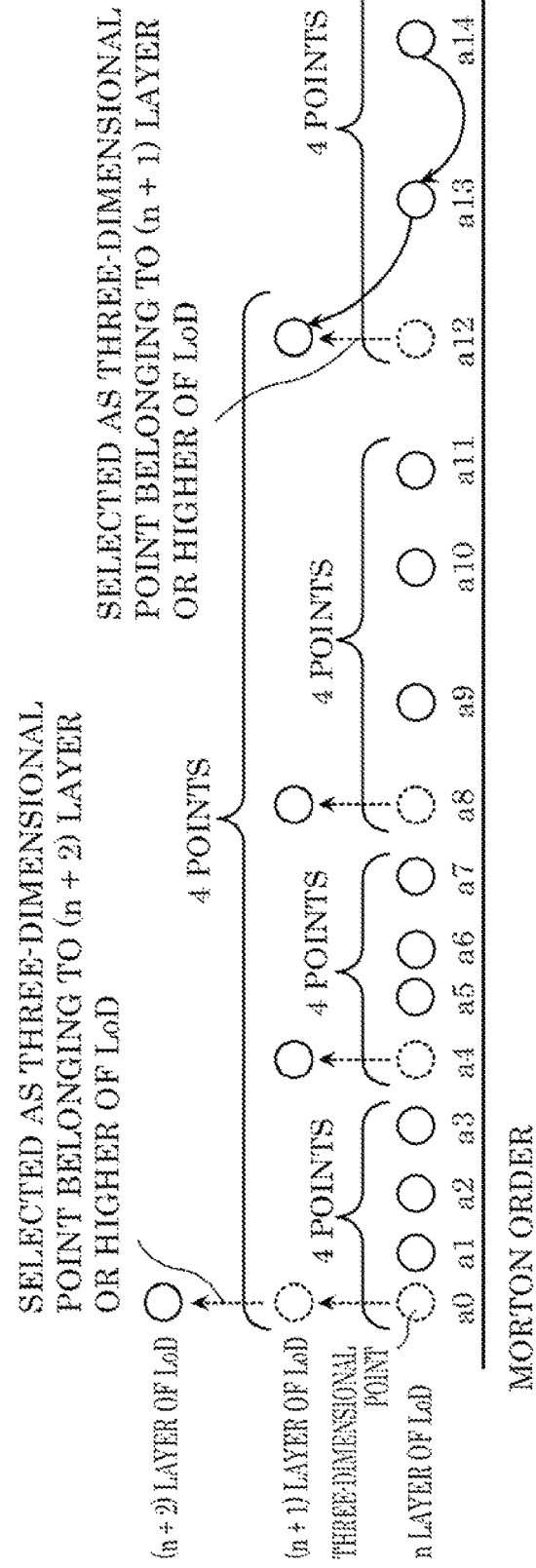

FIG. 126 is a diagram illustrating a first example of a LoD according to the present embodiment. Note that FIG. 126 is a diagram illustrating the layers of the LoD in a case where the sampling period is 4 (sampling=4).

For example, the three-dimensional data encoding device selects three-dimensional points belonging to each layer of the LoD with the following steps.

Step 1. First, the three-dimensional data encoding device arranges input three-dimensional points in the ascending order of a Morton order.

Step 2. Next, the three-dimensional data encoding device selects three-dimensional points belonging to the (n+1) layer and higher of the LoD from the three-dimensional points aligned in the order of the Morton order, according to the value of sampling period information (sampling). For example, the three-dimensional data encoding device selects a three-dimensional point based on a sampling period indicated by the sampling period information, sets the selected three-dimensional point to the three-dimensional point belonging to the (n+1) layer and higher of the LoD, and sets a three-dimensional point that has not been selected to the n layer (for example, the bottom layer) of the LoD. Specifically, for example, when sampling=4, the three-dimensional data encoding device selects a three-dimensional point from a plurality of input three-dimensional points that are aligned in the Morton order for every four points as illustrated in FIG. 126, sets the selected three-dimensional point as a three-dimensional point belonging to the (n+1) layer and higher of the LoD, and sets a three-dimensional point that has not been selected as belonging to the n layer (for example, the bottom layer) of the LoD.

Step 3. Next, the three-dimensional data encoding device selects a three-dimensional point belonging to the LoDn+2 layer or higher, according to the value of the sampling period information (sampling). For example, the three-dimensional data encoding device selects a three-dimensional point from the three-dimensional points selected in the above-described Step 2 based on the sampling period, sets the selected three-dimensional point as a three-dimensional point belonging to the (n+2) layer or higher of the LoD, and sets a three-dimensional point that has not been selected as belonging to the (n+1) layer of the LoD. Specifically, for example, when sampling=4, the three-dimensional data encoding device selects a three-dimensional point from the three-dimensional points selected in the above-described Step 2 for every four points as illustrated in FIG. 126, sets the selected three-dimensional point as a three-dimensional point belonging to the layer (n+2) or higher of the LoD, and sets a three-dimensional point that has not been selected as belonging to the (n+1) layer of the LoD.

Step 4. Subsequently, the three-dimensional data encoding device may repeat the process in the above-described Step 3, and may end the generation of the LoD at the time when a certain condition is satisfied. For example, the three-dimensional data encoding device may generate the layers of the LoD, until the number of the three-dimensional points belonging to a higher layer becomes smaller than a threshold value $\alpha$, which is a value defined in advance. Specifically, for example, since it is determined in advance that $\alpha$=sampling, the three-dimensional data encoding device ends the generation of the LoD at the time when the number of the three-dimensional points of a higher layer becomes smaller than the sampling period.

Note that the three-dimensional data encoding device may encode and add the threshold value $\alpha$ to the header of a bitstream or the like.

Accordingly, the three-dimensional data decoding device can generate the same number of LoD layers as the three-dimensional data encoding device, and can appropriately decode the bitstream by decoding the threshold value $\alpha$ in the header or the like, and performing the same process as the three-dimensional data encoding device.

Note that the threshold value $\alpha$ may be specified in advance by the profile of the standard or the like.

Additionally, the three-dimensional data encoding device may generate the layers of a LoD, until the number of the layers of the LoD reaches an input maximum total number of layers (maxLoD).

Accordingly, the three-dimensional data encoding device can improve the coding efficiency by setting appropriate maxLoD values.

Note that the three-dimensional data encoding device may encode and add maxLoD to the header of a bitstream or the like.

Accordingly, the three-dimensional data decoding device can generate the same number of layers of a LoD as the three-dimensional data encoding device, and can appropriately decode the bitstream, by decoding maxLoD in the header or the like, and performing the same process as the three-dimensional data encoding device.

Note that maxLoD may be specified in advance by the profile (profile) of the standard or the like.

According to the above-described method, since the three-dimensional data encoding device can generate the LoD layers without calculating the distance information between three-dimensional points, the processing amount can be reduced. Additionally, when a spatially dense region (in other words, a region including many three-dimensional points that are spatially close to each other) and a spatially sparse region are included in the input three-dimensional points, since the three-dimensional data encoding device can select three-dimensional points belonging to a higher layer according to the density, the coding efficiency can be improved. For example, in the dense region, the three-dimensional data encoding device selects more three-dimensional points as a higher layer. Accordingly, since the three-dimensional data encoding device can utilize more higher-layer three-dimensional points for generation of a predicted value with respect to lower-layer three-dimensional points included in the dense region, the predictive efficiency can be improved, and the coding efficiency can be improved.

Note that the three-dimensional data encoding device may encode and add the sampling period (sampling) to the header of a bitstream or the like.

Accordingly, since the three-dimensional data decoding device can recognize the sampling period used by the three-dimensional data encoding device, by decoding sampling in the header or the like, the three-dimensional data decoding device can generate the same LoD in the same method as the three-dimensional data encoding device. Therefore, the three-dimensional data decoding device can correctly decode the bitstream.

Note that the value of sampling may be specified by the profile, level (level), or the like of the standard or the like.

Additionally, the three-dimensional data encoding device may generate the predicted value of a three-dimensional point of the n layer of the LoD with reference to the three-dimensional points of the (n+1) layer or higher of the LoD.

Additionally, the three-dimensional data encoding device may switch whether or not to generate the predicted value with reference to the three-dimensional points of the same layer of the LoD, by using information such as EnableReferringSameLoD described above or the like.

Figure 127:
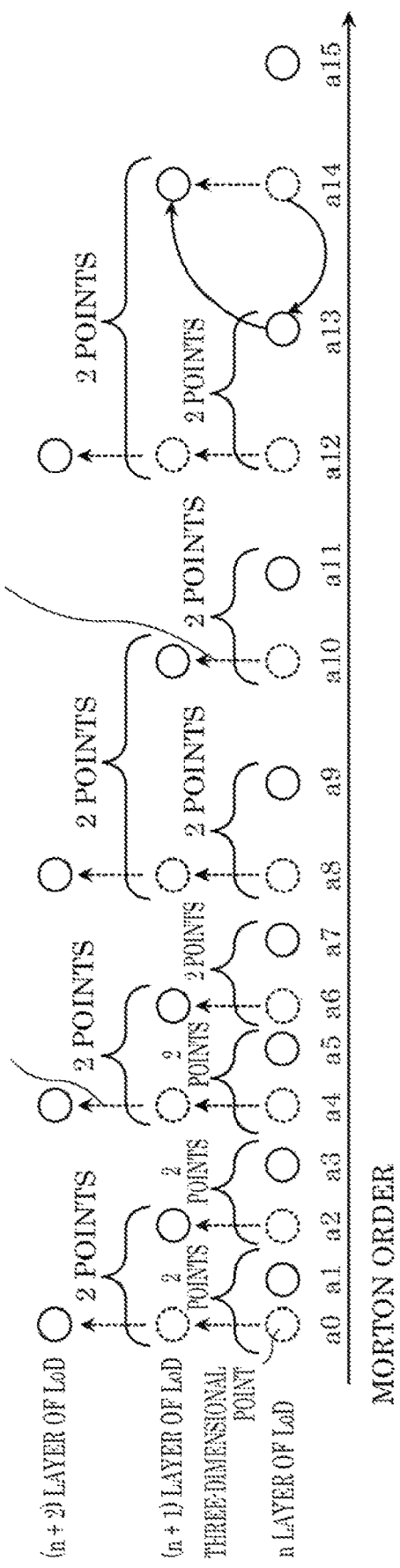

FIG. 127 is a diagram illustrating a second example of the LoD according to the present embodiment. Note that FIG. 127 is a diagram illustrating the layers of a LoD in a case where the sampling period is 2 (sampling=2), and maxLoD is the (n+2) layer (maxLoD=LoDn+2).

For example, the three-dimensional data encoding device performs the above-described steps described in FIG. 126, and generates the layers of the LoD.

Note that, for example, in the above-described Step 2, the three-dimensional data encoding device selects a three-dimensional point from a plurality of input three-dimensional points that are aligned in the Morton order for every two points as illustrated in FIG. 127, sets the selected three-dimensional point as a three-dimensional point belonging to the (n+1) layer or higher of the LoD, and sets a three-dimensional point that has not been selected as belonging to the n layer (for example, the bottom layer) of the LoD.

Additionally, for example, in the above-described Step 3, the three-dimensional data encoding device selects a three-dimensional point from the three-dimensional points selected in the above-described Step 2 for every two points as illustrated in FIG. 127, sets the selected three-dimensional point as a three-dimensional point belonging to the (n+2)

layer or higher of the LoD, and sets a three-dimensional point that has not been selected as belonging to the (n+1) layer of the LoD.

Additionally, the three-dimensional data encoding device may generate the predicted value of a three-dimensional point of the n layer of the LoD with reference to the three-dimensional points of the (n+1) layer or higher of the LoD.

Additionally, the three-dimensional data encoding device may switch whether or not to generate the predicted value with reference to the three-dimensional points of the same layer of the LoD, by using information such as EnableReferringSameLoD described above or the like.

Figure 128:
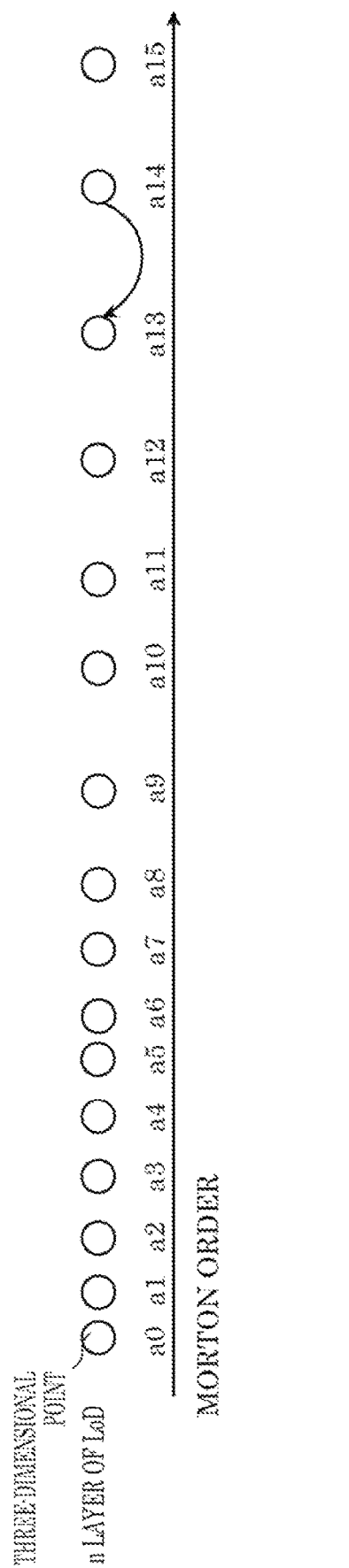

FIG. 128 is a diagram illustrating a third example of the LoD according to the present embodiment. Note that FIG. 128 is a diagram illustrating the layers of a LoD in a case where the sampling period is 1 (sampling=1), or maxLoD is one layer (maxLoD=1).

For example, when the sampling period (sampling)=1, the three-dimensional data encoding device selects a three-dimensional point belonging to one layer of the LoD with the following steps.

Step 1. First, the three-dimensional data encoding device arranges a plurality of input three-dimensional points in the ascending order of the Morton order.

Step 2. Next, the three-dimensional data encoding device sets all of the three-dimensional points to the n layer of the LoD.

Accordingly, since it becomes unnecessary for the three-dimensional data encoding device to select the three-dimensional points belonging to each layer of the LoD, the processing amount can be reduced.

Note that, when sampling=1, the three-dimensional data encoding device may assume that maxLoD=1, and need not add the information of maxLoD to the header.

Accordingly, the three-dimensional data encoding device can reduce the header amount.

Additionally, when maxLoD=1, the three-dimensional data encoding device may assume that sampling=1, and need not add the information of sampling to the header.

Accordingly, the three-dimensional data encoding device can reduce the header amount.

Additionally, when sampling=1, the three-dimensional data encoding device may assume that EnableReferringSameLoD=1, and need not add EnableReferringSameLoD to the header.

Accordingly, the three-dimensional data encoding device can reduce the header amount.

Note that it may be specified in advance by the standard or the like so that EnableReferringSameLoD=0 is not satisfied when sampling=1.

According to the above-described method, since the three-dimensional data encoding device can generate the layers of the LoD without calculating the distance information between three-dimensional points, and without selecting sampling points, the processing amount can be further reduced.

Note that the three-dimensional data encoding device may switch whether or not to generate the predicted value with reference to the three-dimensional points of the same layer of the LoD, by using information such as EnableReferringSameLoD described above or the like.

EMBODIMENT 8

In this embodiment, as an example of encoding of attribute information on three-dimensional points by prediction, a method of generating encoded data or decoded data by determining prediction structures while generating Levels of Detail (LoDs) will be described. FIG. 129 to FIG. 132 are diagrams for illustrating this process.

Figure 129:
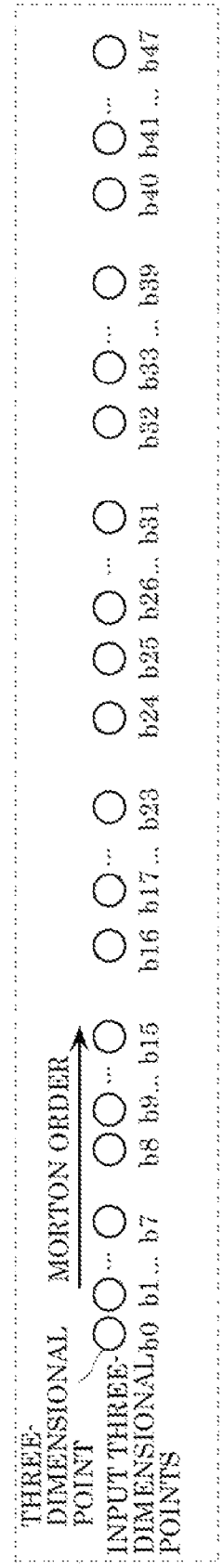

FIG. 129 is a diagram showing an example of a processing of re-ordering three-dimensional points. First, the three-dimensional data encoding device re-orders input three-dimensional points in the order of Morton codes (referred to also as a Morton order), as shown in FIG. 129. In this way, three-dimensional points relatively close to each other can be brought together and encoded, so that the prediction precision can be improved. Therefore, the encoding efficiency can be improved. Note that the three-dimensional data encoding device may re-order three-dimensional points in any of ascending or descending Morton order.

Figure 130:
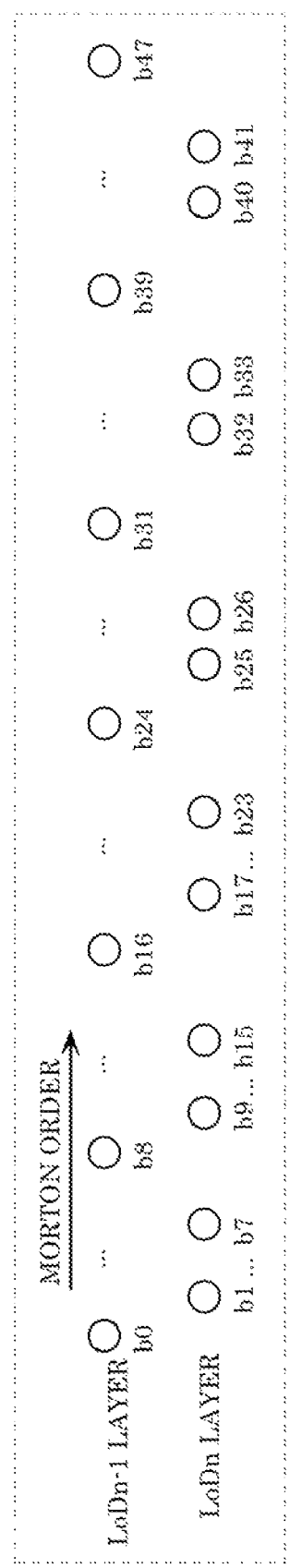

FIG. 130 is a diagram showing an example of a layer assignment processing. As shown in FIG. 130, the three-dimensional data encoding device then assigns three-dimensional points (input three-dimensional points b0 to b47 in the case of this example) belonging to the LoDn layer to the LoDn layer and LoDn−1 layer. Note that LoD0 is the highest layer herein, and the lower the layer, the greater the numeric value of LoD is. Note that LoD0 may be the lowest layer, and the higher the layer, the greater the numeric value of LoD may be.

The three-dimensional data encoding device performs the assignment processing in the re-ordered Morton order (that is, in the order of b0, b1, . . . , b47), for example. The three-dimensional data encoding device may perform the assignment based on distance information on the three-dimensional points, for example. Alternatively, the three-dimensional data encoding device may extract three-dimensional points to be assigned to the LoDn−1 layer at a certain sampling rate. Alternatively, the three-dimensional data encoding device may selectively use these approaches. The three-dimensional data encoding device can choose whether to give a higher priority to the encoding efficiency or the processing amount by switching between these approaches.

FIG. 131 is a diagram showing an example of a prediction structure determination processing. As shown in FIG. 131, the three-dimensional data encoding device then determines prediction structures for a plurality of three-dimensional points belonging to the LoDn layer. For example, the three-dimensional data encoding device performs the prediction structure determination processing in the Morton order (that is, in the order of b1, b7, b9, . . . , b41). In this way, three-dimensional points for which the prediction structure is determined earlier, such as b1, b7, and b9, can refer to more three-dimensional points than three-dimensional points for which the prediction structure is determined later, such as b40 and b41. In this way, the prediction precision of three-dimensional points processed earlier can be improved, so that the encoding efficiency of the three-dimensional points processed earlier can be improved.

For example, when three-dimensional points are arranged in ascending Morton order, the prediction efficiency of the attribute information on three-dimensional points with small Morton codes, that is, a three-dimensional point cloud close to the coordinates of the origin of the input three-dimensional point cloud is improved. Therefore, the attribute information on three-dimensional points close to the origin can be efficiently encoded.

When three-dimensional points are arranged in descending Morton order, the prediction efficiency of the attribute information on three-dimensional points with large Morton codes, that is, a three-dimensional point cloud far from the coordinates of the origin of the input three-dimensional point cloud is improved. In this way, by switching the prediction structure determination order of the input three-dimensional points between ascending Morton order and descending Morton order, three-dimensional points close to or far from the origin can be encoded with a higher priority.

For example, in the prediction structure determination, the three-dimensional data encoding device searches the three-dimensional points in same layer LoDn as the current three-dimensional point or the three-dimensional points in higher layer LoDn−1 for a three-dimensional point to be referred to. In this case, the search range of the search of the same layer and the search range of the search of the higher layer may be different. Furthermore, information indicating the search ranges may be added to the header or the like. In this way, the search range can be more finely controlled, and the improvement of the encoding efficiency and the reduction of the processing amount can be balanced.

FIG. 132 is a diagram showing an example of a prediction processing. After determining the prediction structures, the three-dimensional data encoding device calculates prediction residuals of the three-dimensional points belonging to the LoDn layer and arithmetically encodes the calculated prediction residuals as shown in FIG. 132. For example, the three-dimensional data encoding device performs this processing in the reverse order (the order of b41, b40, . . . , b1) to the Morton order. That is, the order of this processing is reverse to the order of the layer assignment (FIG. 130) and the order of the prediction structure determination (FIG. 131).

For example, the three-dimensional data encoding device calculates a prediction residual of b7 by subtracting a predicted value calculated from b0, b8, and b9 from attribute information (attribute value) on b7. The three-dimensional data encoding device generates encoded data on b7 by arithmetically encoding the calculated prediction residual. The three-dimensional data encoding device calculates a prediction residual of b41 by subtracting attribute information on b47, which is a predicted value, from attribute information on b41. The three-dimensional data encoding device generates encoded data on b41 by arithmetically encoding the calculated prediction residual.

The layer assignment processing (FIG. 130), the prediction structure determination processing (FIG. 131), and the prediction processing (FIG. 132) described above are repeatedly performed for each layer. That is, the LoDn—1 layer determined as described above is the next layer to be processed, and the three-dimensional points (b0, b8, . . . ) included in the LoDn—1 layer are assigned to the LoDn—1 layer and the LoDn—2 layer. In this way, some of the three-dimensional points (b0, b8, . . . ) belonging to the LoDn—1 layer shown in FIG. 131 are eventually assigned to layers higher than the LoDn—1 layer. The prediction structures for the LoDn—1 layer are determined in the same manner as described above, and the prediction residual and the encoded data for the LoDn—1 layer are generated.

In this way, by repeating the processings described above for each LoD layer, encoded data for all the LoD layers is generated.

Note that, when the LoD layer to be processed is the highest layer (such as LoD0), the three-dimensional data encoding device may omit the layer assignment processing (FIG. 130). In this way, the processing amount of the LoD generation can be reduced.

As the prediction structure determination processing and the prediction processing, the processings described below may be performed. FIG. 133 is a diagram showing an example of the prediction structure determination processing for the highest layer. FIG. 134 is a diagram showing an example of the prediction processing for the highest layer.

As shown in FIG. 133 and FIG. 6, for example, a three-dimensional point included in the current layer (highest layer) refers to a three-dimensional point included in the same layer (highest layer) but does not refer to a three-dimensional point included in another layer.

For example, the three-dimensional data encoding device calculates a prediction residual of b47 by subtracting a predicted value of 0 from an attribute value of b47. The three-dimensional data encoding device generates encoded data on b47 by arithmetically encoding the calculated prediction residual. The three-dimensional data encoding device calculates a prediction residual of b16 by subtracting attribute information on b31, which is a predicted value, from attribute information on b16. The three-dimensional data encoding device generates encoded data on b16 by arithmetically encoding the calculated prediction residual.

Note that a value that indicates the highest layer may be added to the header or the like. The three-dimensional data encoding device or three-dimensional data decoding device may calculate a value for the highest layer from this value.

FIG. 135 is a flowchart of a three-dimensional data encoding process. First, the three-dimensional data encoding device re-orders input three-dimensional points in the Morton order as shown in FIG. 129, for example (S8901). The three-dimensional data encoding device then sets LoDn, which is the current layer to be processed, to be maxLoD−1 (S8902). That is, among a plurality of layers, the lowest layer is set to be the current layer. Here, maxLoD is the maximum number of LoD layers to be generated. MaxLoD may be added to the header or the like included in the bitstream. This allows the three-dimensional data decoding device to calculate the maximum number of LoD layers generated in the decoding, and therefore to properly decode the bitstream.

The three-dimensional data encoding device then determines whether LoDn is the highest layer or not (S8903). For example, the three-dimensional data encoding device may determine that LoDn is the highest layer when the value of LoDn is 0, and determine that LoDn is not the highest layer when the value of LoDn is not 0. When there is no three-dimensional point belonging to LoDn, the three-dimensional data encoding device may end the process. By omitting the processings in this way, the processing amount can be reduced.

When LoDn is not the highest layer (if No in S8903), the three-dimensional data encoding device generates LoDn and LoDn−1 (S8904). Specifically, as shown in FIG. 130, the three-dimensional data encoding device assigns a plurality of three-dimensional points belonging to current layer LoDn at that point in time to current layer LoDn and next layer LoDn−1, which is a layer higher by one layer than the current layer, thereby updating the three-dimensional points belonging to current layer LoDn and next layer LoDn−1.

The three-dimensional data encoding device then determines prediction structures for the three-dimensional points belonging to LoDn as shown in FIG. 131 (S8905). The three-dimensional data encoding device then generates prediction residuals of the three-dimensional points belonging to LoDn as shown in FIG. 132, and arithmetically encodes the generated prediction residuals (S8906).

The three-dimensional data encoding device then sets LoDn to be LoDn−1, thereby setting the next layer to be the current layer (S8907), and performs step S8903 and the following processings for the set current layer.

On the other hand, when LoDn is the highest layer (if Yes in S8903), the three-dimensional data encoding device determines prediction structures for the three-dimensional points belonging to the highest layer as shown in FIG. 133 (S8908). The three-dimensional data encoding device then generates prediction residuals of the three-dimensional points belonging to the highest layer as shown in FIG. 134, and arithmetically encodes the generated prediction residuals (S8909).

Note that step S8905 and step S8908 are similar processings and therefore may be integrated. Similarly, step S8906 and step S8909 are similar processings and therefore may be integrated.

In the process shown in FIG. 135, prediction structures are determined on a layer basis, and the generation and arithmetic encoding of prediction residuals are also performed on a layer basis. However, prediction structures for all the layers may be first determined, and then the generation and arithmetic encoding of prediction residuals may be performed for all the layers. FIG. 136 is a flowchart of a three-dimensional data encoding process in that case. The process shown in FIG. 136 differs from the process shown in FIG. 135 in that the process includes step S8910, instead of step S8906 and step S8909.

Specifically, after prediction structures for all the layers are determined (after S8908), the three-dimensional data encoding device generates prediction residuals of the three-dimensional points of all the layers, and arithmetically encodes the generated prediction residuals (S8910). For example, the three-dimensional data encoding device performs the processing, beginning with the highest layer. The three-dimensional data encoding device performs the processing on a plurality of three-dimensional points included in each layer in the reverse order to the Morton order. That is, the three-dimensional data encoding device performs the processing in the reverse order to the order in the layer assignment processing (S8904) and the prediction structure determination processing (S8905 or S8908). Specifically, the three-dimensional data encoding device processes the layers in the reverse order to the order in the layer assignment processing (S8904) and the prediction structure determination processing (S8905 or S8908), and processes the plurality of three-dimensional points belonging to each layer in the reverse order to the order in the layer assignment processing (S8904) and the prediction structure determination processing (S8905 or S8908).

Next, a process in the three-dimensional data decoding device will be described. Note that the re-ordering processing (FIG. 129), the layer assignment processing (FIG. 130), and the prediction structure determination processing (FIG. 131) are the same as the processings in the three-dimensional data encoding device.

FIG. 137 is a diagram showing an example of a decoded data generation processing. After determining a prediction structure, the three-dimensional data decoding device generates decoded data by adding a calculated predicted value to a prediction residual as shown in FIG. 137. Specifically, the three-dimensional data decoding device generates a prediction residual by arithmetically decoding the encoded data included in the bitstream. The three-dimensional data decoding device generates decoded data by adding a predicted value calculated based on the prediction structure to the generated prediction residual. For example, the three-dimensional data decoding device generates decoded data on a plurality of three-dimensional points belonging to the LoDn layer in the reverse order to the Morton order. For example, the three-dimensional data decoding device generates decoded data in the order of b41, b40, . . . , b1 belonging to the LoDn layer.

For example, the three-dimensional data decoding device generates decoded data (attribute information) on b7 by adding a predicted value calculated from b0, b8, and b9 to a prediction residual of b7 decoded from the bitstream. The three-dimensional data decoding device also generates decoded data on b41 by adding attribute information on b47, which is a predicted value of b41, to a prediction residual of b41 decoded from the bitstream.

The layer assignment processing (FIG. 130), the prediction structure determination processing (FIG. 131), and the decoded data generation processing (FIG. 137) are repeatedly performed for each layer. That is, decoded data on the LoDn—1 layer is generated by performing the layer assignment processing (FIG. 130), the prediction structure determination processing (FIG. 131), and the decoded data generation processing (FIG. 137) for the LoDn—1 layer. By repeating the processings described above for each LoD layer in this way, decoded data on all the LoD layers is generated.

Note that when the LoD layer to be processed is the highest layer (such as LoD0), the three-dimensional data decoding device may omit the layer assignment processing (FIG. 130). In this way, the processing amount of the LoD generation can be reduced. When the LoD layer to be processed is the highest layer, the three-dimensional data decoding device performs the prediction structure determination processing shown in FIG. 133, as with the three-dimensional data encoding device.

FIG. 138 is a diagram showing an example of the decoded data generation processing for the highest layer. As shown in FIG. 133 and FIG. 138, the three-dimensional data decoding device processes three-dimensional points included in the current layer (highest layer) by referring to the three-dimensional points included in the same layer (highest layer), without referring to the three-dimensional points included in the other layers.

For example, the three-dimensional data decoding device calculated decoded data on b47 by adding a predicted value of 0 to a prediction residual of b47. Note that the three-dimensional data decoding device obtains the prediction residual of b47 by arithmetically decoding the encoded data included in the bitstream. The three-dimensional data decoding device calculates decoded data on b16 by adding an attribute value of b31, which is a predicted value, to a prediction residual of b16. Note that the three-dimensional data decoding device obtains the prediction residual of b16 by arithmetically decoding the encoded data included in the bitstream.

Note that the three-dimensional data decoding device may calculate a value of the highest layer from the value indicating the highest layer added to the header or the like included in the bitstream.

FIG. 139 is a flowchart of a three-dimensional data decoding process. First, the three-dimensional data decoding device re-orders input three-dimensional points in the Morton order as shown in FIG. 129, for example (S8911). The three-dimensional data decoding device then sets LoDn, which is the current layer to be processed, to be maxLoD−1 (S8912). That is, among a plurality of layers, the lowest layer is set to be the current layer. Here, maxLoD is the maximum number of LoD layers to be generated. For example, the three-dimensional data decoding device decodes maxLoD from the header or the like included in the bitstream.

The three-dimensional data decoding device then determines whether LoDn is the highest layer or not (S8913). For example, the three-dimensional data decoding device may determine that LoDn is the highest layer when the value of LoDn is 0, and determine that LoDn is not the highest layer when the value of LoDn is not 0. When there is no three-dimensional point belonging to LoDn, the three-dimensional data decoding device may end the process. By omitting the processings in this way, the processing amount can be reduced.

When LoDn is not the highest layer (if No in S8913), the three-dimensional data decoding device generates LoDn and LoDn−1 (S8914). Specifically, as shown in FIG. 130, the three-dimensional data decoding device assigns a plurality of three-dimensional points belonging to current layer LoDn at that point in time to current layer LoDn and next layer LoDn−1, which is a layer higher by one layer than the current layer, thereby updating the three-dimensional points belonging to current layer LoDn and next layer LoDn−1.

The three-dimensional data decoding device then determines prediction structures for the three-dimensional points belonging to LoDn as shown in FIG. 131 (S8915). The three-dimensional data decoding device then calculates decoded data on the three-dimensional points belonging to LoDn as shown in FIG. 137 (S8916).

The three-dimensional data decoding device then sets LoDn to be LoDn−1, thereby setting the next layer to be the current layer (S8917), and performs step S8913 and the following processings for the set current layer.

On the other hand, when LoDn is the highest layer (if Yes in S8913), the three-dimensional data decoding device determines prediction structures for the three-dimensional points belonging to the highest layer as shown in FIG. 133 (S8918). The three-dimensional data decoding device then calculates decoded data on the three-dimensional points belonging to the highest layer as shown in FIG. 138 (S8919).

Note that step S8915 and step S8918 are similar processings and therefore may be integrated. Similarly, step S8916 and step S8919 are similar processings and therefore may be integrated.

In the process shown in FIG. 139, prediction structures are determined on a layer basis, and the generation of decoded data is also performed on a layer basis. However, prediction structures for all the layers may be first determined, and then the generation of decoded data may be performed for all the layers. FIG. 140 is a flowchart of a three-dimensional data decoding process in that case. The process shown in FIG. 140 differs from the process shown in FIG. 139 in that the process includes step S8920, instead of step S8916 and step S8919.

Specifically, after prediction structures for all the layers are determined (after S8918), the three-dimensional data decoding device calculates decoded data on the three-dimensional points of all the layers (S8920). For example, the three-dimensional data decoding device performs the processing, beginning with the highest layer. The three-dimensional data decoding device performs the processing on a plurality of three-dimensional points included in each layer in the reverse order to the Morton order. That is, the three-dimensional data decoding device performs the processing in the reverse order to the order in the layer assignment processing (S8914) and the prediction structure determination processing (S8915 or S8918). Specifically, the three-dimensional data decoding device processes the layers in the reverse order to the order in the layer assignment processing (S8914) and the prediction structure determination processing (S8915 or S8918), and processes the plurality of three-dimensional points belonging to each layer in the reverse order to the order in the layer assignment processing (S8914) and the prediction structure determination processing (S8915 or S8918).

In the following, variations of the three-dimensional data encoding process and the three-dimensional data decoding process will be described. Specifically, processes in which step S8905 and step S8908 (or step S8915 and step S8918) are integrated and step S8906 and step S8909 (or step S8916 and step S8919) are integrated will be described.

FIG. 141 is a flowchart of a variation of the three-dimensional data encoding process. First, the three-dimensional data encoding device re-orders input three-dimensional points in the Morton order as shown in FIG. 129, for example (S8921). The three-dimensional data encoding device then sets LoDn, which is the current layer to be processed, to be maxLoD−1 (S8922). That is, among a plurality of layers, the lowest layer is set to be the current layer. Here, maxLoD is the maximum number of LoD layers to be generated. MaxLoD may be added to the header or the like. This allows the three-dimensional data decoding device to calculate the maximum number of LoD layers generated in the decoding, and therefore to properly decode the bitstream.

The three-dimensional data encoding device then determines whether LoDn is the highest layer or not (S8923). For example, the three-dimensional data encoding device may determine that LoDn is the highest layer when the value of LoDn is 0, and determine that LoDn is not the highest layer when the value of LoDn is not 0. When there is no three-dimensional point belonging to LoDn, the three-dimensional data encoding device may end the process. By omitting the processings in this way, the processing amount can be reduced.

When LoDn is not the highest layer (if No in S8923), the three-dimensional data encoding device generates LoDn and LoDn−1 (S8924). Specifically, as shown in FIG. 130, the three-dimensional data encoding device assigns a plurality of three-dimensional points belonging to current layer LoDn at that point in time to current layer LoDn and next layer LoDn−1, which is a layer higher by one layer than the current layer, thereby updating the three-dimensional points belonging to current layer LoDn and next layer LoDn−1.

On the other hand, when LoDn is the highest layer (if Yes in S8923), the three-dimensional data encoding device does not perform the layer assignment processing (S8924).

The three-dimensional data encoding device then determines prediction structures for the three-dimensional points belonging to LoDn as shown in FIG. 131 (S8925). The three-dimensional data encoding device then generates prediction residuals of the three-dimensional points belonging to LoDn as shown in FIG. 132, and arithmetically encodes the generated prediction residuals (S8926). Note that when the current layer is the highest layer, there is no layer higher than the current layer, and therefore, prediction structures for the three-dimensional points belonging to the highest layer are determined as shown in FIG. 133 in step S8925. In step S8926, prediction residuals of the three-dimensional points belonging to the highest layer are generated as shown in FIG. 134.

The three-dimensional data encoding device then determines whether LoDn is the highest layer or not (S8927). When LoDn is not the highest layer (if No in S8927), the three-dimensional data encoding device then sets LoDn to be LoDn−1, thereby setting the next layer to be the current layer (S8928), and performs step S8923 and the following processings for the set current layer.

On the other hand, when LoDn is the highest layer (if Yes in S8927), the three-dimensional data encoding device ends the process.

In the process shown in FIG. 141, prediction structures are determined on a layer basis, and the generation and arithmetic encoding of prediction residuals are also performed on a layer basis. However, prediction structures for all the layers may be first determined, and then the generation and arithmetic encoding of prediction residuals may be performed for all the layers. FIG. 142 is a flowchart of a three-dimensional data encoding process in that case. The process shown in FIG. 142 differs from the process shown in FIG. 141 in that the process includes step S8929, instead of step S8926.

Specifically, after prediction structures for all the layers are determined (if Yes in S8927), the three-dimensional data encoding device generates prediction residuals of the three-dimensional points of all the layers, and arithmetically encodes the generated prediction residuals (S8929). For example, the three-dimensional data encoding device performs the processing, beginning with the highest layer. The three-dimensional data encoding device performs the processing on a plurality of three-dimensional points included in each layer in the reverse order to the Morton order. That is, the three-dimensional data encoding device performs the processing in the reverse order to the order in the layer assignment processing (S8924) and the prediction structure determination processing (S8925). Specifically, the three-dimensional data encoding device processes the layers in the reverse order to the order in the layer assignment processing (S8924) and the prediction structure determination processing (S8925), and processes the plurality of three-dimensional points belonging to each layer in the reverse order to the order in the layer assignment processing (S8924) and the prediction structure determination processing (S8925).

FIG. 143 is a flowchart of a three-dimensional data decoding process. First, the three-dimensional data decoding device re-orders input three-dimensional points in the Morton order as shown in FIG. 129, for example (S8931). The three-dimensional data decoding device then sets LoDn, which is the current layer to be processed, to be maxLoD−1 (S8932). That is, among a plurality of layers, the lowest layer is set to be the current layer. Here, maxLoD is the maximum number of LoD layers to be generated. For example, the three-dimensional data decoding device decodes maxLoD from the header or the like included in the bitstream.

The three-dimensional data decoding device then determines whether LoDn is the highest layer or not (S8933). For example, the three-dimensional data decoding device may determine that LoDn is the highest layer when the value of LoDn is 0, and determine that LoDn is not the highest layer when the value of LoDn is not 0. When there is no three-dimensional point belonging to LoDn, the three-dimensional data decoding device may end the process. By omitting the processings in this way, the processing amount can be reduced.

When LoDn is not the highest layer (if No in S8933), the three-dimensional data decoding device generates LoDn and LoDn−1 (S8934). Specifically, as shown in FIG. 130, the three-dimensional data decoding device assigns a plurality of three-dimensional points belonging to current layer LoDn at that point in time to current layer LoDn and next layer LoDn−1, which is a layer higher by one layer than the current layer, thereby updating the three-dimensional points belonging to current layer LoDn and next layer LoDn−1.

On the other hand, when LoDn is the highest layer (if Yes in S8933), the three-dimensional data decoding device does not perform the layer assignment processing (S8934).

The three-dimensional data decoding device then determines prediction structures for the three-dimensional points belonging to LoDn as shown in FIG. 131 (S8935). The three-dimensional data decoding device then calculates decoded data on the three-dimensional points belonging to LoDn as shown in FIG. 137 (S8936). Note that when the current layer is the highest layer, there is no layer higher than the current layer, and therefore, prediction structures for the three-dimensional points belonging to the highest layer is determined as shown in FIG. 133 in step S8935. In step S8936, prediction residuals of the three-dimensional points belonging to the highest layer are generated as shown in FIG. 138.

The three-dimensional data decoding device then determines whether LoDn is the highest layer or not (S8937). When LoDn is not the highest layer (if No in S8937), the three-dimensional data decoding device then sets LoDn to be LoDn−1, thereby setting the next layer to be the current layer (S8938), and performs step S8933 and the following processings for the set current layer.

On the other hand, when LoDn is the highest layer (if Yes in S8937), the three-dimensional data decoding device ends the process.

In the process shown in FIG. 143, prediction structures are determined on a layer basis, and the generation of decoded data is also performed on a layer basis. However, prediction structures for all the layers may be first determined, and then the generation of decoded data may be performed for all the layers. FIG. 144 is a flowchart of a three-dimensional data decoding process in that case. The process shown in FIG. 144 differs from the process shown in FIG. 143 in that the process includes step S8939, instead of step S8936.

Specifically, after prediction structures for all the layers are determined (if Yes in S8937), the three-dimensional data decoding device calculates decoded data on the three-dimensional points of all the layers (S8939). For example, the three-dimensional data decoding device performs the processing, beginning with the highest layer. The three-dimensional data decoding device performs the processing on a plurality of three-dimensional points included in each layer in the reverse order to the Morton order. That is, the three-dimensional data decoding device performs the processing in the reverse order to the order in the layer assignment processing (S8934) and the prediction structure determination processing (S8935). Specifically, the three-dimensional data decoding device processes the layers in the reverse order to the order in the layer assignment processing (S8934) and the prediction structure determination processing (S8935), and processes the plurality of three-dimensional points belonging to each layer in the reverse order to the order in the layer assignment processing (S8934) and the prediction structure determination processing (S8935).

As stated above, the three-dimensional data encoding device according to the present embodiment assigns items of attribute information of three-dimensional points included in point cloud data to one of layers (e.g., LoDs), based on items of geometry information of the three-dimensional points, and encodes the items of attribute information. The three-dimensional data encoding device selects each of the layers as a current layer (e.g., LoDn) in order from a lowest layer (e.g., S8902 and S8907 or S8922 and S8928). When the current layer is not a highest layer among the layers (e.g., No in S8903 or No in S8923), the three-dimensional data encoding device repeats, for each of the current layers, (i) assigning three-dimensional points included in the current layer to each of the current layer and a next layer higher by one layer than the current layer, to update three-dimensional points included in each of the current layer and the next layer (e.g., S8904 or S8924), and (ii) determining a prediction structure indicating three-dimensional points referred to by the three-dimensional points updated included in the current layer (e.g., S8905 or S8925). When the current layer is the highest layer in the repeating (e.g., Yes in S8903 or Yes in S8923), the three-dimensional data encoding device determines a prediction structure of three-dimensional points included in the highest layer (e.g., S8908 or S8925). In other words, the three-dimensional data encoding device does not assign three-dimensional points included in the current layer to each of the current layer and the next layer higher by one layer than the current layer, to update three-dimensional points included in each of the current layer and the next layer. The three-dimensional data encoding device predictively encodes the items of attribute information of the three-dimensional points included in the layers, based on the prediction structure determined in the repeating, to generate prediction residuals (e.g., S8906 and S8909, S8910, S8926, or S8929).

According to this three-dimensional data encoding device, prediction structures can be determined while generating layers, so that the processing amount can be reduced. In this case, in addition, according to the three-dimensional data encoding device, an efficient process can be implemented, so that the processing amount can be reduced.

For example, in the determining (e.g., S8905 or S8925), the three-dimensional data encoding device determines prediction structures of the three-dimensional points updated included in the current layer in sequence according to a first order, and in the predictively encoding (e.g., S8906 and S8909, S8910, S8926, or S8929), the three-dimensional data encoding device predictively encodes items of attribute information of three-dimensional points included in each of the layers in sequence according to a second order reverse to the first order. For example, the first order is a Morton order.

For example, when the current layer is not the highest layer, in the prediction structure, a three-dimensional point among the three-dimensional points included in the current layer refers to another three-dimensional point among the three-dimensional points included in the current layer and a three-dimensional point among the three-dimensional points included in the next layer, and when the current layer is the highest layer, in the prediction structure, a three-dimensional point among the three-dimensional points included in the highest layer refers to another three-dimensional point among the three-dimensional points included in the highest layer.

For example, the three-dimensional data encoding device includes a processor and memory. Using the memory, the processor performs the above-described process.

The three-dimensional data decoding device according to the present embodiment decodes a bitstream generated by (i) assigning items of attribute information of three-dimensional points included in point cloud data to one of layers (e.g., LoDs), based on items of geometry information of the three-dimensional points, and (ii) encoding the items of attribute information. The three-dimensional data decoding device selects each of the layers as a current layer (e.g., LoDn) in order from a lowest layer (e.g., S8912 and S8917 or S8932 and S8938). When the current layer is not a highest layer among the layers (e.g., No in S8913 or No in S8933), the three-dimensional data decoding device repeats, for each of the current layers, (i) assigning three-dimensional points included in the current layer to each of the current layer and a next layer higher by one layer than the current layer, to update three-dimensional points included in each of the current layer and the next layer (e.g., S8914 or S8934), and (ii) determining a prediction structure indicating three-dimensional points referred to by the three-dimensional points updated included in the current layer selects each of the layers as a current layer in order from a lowest layer (e.g., S8915 or S8935). When the current layer is the highest layer in the repeating (e.g., Yes in S8913 or Yes in S8933), the three-dimensional data decoding device determines a prediction structure of three-dimensional points included in the highest layer (e.g., S8918 or S8935). In other words, the three-dimensional data decoding device does not assign three-dimensional points included in the current layer to each of the current layer and the next layer higher by one layer than the current layer, to update three-dimensional points included in each of the current layer and the next layer. The three-dimensional data decoding device predictively decodes prediction residuals included in the bitstream, based on the prediction structure determined in the repeating, to generate decoded data of the items of attribute information of the three-dimensional points included in the layers (e.g., S8916 and S8919, S8920, S8936, or S8939).

According to this three-dimensional data decoding device, prediction structures can be determined while generating layers, so that the processing amount can be reduced. In this case, in addition, according to the three-dimensional data decoding device, an efficient process can be implemented, so that the processing amount can be reduced.

For example, in the determining (e.g., S8915 or S8935), the three-dimensional data decoding device determines prediction structures of the three-dimensional points included in the current layer in sequence according to a first order, and in the predictively decoding (e.g., S8916 and S8919, S8920, S8936, or S8939), the three-dimensional data decoding device generates decoded data of items of attribute information of three-dimensional points included in each of the layers in sequence according to a second order reverse to the first order. For example, the first order is a Morton order.

For example, when the current layer is not the highest layer, in the prediction structure, a three-dimensional point among the three-dimensional points included in the current layer refers to another three-dimensional point among the three-dimensional points included in the current layer and a three-dimensional point among the three-dimensional points included in the next layer, and when the current layer is the highest layer, in the prediction structure, a three-dimensional point among the three-dimensional points included in the highest layer refers to another three-dimensional point among the three-dimensional points included in the highest layer.

For example, the three-dimensional data decoding device includes a processor and memory. Using the memory, the processor performs the above-described process.

EMBODIMENT 9

The following describes the structure of three-dimensional data creation device 810 according to the present embodiment. FIG. 145 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

The following describes the steps performed by three-dimensional data creation device 810 of transmitting three-dimensional data to a following vehicle. FIG. 146 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space on the road ahead of the own vehicle (S801). More specifically, three-dimensional data creation device 810 synthesizes three-dimensional data 834 created on the basis of sensor information 833 of the own vehicle with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change. Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of the own vehicle by distance L (S804).

The processes of step S801 through step S804 are repeated, for example at a predetermined time interval.

When three-dimensional data 835 of the current space to be transmitted includes no difference from the three-dimensional map, three-dimensional data creation device 810 may not transmit three-dimensional data 837 of the space.

In the present embodiment, a client device transmits sensor information obtained through a sensor to a server or another client device.

A structure of a system according to the present embodiment will first be described. FIG. 147 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

FIG. 148 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g., transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 1015 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

A structure of server 901 will be described next. FIG. 149 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g., transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

An operational flow of client device 902 will be described next. FIG. 150 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

FIG. 151 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

An operational flow of server 901 will be described next. FIG. 152 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

FIG. 153 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

The following describes variations of the present embodiment.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Server 901 is not limited to only being a server such as a cloud-based traffic monitoring system, and may also be another (vehicle-mounted) client device. FIG. 154 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

FIG. 155 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits obtained sensor information 1033 to server 901 or another client device 902.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1033 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another client device 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

The following will describe a variation of the present embodiment. FIG. 156 is a diagram illustrating a configuration of a system according to the present embodiment. The system illustrated in FIG. 156 includes server 2001, client device 2002A, and client device 2002B.

Client device 2002A and client device 2002B are each provided in a mobile object such as a vehicle, and transmit sensor information to server 2001. Server 2001 transmits a three-dimensional map (a point cloud) to client device 2002A and client device 2002B.

Client device 2002A includes sensor information obtainer 2011, storage 2012, and data transmission possibility determiner 2013. It should be noted that client device 2002B has the same configuration. Additionally, when client device 2002A and client device 2002B are not particularly distinguished below, client device 2002A and client device 2002B are also referred to as client device 2002.

FIG. 157 is a flowchart illustrating operation of client device 2002 according to the present embodiment.

Sensor information obtainer 2011 obtains a variety of sensor information using sensors (a group of sensors) provided in a mobile object. In other words, sensor information obtainer 2011 obtains sensor information obtained by the sensors (the group of sensors) provided in the mobile object and indicating a surrounding state of the mobile object. Sensor information obtainer 2011 also stores the obtained sensor information into storage 2012. This sensor information includes at least one of information obtained by LiDAR, a visible light image, an infrared image, or a depth image. Additionally, the sensor information may include at least one of sensor position information, speed information, obtainment time information, or obtainment location information. Sensor position information indicates a position of a sensor that has obtained sensor information. Speed information indicates a speed of the mobile object when a sensor obtained sensor information. Obtainment time information indicates a time when a sensor obtained sensor information. Obtainment location information indicates a position of the mobile object or a sensor when the sensor obtained sensor information.

Next, data transmission possibility determiner 2013 determines whether the mobile object (client device 2002) is in an environment in which the mobile object can transmit sensor information to server 2001 (S2002). For example, data transmission possibility determiner 2013 may specify a location and a time at which client device 2002 is present using GPS information etc., and may determine whether data can be transmitted. Additionally, data transmission possibility determiner 2013 may determine whether data can be transmitted, depending on whether it is possible to connect to a specific access point.

When client device 2002 determines that the mobile object is in the environment in which the mobile object can transmit the sensor information to server 2001 (YES in S2002), client device 2002 transmits the sensor information to server 2001 (S2003). In other words, when client device 2002 becomes capable of transmitting sensor information to server 2001, client device 2002 transmits the sensor information held by client device 2002 to server 2001. For example, an access point that enables high-speed communication using millimeter waves is provided in an intersection or the like. When client device 2002 enters the intersection, client device 2002 transmits the sensor information held by client device 2002 to server 2001 at high speed using the millimeter-wave communication.

Next, client device 2002 deletes from storage 2012 the sensor information that has been transmitted to server 2001 (S2004). It should be noted that when sensor information that has not been transmitted to server 2001 meets predetermined conditions, client device 2002 may delete the sensor information. For example, when an obtainment time of sensor information held by client device 2002 precedes a current time by a certain time, client device 2002 may delete the sensor information from storage 2012. In other words, when a difference between the current time and a time when a sensor obtained sensor information exceeds a predetermined time, client device 2002 may delete the sensor information from storage 2012. Besides, when an obtainment location of sensor information held by client device 2002 is separated from a current location by a certain distance, client device 2002 may delete the sensor information from storage 2012. In other words, when a difference between a current position of the mobile object or a sensor and a position of the mobile object or the sensor when the sensor obtained sensor information exceeds a predetermined distance, client device 2002 may delete the sensor information from storage 2012. Accordingly, it is possible to reduce the capacity of storage 2012 of client device 2002.

When client device 2002 does not finish obtaining sensor information (NO in S2005), client device 2002 performs step S2001 and the subsequent steps again. Further, when client device 2002 finishes obtaining sensor information (YES in S2005), client device 2002 completes the process.

Client device 2002 may select sensor information to be transmitted to server 2001, in accordance with communication conditions. For example, when high-speed communication is available, client device 2002 preferentially transmits sensor information (e.g., information obtained by LiDAR) of which the data size held in storage 2012 is large. Additionally, when high-speed communication is not readily available, client device 2002 transmits sensor information (e.g., a visible light image) which has high priority and of which the data size held in storage 2012 is small. Accordingly, client device 2002 can efficiently transmit sensor information held in storage 2012, in accordance with network conditions Client device 2002 may obtain, from server 2001, time information indicating a current time and location information indicating a current location. Moreover, client device 2002 may determine an obtainment time and an obtainment location of sensor information based on the obtained time information and location information. In other words, client device 2002 may obtain time information from server 2001 and generate obtainment time information using the obtained time information. Client device 2002 may also obtain location information from server 2001 and generate obtainment location information using the obtained location information.

For example, regarding time information, server 2001 and client device 2002 perform clock synchronization using a means such as the Network Time Protocol (NTP) or the Precision Time Protocol (PTP). This enables client device 2002 to obtain accurate time information. What's more, since it is possible to synchronize clocks between server 2001 and client devices 2002, it is possible to synchronize times included in pieces of sensor information obtained by separate client devices 2002. As a result, server 2001 can handle sensor information indicating a synchronized time. It should be noted that a means of synchronizing clocks may be any means other than the NTP or PTP. In addition, GPS information may be used as the time information and the location information.

Server 2001 may specify a time or a location and obtain pieces of sensor information from client devices 2002. For example, when an accident occurs, in order to search for a client device in the vicinity of the accident, server 2001 specifies an accident occurrence time and an accident occurrence location and broadcasts sensor information transmission requests to client devices 2002. Then, client device 2002 having sensor information obtained at the corresponding time and location transmits the sensor information to server 2001. In other words, client device 2002 receives, from server 2001, a sensor information transmission request including specification information specifying a location and a time. When sensor information obtained at a location and a time indicated by the specification information is stored in storage 2012, and client device 2002 determines that the mobile object is present in the environment in which the mobile object can transmit the sensor information to server 2001, client device 2002 transmits, to server 2001, the sensor information obtained at the location and the time indicated by the specification information. Consequently, server 2001 can obtain the pieces of sensor information pertaining to the occurrence of the accident from client devices 2002, and use the pieces of sensor information for accident analysis etc.

It should be noted that when client device 2002 receives a sensor information transmission request from server 2001, client device 2002 may refuse to transmit sensor information. Additionally, client device 2002 may set in advance which pieces of sensor information can be transmitted. Alternatively, server 2001 may inquire of client device 2002 each time whether sensor information can be transmitted.

A point may be given to client device 2002 that has transmitted sensor information to server 2001. This point can be used in payment for, for example, gasoline expenses, electric vehicle (EV) charging expenses, a highway toll, or rental car expenses. After obtaining sensor information, server 2001 may delete information for specifying client device 2002 that has transmitted the sensor information. For example, this information is a network address of client device 2002. Since this enables the anonymization of sensor information, a user of client device 2002 can securely transmit sensor information from client device 2002 to server 2001. Server 2001 may include servers. For example, by servers sharing sensor information, even when one of the servers breaks down, the other servers can communicate with client device 2002. Accordingly, it is possible to avoid service outage due to a server breakdown.

A specified location specified by a sensor information transmission request indicates an accident occurrence location etc., and may be different from a position of client device 2002 at a specified time specified by the sensor information transmission request. For this reason, for example, by specifying, as a specified location, a range such as within XX meters of a surrounding area, server 2001 can request information from client device 2002 within the range. Similarly, server 2001 may also specify, as a specified time, a range such as within N seconds before and after a certain time. As a result, server 2001 can obtain sensor information from client device 2002 present for a time from t-N to t+N and in a location within XX meters from absolute position S. When client device 2002 transmits three-dimensional data such as LiDAR, client device 2002 may transmit data created immediately after time t.

Server 2001 may separately specify information indicating, as a specified location, a location of client device 2002 from which sensor information is to be obtained, and a location at which sensor information is desirably obtained. For example, server 2001 specifies that sensor information including at least a range within YY meters from absolute position S is to be obtained from client device 2002 present within XX meters from absolute position S. When client device 2002 selects three-dimensional data to be transmitted, client device 2002 selects one or more pieces of three-dimensional data so that the one or more pieces of three-dimensional data include at least the sensor information including the specified range. Each of the one or more pieces of three-dimensional data is a random-accessible unit of data. In addition, when client device 2002 transmits a visible light image, client device 2002 may transmit pieces of temporally continuous image data including at least a frame immediately before or immediately after time t.

When client device 2002 can use physical networks such as 5G, Wi-Fi, or modes in 5G for transmitting sensor information, client device 2002 may select a network to be used according to the order of priority notified by server 2001. Alternatively, client device 2002 may select a network that enables client device 2002 to ensure an appropriate bandwidth based on the size of transmit data. Alternatively, client device 2002 may select a network to be used, based on data transmission expenses etc. A transmission request from server 2001 may include information indicating a transmission deadline, for example, performing transmission when client device 2002 can start transmission by time t. When server 2001 cannot obtain sufficient sensor information within a time limit, server 2001 may issue a transmission request again.

Sensor information may include header information indicating characteristics of sensor data along with compressed or uncompressed sensor data. Client device 2002 may transmit header information to server 2001 via a physical network or a communication protocol that is different from a physical network or a communication protocol used for sensor data. For example, client device 2002 transmits header information to server 2001 prior to transmitting sensor data. Server 2001 determines whether to obtain the sensor data of client device 2002, based on a result of analysis of the header information. For example, header information may include information indicating a point cloud obtainment density, an elevation angle, or a frame rate of LiDAR, or information indicating, for example, a resolution, an SN ratio, or a frame rate of a visible light image. Accordingly, server 2001 can obtain the sensor information from client device 2002 having the sensor data of determined quality.

As stated above, client device 2002 is provided in the mobile object, obtains sensor information that has been obtained by a sensor provided in the mobile object and indicates a surrounding state of the mobile object, and stores the sensor information into storage 2012. Client device 2002 determines whether the mobile object is present in an environment in which the mobile object is capable of transmitting the sensor information to server 2001, and transmits the sensor information to server 2001 when the mobile object is determined to be present in the environment in which the mobile object is capable of transmitting the sensor information to server 2001.

Additionally, client device 2002 further creates, from the sensor information, three-dimensional data of a surrounding area of the mobile object, and estimates a self-location of the mobile object using the three-dimensional data created.

Besides, client device 2002 further transmits a transmission request for a three-dimensional map to server 2001, and receives the three-dimensional map from server 2001. In the estimating, client device 2002 estimates the self-location using the three-dimensional data and the three-dimensional map.

It should be noted that the above process performed by client device 2002 may be realized as an information transmission method for use in client device 2002.

In addition, client device 2002 may include a processor and memory. Using the memory, the processor may perform the above process.

Next, a sensor information collection system according to the present embodiment will be described. FIG. 158 is a diagram illustrating a configuration of the sensor information collection system according to the present embodiment. As illustrated in FIG. 158, the sensor information collection system according to the present embodiment includes terminal 2021A, terminal 2021B, communication device 2022A, communication device 2022B, network 2023, data collection server 2024, map server 2025, and client device 2026. It should be noted that when terminal 2021A and terminal 2021B are not particularly distinguished, terminal 2021A and terminal 2021B are also referred to as terminal 2021. Additionally, when communication device 2022A and communication device 2022B are not particularly distinguished, communication device 2022A and communication device 2022B are also referred to as communication device 2022.

Data collection server 2024 collects data such as sensor data obtained by a sensor included in terminal 2021 as position-related data in which the data is associated with a position in a three-dimensional space.

Sensor data is data obtained by, for example, detecting a surrounding state of terminal 2021 or an internal state of terminal 2021 using a sensor included in terminal 2021. Terminal 2021 transmits, to data collection server 2024, one or more pieces of sensor data collected from one or more sensor devices in locations at which direct communication with terminal 2021 is possible or at which communication with terminal 2021 is possible by the same communication system or via one or more relay devices.

Data included in position-related data may include, for example, information indicating an operating state, an operating log, a service use state, etc. of a terminal or a device included in the terminal. In addition, the data include in the position-related data may include, for example, information in which an identifier of terminal 2021 is associated with a position or a movement path etc. of terminal 2021.

Information indicating a position included in position-related data is associated with, for example, information indicating a position in three-dimensional data such as three-dimensional map data. The details of information indicating a position will be described later.

Position-related data may include at least one of the above-described time information or information indicating an attribute of data included in the position-related data or a type (e.g., a model number) of a sensor that has created the data, in addition to position information that is information indicating a position. The position information and the time information may be stored in a header area of the position-related data or a header area of a frame that stores the position-related data. Further, the position information and the time information may be transmitted and/or stored as metadata associated with the position-related data, separately from the position-related data.

Map server 2025 is connected to, for example, network 2023, and transmits three-dimensional data such as three-dimensional map data in response to a request from another device such as terminal 2021. Besides, as described in the aforementioned embodiments, map server 2025 may have, for example, a function of updating three-dimensional data using sensor information transmitted from terminal 2021.

Data collection server 2024 is connected to, for example, network 2023, collects position-related data from another device such as terminal 2021, and stores the collected position-related data into a storage of data collection server 2024 or a storage of another server. In addition, data collection server 2024 transmits, for example, metadata of collected position-related data or three-dimensional data generated based on the position-related data, to terminal 2021 in response to a request from terminal 2021.

Network 2023 is, for example, a communication network such as the Internet. Terminal 2021 is connected to network 2023 via communication device 2022. Communication device 2022 communicates with terminal 2021 using one communication system or switching between communication systems. Communication device 2022 is a communication satellite that performs communication using, for example, (1) a base station compliant with Long-Term Evolution (LTE) etc., (2) an access point (AP) for Wi-Fi or millimeter-wave communication etc., (3) a low-power wide-area (LPWA) network gateway such as SIGFOX, LoRaWAN, or Wi-SUN, or (4) a satellite communication system such as DVB-S2.

It should be noted that a base station may communicate with terminal 2021 using a system classified as an LPWA network such as Narrowband Internet of Things (NB IoT) or LTE-M, or switching between these systems.

Here, although, in the example given, terminal 2021 has a function of communicating with communication device 2022 that uses two types of communication systems, and communicates with map server 2025 or data collection server 2024 using one of the communication systems or switching between the communication systems and between communication devices 2022 to be a direct communication partner; a configuration of the sensor information collection system and terminal 2021 is not limited to this. For example, terminal 2021 need not have a function of performing communication using communication systems, and may have a function of performing communication using one of the communication systems. Terminal 2021 may also support three or more communication systems. Additionally, each terminal 2021 may support a different communication system.

Terminal 2021 includes, for example, the configuration of client device 902 illustrated in FIG. 148. Terminal 2021 estimates a self-location etc. using received three-dimensional data. Besides, terminal 2021 associates sensor data obtained from a sensor and position information obtained by self-location estimation to generate position-related data.

Position information appended to position-related data indicates, for example, a position in a coordinate system used for three-dimensional data. For example, the position information is coordinate values represented using a value of a latitude and a value of a longitude. Here, terminal 2021 may include, in the position information, a coordinate system serving as a reference for the coordinate values and information indicating three-dimensional data used for location estimation, along with the coordinate values. Coordinate values may also include altitude information.

The position information may be associated with a data unit or a space unit usable for encoding the above three-dimensional data. Such a unit is, for example, WLD, GOS, SPC, VLM, or VXL. Here, the position information is represented by, for example, an identifier for identifying a data unit such as the SPC corresponding to position-related data. It should be noted that the position information may include, for example, information indicating three-dimensional data obtained by encoding a three-dimensional space including a data unit such as the SPC or information indicating a detailed position within the SPC, in addition to the identifier for identifying the data unit such as the SPC. The information indicating the three-dimensional data is, for example, a file name of the three-dimensional data.

As stated above, by generating position-related data associated with position information based on location estimation using three-dimensional data, the system can give more accurate position information to sensor information than when the system appends position information based on a self-location of a client device (terminal 2021) obtained using a GPS to sensor information. As a result, even when another device uses the position-related data in another service, there is a possibility of more accurately determining a position corresponding to the position-related data in an actual space, by performing location estimation based on the same three-dimensional data.

It should be noted that although the data transmitted from terminal 2021 is the position-related data in the example given in the present embodiment, the data transmitted from terminal 2021 may be data unassociated with position information. In other words, the transmission and reception of three-dimensional data or sensor data described in the other embodiments may be performed via network 2023 described in the present embodiment.

Next, a different example of position information indicating a position in a three-dimensional or two-dimensional actual space or in a map space will be described. The position information appended to position-related data may be information indicating a relative position relative to a keypoint in three-dimensional data. Here, the keypoint serving as a reference for the position information is encoded as, for example, SWLD, and notified to terminal 2021 as three-dimensional data.

The information indicating the relative position relative to the keypoint may be, for example, information that is represented by a vector from the keypoint to the point indicated by the position information, and indicates a direction and a distance from the keypoint to the point indicated by the position information. Alternatively, the information indicating the relative position relative to the keypoint may be information indicating an amount of displacement from the keypoint to the point indicated by the position information along each of the x axis, the y axis, and the z axis. Additionally, the information indicating the relative position relative to the keypoint may be information indicating a distance from each of three or more keypoints to the point indicated by the position information. It should be noted that the relative position need not be a relative position of the point indicated by the position information represented using each keypoint as a reference, and may be a relative position of each keypoint represented with respect to the point indicated by the position information. Examples of position information based on a relative position relative to a keypoint include information for identifying a keypoint to be a reference, and information indicating the relative position of the point indicated by the position information and relative to the keypoint. When the information indicating the relative position relative to the keypoint is provided separately from three-dimensional data, the information indicating the relative position relative to the keypoint may include, for example, coordinate axes used in deriving the relative position, information indicating a type of the three-dimensional data, and/or information indicating a magnitude per unit amount (e.g., a scale) of a value of the information indicating the relative position.

The position information may include, for each keypoint, information indicating a relative position relative to the keypoint. When the position information is represented by relative positions relative to keypoints, terminal 2021 that intends to identify a position in an actual space indicated by the position information may calculate candidate points of the position indicated by the position information from positions of the keypoints each estimated from sensor data, and may determine that a point obtained by averaging the calculated candidate points is the point indicated by the position information. Since this configuration reduces the effects of errors when the positions of the keypoints are estimated from the sensor data, it is possible to improve the estimation accuracy for the point in the actual space indicated by the position information. Besides, when the position information includes information indicating relative positions relative to keypoints, if it is possible to detect any one of the keypoints regardless of the presence of keypoints undetectable due to a limitation such as a type or performance of a sensor included in terminal 2021, it is possible to estimate a value of the point indicated by the position information.

A point identifiable from sensor data can be used as a keypoint. Examples of the point identifiable from the sensor data include a point or a point within a region that satisfies a predetermined keypoint detection condition, such as the above-described three-dimensional feature or feature of visible light data is greater than or equal to a threshold value.

Moreover, a marker etc. placed in an actual space may be used as a keypoint. In this case, the maker may be detected and located from data obtained using a sensor such as LiDAR or a camera. For example, the marker may be represented by a change in color or luminance value (degree of reflection), or a three-dimensional shape (e.g., unevenness). Coordinate values indicating a position of the marker, or a two-dimensional bar code or a bar code etc. generated from an identifier of the marker may be also used.

Furthermore, a light source that transmits an optical signal may be used as a marker. When a light source of an optical signal is used as a marker, not only information for obtaining a position such as coordinate values or an identifier but also other data may be transmitted using an optical signal. For example, an optical signal may include contents of service corresponding to the position of the marker, an address for obtaining contents such as a URL, or an identifier of a wireless communication device for receiving service, and information indicating a wireless communication system etc. for connecting to the wireless communication device. The use of an optical communication device (a light source) as a marker not only facilitates the transmission of data other than information indicating a position but also makes it possible to dynamically change the data.

Terminal 2021 finds out a correspondence relationship of keypoints between mutually different data using, for example, a common identifier used for the data, or information or a table indicating the correspondence relationship of the keypoints between the data. When there is no information indicating a correspondence relationship between keypoints, terminal 2021 may also determine that when coordinates of a keypoint in three-dimensional data are converted into a position in a space of another three-dimensional data, a keypoint closest to the position is a corresponding keypoint.

When the position information based on the relative position described above is used, terminal 2021 that uses mutually different three-dimensional data or services can identify or estimate a position indicated by the position information with respect to a common keypoint included in or associated with each three-dimensional data. As a result, terminal 2021 that uses the mutually different three-dimensional data or the services can identify or estimate the same position with higher accuracy.

Even when map data or three-dimensional data represented using mutually different coordinate systems are used, since it is possible to reduce the effects of errors caused by the conversion of a coordinate system, it is possible to coordinate services based on more accurate position information.

Hereinafter, an example of functions provided by data collection server 2024 will be described. Data collection server 2024 may transfer received position-related data to another data server. When there are data servers, data collection server 2024 determines to which data server received position-related data is to be transferred, and transfers the position-related data to a data server determined as a transfer destination.

Data collection server 2024 determines a transfer destination based on, for example, transfer destination server determination rules preset to data collection server 2024. The transfer destination server determination rules are set by, for example, a transfer destination table in which identifiers respectively associated with terminals 2021 are associated with transfer destination data servers.

Terminal 2021 appends an identifier associated with terminal 2021 to position-related data to be transmitted, and transmits the position-related data to data collection server 2024. Data collection server 2024 determines a transfer destination data server corresponding to the identifier appended to the position-related data, based on the transfer destination server determination rules set out using the transfer destination table etc.; and transmits the position-related data to the determined data server. The transfer destination server determination rules may be specified based on a determination condition set using a time, a place, etc. at which position-related data is obtained. Here, examples of the identifier associated with transmission source terminal 2021 include an identifier unique to each terminal 2021 or an identifier indicating a group to which terminal 2021 belongs.

The transfer destination table need not be a table in which identifiers associated with transmission source terminals are directly associated with transfer destination data servers. For example, data collection server 2024 holds a management table that stores tag information assigned to each identifier unique to terminal 2021, and a transfer destination table in which the pieces of tag information are associated with transfer destination data servers. Data collection server 2024 may determine a transfer destination data server based on tag information, using the management table and the transfer destination table. Here, the tag information is, for example, control information for management or control information for providing service assigned to a type, a model number, an owner of terminal 2021 corresponding to the identifier, a group to which terminal 2021 belongs, or another identifier. Moreover, in the transfer destination able, identifiers unique to respective sensors may be used instead of the identifiers associated with transmission source terminals 2021. Furthermore, the transfer destination server determination rules may be set by client device 2026.

Data collection server 2024 may determine data servers as transfer destinations, and transfer received position-related data to the data servers. According to this configuration, for example, when position-related data is automatically backed up or when, in order that position-related data is commonly used by different services, there is a need to transmit the position-related data to a data server for providing each service, it is possible to achieve data transfer as intended by changing a setting of data collection server 2024. As a result, it is possible to reduce the number of steps necessary for building and changing a system, compared to when a transmission destination of position-related data is set for each terminal 2021.

Data collection server 2024 may register, as a new transfer destination, a data server specified by a transfer request signal received from a data server; and transmit position-related data subsequently received to the data server, in response to the transfer request signal.

Data collection server 2024 may store position-related data received from terminal 2021 into a recording device, and transmit position-related data specified by a transmission request signal received from terminal 2021 or a data server to request source terminal 2021 or the data server in response to the transmission request signal.

Data collection server 2024 may determine whether position-related data is suppliable to a request source data server or terminal 2021, and transfer or transmit the position-related data to the request source data server or terminal 2021 when determining that the position-related data is suppliable.

When data collection server 2024 receives a request for current position-related data from client device 2026, even if it is not a timing for transmitting position-related data by terminal 2021, data collection server 2024 may send a transmission request for the current position-related data to terminal 2021, and terminal 2021 may transmit the current position-related data in response to the transmission request.

Although terminal 2021 transmits position information data to data collection server 2024 in the above description, data collection server 2024 may have a function of managing terminal 2021 such as a function necessary for collecting position-related data from terminal 2021 or a function used when collecting position-related data from terminal 2021.

Data collection server 2024 may have a function of transmitting, to terminal 2021, a data request signal for requesting transmission of position information data, and collecting position-related data.

Management information such as an address for communicating with terminal 2021 from which data is to be collected or an identifier unique to terminal 2021 is registered in advance in data collection server 2024. Data collection server 2024 collects position-related data from terminal 2021 based on the registered management information. Management information may include information such as types of sensors included in terminal 2021, the number of sensors included in terminal 2021, and communication systems supported by terminal 2021.

Data collection server 2024 may collect information such as an operating state or a current position of terminal 2021 from terminal 2021.

Registration of management information may be instructed by client device 2026, or a process for the registration may be started by terminal 2021 transmitting a registration request to data collection server 2024. Data collection server 2024 may have a function of controlling communication between data collection server 2024 and terminal 2021.

Communication between data collection server 2024 and terminal 2021 may be established using a dedicated line provided by a service provider such as a mobile network operator (MNO) or a mobile virtual network operator (MVNO), or a virtual dedicated line based on a virtual private network (VPN). According to this configuration, it is possible to perform secure communication between terminal 2021 and data collection server 2024.

Data collection server 2024 may have a function of authenticating terminal 2021 or a function of encrypting data to be transmitted and received between data collection server 2024 and terminal 2021. Here, the authentication of terminal 2021 or the encryption of data is performed using, for example, an identifier unique to terminal 2021 or an identifier unique to a terminal group including terminals 2021, which is shared in advance between data collection server 2024 and terminal 2021. Examples of the identifier include an international mobile subscriber identity (IMSI) that is a unique number stored in a subscriber identity module (SIM) card. An identifier for use in authentication and an identifier for use in encryption of data may be identical or different.

The authentication or the encryption of data between data collection server 2024 and terminal 2021 is feasible when both data collection server 2024 and terminal 2021 have a function of performing the process. The process does not depend on a communication system used by communication device 2022 that performs relay. Accordingly, since it is possible to perform the common authentication or encryption without considering whether terminal 2021 uses a communication system, the user's convenience of system architecture is increased. However, the expression "does not depend on a communication system used by communication device 2022 that performs relay" means a change according to a communication system is not essential. In other words, in order to improve the transfer efficiency or ensure security, the authentication or the encryption of data between data collection server 2024 and terminal 2021 may be changed according to a communication system used by a relay device.

Data collection server 2024 may provide client device 2026 with a User Interface (UI) that manages data collection rules such as types of position-related data collected from terminal 2021 and data collection schedules. Accordingly, a user can specify, for example, terminal 2021 from which data is to be collected using client device 2026, a data collection time, and a data collection frequency. Additionally, data collection server 2024 may specify, for example, a region on a map from which data is to be desirably collected, and collect position-related data from terminal 2021 included in the region.

When the data collection rules are managed on a per terminal 2021 basis, client device 2026 presents, on a screen, a list of terminals 2021 or sensors to be managed. The user sets, for example, a necessity for data collection or a collection schedule for each item in the list.

When a region on a map from which data is to be desirably collected is specified, client device 2026 presents, on a screen, a two-dimensional or three-dimensional map of a region to be managed. The user selects the region from which data is to be collected on the displayed map. Examples of the region selected on the map include a circular or rectangular region having a point specified on the map as the center, or a circular or rectangular region specifiable by a drag operation. Client device 2026 may also select a region in a preset unit such as a city, an area or a block in a city, or a main road, etc. Instead of specifying a region using a map, a region may be set by inputting values of a latitude and a longitude, or a region may be selected from a list of candidate regions derived based on inputted text information. Text information is, for example, a name of a region, a city, or a landmark.

Moreover, data may be collected while the user dynamically changes a specified region by specifying one or more terminals 2021 and setting a condition such as within 100 meters of one or more terminals 2021.

When client device 2026 includes a sensor such as a camera, a region on a map may be specified based on a position of client device 2026 in an actual space obtained from sensor data. For example, client device 2026 may estimate a self-location using sensor data, and specify, as a region from which data is to be collected, a region within a predetermined distance from a point on a map corresponding to the estimated location or a region within a distance specified by the user. Client device 2026 may also specify, as the region from which the data is to be collected, a sensing region of the sensor, that is, a region corresponding to obtained sensor data. Alternatively, client device 2026 may specify, as the region from which the data is to be collected, a region based on a location corresponding to sensor data specified by the user. Either client device 2026 or data collection server 2024 may estimate a region on a map or a location corresponding to sensor data.

When a region on a map is specified, data collection server 2024 may specify terminal 2021 within the specified region by collecting current position information of each terminal 2021, and may send a transmission request for position-related data to specified terminal 2021. When data collection server 2024 transmits information indicating a specified region to terminal 2021, determines whether terminal 2021 is present within the specified region, and determines that terminal 2021 is present within the specified region, rather than specifying terminal 2021 within the region, terminal 2021 may transmit position-related data.

Data collection server 2024 transmits, to client device 2026, data such as a list or a map for providing the above-described User Interface (UI) in an application executed by client device 2026. Data collection server 2024 may transmit, to client device 2026, not only the data such as the list or the map but also an application program. Additionally, the above UI may be provided as contents created using HTML displayable by a browser. It should be noted that part of data such as map data may be supplied from a server, such as map server 2025, other than data collection server 2024.

When client device 2026 receives an input for notifying the completion of an input such as pressing of a setup key by the user, client device 2026 transmits the inputted information as configuration information to data collection server 2024. Data collection server 2024 transmits, to each terminal 2021, a signal for requesting position-related data or notifying position-related data collection rules, based on the configuration information received from client device 2026, and collects the position-related data.

Next, an example of controlling operation of terminal 2021 based on additional information added to three-dimensional or two-dimensional map data will be described.

In the present configuration, object information that indicates a position of a power feeding part such as a feeder antenna or a feeder coil for wireless power feeding buried under a road or a parking lot is included in or associated with three-dimensional data, and such object information is provided to terminal 2021 that is a vehicle or a drone.

A vehicle or a drone that has obtained the object information to get charged automatically moves so that a position of a charging part such as a charging antenna or a charging coil included in the vehicle or the drone becomes opposite to a region indicated by the object information, and such vehicle or a drone starts to charge itself. It should be noted that when a vehicle or a drone has no automatic driving function, a direction to move in or an operation to perform is presented to a driver or an operator by using an image displayed on a screen, audio, etc. When a position of a charging part calculated based on an estimated self-location is determined to fall within the region indicated by the object information or a predetermined distance from the region, an image or audio to be presented is changed to a content that puts a stop to driving or operating, and the charging is started.

Object information need not be information indicating a position of a power feeding part, and may be information indicating a region within which placement of a charging part results in a charging efficiency greater than or equal to a predetermined threshold value. A position indicated by object information may be represented by, for example, the central point of a region indicated by the object information, a region or a line within a two-dimensional plane, or a region, a line, or a plane within a three-dimensional space.

According to this configuration, since it is possible to identify the position of the power feeding antenna unidentifiable by sensing data of LiDAR or an image captured by the camera, it is possible to highly accurately align a wireless charging antenna included in terminal 2021 such as a vehicle with a wireless power feeding antenna buried under a road. As a result, it is possible to increase a charging speed at the time of wireless charging and improve the charging efficiency.

Object information may be an object other than a power feeding antenna. For example, three-dimensional data includes, for example, a position of an AP for millimeter-wave wireless communication as object information. Accordingly, since terminal 2021 can identify the position of the AP in advance, terminal 2021 can steer a directivity of beam to a direction of the object information and start communication. As a result, it is possible to improve communication quality such as increasing transmission rates, reducing the duration of time before starting communication, and extending a communicable period.

Object information may include information indicating a type of an object corresponding to the object information. In addition, when terminal 2021 is present within a region in an actual space corresponding to a position in three-dimensional data of the object information or within a predetermined distance from the region, the object information may include information indicating a process to be performed by terminal 2021.

Object information may be provided by a server different from a server that provides three-dimensional data. When object information is provided separately from three-dimensional data, object groups in which object information used by the same service is stored may be each provided as separate data according to a type of a target service or a target device.

Three-dimensional data used in combination with object information may be point cloud data of WLD or keypoint data of SWLD.

In the three-dimensional data encoding device, when attribute information of a current three-dimensional point to be encoded is layer-encoded using Levels of Detail (LoDs), the three-dimensional data decoding device may decode the attribute information in layers down to LoD required by the three-dimensional data decoding device and need not decode the attribute information in layers not required. For example, when the total number of LoDs for the attribute information in a bitstream generated by the three-dimensional data encoding device is N, the three-dimensional data decoding device may decode M LoDs (M<N), i.e., layers from the uppermost layer LoD0 to LoD(M−1), and need not decode the remaining LoDs, i.e., layers down to LoD(N−1). With this, while reducing the processing load, the three-dimensional data decoding device can decode the attribute information in layers from LoD0 to LoD(M−1) required by the three-dimensional data decoding device.

FIG. 159 is a diagram illustrating the foregoing use case. In the example shown in FIG. 159, a server stores a three-dimensional map obtained by encoding three-dimensional geometry information and attribute information. The server (the three-dimensional data encoding device) broadcasts the three-dimensional map to client devices (the three-dimensional data decoding devices: for example, vehicles, drones, etc.) in an area managed by the server, and each client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure or the like. Then, the sever layer-encodes the attribute information of the three-dimensional map using N LoDs established based on the geometry information. The server stores a bitstream of the three-dimensional map obtained by the layer-encoding.

Next, in response to a send request for the map information from the client device in the area managed by the server, the server sends the bitstream of the encoded three-dimensional map to the client device.

The client device receives the bitstream of the three-dimensional map sent from the server, and decodes the geometry information and the attribute information of the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and decodes all the information in the bitstream.

Moreover, when the client device displays the three-dimensional map information to a user or the like, the client device determines that a decoding result to the sparse three-dimensional points is necessary as the attribute information, and decodes the geometry information and the attribute information in M LoDs (M<N) starting from an upper layer LoD0.

In this way, the processing load of the client device can be reduced by changing LoDs for the attribute information to be decoded in accordance with the intended use of the client device.

In the example shown in FIG. 159, for example, the three-dimensional map includes geometry information and attribute information. The geometry information is encoded using the octree. The attribute information is encoded using N LoDs.

Client device A performs highly accurate estimation of the self-position. In this case, client device A determines that all the geometry information and all the attribute information are necessary, and decodes all the geometry information and all the attribute information constructed from N LoDs in the bitstream.

Client device B displays the three-dimensional map to a user. In this case, client device B determines that the geometry information and the attribute information in M LoDs (M<N) are necessary, and decodes the geometry information and the attribute information constructed from M LoDs in the bitstream.

It is to be noted that the server may broadcast the three-dimensional map to the client devices, or multicast or unicast the three-dimensional map to the client devices.

The following describes a variation of the system according to the present embodiment. In the three-dimensional data encoding device, when attribute information of a current three-dimensional point to be encoded is layer-encoded using LoDs, the three-dimensional data encoding device may encode the attribute information in layers down to LoD required by the three-dimensional data decoding device and need not encode the attribute information in layers not required. For example, when the total number of LoDs is N, the three-dimensional data encoding device may generate a bitstream by encoding M LoDs (M<N), i.e., layers from the uppermost layer LoD0 to LoD(M−1), and not encoding the remaining LoDs, i.e., layers down to LoD(N−1). With this, in response to a request from the three-dimensional data decoding device, the three-dimensional data encoding device can provide a bitstream in which the attribute information from LoD0 to LoD(M−1) required by the three-dimensional data decoding device is encoded.

FIG. 160 is a diagram illustrating the foregoing use case. In the example shown in FIG. 160, a server stores a three-dimensional map obtained by encoding three-dimensional geometry information and attribute information. The server (the three-dimensional data encoding device) unicasts, in response to a request from the client device, the three-dimensional map to a client device (the three-dimensional data decoding device: for example, a vehicle, a drone, etc.) in an area managed by the server, and the client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure, or the like. Then, the sever generates a bitstream of three-dimensional map A by layer-encoding the attribute information of the three-dimensional map using N LoDs established based on the geometry information, and stores the generated bitstream in the server. The sever also generates a bitstream of three-dimensional map B by layer-encoding the attribute information of the three-dimensional map using M LoDs (M<N) established based on the geometry information, and stores the generated bitstream in the server.

Next, the client device requests the server to send the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and requests the server to send the bitstream of three-dimensional map A. Moreover, when the client device displays the three-dimensional map information to a user or the like, the client device determines that a decoding result to the sparse three-dimensional points is necessary as the attribute information, and requests the server to send the bitstream of three-dimensional map B including the geometry information and the attribute information in M LoDs (M<N) starting from an upper layer LoD0. Then, in response to the send request for the map information from the client device, the server sends the bitstream of encoded three-dimensional map A or B to the client device.

The client device receives the bitstream of three-dimensional map A or B sent from the server in accordance with the intended use of the client device, and decodes the received bitstream. In this way, the server changes a bitstream to be sent, in accordance with the intended use of the client device. With this, it is possible to reduce the processing load of the client device.

In the example shown in FIG. 160, the server stores three-dimensional map A and three-dimensional map B. The server generates three-dimensional map A by encoding the geometry information of the three-dimensional map using, for example, an octree structure, and encoding the attribute information of the three-dimensional map using N LoDs. In other words, NumLoD included in the bitstream of three-dimensional map A indicates N.

The server also generates three-dimensional map B by encoding the geometry information of the three-dimensional map using, for example, an octree structure, and encoding the attribute information of the three-dimensional map using M LoDs. In other words, NumLoD included in the bitstream of three-dimensional map B indicates M.

Client device A performs highly accurate estimation of the self-position. In this case, client device A determines that all the geometry information and all the attribute information are necessary, and requests the server to send three-dimensional map A including all the geometry information and the attribute information constructed from N LoDs. Client device A receives three-dimensional map A, and decodes all the geometry information and the attribute information constructed from N LoDs.

Client device B displays the three-dimensional map to a user. In this case, client device B determines that all the geometry information and the attribute information in M LoDs (M<N) are necessary, and requests the server to send three-dimensional map B including all the geometry information and the attribute information constructed from M LoDs. Client device B receives three-dimensional map B, and decodes all the geometry information and the attribute information constructed from M LoDs.

It is to be noted that in addition to three-dimensional map B, the server (the three-dimensional data encoding device) may generate three-dimensional map C in which attribute information in the remaining N-M LoDs is encoded, and send three-dimensional map C to client device B in response to the request from client device B. Moreover, client device B may obtain the decoding result of N LoDs using the bitstreams of three-dimensional maps B and C.

Hereinafter, an example of an application process will be described. FIG. 161 is a flowchart illustrating an example of the application process. When an application operation is started, a three-dimensional data demultiplexing device obtains an ISOBMFF file including point cloud data and a plurality of pieces of encoded data (S7301). For example, the three-dimensional data demultiplexing device may obtain the ISOBMFF file through communication, or may read the ISOBMFF file from the accumulated data.

Next, the three-dimensional data demultiplexing device analyzes the general configuration information in the ISOBMFF file, and specifies the data to be used for the application (S7302). For example, the three-dimensional data demultiplexing device obtains data that is used for processing, and does not obtain data that is not used for processing.

Next, the three-dimensional data demultiplexing device extracts one or more pieces of data to be used for the application, and analyzes the configuration information on the data (S7303).

When the type of the data is encoded data (encoded data in S7304), the three-dimensional data demultiplexing device converts the ISOBMFF to an encoded stream, and extracts a timestamp (S7305). Additionally, the three-dimensional data demultiplexing device refers to, for example, the flag indicating whether or not the synchronization between data is aligned to determine whether or not the synchronization between data is aligned, and may perform a synchronization process when not aligned.

Next, the three-dimensional data demultiplexing device decodes the data with a predetermined method according to the timestamp and the other instructions, and processes the decoded data (S7306).

On the other hand, when the type of the data is RAW data (RAW data in S7304), the three-dimensional data demultiplexing device extracts the data and timestamp (S7307). Additionally, the three-dimensional data demultiplexing device may refer to, for example, the flag indicating whether or not the synchronization between data is aligned to determine whether or not the synchronization between data is aligned, and may perform a synchronization process when not aligned. Next, the three-dimensional data demultiplexing device processes the data according to the timestamp and the other instructions (S7308).

For example, an example will be described in which the sensor signals obtained by a beam LiDAR, a FLASH LiDAR, and a camera are encoded and multiplexed with respective different encoding schemes. FIG. 162 is a diagram illustrating examples of the sensor ranges of a beam LiDAR, a FLASH LiDAR, and a camera. For example, the beam LiDAR detects all directions in the periphery of a vehicle (sensor), and the FLASH LiDAR and the camera detect the range in one direction (for example, the front) of the vehicle.

In the case of an application that integrally handles a LiDAR point cloud, the three-dimensional data demultiplexing device refers to the general configuration information, and extracts and decodes the encoded data of the beam LiDAR and the FLASH LiDAR. Additionally, the three-dimensional data demultiplexing device does not extract camera images.

According to the timestamps of the beam LiDAR and the FLASH LiDAR, the three-dimensional data demultiplexing device simultaneously processes the respective encoded data of the time of the same timestamp.

For example, the three-dimensional data demultiplexing device may present the processed data with a presentation device, may synthesize the point cloud data of the beam LiDAR and the FLASH LiDAR, or may perform a process such as rendering.

Additionally, in the case of an application that performs calibration between data, the three-dimensional data demultiplexing device may extract sensor geometry information, and use the sensor geometry information in the application.

For example, the three-dimensional data demultiplexing device may select whether to use beam LiDAR information or FLASH LiDAR information in the application, and may switch the process according to the selection result.

In this manner, since it is possible to adaptively change the obtaining of data and the encoding process according to the process of the application, the processing amount and the power consumption can be reduced.

Hereinafter, a use case in automated driving will be described. FIG. 163 is a diagram illustrating a configuration example of an automated driving system. This automated driving system includes cloud server 7350, and edge 7360 such as an in-vehicle device or a mobile device. Cloud server 7350 includes demultiplexer 7351, decoders 7352A, 7352B, and 7355, point cloud data synthesizer 7353, large data accumulator 7354, comparator 7356, and encoder 7357. Edge 7360 includes sensors 7361A and 7361B, point cloud data generators 7362A and 7362B, synchronizer 7363, encoders 7364A and 7364B, multiplexer 7365, update data accumulator 7366, demultiplexer 7367, decoder 7368, filter 7369, self-position estimator 7370, and driving controller 7371.

In this system, edge 7360 downloads large data, which is large point-cloud map data accumulated in cloud server 7350. Edge 7360 performs a self-position estimation process of edge 7360 (a vehicle or a terminal) by matching the large data with the sensor information obtained by edge 7360. Additionally, edge 7360 uploads the obtained sensor information to cloud server 7350, and updates the large data to the latest map data.

Additionally, in various applications that handle point cloud data in the system, point cloud data with different encoding methods are handled.

Cloud server 7350 encodes and multiplexes large data. Specifically, encoder 7357 performs encoding by using a third encoding method suitable for encoding a large point cloud. Additionally, encoder 7357 multiplexes encoded data. Large data accumulator 7354 accumulates the data encoded and multiplexed by encoder 7357.

Edge 7360 performs sensing. Specifically, point cloud data generator 7362A generates first point cloud data (geometry information (geometry) and attribute information) by using the sensing information obtained by sensor 7361A. Point cloud data generator 7362B generates second point cloud data (geometry information and attribute information) by using the sensing information obtained by sensor 7361B. The generated first point cloud data and second point cloud data are used for the self-position estimation or vehicle control of automated driving, or for map updating. In each process, a part of information of the first point cloud data and the second point cloud data may be used.

Edge 7360 performs the self-position estimation. Specifically, edge 7360 downloads large data from cloud server 7350. Demultiplexer 7367 obtains encoded data by demultiplexing the large data in a file format. Decoder 7368 obtains large data, which is large point-cloud map data, by decoding the obtained encoded data.

Self-position estimator 7370 estimates the self-position in the map of a vehicle by matching the obtained large data with the first point cloud data and the second point cloud data generated by point cloud data generators 7362A and 7362B. Additionally, driving controller 7371 uses the matching result or the self-position estimation result for driving control.

Note that self-position estimator 7370 and driving controller 7371 may extract specific information, such as geometry information, of the large data, and may perform processes by using the extracted information. Additionally, filter 7369 performs a process such as correction or decimation on the first point cloud data and the second point cloud data. Self-position estimator 7370 and driving controller 7371 may use the first point cloud data and second point cloud data on which the process has been performed. Additionally, self-position estimator 7370 and driving controller 7371 may use the sensor signals obtained by sensors 7361A and 7361B.

Synchronizer 7363 performs time synchronization and geometry correction between a plurality of sensor signals or the pieces of data of a plurality of pieces of point cloud data. Additionally, synchronizer 7363 may correct the geometry information on the sensor signal or point cloud data to match the large data, based on geometry correction information on the large data and sensor data generated by the self-position estimation process.

Note that synchronization and geometry correction may be performed not by edge 7360, but by cloud server 7350. In this case, edge 7360 may multiplex the synchronization information and the geometry information to transmit the synchronization information and the geometry information to cloud server 7350.

Edge 7360 encodes and multiplexes the sensor signal or point cloud data. Specifically, the sensor signal or point cloud data is encoded by using a first encoding method or a second encoding method suitable for encoding each signal. For example, encoder 7364A generates first encoded data by encoding first point cloud data by using the first encoding method. Encoder 7364B generates second encoded data by encoding second point cloud data by using the second encoding method.

Multiplexer 7365 generates a multiplexed signal by multiplexing the first encoded data, the second encoded data, the synchronization information, and the like. Update data accumulator 7366 accumulates the generated multiplexed signal. Additionally, update data accumulator 7366 uploads the multiplexed signal to cloud server 7350.

Cloud server 7350 synthesizes the point cloud data. Specifically, demultiplexer 7351 obtains the first encoded data and the second encoded data by demultiplexing the multiplexed signal uploaded to cloud server 7350. Decoder 7352A obtains the first point cloud data (or sensor signal) by decoding the first encoded data. Decoder 7352B obtains the second point cloud data (or sensor signal) by decoding the second encoded data.

Point cloud data synthesizer 7353 synthesizes the first point cloud data and the second point cloud data with a predetermined method. When the synchronization information and the geometry correction information are multiplexed in the multiplexed signal, point cloud data synthesizer 7353 may perform synthesis by using these pieces of information.

Decoder 7355 demultiplexes and decodes the large data accumulated in large data accumulator 7354. Comparator 7356 compares the point cloud data generated based on the sensor signal obtained by edge 7360 with the large data held by cloud server 7350, and determines the point cloud data that needs to be updated. Comparator 7356 updates the point cloud data that is determined to need to be updated of the large data to the point cloud data obtained from edge 7360.

Encoder 7357 encodes and multiplexes the updated large data, and accumulates the obtained data in large data accumulator 7354.

As described above, the signals to be handled may be different, and the signals to be multiplexed or encoding methods may be different, according to the usage or applications to be used. Even in such a case, flexible decoding and application processes are enabled by multiplexing data of various encoding schemes by using the present embodiment. Additionally, even in a case where the encoding schemes of signals are different, by conversion to an encoding scheme suitable for demultiplexing, decoding, data conversion, encoding, and multiplexing processing, it becomes possible to build various applications and systems, and to offer of flexible services.

Hereinafter, an example of decoding and application of divided data will be described. First, the information on divided data will be described. FIG. 164 is a diagram illustrating a configuration example of a bitstream. The general information of divided data indicates, for each divided data, the sensor ID (sensor_id) and data ID (data_id) of the divided data. Note that the data ID is also indicated in the header of each encoded data.

Note that the general information of divided data illustrated in FIG. 164 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

The general information of divided data may be stored in SPS, GPS, or APS, which is the metadata, or may be stored in SEI, which is the metadata not required for encoding. Additionally, at the time of multiplexing, the three-dimensional data encoding device stores the SEI in a file of ISOBMFF. The three-dimensional data decoding device can obtain desired divided data based on the metadata.

In FIG. 164, SPS is the metadata of the entire encoded data, GPS is the metadata of the geometry information, APS is the metadata for each attribute information, G is encoded data of the geometry information for each divided data, and A1, etc. are encoded data of the attribute information for each divided data.

Next, an application example of divided data will be described. An example of application will be described in which an arbitrary point cloud is selected, and the selected point cloud is presented. FIG. 165 is a flowchart of a point cloud selection process performed by this application. FIG. 166 to FIG. 168 are diagrams illustrating screen examples of the point cloud selection process.

As illustrated in FIG. 166, the three-dimensional data decoding device that performs the application includes, for example, a UI unit that displays an input UI (user interface) 8661 for selecting an arbitrary point cloud. Input UI 8661 includes presenter 8662 that presents the selected point cloud, and an operation unit (buttons 8663 and 8664) that receives operations by a user. After a point cloud is selected in UI 8661, the three-dimensional data decoding device obtains desired data from accumulator 8665.

First, based on an operation by the user on input UI 8661, the point cloud information that the user wants to display is selected (S8631). Specifically, by selecting button 8663, the point cloud based on sensor 1 is selected. By selecting button 8664, the point cloud based on sensor 2 is selected. Alternatively, by selecting both button 8663 and button 8664, the point cloud based on sensor 1 and the point cloud based on sensor 2 are selected. Note that it is an example of the selection method of point cloud, and it is not limited to this.

Next, the three-dimensional data decoding device analyzes the general information of divided data included in the multiplexed signal (bitstream) or encoded data, and specifies the data ID (data_id) of the divided data constituting the selected point cloud from the sensor ID (sensor_id) of the selected sensor (S8632). Next, the three-dimensional data decoding device extracts, from the multiplexed signal, the encoded data including the specified and desired data ID, and decodes the extracted encoded data to decode the point cloud based on the selected sensor (S8633). Note that the three-dimensional data decoding device does not decode the other encoded data.

Lastly, the three-dimensional data decoding device presents (for example, displays) the decoded point cloud (S8634). FIG. 167 illustrates an example in the case where button 8663 for sensor 1 is pressed, and the point cloud of sensor 1 is presented. FIG. 168 illustrates an example in the case where both button 8663 for sensor 1 and button 8664 for sensor 2 are pressed, and the point clouds of sensor 1 and sensor 2 are presented.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method comprising:
assigning three-dimensional points to one of layers, based on items of geometry information of the three-dimensional points;
searching three-dimensional points surrounding a current three-dimensional point to be encoded, to select, from the three-dimensional points, a three-dimensional point to be referred to when a predicted value of attribute information of the current three-dimensional point is calculated, the current three-dimensional point belonging to a first layer among the layers; and
calculating the predicted value of the attribute information of the current three-dimensional point using the three-dimensional point selected,
wherein in the searching of the three-dimensional points, a search range for a same layer as the current three-dimensional point is different from a search range for a layer higher than the first layer.

2. The three-dimensional data encoding method according to claim 1,
wherein in the searching of the three-dimensional points, the search range for the same layer as the current three-dimensional point is larger than the search range for the layer higher than the first layer.

3. A three-dimensional data decoding method comprising:
assigning three-dimensional points to one of layers, based on items of geometry information of the three-dimensional points;
searching three-dimensional points surrounding a current three-dimensional point to be decoded, to select, from the three-dimensional points, a three-dimensional point to be referred to when a predicted value of attribute information of the current three-dimensional point is calculated, the current three-dimensional point belonging to a first layer among the layers; and
calculating the predicted value of the attribute information of the current three-dimensional point using the three-dimensional point selected,
wherein in the searching of the three-dimensional points, a search range for a same layer as the current three-dimensional point is different from a search range for a layer higher than the first layer.

4. The three-dimensional data decoding method according to claim 3,
wherein in the searching of the three-dimensional points, the search range for the same layer as the current three-dimensional point is larger than the search range for the layer higher than the first layer.

5. A three-dimensional data encoding device comprising:
a processor; and
memory,
wherein using the memory, the processor:
assigns three-dimensional points to one of layers, based on items of geometry information of the three-dimensional points;
searches three-dimensional points surrounding a current three-dimensional point to be encoded, to select, from the three-dimensional points, a three-dimensional point to be referred to when a predicted value of attribute information of the current three-dimensional point is calculated, the current three-dimensional point belonging to a first layer among the layers; and
calculates the predicted value of the attribute information of the current three-dimensional point using the three-dimensional point selected,
wherein in the searching of the three-dimensional points, a search range for a same layer as the current three-dimensional point is different from a search range for a layer higher than the first layer.

6. A three-dimensional data decoding device comprising:
a processor; and
memory,
wherein using the memory, the processor:
assigns three-dimensional points to one of layers, based on items of geometry information of the three-dimensional points;
searches three-dimensional points surrounding a current three-dimensional point to be decoded, to select, from the three-dimensional points, a three-dimensional point to be referred to when a predicted value of attribute information of the current three-dimensional point is calculated, the current three-dimensional point belonging to a first layer among the layers; and
calculates the predicted value of the attribute information of the current three-dimensional point using the three-dimensional point selected,
wherein in the searching of the three-dimensional points, a search range for a same layer as the current three-dimensional point is different from a search range for a layer higher than the first layer.

* * * * *